(12) United States Patent
Takashima

(10) Patent No.: US 8,401,179 B2
(45) Date of Patent: Mar. 19, 2013

(54) ENCRYPTION PARAMETER SETTING APPARATUS, KEY GENERATION APPARATUS, CRYPTOGRAPHIC SYSTEM, PROGRAM, ENCRYPTION PARAMETER SETTING METHOD, AND KEY GENERATION METHOD

(75) Inventor: Katsuyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 306 days.

(21) Appl. No.: 12/863,100

(22) PCT Filed: Jan. 18, 2008

(86) PCT No.: PCT/JP2008/050582
§ 371 (c)(1),
(2), (4) Date: Jul. 15, 2010

(87) PCT Pub. No.: WO2009/090750
PCT Pub. Date: Jul. 23, 2009

(65) Prior Publication Data
US 2010/0329454 A1    Dec. 30, 2010

(51) Int. Cl.
*H04L 29/06* (2006.01)
(52) U.S. Cl. .............................. 380/28; 380/44
(58) Field of Classification Search ............ 380/28, 380/44
See application file for complete search history.

(56) References Cited

U.S. PATENT DOCUMENTS

| | | | |
|---|---|---|---|
| 6,560,336 B1 * | 5/2003 | Arita .............................. | 380/28 |
| 6,892,940 B2 * | 5/2005 | Kocarev et al. ............... | 235/380 |
| 7,000,110 B1 * | 2/2006 | Terao ............................ | 713/172 |
| 7,003,537 B1 * | 2/2006 | Tamura ........................ | 708/492 |
| 7,020,776 B2 * | 3/2006 | Lauter et al. .................. | 713/176 |
| 7,023,990 B1 * | 4/2006 | Arita ............................. | 380/28 |
| 7,043,015 B2 * | 5/2006 | Lauter et al. .................. | 380/28 |
| 7,197,528 B2 * | 3/2007 | Arita ............................ | 708/670 |
| 7,209,555 B2 * | 4/2007 | Futa et al. ..................... | 380/28 |
| 7,236,589 B2 * | 6/2007 | Lauter et al. .................. | 380/28 |
| 7,251,325 B2 * | 7/2007 | Paeng et al. ................... | 380/28 |
| 7,260,552 B2 * | 8/2007 | Riera Jorba et al. ........... | 705/12 |
| 7,440,569 B2 * | 10/2008 | Eisentraeger et al. ......... | 380/28 |
| 7,469,048 B2 * | 12/2008 | Lauter et al. .................. | 380/28 |
| 7,594,261 B2 * | 9/2009 | Lauter et al. .................. | 726/14 |
| 7,697,683 B2 * | 4/2010 | Katagi et al. .................. | 380/30 |
| 7,730,315 B2 * | 6/2010 | Lauter et al. .................. | 713/176 |

(Continued)

FOREIGN PATENT DOCUMENTS

JP    2005-316267    11/2005

OTHER PUBLICATIONS

Karpynskyy et al., Elliptic curve parameters generation, Feb. 2004, TCSET, IEEE.*

(Continued)

*Primary Examiner* — David García Cervetti
(74) *Attorney, Agent, or Firm* — Oblon, Spivak, McClelland, Maier & Neustadt, L.L.P.

(57) ABSTRACT

A sophisticated cryptographic system is realized without using a pairing operation on a composite order. A random matrix selection unit 142 randomly selects a random matrix $V^*$ from a plurality of matrices satisfying a predetermined condition, based on a plurality of pairing log coefficients $\eta_i$ calculated by an encryption parameter setting apparatus 100. An output base calculation unit 143 calculates a plurality of output bases $g_k$, based on a plurality of base divisors $\tilde{D}_j$ calculated by the encryption parameter setting apparatus 100 and the random matrix $V^*$ selected by the random matrix selection unit 142.

23 Claims, 19 Drawing Sheets

U.S. PATENT DOCUMENTS

| | | | |
|---|---|---|---|
| 7,764,785 B2* | 7/2010 | Al-Khoraidly et al. | 380/28 |
| 7,835,517 B2* | 11/2010 | Akishita et al. | 380/30 |
| 7,853,013 B2* | 12/2010 | Vasyltsov et al. | 380/28 |
| 7,856,100 B2* | 12/2010 | Wang et al. | 380/30 |
| 7,885,406 B2* | 2/2011 | Lauter et al. | 380/44 |
| 7,957,527 B2* | 6/2011 | Katagi et al. | 380/44 |
| 8,014,521 B2* | 9/2011 | Kitamura et al. | 380/30 |
| 8,300,807 B2* | 10/2012 | Broker et al. | 380/28 |
| 2002/0018560 A1* | 2/2002 | Lauter et al. | 380/28 |
| 2003/0081771 A1* | 5/2003 | Futa et al. | 380/30 |
| 2004/0039768 A1* | 2/2004 | Arita | 708/492 |
| 2004/0086113 A1* | 5/2004 | Lauter et al. | 380/28 |
| 2004/0156498 A1* | 8/2004 | Paeng et al. | 380/30 |
| 2004/0223616 A1* | 11/2004 | Kocarev et al. | 380/263 |
| 2005/0018850 A1* | 1/2005 | Venkatesan et al. | 380/277 |
| 2005/0018851 A1* | 1/2005 | Venkatesan et al. | 380/277 |
| 2005/0025311 A1* | 2/2005 | Eisentraeger et al. | 380/28 |
| 2005/0193048 A1* | 9/2005 | Vaudenay et al. | 708/400 |
| 2006/0098814 A1* | 5/2006 | Al-Khoraidly et al. | 380/28 |
| 2006/0104447 A1* | 5/2006 | Lauter et al. | 380/258 |
| 2006/0177051 A1* | 8/2006 | Lauter et al. | 380/28 |
| 2006/0177062 A1* | 8/2006 | Lauter et al. | 380/269 |
| 2006/0182273 A1* | 8/2006 | Lauter et al. | 380/28 |
| 2006/0280296 A1* | 12/2006 | Vasyltsov et al. | 380/28 |
| 2007/0053506 A1* | 3/2007 | Takashima | 380/28 |
| 2007/0058802 A1* | 3/2007 | Lauter et al. | 380/28 |
| 2007/0140479 A1* | 6/2007 | Wang et al. | 380/30 |
| 2007/0177721 A1* | 8/2007 | Itoh et al. | 380/28 |
| 2007/0192397 A1* | 8/2007 | Lauter et al. | 708/523 |
| 2007/0211894 A1* | 9/2007 | Akishita et al. | 380/30 |
| 2007/0291937 A1* | 12/2007 | Katagi et al. | 380/30 |
| 2008/0084997 A1* | 4/2008 | Lauter et al. | 380/30 |
| 2008/0219450 A1* | 9/2008 | Ebeid | 380/277 |
| 2009/0279694 A1* | 11/2009 | Takahashi et al. | 380/28 |
| 2010/0172491 A1* | 7/2010 | Broker et al. | 380/28 |
| 2010/0183142 A1* | 7/2010 | Katagi et al. | 380/28 |

OTHER PUBLICATIONS

Katagi et al., Novel Efficient Implementations of Hyperelliptic Curve Cryptosystems using Degenerate Divisors, 2005, Springer Verlag.*

Katagi et al., Some Improved Algorithms for Hyperelliptic Curve Cryptosystems Using Degenerate Divisors, 2005, Springer Verlag.*

Ji et al., A Structurally Stable Realization for Jacobi Elliptic Functions, 2002, IEEE.*

Dan Boneh, et al., "Fully Collusion Resistant Traitor Tracing With Short Ciphertexts and Private Keys", Eurocrypt 2006, pp. 1-29.

Dan Boneh, et al., "A Fully Collusion Resistant Broadcast, Trace, and Revoke System", ACM CCS 2006, pp. 1-30.

Dan Boneh, et al., "Evaluating 2-DNF Formulas on Ciphertexts", TCC 2005, pp. 1-16.

Xavier Boyen, et al., "Full-Domain Subgroup Hiding and Constant-Size Group Signatures", PKC 2007, pp. 1-21.

Dan Boneh, et al., "Conjunctive, Subset, and Range Queries on Encrypted Data", TCC 2007, pp. 1-29.

Steven D. Galbraith, et al., "Distortion Maps for Genus two Curves", Available at arXiv:math.NT/0611471v1, Nov. 15, 2006, pp. 1-16.

Steven D. Galbraith, et al., "Hyperelliptic Pairings", Pairing 2007, LNCS 4575, 2007, pp. 108-131.

David Freeman, "Constructing Pairing-Friendly Genus 2 Curves with Ordinary Jacobians", Pairing 2007, LNCS 4575, pp. 152-176.

Ryuichi Sakai, et al., "Cryptographic Schemes Based on Pairing Over Elliptic Curve (Part 2)", Information Processing Society Study Report 2002-CSEC-18, vol. 2002, No. 68, Jul. 18, 2002, pp. 276-277 (with partial English translation).

International Search Report issued Mar. 14, 2008, in PCT/JP2008/050582.

U.S. Appl. No. 13/266,002, filed Oct. 24, 2011, Takashima et al.

* cited by examiner

ENCRYPTION PARAMETER SETTING APPARATUS, KEY GENERATION APPARATUS, CRYPTOGRAPHIC SYSTEM, PROGRAM, ENCRYPTION PARAMETER SETTING METHOD, AND KEY GENERATION METHOD

TECHNICAL FIELD

The present invention relates to an encryption parameter setting apparatus which sets an encryption parameter and a key generation apparatus which generates a key, used in a cryptographic system.

BACKGROUND ART

There is proposed a cryptographic system that realizes sophisticated cryptography or a signature by using a pairing operation on a composite order.

[Non-patent Literature 1] D. Boneh, A. Sahai, B. Waters, "Fully Collusion Resistant Traitor Tracing With Short Ciphertexts and Private Keys", Eurocrypt 2006, 2006

[Non-patent Literature 2] D. Boneh, B. Waters, "A Fully Resistant Broadcast, Trace, and Revoke System", ACM CCS 2006, 2006

[Non-patent Literature 3] D. Boneh, E. Goh, K. Nissim, "Evaluating 2-DNF Formulas on Ciphertexts", TCC 2005, 2005

[Non-patent Literature 4] X. Boyen, B. Waters, "Full-Domain Subgroup Hiding and Constant-Size Group Signatures", PKC 2007, 2007

[Non-patent Literature 5] D. Boneh, B. Waters, "Conjunctive, Subset, and Range Queries on Encrypted Data", TCC 2007, 2007

[Non-patent Literature 6] S. D. Galbraith, J. Pujolas, C. Ritzenthaler, B. Smith, "Distortion Maps For Genus Two Curves", arXiv: math.NT/0611471, 2006

[Non-patent Literature 7] S. D. Galbraith, F. Hess, F. Vercauteren, "Hyperelliptic pairings", Pairing 2007, LNCS 4575, pp. 108-131, 2007

[Non-patent Literature 8] D. Freeman, "Constructing Pairing-Friendly Genus 2 Curves with Ordinary Jacobians", Pairing 2007, LNCS 4575, pp. 152-176, 2007

SUMMARY OF INVENTION

Technical Problem

Security of the cryptographic system using a pairing operation on a composite order is based on that it is difficult to perform factorization into prime factors for a composite order. Generally, in cryptographic systems basing their security on the difficulty of factorization into prime factors, the size of data necessary for encryption is large, thereby taking a long time to perform a cryptographic operation.

The present invention aims, for example, to solve the problem as described above and comprise a cryptographic system being the same or more sophisticated than a cryptographic system configured using a pairing operation on a composite order, by employing other operation as an alternative to the pairing operation on the composite order.

Solution to Problem

An encryption parameter setting apparatus according to the present invention includes:

a processing device for processing data; a random divisor selection unit; a base divisor generation unit; a pairing log calculation unit; and a parameter setting unit, wherein the random divisor selection unit selects an element from a plurality of elements of a cyclic group G', as a random divisor D*, by using the processing device;

the base divisor generation unit calculates a plurality of base divisors $D^-_j$ by mapping the random divisor D* by using a plurality of maps $G_j$ (where the plurality of maps $G_j$ are homomorphism from the cyclic group G' to each of a plurality of cyclic groups $G'_j$), based on the random divisor D* selected by the random divisor selection unit, by using the processing device;

the pairing log calculation unit calculates logarithms of pairing values of the plurality of base divisors $D^-_j$ in a group G (where the group G is a direct product of the plurality of cyclic groups $G'_j$, and a pairing value by a bilinear pairing operation of two elements included in the group G is computable), and treats the logarithms as a plurality of pairing log coefficients $\eta_i$, by using the processing device; and the parameter setting unit treats the plurality of base divisors $D^-_j$ calculated by the base divisor generation unit and the plurality of pairing log coefficients $\eta_i$ calculated by the pairing log calculation unit, as encryption parameters used in a cryptographic operation, by using the processing device.

The encryption parameter setting apparatus according to the present invention has the following features:

the random divisor selection unit selects an element from a plurality of elements of a cyclic group G' which is a subgroup of a group composed of divisors of a Jacobian variety $Jac_c$ of an algebraic curve C in a finite field $F_p$, as a random divisor D*, by using the processing device; and the base divisor generation unit calculates the plurality of base divisors $D^-_j$ by treating a plurality of endomorphism maps in a group composed of divisors of a Jacobian variety $Jac_c$ of an algebraic curve C in an extension field K given by a finite algebraic extension of the finite field $F_p$, as the plurality of maps $G_j$, by using the processing device.

An encryption parameter setting apparatus according to the present invention includes:

a processing device for processing data; a random divisor selection unit; a base divisor generation unit; a discrete log calculation unit; a pairing log calculation unit; and a parameter setting unit, wherein the random divisor selection unit randomly selects a random divisor D* from a plurality of divisors of a Jacobian variety $Jac_c$ of an algebraic curve C of genus d in a finite field $F_p$ (where an order p of the finite field $F_p$ is a prime number, and the genus d is an integer greater than or equal to 2), by using the processing device;

the base divisor generation unit calculates a plurality of base divisors $D^-_j$, based on the random divisor D* selected by the random divisor selection unit, by using the processing device;

the discrete log calculation unit calculates a plurality of discrete logs $l_k$, by using the processing device;

the pairing log calculation unit calculates a plurality of pairing log coefficients $\eta_i$, based on the plurality of discrete logs $l_k$ calculated by the discrete log calculation unit, by using the processing device; and the parameter setting unit sets an encryption parameter to be used in a cryptographic operation, based on the plurality of base divisors $D^-_j$ calculated by the base divisor generation unit and the plurality of pairing log coefficients $\eta_i$ calculated by the pairing log calculation unit, by using the processing device.

The encryption parameter setting apparatus according to the present invention has the following features:

the random divisor selection unit selects a random divisor D* from a plurality of divisors of a Jacobian variety $Jac_c$ of a hyperelliptic curve $C: Y^2 = X^w + 1$ (where w is a prime number of $w = 2d+1$, and a remainder a of the order p divided by the prime number w is a generator of a multiplicative group $F_w^*$ of a finite field $F_w$ whose order is w) in the finite field $F_p$, by using the processing device;

the base divisor generation unit calculates, by applying Gauss sum operators $G_j$ to the random divisor D* (where j is an integer greater than or equal to 0 and less than or equal to 2d−1, the Gauss sum operators $G_j$ is an operation on a Jacobian variety $Jac_c$ in an extension field K shown in Expression 1, and the extension field K is an algebraic extension field given by a 2d-th order extension of the finite field $F_r$), a plurality of base divisors $D^\sim_j = G_j(D^*)$ of the Jacobian variety $Jac_c$ in the extension field K, based on the random divisor D* selected by the random divisor selection unit, by using the processing device;

the discrete log calculation unit calculates a plurality of discrete logs $l_k$ satisfying Expression 2 (where k is an integer greater than or equal to 1 and equal to 2d−1, and the plurality of discrete logs $l_k$ are integers greater than or equal to 0 and less than or equal to 2d−1), based on the remainder a, by using the processing device; and the pairing log calculation unit calculates a plurality of pairing log coefficients $\eta_i$ (where i is an integer greater than or equal to 0 and less than or equal to 2d−1, the plurality of pairing log coefficients $\eta_i$ are integers greater than or equal to 0 and less than or equal to r−1, and r is the order of the random divisor D*) by calculating an expression shown in Expression 3, based on the plurality of discrete logs $l_k$ calculated by the discrete log calculation unit, by using the processing device.

$$G_j = \sum_{i=0}^{2d-1} \{p^{i \cdot j} \cdot \rho^{a^i}\} \quad \text{[Expression 1]}$$

where $\rho$ is an operation on the Jacobian variety $Jac_c$ corresponding to an operation $(x,y) \rightarrow (\zeta x, y)$ on the hyperelliptic curve C in the extension field K, and $\zeta$ is a w-th root of 1.

$$a^k - 1 \equiv a^{l_k} \bmod w \quad \text{[Expression 2]}$$

$$\eta_i = \left(\sum_{k=1}^{2d-1} p^{l_k + i \cdot k}\right) \bmod r \quad \text{[Expression 3]}$$

A key generation apparatus according to the present invention includes:

a processing device for processing data; a storage device for storing data; a base divisor storage unit; a pairing log storage unit; an output base calculation unit; and a key calculation unit, wherein the base divisor storage unit stores, as a plurality of base divisors $D^\sim_j$, a plurality of elements of a group G (where the group G is a direct product of a plurality of cyclic groups of a same order, a pairing value by a bilinear pairing operation of two elements included in the group G is computable, and the plurality of base divisors $D^\sim_j$ are mutually linearly independent), by using the storage device;

the pairing log storage unit stores logarithms of pairing values of the plurality of base divisors $D^\sim_j$, as a plurality of pairing log coefficients $\eta_i$, by using the storage device;

the output base calculation unit calculates a plurality of output bases $g_k$ being elements of the group G (where a pairing value of at least any two output bases $g_k$ in the plurality of output bases $g_k$ is 1), based on the plurality of base divisors $D^\sim_j$ stored by the base divisor storage unit and the plurality of pairing log coefficients $\eta_i$ stored by the pairing log storage unit, by using the processing device; and the key calculation unit calculates a key to be used in a cryptographic operation, based on the plurality of output bases $g_k$ calculated by the output base calculation unit, by using the processing device.

The key generation apparatus according to the present invention further includes a random matrix selection unit, wherein the random matrix selection unit randomly selects a random matrix V* from a plurality of matrices V satisfying $m'_{uv} = 0$ (where u and v are predetermined integers greater than or equal to 1 and less than or equal to b) in a relational expression $M' = V \cdot M \cdot V^T$ (where M' is a b-dimensional square matrix in which $m'_{\mu\nu}$ is a μ-th row and ν-th column element, b is a number of a plurality of output bases $g_k$ which the output base calculation unit calculates, V is a b row by f column matrix in which a variable $c_{\mu\nu}$ whose value is an integer greater than or equal to 0 and less than or equal to r−1 is a μ-th row and ν-th column element, r is an order of the plurality of cyclic groups, f is a number of the plurality of base divisors $D^\sim_j$ stored by the base divisor storage unit, M is an f-dimensional square matrix in which a pairing log coefficient of a base divisor $D^\sim_\mu$ and a base divisor $D^\sim_\nu$ in the pairing log coefficients $\eta_i$ stored by the pairing log storage unit is a μ-th row and ν-th column element, and $V^T$ is an f row by b column matrix transposed from the matrix V), based on the plurality of pairing log coefficients $\eta_i$ stored by the pairing log storage unit, by using the processing device; and the output base calculation unit calculates the plurality of output bases $g_k = v_k \cdot D^\sim$ (where k is an integer greater than or equal to 1 and less than or equal to b, $v_k$ is a k-th row vector of the random matrix V*, and $D^\sim$ is an f-dimensional column vector which uses the plurality of base divisors $D^\sim_j$ as a (j+1)th row element), based on the plurality of base divisors $D^\sim_j$ stored by the base divisor storage unit and the random matrix V* selected by the random matrix selection unit, by using the processing device.

The key generation apparatus according to the present invention has the following features:

the base divisor storage unit stores a plurality of elements of a group G which is a subgroup of a group composed of a plurality of divisors of a Jacobian variety $Jac_c$ of an algebraic curve C in an extension field K given by a finite algebraic extension of a finite field $F_p$, as the plurality of base divisors $D^\sim_j$, by using the storage device.

A key generation apparatus according to the present invention includes:

a processing device for processing data; a storage device for storing data; a base divisor storage unit; a pairing log storage unit; a random matrix selection unit; an output base calculation unit; and a key calculation unit, wherein the base divisor storage unit stores a plurality of base divisors $D^\sim_1$ calculated by the encryption parameter setting apparatus, by using the storage device;

the pairing log storage unit stores a plurality of pairing log coefficients $\eta_i$ calculated by the encryption parameter setting apparatus, by using the storage device;

the random matrix selection unit randomly selects a random matrix V* from a plurality of matrices V satisfying a relational expression $M'=V \cdot M \cdot V^T$ (where M' is a b-dimensional square matrix in which an integer $m'_{\mu\nu}$ is a µ-th row and v-th column element, V is a b row by 2d column matrix in which a variable $c_{\mu\nu}$ whose value is an integer greater than or equal to 0 and less than or equal to r−1 is a µ-th row and v-th column element, $V^T$ is a 2d row by b column square matrix transposed from the matrix V, M is a 2d-dimensional square matrix in which an integer $m_{\mu\nu}$ is a µ-th row and v-th column element, and the integer $m_{\mu\nu}$ is $\eta_{\nu-1}$ when µ+v=2d+1 and 0 when µ+v≠2d+1), based on a predetermined condition that should be satisfied by a plurality of integers $m'_{\mu\nu}$ (where µ and v are integers greater than or equal to 1 and less than or equal to b, and b is an integer greater than or equal to 2 and less than or equal to 2d), by using the processing device;

the output base calculation unit calculates a plurality of output bases $g_k = v_k \cdot D^-$ (where k is an integer greater than or equal to 1 and less than or equal to b, $g_k$ is a divisor of a Jacobian variety $Jac_c$ in the extension field K, $v_k$ is a k-th row vector of the random matrix V*, and $D^-$ is a 2d-dimensional column vector which uses the plurality of base divisors $D^-_j$ as a (j+1)th row element), based on the plurality of base divisors $D^-_j$ stored by the base divisor storage unit and the random matrix V* selected by the random matrix selection unit, by using the processing device; and the parameter calculation unit calculates a key to be used in a cryptographic operation, based on the plurality of output bases $g_k$ calculated by the output base calculation unit and the random matrix V* selected by the random matrix selection unit, by using the processing device.

The key generation apparatus according to the present invention further includes a consistent condition input unit, wherein the consistent condition input unit inputs an integer pair (µ,v) indicating an output base pair whose pairing value $e(g_1, g_v)$ of an output base $g_\mu$ and an output base $g_v$ in the plurality of output bases $g_k$ should be 1, by using the processing device; and the random matrix selection unit selects a random matrix V* satisfying a condition $m'_{\mu\nu}=0$, based on the integer pair (µ,v) input by the consistent condition input unit, by using the processing device.

The key generation apparatus according to the present invention further includes an inconsistent condition input unit, wherein the inconsistent condition input unit inputs an integer pair (µ,v) indicating an output base pair whose pairing value $e(g_\mu, g_v)$ of an output base $g_\mu$ and an output base $g_v$ in the plurality of output bases $g_k$ should not be 1, by using the processing device; and the random matrix selection unit selects a random matrix V* satisfying a condition $m'_{\mu\nu} \neq 0$, based on the integer pair (µ,v) input by the inconsistent condition input unit, by using the processing device.

A cryptographic system according to the present invention includes the encryption parameter setting apparatus and the key generation apparatus, wherein the base divisor storage unit stores a plurality of base divisors $D^-_j$ calculated by the encryption parameter setting apparatus, by using the storage device; and the pairing log storage unit stores a plurality of pairing log coefficients $\eta_i$ calculated by the encryption parameter setting apparatus, by using the storage device.

The cryptographic system according to the present invention further includes a ciphertext generation apparatus; and a ciphertext decryption apparatus, wherein the ciphertext generation apparatus generates a ciphertext, based on an encryption parameter set by the encryption parameter setting apparatus and a key generated by the key generation apparatus; and the ciphertext decryption apparatus decrypts the ciphertext generated by the ciphertext generation apparatus, based on the encryption parameter set by the encryption parameter setting apparatus and the key generated by the key generation apparatus.

The cryptographic system according to the present invention, including a plurality of ciphertext decryption apparatuses, further includes a wrongdoer tracing apparatus, wherein the key generation apparatus further includes a public key setting unit, a private key setting unit, and a tracer's key setting unit;

the public key setting unit sets a public key to be used for generating a ciphertext by the ciphertext generation apparatus;

the private key setting unit sets a plurality of private keys to be used for decrypting the ciphertext, generated by the ciphertext generation apparatus, by each of the plurality of ciphertext decryption apparatuses;

the tracer's key setting unit sets a tracer's key to be used for identifying a leak source of a private key by the wrongdoer tracing apparatus;

the ciphertext generation apparatus generates a ciphertext, based on the public key set by the key generation apparatus;

each of the plurality of ciphertext decryption apparatuses decrypts the ciphertext generated by the ciphertext generation apparatus, based on the private key corresponding to a user of the ciphertext decryption apparatus in the plurality of private keys set by the key generation apparatus; and the wrongdoer tracing apparatus, based on the tracer's key set by the key generation apparatus, generates a ciphertext, analyzes a decryption result of a generated ciphertext decrypted by a pirate decryption device which decrypts a ciphertext generated by the ciphertext generation apparatus, and identifies a private key having been used for decrypting the ciphertext by the pirate decryption device.

The cryptographic system according to the present invention has the following features:

the random divisor selection unit selects a random divisor D* from a plurality of divisors of a Jacobian variety $Jac_c$ of a hyperelliptic curve $C:Y^2=X^5+1$ (where a remainder a of a prime number p divided by 5 is 2 or 3) in a finite field $F_p$, by using the processing device;

the random matrix selection unit selects a random matrix V* of 4 row by 4 column satisfying a condition: $m'_{12}=m'_{21}=m'_{34}=m'_{43}=m'_{14}=m'_{41}=m'_{23}=m'_{32}$ 0, $m'_{11}\neq 0$, $m'_{22}\neq 0$, $m'_{33}\neq 0$, and $m'_{44}\neq 0$, by using the processing device;

the output base calculation unit calculates four output bases $g_k=v_k \cdot D^-$ (where k is an integer greater than or equal to 1 and less than or equal to 4), based on the plurality of base divisors $D^-_j$ stored by the base divisor storage unit and the random matrix V* calculated by the random matrix selection unit, by using the processing device;

the key calculation unit includes a number-of-users input unit, a public row base calculation unit, a public column base calculation unit, a row random number generation unit, a column random number generation unit, a pairing random number generation unit, a common random number generation unit, a public common divisor calculation unit, a public row first divisor calculation unit, a public row second divisor calculation unit, a public pairing value calculation unit, a public column divisor calculation unit, a public key setting unit, a private divisor calculation unit, and a private key setting unit;

the number-of-users input unit inputs an integer $n_1$ and an integer $n_2$ (where $n = n_1 n_2$) indicating n being a number of users, by using the processing device;

the public row base calculation unit calculates a divisor $g = g_1 + g_2$ of the Jacobian variety $Jac_c$, based on an output base $g_1$ and an output base $g_2$ calculated by the output base calculation unit, by using the processing device;

the public column base calculation unit calculates a divisor $h = g_3 + g_4$ of the Jacobian variety $Jac_c$, based on an output base $g_3$ and an output base $g_4$ calculated by the output base calculation unit, by using the processing device;

the row random number generation unit randomly generates $n_1$ random numbers $r_x$ (where x is an integer greater than or equal to 1 and less than or equal to $n_1$, and the random number $r_x$ is an integer greater than or equal to 1 and less than or equal to $r-1$), based on the integer $n_1$ input by the number-of-users input unit, by using the processing device;

the column random number generation unit randomly generates $n_2$ random numbers $c_y$ (where y is an integer greater than or equal to 1 and less than or equal to $n_2$, and the random number $c_y$ is an integer greater than or equal to 1 and less than or equal to $r-1$), based on the integer $n_2$ input by the number-of-users input unit, by using the processing device;

the pairing random number generation unit randomly generates $n_1$ random numbers $\alpha_x$ (where x is an integer greater than or equal to 1 and less than or equal to $n_1$, and the random number $\alpha_x$ is an integer greater than or equal to 1 and less than or equal to $r-1$), based on the integer $n_1$ input by the number-of-users input unit, by using the processing device;

the common random number generation unit randomly generates a random number $\beta$ (where the random number $\beta$ is an integer greater than or equal to 1 and less than or equal to $r-1$), by using the processing device;

the public common divisor calculation unit calculates a divisor $E = \beta \cdot g_2$ of the Jacobian variety $Jac_c$, based on the output base $g_2$ calculated by the output base calculation unit and the random number $\beta$ generated by the common random number generation unit, by using the processing device;

the public row first divisor calculation unit calculates $n_1$ divisors $E_x = \beta \cdot r_x \cdot g_2$ (where x is an integer greater than or equal to 1 and less than or equal to $n_1$) of the Jacobian variety $Jac_c$, based on the output base $g_2$ calculated by the output base calculation unit, the $n_1$ random numbers $r_x$ generated by the row random number generation unit, and the random number $\beta$ generated by the common random number generation unit, by using the processing device;

the public row second divisor calculation unit calculates $n_1$ divisors $F_x = \beta \cdot r_x \cdot g_4$ (where x is an integer greater than or equal to 1 and less than or equal to $n_1$) of the Jacobian variety $Jac_c$, based on the output base $g_4$ calculated by the output base calculation unit, the $n_1$ random numbers $r_x$ generated by the row random number generation unit, and the random number $\beta$ generated by the common random number generation unit, by using the processing device;

the public pairing value calculation unit calculates $n_1$ pairing values $G_x = e(g_4, g_4)^{\beta \cdot \alpha_x}$ (where the pairing e is $e(D, D') = e_w(D, \phi(D'))$, $e_w$ is a Weil pairing, and $\phi$ is a calculable homomorphism mapping on the Jacobian variety $Jac_c$), based on the output base $g_2$ calculated by the output base calculation unit, the $n_1$ random numbers $\alpha_x$ generated by the pairing random number generation unit, and the random number $\beta$ generated by the common random number generation unit, by using the processing device;

the public column divisor calculation unit calculates $n_2$ divisors $H_y = c_y \cdot g$ (where y is an integer greater than or equal to 1 and less than or equal to $n_2$) of the Jacobian variety $Jac_c$, based on the divisor g calculated by the public row base calculation unit and the random numbers $c_y$ generated by the column random number generation unit, by using the processing device;

the public key setting unit sets a public key $PK = (g, h, E, E_x, F_x, G_x, H_y)$ (where x is an integer greater than or equal to 1 and less than or equal to $n_1$, and y is an integer greater than or equal to 1 and less than or equal to $n_2$), based on the divisor g calculated by the public row base calculation unit, the divisor h calculated by the public column base calculation unit, the divisor E calculated by the public common divisor calculation unit, the $n_1$ divisors $E_x$ calculated by the public row first divisor calculation unit, the $n_1$ divisors $F_x$ calculated by the public row second divisor calculation unit, the $n_1$ pairing values $G_x$ calculated by the public pairing value calculation unit, and the $n_2$ divisors $H_y$ calculated by the public column divisor calculation unit, by using the processing device;

the private divisor calculation unit calculates n divisors $K_{x,y} = \alpha_x \cdot g + r_x c_y \cdot g$ (where x is an integer greater than or equal to 1 and less than or equal to $n_1$, and y is an integer greater than or equal to 1 and less than or equal to $n_2$), based on the divisor g calculated by the public row base calculation unit, the $n_1$ random numbers $r_x$ generated by the row random number generation unit, the $n_2$ random numbers $c_y$ generated by the column random number generation unit, and the $n_1$ random numbers $\alpha_x$ generated by the pairing random number generation unit, by using the processing device;

the private key setting unit sets n private keys $SK_{x,y} = (K_{x,y})$ respectively corresponding to n users, based on the n divisors $K_{x,y}$ calculated by the private divisor calculation unit, by using the processing device;

the ciphertext generation apparatus includes a processing device for processing data, a public key input unit, a plaintext input unit, an encryption common random number generation unit, an encryption column random number generation unit, an encryption row random number generation unit, an encryption row first divisor calculation unit, an encryption row second divisor calculation unit, an encryption row third divisor calculation unit, an encryption key calculation unit, a plaintext encryption unit, a row ciphertext setting unit, an encryption column first divisor calculation unit, an encryption column second divisor calculation unit, and a column ciphertext setting unit;

the public key input unit inputs the public key $PK = (g, h, E, E_x, F_x, G_x, H_y)$ set by the key generation apparatus, by using the processing device;

the plaintext input unit inputs a plaintext M to be encrypted, by using the processing device;

the encryption common random number generation unit randomly generates a random number t (where the random number t is an integer greater than or equal to 1 and less than or equal to r−1), by using the processing device;

the encryption column random number generation unit generates $n_2$ or less random numbers $w_y$ (where y is an integer greater than or equal to 1 and less than or equal to $n_2$, and the random number $w_y$ is an integer greater than or equal to 1 and less than or equal to r−1), by using the processing device;

the encryption row random number generation unit generates $n_1$ or less random numbers $s_x$ (where x is an integer greater than or equal to 1 and less than or equal to $n_1$, and the random number $s_x$ is an integer greater than or equal to 1 and less than or equal to r−1), by using the processing device;

the encryption row first divisor calculation unit calculates $n_1$ or less divisors $R_x = s_x \cdot E_x$ (where x is an integer greater than or equal to 1 and less than or equal to $n_1$) of a Jacobian variety $Jac_c$, based on the $n_1$ divisors $E_x$ included in the public key PK input by the public key input unit and the $n_1$ or less random numbers $s_x$ generated by the encryption row random number generation unit, by using the processing device;

the encryption row second divisor calculation unit calculates $n_1$ or less divisors $R^\sim_x = s_x \cdot F_x$ (where x is an integer greater than or equal to 1 and less than or equal to $n_1$) of the Jacobian variety $Jac_c$, based on the $n_1$ divisors $F_x$ included in the public key PK input by the public key input unit, and the $n_1$ or less random numbers $s_x$ generated by the encryption row random number generation unit, by using the processing device;

the encryption row third divisor calculation unit calculates $n_1$ or less divisors $A_x = s_x \cdot t \cdot E$ (where x is an integer greater than or equal to 1 and less than or equal to $n_1$) of the Jacobian variety $Jac_c$, based on the divisor E included in the public key PK input by the public key input unit, the random number t generated by the encryption common random number generation unit, and the $n_1$ or less random numbers $s_x$ generated by encryption row random number generation unit, by using the processing device;

the encryption key calculation unit calculates $n_1$ or less pairing values $CK_x = G_x{}^{s_x} \cdot t$ (where x is an integer greater than or equal to 1 and less than or equal to $n_1$), based on the $n_1$ pairing values $G_x$ included in the public key PK input by the public key input unit, the random number t generated by the encryption common random number generation unit, and the $n_1$ or less random numbers $s_x$ generated by the encryption column random number generation unit, by using the processing device;

the plaintext encryption unit generates, based on the plaintext M input by the plaintext input unit and the $n_1$ or less pairing values $CK_x$ calculated by the encryption key calculation unit, $n_1$ or less ciphertexts $B_x$ (where x is an integer greater than or equal to 1 and less than or equal to $n_1$) by encrypting the plaintext M by respectively using the $n_1$ or less pairing values $CK_x$ as encryption keys, by using the processing device;

the row ciphertext setting unit sets $n_1$ or less row ciphertexts $CT_x = (R_x, R^\sim_x, A_x, B_x)$ (where x is an integer greater than or equal to 1 and less than or equal to $n_1$), based on the $n_1$ or less divisors $R_x$ calculated by the encryption row first divisor calculation unit, the $n_1$ or less divisors $R^\sim_x$ calculated by the encryption row second divisor calculation unit, the $n_1$ or less divisors $A_x$ calculated by the encryption row third divisor calculation unit, and the $n_1$ or less ciphertexts $B_x$ generated by the plaintext encryption unit, by using the processing device;

the encryption column first divisor calculation unit calculates $n_2$ or less divisors $C_y = t \cdot H_y + w_y \cdot h$ (where y is an integer greater than or equal to 1 and less than or equal to $n_2$) of the Jacobian variety $Jac_c$, based on the divisors h and $H_y$ included in the public key PK input by the public key input unit, the random number t generated by the encryption common random number generation unit, and the random number $w_y$ generated by the encryption column random number generation unit, by using the processing device;

the encryption column second divisor calculation unit calculates $n_2$ or less divisors $C^\sim_y = w_y \cdot g$ (where y is an integer greater than or equal to 1 and less than or equal to $n_2$) of the Jacobian variety $Jac_c$, based on the divisor g included in the public key PK input by the public key input unit and the random number $w_y$ generated by the encryption column random number generation unit, by using the processing device;

the column ciphertext setting unit sets $n_2$ or less column ciphertexts $CT_y = (C_y, C^\sim_y)$ (where y is an integer greater than or equal to 1 and less than or equal to $n_2$), based on the $n_2$ or less divisors $C_y$ calculated by the encryption column first divisor calculation unit and the $n_2$ or less divisors $C^\sim_y$ calculated by the encryption column second divisor calculation unit, by using the processing device;

the ciphertext decryption apparatus includes a storage device for storing data, a processing device for processing data, a private key storage unit, a row ciphertext input unit, a column ciphertext input unit, a decryption key calculation unit, and a ciphertext decryption unit;

the private key storage unit stores a private key $SK_{X,Y} = (K_{X,Y})$ corresponding to predetermined indexes X and Y (where X is an integer greater than or equal to 1 and less than or equal to $n_1$ and Y is an integer greater than or equal to 1 and less than or equal to $n_2$) corresponding to a user of the ciphertext decryption apparatus, in the n private keys $SK_{x,y}$ set by the key generation apparatus, by using the storage device;

the row ciphertext input unit inputs a row ciphertext $CT_X = (R_X, R^\sim_X, A_X, B_X)$ corresponding to the index X, in the $n_1$ or less row ciphertexts $CT_x$ set by the ciphertext generation apparatus, by using the processing device;

the column ciphertext input unit inputs a column ciphertext $CT_Y = (C_Y, C^\sim_Y)$ corresponding to the index Y, in the $n_2$ or less column ciphertexts $CT_y$ set by the ciphertext generation apparatus, by using the processing device;

the decryption key calculation unit calculates a pairing value $CK' = e(K_{X,Y}, A_X) \cdot e(R^\sim_X, C^\sim_Y)/e(C_Y, R_X)$, based on the private key $SK_{X,Y}$ stored by the private key storage unit, the divisors $R_x$, $R^\sim_x$ and $A_x$ included in the row ciphertext $CT_x$ input by the row ciphertext input unit, the divisors $C_y$ and $C^\sim_y$ included in the column ciphertext $CT_y$ input by the column ciphertext input unit, by using the processing device; and the ciphertext decryption unit generates, based on a ciphertext $B_X$ included in the row ciphertext $CT_X$ input by the row ciphertext input unit and the pairing value CK' calculated by the decryption key calculation unit, a decrypted text M' by decrypting the ciphertext $B_x$ by using the pairing value CK' as a decryption key, by using the processing device.

The cryptographic system according to the present invention, including a plurality of ciphertext decryption apparatuses, further includes a wrongdoer tracing apparatus, wherein the key calculation unit further includes a tracer's key setting unit;

the tracer's key setting unit sets a tracer's key $TK=(g_k,r_x,\alpha_x,c_y)$ (where k is an integer greater than or equal to 1 and less than or equal to 4, x is an integer greater than or equal to 1 and less than or equal to $n_1$, and y is an integer greater than or equal to 1 and less than or equal to $n_2$), based on the four output bases $g_k$ calculated by the output base calculation unit, the $n_1$ random numbers $r_x$ generated by the row random number generation unit, the $n_1$ random numbers $\alpha_x$ generated by the pairing random number generation unit, and the $n_2$ random numbers $c_y$ generated by the column random number generation unit, by using the processing device;

the wrongdoer tracing apparatus includes a storage device for storing data, a processing device for processing data, a tracer's key storage unit, a target determination unit, a tracing plaintext generation unit, a tracing common random number generation unit, a tracing column random number generation unit, a tracing row random number generation unit, a disturbance row random number generation unit, a disturbance column random number generation unit, a tracing row first divisor calculation unit, a tracing row second divisor calculation unit, a tracing row third divisor calculation unit, a tracing encryption key calculation unit, a tracing plaintext encryption unit, a tracing row ciphertext setting unit, a tracing column first divisor calculation unit, a tracing column second divisor calculation unit, a tracing column ciphertext setting unit, a decrypted text input unit, and a leak source identification unit;

the tracer's key storage unit stores the tracer's key $TK=(g_k,r_x,\alpha_x,c_y)$ set by the key generation apparatus, by using the storage device;

the target determination unit classifies the index x into three groups and the index y into two groups, by using the processing device;

the tracing plaintext generation unit generates a plaintext M by using the processing device;

the tracing common random number generation unit randomly generates a random number t (where the random number t is an integer greater than or equal to 1 and less than or equal to r) by using the processing device;

the tracing column random number generation unit randomly generates $n_2$ or less random numbers $w_y$ (where y is an integer greater than or equal to 1 and less than or equal to $n_2$, and the random number $w_y$ is an integer greater than or equal to 1 and less than or equal to r−1) by using the processing device;

the tracing row random number generation unit randomly generates $n_1$ or less random numbers $s_x$ (where x is an integer greater than or equal to 1 and less than or equal to $n_1$, and the random number $s_x$ is an integer greater than or equal to 1 and less than or equal to r−1) by using the processing device;

the disturbance row random number generation unit randomly generates $n_1$ or less random numbers $v_{x,1}$ (where x is an integer greater than or equal to 1 and less than or equal to $n_1$, and the random number $v_{x,1}$ is an integer greater than or equal to 1 and less than or equal to r−1), $n_1$ or less random numbers $v_{x,2}$ (where x is an integer greater than or equal to 1 and less than or equal to $n_1$, and the random number $v_{x,2}$ is an integer greater than or equal to 1 and less than or equal to r−1), and $n_1$ or less random numbers $v_{x,3}$ (where x is an integer greater than or equal to 1 and less than or equal to $n_1$, and the random number $v_{x,3}$ is an integer greater than or equal to 1 and less than or equal to r−1) by using the processing device;

the disturbance column random number generation unit randomly generates $n_2$ or less random numbers $z_{p,y}$ (where y is an integer greater than or equal to 1 and less than or equal to $n_2$, and the random number $z_{p,y}$ is an integer greater than or equal to 1 and less than or equal to r−1) by using the processing device;

the tracing row first divisor calculation unit calculates a divisor $R_x=s_x r_x \cdot g_2$ (where x is an integer greater than or equal to 1 and less than or equal to $n_1$) with respect to the index x belonging to a first group in the three groups, a divisor $R_x=s_x r_x \cdot (g_1+g_2)$ (where x is an integer greater than or equal to 1 and less than or equal to $n_1$) with respect to the index x belonging to a second group in the three groups, and a divisor $R_x=v_{x,1} \cdot (g_1+g_2)$ (where x is an integer greater than or equal to 1 and less than or equal to $n_1$) with respect to the index x belonging to a third group in the three groups, based on divisors $g_1$ and $g_2$ and the $n_1$ random numbers $r_x$ included in the tracer's key TK stored by the tracer's key storage unit, the three groups of the index x classified by the target determination unit, the $n_1$ or less random numbers $s_x$ generated by the tracing row random number generation unit, and the $n_1$ or less random numbers $v_{x,1}$ generated by the disturbance row random number generation unit, by using the processing device;

the tracing row second divisor calculation unit calculates a divisor $\tilde{R}_x=s_x r_x \cdot g_4$ (where x is an integer greater than or equal to 1 and less than or equal to $n_1$) with respect to the index x belonging to the first group in the three groups, a divisor $\tilde{R}_x=s_x r_x \cdot (g_3+g_4)$ (where x is an integer greater than or equal to 1 and less than or equal to $n_1$) with respect to the index x belonging to the second group in the three groups, and a divisor $\tilde{R}_x=v_{x,1} \cdot (g_3+g_4)$ (where x is an integer greater than or equal to 1 and less than or equal to $n_1$) with respect to the index x belonging to the third group in the three groups, based on divisors $g_3$ and $g_4$ and the $n_1$ random numbers $r_x$ included in the tracer's key TK stored by the tracer's key storage unit, the three groups of the index x classified by the target determination unit, the $n_1$ or less random numbers $s_x$ generated by the tracing row random number generation unit, and the $n_1$ or less random numbers $v_{x,1}$ generated by the disturbance row random number generation unit, by using the processing device;

the tracing row third divisor calculation unit calculates a divisor $A_x=s_x t \cdot g_2$ (where x is an integer greater than or equal to 1 and less than or equal to $n_1$) with respect to the index x belonging to the first group in the three groups, a divisor $A_x=s_x t \cdot (g_1-g_2)$ (where x is an integer greater than or equal to 1 and less than or equal to $n_1$) with respect to the index x belonging to the second group in the three groups, and a divisor $A_x=v_{x,2} \cdot (g_1+g_2)$ (where x is an integer greater than or equal to 1 and less than or equal to $n_1$) with respect to the index x belonging to the third group in the three groups, based on the divisors $g_1$ and $g_2$ included in the tracer's key TK stored by the tracer's key storage unit, the three groups of the index x classified by the target determination unit, the random number t generated by the tracing common random number generation unit, the $n_1$ or less random numbers $s_x$ generated by the tracing row random number generation unit, and the $n_1$ or less random numbers $v_{x,2}$ generated by the disturbance row random number generation unit, by using the processing device;

the tracing encryption key calculation unit calculates a pairing value $CK_x = e(g_2, g_2)^{\alpha_x s_x t}$ (where x is an integer greater than or equal to 1 and less than or equal to $n_1$) with respect to the index x belonging to the first group in the three groups, a pairing value $CK_x = e(g_1+g_2, g_1+g_2)^{\alpha_x s_x t}$ (where x is an integer greater than or equal to 1 and less than or equal to $n_1$) with respect to the index x belonging to the second group in the three groups, and a pairing value $CK_x = e(g_1+g_2, g_1+g_2)^{v_{x,2}}$ (where x is an integer greater than or equal to 1 and less than or equal to $n_1$) with respect to the index x belonging to the third group in the three groups, based on the divisors $g_1$ and $g_2$ and the $n_1$ random numbers $\alpha_x$ included in the tracer's key TK stored by the tracer's key storage unit, the three groups of the index x classified by the target determination unit, the $n_1$ or less random numbers $s_x$ generated by the tracing row random number generation unit, and the $n_1$ or less random numbers $v_{x,3}$ generated by the disturbance row random number generation unit, by using the processing device;

the tracing plaintext encryption unit generates $n_1$ or less ciphertexts $B_x$ (where x is an integer greater than or equal to 1 and less than or equal to $n_1$) by encrypting the plaintext M by respectively using the $n_1$ or less pairing values $CK_x$ as encryption keys, based on the $n_1$ or less pairing values $CK_x$ calculated by the tracing encryption key calculation unit and the plaintext M generated by the tracing plaintext generation unit, by using the processing device;

the tracing row ciphertext setting unit sets $n_1$ or less row ciphertexts $CT_x = (R_x, R^\sim_x, A_x, B_x)$ (where x is an integer greater than or equal to 1 and less than or equal to $n_1$), based on $n_1$ or less divisors $R_x$ calculated by the tracing row first divisor calculation unit, n1 or less divisors $R^\sim_x$ calculated by the tracing row second divisor calculation unit, $n_1$ or less divisors $A_x$ calculated by the tracing row third divisor calculation unit, and the n1 or less ciphertexts $B_x$ generated by the tracing plaintext encryption unit, by using the processing device;

the tracing column first divisor calculation unit calculates a divisor $C_y = tc_y \cdot (g_1+g_2) + w_y \cdot (g_3+g_4)$ (where y is an integer greater than or equal to 1 and less than or equal to $n_2$) with respect to the index y belonging to a first group in the two groups, and a divisor $C_y = tc_y \cdot (g_3+g_4) + z_{p,y} \cdot g_1 + w_y \cdot (g_3+g_4)$ (where y is an integer greater than or equal to 1 and less than or equal to $n_2$) with respect to the index y belonging to a second group in the two groups, based on the divisors $g_1$, $g_2$, $g_3$, and $g_4$, and the $n_2$ random numbers $c_y$ included in the tracer's key TK stored by the tracer's key storage unit, the two groups of the index y classified by the target determination unit, the random number t generated by the tracing common random number generation unit, the $n_2$ or less random numbers $w_y$ generated by the tracing column random number generation unit, and the n2 or less random numbers $z_{p,y}$ generated by the disturbance column random number generation unit, by using the processing device;

the tracing column second divisor calculation unit calculates $n_2$ or less $C^\sim_y = w_y \cdot (g_1+g_2)$ (where y is an integer greater than or equal to 1 and less than or equal to $n_2$), based on the divisors $g_1$ and $g_2$ included in the tracer's key TK stored by the tracer's key storage unit, and the $n_2$ or less random numbers $w_y$ generated by the tracing column random number generation unit, by using the processing device;

the tracing column ciphertext setting unit sets $n_2$ or less column ciphertexts $CT_y = (C_y, C^\sim_y)$ (where y is an integer greater than or equal to 1 and less than or equal to $n_2$), based on the $n_2$ or less divisors $C_y$ calculated by the tracing column first divisor calculation unit, and the $n_2$ or less divisors $C^\sim_y$ calculated by the tracing column second divisor calculation unit, by using the processing device;

the decrypted text input unit inputs a decrypted text M' generated by decrypting a ciphertext, including the $n_1$ or less row ciphertexts $CT_X$ set by the tracing row ciphertext setting unit and the $n_2$ or less column ciphertexts $CT_y$ set by the tracing column ciphertext setting unit, by the pirate decryption device which decrypts a ciphertext generated by the ciphertext generation apparatus, by using the processing device; and the leak source identification unit identifies a private key $K_{x,y}$ having been used for decryption by the pirate decryption device, by comparing the plaintext M generated by the tracing plaintext generation unit and the decrypted text M' input by the decrypted text input unit, by using the processing device.

The cryptographic system according to the present invention further includes a signing key issuing apparatus; a plurality of signing apparatuses; a signature verification apparatus; and a signer tracing apparatus, wherein the signing key issuing apparatus generates a plurality of signing keys respectively corresponding to the plurality of signing apparatuses, based on an encryption parameter set by the encryption parameter setting apparatus and a key generated by the key generation apparatus;

at least any signing apparatus of the plurality of signing apparatuses generates a signature by using a signing key corresponding to the signing apparatus in the plurality of signing keys generated by the signing key issuing apparatus;

the signature verification apparatus verifies the signature generated by the signing apparatus, by using the encryption parameter set by the encryption parameter setting apparatus and the key generated by the key generation apparatus; and the signer tracing apparatus analyzes the signature generated by the signing apparatus, and identifies the signing apparatus used for generating the signature, by using the encryption parameter set by the encryption parameter setting apparatus and the key generated by the key generation apparatus.

The cryptographic system according to the present invention has the following features:

the random divisor selection unit selects a random divisor $D^*$ from a plurality of divisors of a Jacobian variety $Jac_c$ of a hyperelliptic curve $C: Y^2 = X^5 + 1$ (where a remainder a of a prime number p divided by 5 is 2 or 3) in a finite field $F_p$, by using the processing device;

the random matrix selection unit selects a random matrix $V^*$ of 2 row by 2 column satisfying a condition: $m'_{12} = m'_{21} = 0$, $m'_{11} \neq 0$, and $m'_{22} \neq 0$, by using the processing device;

the output base calculation unit calculates two output bases $g_k = v_k \cdot D^\sim$ (where k is an integer greater than or equal to 1 and less than or equal to 2), based on a plurality of base divisors $D^\sim_j$ stored by the base divisor storage unit and the random matrix $V^*$ calculated by the random matrix selection unit, by using the processing device;

the key calculation unit includes a bit length input unit, a base random number generation unit, a pairing random number generation unit, a master random number generation unit, a public base calculation unit, a public first divisor calculation unit, a public pairing value calculation unit, a public second divisor generation unit, a public third divisor generation unit, a public bit divisor generation unit, a master divisor calculation unit, a public key setting unit, a master key setting unit, and a tracer's key setting unit;

the bit length input unit inputs a bit length m of a message to be signed, by using the processing device;

the base random number generation unit randomly generates a random number $\beta$ (where the random number $\beta$ is an integer greater than or equal to 1 and less than or equal to r−1), by using the processing device;

the pairing random number generation unit randomly generates a random number $\alpha$ (where the random number $\alpha$ is an integer greater than or equal to 1 and less than or equal to r−1), by using the processing device;

the master random number generation unit randomly generates a random number $\omega$ (where the random number $\omega$ is an integer greater than or equal to 1 and less than or equal to r−1), by using the processing device;

the public base calculation unit calculates a divisor $g=g_2-\beta \cdot g_1$ of the Jacobian variety $Jac_c$, based on an output base $g_1$ and an output base $g_2$ calculated by the output base calculation unit and the random number $\beta$ generated by the base random number generation unit, by using the processing device;

the public first divisor calculation unit calculates a divisor $\Omega=\omega \cdot g$ of the Jacobian variety $Jac_c$, based on the random number $\omega$ generated by the master random number generation unit and the divisor g calculated by the public base calculation unit, by using the processing device;

the public pairing value calculation unit calculates a pairing value $A=e(g,g)^\alpha$, based on the random number $\alpha$ generated by the pairing random number generation unit and the divisor g calculated by the public base calculation unit, by using the processing device;

the public second divisor generation unit randomly generates a divisor u of the Jacobian variety $Jac_c$, by using the processing device;

the public third divisor generation unit randomly generates a divisor v' of the Jacobian variety $Jac_c$, by using the processing device;

the public bit divisor generation unit randomly generates m divisors $v_i$ (where i is an integer greater than or equal to 1 and less than or equal to m) of the Jacobian variety $Jac_c$, based on the bit length m input by the bit length input unit, by using the processing device;

the master divisor calculation unit calculates a divisor $g'=\alpha \cdot g$ of the Jacobian variety $Jac_c$, based on the random number $\alpha$ generated by the pairing random number generation unit and the divisor g calculated by the public base calculation unit, by using the processing device;

the public key setting unit sets a public key $PK=(g_1,g,\Omega,A,u,v',v_i)$ (where i is an integer greater than or equal to 1 and less than or equal to m), based on the divisor $g_1$ calculated by the output base calculation unit, the divisor g calculated by the public base calculation unit, the divisor $\Omega$ calculated by the public first divisor calculation unit, the pairing value A calculated by the public pairing value $\Omega$ calculation unit, the divisor u generated by the public second divisor generation unit, the divisor v' generated by the public third divisor generation unit, and the m divisors $v_i$ generated by the public bit divisor generation unit, by using the processing device;

the master key setting unit sets a master key $MK=(\omega,g')$, based on the random number $\omega$ generated by the master random number generation unit and the divisor g' calculated by the master divisor calculation unit, by using the processing device;

the tracer's key setting unit sets a tracer's key $TK=(g_2)$, based on the output base $g_2$ calculated by the output base calculation unit, by using the processing device;

the signing key issuing apparatus includes a storage device for storing data, a processing device for processing data, a master key storage unit, an issuer public key input unit, an identifier generation unit, a signing first key calculation unit, a signing second key calculation unit, a signing third key calculation unit, a signing key setting unit, and an identifier setting unit;

the master key storage unit stores the master key $MK=(\omega, g')$ set by the key generation apparatus, by using the storage device;

the issuer public key input unit inputs the public key $PK=(g_1,g,\Omega,A,u,v',v_i)$ set by the key generation apparatus, by using the processing device;

the identifier generation unit randomly generates an identifier $s_{ID}$ (where the identifier $s_{ID}$ is an integer greater than or equal to 1 and less than or equal to r−1), by using the processing device;

the signing first key calculation unit calculates a divisor $K_1=\{1/(\omega+s_{ID})\} \cdot g'$ of the Jacobian variety $Jac_c$, based on the random number $\omega$ and the divisor g' included in the master key MK stored by the master key storage unit and the identifier $S_{ID}$ generated by the identifier generation unit, by using the processing device;

the signing second key calculation unit calculates a divisor $K_2=s_{ID} \cdot g$ of the Jacobian variety $Jac_c$, based on the divisor g included in the public key PK stored by the issuer public key input unit and the identifier $s_{ID}$ generated by the identifier generation unit, by using the processing device;

the signing third key calculation unit calculates a divisor $K_3=s_{ID} \cdot u$ of the Jacobian variety $Jac_c$, based on the divisor u included in the public key PK stored by the issuer public key input unit and the identifier $s_{ID}$ generated by the identifier generation unit, by using the processing device;

the signing key setting unit sets a signing key $SK=(K_1,K_2,K_3)$, based on the divisor $K_1$ calculated by the signing first key calculation unit, the divisor $K_2$ calculated by the signing second key calculation unit, and the divisor $K_3$ calculated by the signing third key calculation unit, by using the processing device;

the identifier setting unit sets the identifier $s_{ID}$ generated by the identifier generation unit as an identifier for identifying the signing key SK set by the signing key setting unit, by using the processing device;

the signing apparatus includes a storage device for storing data, a processing device for processing data, a signing key storage unit, a signer public key input unit, a signer message input unit, a signer message divisor calculation unit, a signature first random number generation unit, a signature second random number generation unit, a signature first divisor calculation unit, a signature second divisor calculation unit, a signature third divisor calculation unit, a signature fourth divisor calculation unit, a signature fifth divisor calculation unit, a signature sixth divisor calculation unit, and a signature output unit;

the signing key storage unit stores the signing key $SK=(K_1,K_2,K_3)$ set by the key generation apparatus, by using the storage device;

the signer public key input unit inputs the public key PK=$(g_1,g,\Omega,A,u,v',v_i)$ set by the key generation apparatus, by using the processing device;

the signer message input unit inputs a message M to be signed, by using the processing device;

the signer message divisor calculation unit calculates a divisor $v=v'+\Sigma(\mu_i \cdot v_i)$ (where i is an integer greater than or equal to 1 and less than or equal to m, and $\mu_i$ is an integer being 0 or 1 indicating an i-th bit of the message M) of the Jacobian variety $Jac_c$, based on the divisor v' and the m divisors $v_i$ included in the public key PK input by the signer public key input unit and the message M input by the signer message input unit, by using the processing device;

the signature first random number generation unit generates a random number s (where the random number s is an integer greater than or equal to and less than or equal to r−1), by using the processing device;

the signature second random number generation unit randomly generates four random numbers $t_j$ (where j is an integer greater than or equal to 1 and less than or equal to 4 and the random number $t_j$ is an integer greater than or equal to 1 and less than or equal to r−1), by using the processing device;

the signature first divisor calculation unit calculates a divisor $\sigma_1=K_1+t_1 \cdot g_1$ of the Jacobian variety $Jac_c$, based on the divisor $g_1$ included in the public key PK input by the signer public key input unit, the divisor $K_1$ included in the signing key SK stored by the signing key storage unit, and a random number $t_1$ generated by the signature second random number generation unit, by using the processing device;

the signature second divisor calculation unit calculates a divisor $\sigma_2=K_2+t_2 \cdot g_1$ of the Jacobian variety $Jac_c$, based on the divisor $g_1$ included in the public key PK input by the signer public key input unit, the divisor $K_2$ included in the signing key SK stored by the signing key storage unit, and a random number $t_2$ generated by the signature second random number generation unit, by using the processing device;

the signature third divisor calculation unit calculates a divisor $\sigma_3=K_3+s \cdot v+t_3 \cdot g_1$ of the Jacobian variety $Jac_c$, based on the divisor $g_1$ included in the public key PK input by the signer public key input unit, the divisor $K_3$ included in the signing key SK stored by the signing key storage unit, the divisor v calculated by the signer message divisor calculation unit, the random number s generated by the signature first random number generation unit, and a random number $t_3$ generated by the signature second random number generation unit, by using the processing device;

the signature fourth divisor calculation unit calculates a divisor $\sigma_4=-s \cdot g+t_4 \cdot g_1$ of the Jacobian variety $Jac_c$, based on the divisors g and $g_1$ included in the public key PK input by the signer public key input unit, the random number s generated by the signature first random number generation unit, and a random number $t_4$ generated by the signature second random number generation unit, by using the processing device;

the signature fifth divisor calculation unit calculates a divisor $\pi_1=t_1 t_2 \cdot g_1+t_2 \cdot K_1+t_1 \cdot (K_2+\Omega)$ of the Jacobian variety $Jac_c$, based on the divisors $g_1$ and $\Omega$ included in the public key PK input by the signer public key input unit, the divisors $K_1$ and $K_2$ included in the signing key SK stored by the signing key storage unit, and the random numbers $t_1$ and $t_2$ generated by the signature second random number generation unit, by using the processing device;

the signature sixth divisor calculation unit calculates a divisor $\pi_2=t_2 \cdot u-t_3 \cdot g-t_4 \cdot v$ of the Jacobian variety $Jac_c$, based on the divisors g and u included in the public key PK input by the signer public key input unit, the divisor v calculated by the signer message divisor calculation unit, and the random numbers $t_2$, $t_3$, and $t_4$ generated by the signature second random number generation unit, by using the processing device;

the signature output unit outputs a signature $\sigma=(\sigma_1,\sigma_2,\sigma_2,\sigma_4,\pi_1,\pi_2)$, based on the divisor $\sigma_1$ calculated by the signature first divisor calculation unit, the divisor $\sigma_2$ calculated by the signature second divisor calculation unit, the divisor $\sigma_3$ calculated by the signature third divisor calculation unit, the divisor $\sigma_4$ calculated by the signature fourth divisor calculation unit, the divisor $\pi_1$ calculated by the signature fifth divisor calculation unit, and the divisor $\pi_2$ calculated by the signature sixth divisor calculation unit, by using the processing device;

the signature verification apparatus includes a processing device for processing data, a verifier public key input unit, a verifier signature input unit, a verifier message input unit, a verifier message divisor calculation unit, a signature first verification value calculation unit, a signature second verification value calculation unit, a signature third verification value calculation unit, a signature fourth verification value calculation unit, and a signature verification judgment unit;

the verifier public key input unit inputs the public key PK=$(g_1,g,\Omega,A,u,v',v_i)$ set by the key generation apparatus, by using the processing device;

the verifier signature input unit inputs the signature $\sigma=(\sigma_1,\sigma_2,\sigma_3,\sigma_4,\pi_1,\pi_2)$ output by the signing apparatus, by using the processing device;

the verifier message input unit inputs the message M signed with the signature σ, by using the processing device;

the verifier message divisor calculation unit calculates the divisor $v=v'+\Sigma(\mu_i \cdot v_i)$ (where i is an integer greater than or equal to 1 and less than or equal to m, and $\mu_i$ is an integer being 0 or 1 indicating an i-th bit of the message M) of the Jacobian variety $Jac_c$, based on the divisor v' and the m divisors $v_i$ included in the public key PK input by the verifier public key input unit and the message M input by the verifier message input unit, by using the processing device;

the signature first verification value calculation unit calculates a pairing value $C=e(g_1,\pi_1)$, based on the divisor $g_1$ included in the public key PK input by the verifier public key input unit and the divisor $\pi_i$ included in the signature σ input by the verifier signature input unit, by using the processing device;

the signature second verification value calculation unit calculates a pairing value $C'=e(\sigma_2,\sigma_2+\Omega)/A$, based on the divisor $\Omega$ and the pairing value A included in the public key PK input by the verifier public key input unit and the divisors $\sigma_1$ and $\sigma_2$ included in the signature σ input by the verifier signature input unit, by using the processing device;

the signature third verification value calculation unit calculates a pairing value $D=e(g_1,\pi_2)$, based on the divisor $g_1$ included in the public key PK input by the verifier public key input unit and the divisor $\pi_2$ included in the signature σ input by the verifier signature input unit, by the signature fourth verification value calculation unit calculates a pairing value $D'=e(\sigma_2,\mu)/\{e(g,\sigma_3)\cdot e(\sigma_4,v)\}$, based on the divisors u and g included in the public key PK input by the verifier public key input unit, the divisors $\sigma_2$, $\sigma_3$, and $\sigma_4$ included in the signature $\sigma$ input by the verifier signature input unit, and the divisor v calculated by the verifier message divisor calculation unit, by using the processing device;

the signature verification judgment unit judges whether the pairing value C and the pairing value C' are equal or not and whether the pairing value D and the pairing value D' are equal or not, based on the pairing value C calculated by the signature first verification value calculation unit, the pairing value C' calculated by the signature second verification value calculation unit, the pairing value D calculated by the signature third verification value calculation unit, and the pairing value D' calculated by the signature fourth verification value calculation unit, and when judging that the pairing value C and the pairing value C' are equal and the pairing value D and the pairing value D' are equal, judges the signature $\sigma$ input by the verifier signature input unit to be valid, by using the processing device;

the signer tracing apparatus includes a storage device for storing data, a processing device for processing data, a tracer's key storage unit, an identifier storage unit, a tracer signature input unit, a signature pairing value calculation unit, an identifier pairing value calculation unit, and a signer identification unit;

the tracer's key storage unit stores a tracer's key $TK=(g_2)$ set by the key generation apparatus, by using the storage device;

the identifier storage unit stores the identifier $s_{ID}$ for identifying the signing key SK issued by the signing key issuing apparatus, by using the storage device;

the tracer signature input unit inputs the signature $\sigma$ output by the signing apparatus, by using the processing device;

the signature pairing value calculation unit calculates a pairing value $E=e(g_2,\sigma_2)$, based on the divisor $g_2$ included in the tracer's key TK stored by the tracer's key storage unit and the divisor $\sigma_2$ included in the signature $\sigma$ input by the tracer signature input unit, by using the processing device;

the identifier pairing value calculation unit calculates a pairing value $E_{ID}=e(g_2,g_2)^{s_{ID}}$, based on the divisor $g_2$ included in the tracer's key TK stored by the tracer's key storage unit and the identifier $s_{ID}$ stored by the identifier storage unit, by using the processing device; and the signer identification unit identifies an identifier of the signing key SK which had generated the signature $\sigma$ input by the tracer signature input unit, by detecting a pairing value in accordance with the pairing value E calculated by the signature pairing value calculation unit in the pairing value $E_{ID}$ calculated by the identifier pairing value calculation unit, by using the processing device.

A computer program according to the present invention causes a computer having a processing device for processing data to operate as the encryption parameter setting apparatus.

A computer program according to the present invention causes a computer having a processing device for processing data to operate as the key generation apparatus.

An encryption parameter setting method according to the present invention, in which an encryption parameter setting apparatus having a processing device for processing data sets encryption parameters used for a cryptographic operation, includes:

selecting, by the processing device, an element from a plurality of elements of a cyclic group G', as a random divisor D*;

calculating, by the processing device, a plurality of base divisors $D^-_j$ by mapping the random divisor D* by using a plurality of maps $G_j$ (where the plurality of maps $G_j$ are homomorphism from the cyclic group G' to each of a plurality of cyclic groups $G'_j$), based on the random divisor D* selected;

calculating, by the processing device, logarithms of pairing values of the plurality of base divisors $D^-_j$ in a group G (where the group G is a direct product of the plurality of cyclic groups $G'_j$, and a pairing value by a bilinear pairing operation of two elements included in the group G is computable), and treating the logarithms as a plurality of pairing log coefficients $\eta_i$; and treating, by the processing device, the plurality of base divisors $D^-_j$ calculated and the plurality of pairing log coefficients $\eta_i$ calculated, as the encryption parameters.

An encryption parameter setting method according to the present invention, in which an encryption parameter setting apparatus having a processing device for processing data sets encryption parameters used for a cryptographic operation, includes:

selecting, by the processing device, a random divisor D* randomly from a plurality of divisors of a Jacobian variety $Jac_c$ of a hyperelliptic curve C of genus d in a finite field $F_p$ (where an order p of the finite field $F_p$ is a prime number, and the genus d is an integer greater than or equal to 2);

calculating, by the processing device, a plurality of base divisors $D^-_j$, based on the random divisor D* selected;

calculating, by the processing device, a plurality of discrete logs $l_k$ where k is an integer greater than or equal to 1 and less than or equal to 2d−1, and the discrete log $l_K$ is an integer greater than or equal to 0 and less than or equal to 2d−1);

calculating, by the processing device, a plurality of pairing log coefficients $\eta_i$ (where i is an integer greater than or equal to 0 and less than or equal to 2d−1, and the pairing log coefficient $\eta_i$ is an integer greater than or equal to 0 and less than or equal to r−1), based on the plurality of discrete logs $l_k$ calculated; and setting, by the processing device, the encryption parameters, based on the plurality of base divisors $D^-_j$ calculated and the plurality of pairing log coefficients $\eta_i$ calculated.

A key generation method according to the present invention, in which a key generation apparatus having a processing device for processing data and a storage device for storing data generates a key used for a cryptographic operation, includes:

storing, by the storage device, as a plurality of base divisors $D^-_j$, a plurality of elements of a group G (where the group G is a direct product of a plurality of cyclic groups of a same order, a pairing value by a bilinear pairing operation of two elements included in the group G is computable, and the plurality of base divisors $D^-_j$ are mutually linearly independent);

storing, by the storage device, logarithms of pairing values of the plurality of base divisors $D^-_j$, as a plurality of pairing log coefficients $\eta_i$;

calculating, by the processing device, a plurality of output bases $g_k$ being elements of the group G (where a pairing value of at least any two output bases $g_k$ in the plurality of output bases $g_k$ is 1), based on the plurality of base divisors $D^-_j$ stored by the storage device and the plurality of pairing log coefficients $\eta_i$ stored by the storage device; and calculating, by the processing device, the key, based on the plurality of output bases calculated.

A key generation method according to the present invention, in which a key generation apparatus having a processing device for processing data and a storage device for storing data generates a key used for a cryptographic operation, includes:

storing, by the storing device, a plurality of base divisors $D^-_j$ of a Jacobian variety $Jac_c$ of an algebraic curve C of genus d in an extension field K given by a finite algebraic extension of a finite field $F_p$ (where an order p of the finite field $F_p$ is a prime number, the genus d is an integer greater than or equal to 2, and w is a prime number of w=2d+1) and a plurality of pairing log coefficients $\eta_i$ indicating a relation of a pairing value of the plurality of base divisors;

randomly, by the processing device, selecting a random matrix V* satisfying a predetermined condition, based on the plurality of pairing log coefficients $\eta_i$ stored by the storage device;

calculating, by the processing device, a plurality of output bases $g_k$, based on the plurality of base divisors $D^-_j$ stored by the storage device and the random matrix V* selected; and calculating, by the processing device, a key used for a cryptographic operation, based on the plurality of output bases $g_k$ calculated.

Advantageous Effects of Invention

The encryption parameter setting apparatus according to the present invention has the effect of computing, within a polynomial time, a concrete encryption parameter required for configuring a group G which has a group structure to be utilized for realizing an advanced cryptographic system.

Description of Embodiments

Embodiment 1

Referring to FIGS. 1 to 12, Embodiment 1 will now be described.

FIG. 1 shows an example of an overall system configuration of a cryptographic system 800 according to the present Embodiment. The cryptographic system 800 includes an encryption parameter setting apparatus 100 and a broadcast type cryptographic communication system 810.

The encryption parameter setting apparatus 100 sets an encryption parameter (system parameter) to be used in the broadcast type cryptographic communication system 810. The encryption parameter set by the encryption parameter setting apparatus 100 includes, for example, a definition of a group used for the cryptographic operation, etc. The definition of the group used for the cryptographic operation is, for example, a definition of the order of a finite field, that of a coefficient of an algebraic curve, and that of a pairing operation.

The encryption parameter set by the encryption parameter setting apparatus 100 will be published, and then, for example, a manufacturer of an apparatus constituting the broadcast type cryptographic communication system 810 may produce a device incorporating the published encryption parameter. There is a case of the manufacturer's producing a high speed processing apparatus by specializing in the published encryption parameter, and in this case, when once the encryption parameter setting apparatus 100 sets encryption parameters, it is not easy to change them. Alternatively, the manufacturer may produce a device capable of responding to change of the published encryption parameter, and the encryption parameter setting apparatus 100 may set an encryption parameter of higher security in accordance with change of the security requirement criterion.

The broadcast type cryptographic communication system 810 includes a key generation apparatus 500, a ciphertext generation apparatus 200, a plurality of ciphertext decryption apparatuses 300, and a wrongdoer tracing apparatus 400. The broadcast type cryptographic communication system 810 is a cryptographic communication system of a broadcasting type, wherein, by using an encryption parameter set by the encryption parameter setting apparatus 100, the key generation apparatus 500 generates a key to be used in the cryptographic operation, the ciphertext generation apparatus 200 encrypts a plaintext M and distributes it, and the ciphertext decryption apparatus 300 acquires a decrypted text M' by using a private key SK which is respectively held.

In the plurality of ciphertext decryption apparatuses 300, ciphertext decryption apparatuses 300a to 300c are proper ciphertext decryption apparatuses 300 and are a part of the broadcast type cryptographic communication systems 810. In contrast, a ciphertext decryption apparatus 300z is a fraudulent ciphertext decryption apparatus 300, and is not a part of the broadcast type cryptographic communication systems 810.

Based on the encryption parameter set by the encryption parameter setting apparatus 100, the key generation apparatus 500 generates a key to be used in the broadcast type cryptographic communication system 810. As the keys generated by the encryption parameter setting apparatus 100, there are a public key PK, a private key SK, a tracer's key TK, etc. The public key PK generated by the key generation apparatus 500 is published to the user of the broadcast type cryptographic communication system 810. The private key SK set by the key generation apparatus 500 is respectively assigned to each of the proper ciphertext decryption apparatuses 300a to 300c. The proper ciphertext decryption apparatuses 300a to 300c hold the assigned private key SK in secrecy. The tracer's key TK generated by the key generation apparatus 500 is held by the wrongdoer tracing apparatus 400 in secrecy.

The ciphertext generation apparatus 200 inputs a plaintext M, encrypts the input plaintext M by using the public key PK, and generates a ciphertext CT. The ciphertext CT generated by the ciphertext generation apparatus 200 is transmitted to a plurality of ciphertext decryption apparatuses 300 via, for example, communication, broadcasting, etc.

The plurality of ciphertext decryption apparatuses 300 input the transmitted ciphertext CT, and decrypt the input ciphertext CT by using the public key PK being published and the private key SK being held, to generate a decrypted text M'. If the private key SK which the ciphertext decryption apparatus 300 holds is right one, the decrypted text M' generated by the ciphertext decryption apparatus 300 becomes the same as the plaintext M input by the ciphertext generation apparatus 200. The plaintext M is, for example, a common key for decrypting a scrambled broadcast. Proper users decrypt the scrambled broadcast for viewing/listening, by using the decrypted text M' generated by the ciphertext decryption apparatus 300.

The fraudulent ciphertext decryption apparatus 300z (pirate decryption device: pirate decoder) shall hold a private key SK which has been fraudulently obtained from one of the proper ciphertext decryption apparatuses 300a to 300c. Since holding the right private key SK, the fraudulent ciphertext decryption apparatus 300z can decrypt the ciphertext CT correctly. Therefore, the user of the fraudulent ciphertext decryption apparatus 300z can decrypt the scrambled broadcast and view and listen to it, for example.

Now, it is supposed that the fraudulent ciphertext decryption apparatus 300z is found being sold in a black market. Probably, the administrator of the broadcast type cryptographic communication system 810 may purchase and analyze the fraudulent ciphertext decryption apparatus 300z in order to find out whose private key SK has been revealed.

The wrongdoer tracing apparatus 400 generates a ciphertext CT for tracing the wrongdoer, by using the public key PK being published and the tracer's key TK being held. The ciphertext CT which the wrongdoer tracing apparatus 400 generates has been made not to be distinguished from the normal ciphertext CT. If the ciphertext CT generated by the wrongdoer tracing apparatus 400 is input into the fraudulent ciphertext decryption apparatus 300z, the fraudulent ciphertext decryption apparatus 300z will decrypt the ciphertext CT and generate a decrypted text M' by using the private key SK being held. The wrongdoer tracing apparatus 400 inputs and analyzes the decrypted text M' generated by the fraudulent ciphertext decryption apparatus 300z. The ciphertext CT for tracing, which the wrongdoer tracing apparatus 400 generates, is plotted so that a decrypted text M' decrypted from the ciphertext CT for tracing may include data concerning the private key SK used in the decryption. By analyzing the decrypted text M', the wrongdoer tracing apparatus 400 acquires data concerning the private key SK used in the decryption, and identifies from where the private key SK being held by the fraudulent ciphertext decryption apparatus 300z has been leaked.

FIG. 2 shows an example of the appearance of the encryption parameter setting apparatus 100, the key generation apparatus 500, the ciphertext generation apparatus 200, the ciphertext decryption apparatus 300, and the wrongdoer tracing apparatus 400 according to the present Embodiment.

The encryption parameter setting apparatus 100, the key generation apparatus 500, the ciphertext generation apparatus 200, the ciphertext decryption apparatus 300, and the wrongdoer tracing apparatus 400 include hardware resources, such as a system unit 910, a display device 901 having a display screen of CRT (Cathode Ray Tube) or LCD (Liquid Crystal), a keyboard (K/B) 902, a mouse 903, an FDD (Flexible Disk Drive) 904, a compact disk drive (CDD) 905, a printer 906, and a scanner 907, which are connected through cables and signal lines. The system unit 910, being a computer, is connected to a facsimile machine 932 and a telephone 931 through cables, and to an Internet 940 through a local area network (LAN) 942 and a gateway 941.

FIG. 3 shows an example of hardware resources of the encryption parameter setting apparatus 100, the key generation apparatus 500, the ciphertext generation apparatus 200, the ciphertext decryption apparatus 300, and the wrongdoer tracing apparatus 400 according to the present Embodiment.

The encryption parameter setting apparatus 100, the key generation apparatus 500, the ciphertext generation apparatus 200, the ciphertext decryption apparatus 300, and the wrongdoer tracing apparatus 400 include a CPU 911 (also called a Central Processing Unit, central processing apparatus, processing device, operational device, microprocessor, microcomputer, or processor) which executes a program. The CPU 911 is connected through a bus 912 to a ROM 913, a RAM 914, a communication device 915, the display device 901, the keyboard 902, the mouse 903, the FDD 904, the CDD 905, the printer 906, the scanner 907, and a magnetic disk drive 920, and controls these hardware devices. Instead of the magnetic disk drive 920, a storage device, such as an optical disk drive and a memory card read/write device may be used.

The RAM 914 is an example of a volatile memory. The storage media, such as the ROM 913, the FDD 904, the CDD 905, and the magnetic disk drive 920 are examples of a nonvolatile memory. These are examples of a storage device or a storage unit. The communication device 915, the keyboard 902, the scanner 907, the FDD 904, etc. are examples of an input unit or an input device. The communication device 915, the display device 901, the printer 906, etc. are examples of an output unit or an output device.

The communication device 915 is connected to the facsimile machine 932, the telephone 931, the LAN 942, etc. The communication device 915 may be connected not only to the LAN 942 but also to a WAN (Wide Area Network), such as the Internet 940 and ISDN. When connected to the WAN, such as the Internet 940 or ISDN, the gateway 941 becomes dispensable.

In the magnetic disk drive 920, an operating system (OS) 921, a window system 922, a program group 923, and a file group 924 are stored. Programs of the program group 923 are executed by the CPU 911, the operating system 921, and the window system 922.

In the program group 923, programs for executing functions indicated by the term "unit" described in the Embodiments stated below are stored. The programs are read and executed by the CPU 911. In the file group 924, information, data, signal values, variable values, and parameters indicated by the terms "judgment result of", "calculation result of", or "processing result of" described in the Embodiments stated below are stored as each item of the "file" or "database". Such "file" and "database" are stored in a recording medium, such as a disk and a memory. The information, data, signal values, variable values, and parameters stored in the storage medium, such as a disk and a memory, are read to a main memory or a cache memory by the CPU 911 through a read and write circuit, and used for operations of CPU, such as extraction, search, reference, comparison, operation, calculation, processing, output, printing, and display. During the operations of the CPU, namely during extraction, search, reference, comparison, operation, calculation, processing, output, printing, and display, the information, data, signal values, variable values, and parameters are temporarily stored in the main memory, cache memory, and buffer memory.

Moreover, arrows in the flowchart described for explaining the Embodiments stated below mainly show inputting and outputting of data or signals. Data and signal values are recorded on recording media, such as a memory of the RAM 914, a flexible disk of the FDD 904, a compact disk of the CDD 905, a magnetic disk of the magnetic disk drive 920, an optical disk, a mini disk, and a DVD (Digital Versatile Disk). Moreover, data and signals are transmitted on line by the bus 912, a signal line, a cable, or other transmission medium.

What is described by the term "unit" in the Embodiments stated below may be a "circuit", a "device", or an "apparatus" and may be a "step", a "procedure", or "processing". That is, what is described as a "unit" may be realized by the firmware stored in the ROM 913. Alternatively, they may be implemented only by software, only by hardware, such as an element, a device, a substrate, and a wiring, or by a combination of hardware and software, and alternatively a combination of hardware, software and firmware. Firmware and software are stored, as programs, in a recording medium, such as a magnetic disk, a flexible disk, an optical disk, a compact disk, a mini disk, and a DVD. Such programs are read by the CPU 911, and executed by the CPU 911. That is, such programs operate a computer, as "units" described below, or they cause a computer to execute a procedure or a method of the "units" described below.

FIG. 4 is a block diagram showing an example of a functional block configuration of the encryption parameter setting apparatus 100 according to the present Embodiment. The encryption parameter setting apparatus 100 includes a security parameter input unit 110, a divisor group generation unit 120, and a parameter setting unit 140.

The security parameter input unit 110 inputs a security parameter by using the CPU 911. The security parameter is a parameter for determining security of the broadcast type cryptographic communication system 810, and for example, is the number of bits of the order of a divisor group composed of base divisors, etc. generated by the divisor group generation unit 120. The security parameter input unit 110 stores the data representing the input security parameter, by using the RAM 914.

The divisor group generation unit 120 includes an order determination unit 121, a random divisor selection unit 122, a base divisor generation unit 123, a discrete log calculation unit 124, and a pairing log calculation unit 125.

The order determination unit 121 inputs the data representing the security parameter stored by the security parameter input unit 110, by using the CPU 911. The order determination unit 121 determines an order p of a finite field $F_p$, based on the security parameter represented by the input data, by using the CPU 911. For example, the order determination unit 121 determines, by using the CPU 911, the order p of the finite field $F_p$ so that the order of a divisor D of a Jacobian variety $Jac_c$ of an algebraic curve C in the finite field $F_p$ may be the number of bits defined by the security parameter. In addition, although the order of a finite field is generally a prime number or a value obtained by exponentiating a prime number, the order determination unit 121 determines the order p of the finite field $F_p$ to be a prime number.

Here, an order #$JacC(F_p)$ of a group composed of divisors of the Jacobian variety $Jac_c$ in the finite field $F_p$ is expressed by a product of one or more prime numbers. When selecting an arbitrary divisor from the divisors of the Jacobian variety $Jac_c$ in the finite field $F_p$ and considering a torsion subgroup whose generator is the selected divisor, the order of this torsion subgroup (namely, the order of the selected divisor) is a divisor of the order #$Jac_c(F_p)$ of the group composed of divisors of the Jacobian variety $Jac_c$ in the finite field $F_p$.

As described below, the encryption parameter setting apparatus 100 sets an encryption parameter so that the key generation apparatus 500 can configure a divisor group whose order r is a sufficiently large prime number. Thus, the order determination part 121 determines the order p so that a sufficiently large prime number may exist in prime factors of the order #$Jac_c(F_p)$ of the group composed of divisors of the Jacobian variety $Jac_c$ in the finite field $F_p$.

In the following example, the case where a supersingular hyperelliptic curve $C: Y^2 = X^w + 1$ having two torsion points is used as the algebraic curve C will be explained. In this case, w shall be a prime number greater than or equal to 5. Then, the genus d of the hyperelliptic curve C is w=2d+1. For example, if w=5, the genus d of the hyperelliptic curve C is 2.

In the above cited case, the order determination unit 121 determines the order p so that a(=p mod w), being the remainder of the order p of the finite field $F_p$ divided by the prime number w, may become the generator of a multiplicative group $F_w^*$ of the finite field whose order is w, by using the CPU 911. For example, if w=5, the order determination unit 121 determines the order p so that the remainder a of the order p divided by 5 may be 2 or 3.

The order determination unit 121 selects the order p and calculates the order #$Jac_c(F_p)$ of the group composed of divisors of the Jacobian variety $Jac_c$ in the finite field $F_p$, based on the selected order p, by using the CPU 911. The order determination unit 121 calculates a prime factor r of the calculated order #$Jac_c(F_p)$ by using the CPU 911. The order determination unit 121 judges whether there is any one greater than or equal to the number of bits defined by the security parameter in the calculated prime factors r or not, and reselects the order p when the prime factor r is less than the number of bits defined by the security parameter, by using the CPU 911.

The order determination unit 121 treats the prime number r which is greater than or equal to the number of bits defined by the security parameter, as the order of the divisor D of the Jacobian variety JacC in the finite field $F_p$, by using the CPU 911, and stores the data representing the determined order p of the finite field $F_p$ and the data representing the calculated order r of the divisor D of the Jacobian variety $Jac_C$, by using the RAM 914.

The random divisor selection unit 122 inputs the data representing the order p of the finite field $F_p$ which the order determination unit 121 stored, and the data representing the order r of the divisor D of the Jacobian variety $Jac_C$, by using the CPU 911. The random divisor selection unit 122 randomly selects a nontrivial divisor from the divisor D of the order r, in a plurality of divisors D of the Jacobian variety $Jac_C$ in the finite field $F_p$, based on the orders p and r represented by the input data, and treats it as a random divisor D*.

The random divisor selection unit 122 stores the data representing the selected random divisor D*, by using the RAM 914. The data representing divisors of the Jacobian variety $Jac_C$ is, for example, data indicating a coefficient of a polynomial in the Mumford expression of a divisor. In the case of the divisor of the Jacobian variety $Jac_c$ in the finite field $F_p$, the coefficient of the polynomial in the Mumford expression is an integer greater than or equal to 0 and less than p.

The base divisor generation unit 123 inputs the data representing the random divisor D* stored by the random divisor selection unit 122, by using the CPU 911. The base divisor generation unit 123 calculates a plurality of base divisors $D^-_j$ (where j is an integer greater than or equal to 0 and less than or equal to 2d−1), based on the random divisor D* represented by the input data, by using the CPU 911. For example, if w=5, the base divisor generation unit 123 calculates four base divisors $D^-_0$, $D^-_1$, $D^-_2$, and $D^-_3$, by using the CPU 911.

The base divisor generation unit 123 calculates a base divisor $D^-_j$ by making a plurality of predetermined operators $G_j$ (where j is an integer greater than or equal to 0 and less than or equal to 2d−1) respectively operate on the random divisor D*, by using the CPU 911.

In the following example, the operator $G_j$ shall be a Gauss Sum operator expressed by Expression 4.

$$G_j = \sum_{i=0}^{2d-1} \{ p^{i \cdot j} \cdot \rho^{a^i} \} \qquad \text{[Expression 4]}$$

where ρ is an operation on the Jacobian variety Jac corresponding to an operation $(x,y) \to (\zeta x, y)$ on the hyperelliptic curve C. That is, since a divisor of the Jacobian variety $Jac_c$ is expressed by a formal sum of points on the hyperelliptic curve C, it is possible to constitute an operation ρ of mapping a divisor of the Jacobian variety $Jac_c$ to a divisor of the Jacobian variety $Jac_c$, by using the operation of mapping a point (x,y), which constitutes a divisor, on the hyperelliptic curve C to a point (ζx, y) on the hyperelliptic curve C. ζ is the w-th root of 1. That is, $\zeta^w = 1$ and $\zeta \neq 1$. Since $(\zeta x)^w = \zeta^w = x^w$, the operation (x,y)→(ζx,y) maps a point on the hyperelliptic curve C:$Y^2=X^w+1$ to a point on the hyperelliptic curve C.

In addition, i is an integer greater than or equal to 0 and less than or equal to 2d−1. p is the order of the finite field $F_p$ determined by the order determination unit 121. a is the remainder of the order p of the finite field $F_p$ divided by the prime number w.

According to the condition of determining the order p of the finite field $F_p$ by the order determination unit 121, the remainder a is the generator of the finite field $F_w$ whose order is w. Therefore, the remainder a is not 1. That is, since w is not a divisor of p−1, does not exist in the finite field $F_p$. Then, an extension field K given by expanding the finite field $F_p$ is considered so that may be included. Since $ζ^w=1$ and $ζ≠1$, $Σ(ζ^i)=0$ (where i is an integer greater than or equal to 0 and less than or equal to 2d). Therefore, the extension field K is a field given by an algebraic extension of the finite field $F_p$ with treating the 2d-th order polynomial $Σ(x^i)$ as a generator polynomial, and the order of extension is 2d.

The element of the extension field K is expressed by the (2d−1)th order polynomial in which the element of the finite field $F_p$ is a coefficient. That is, the extension field K is a 2d-dimensional vector space in the finite field $F_p$, and the element of the extension field K can be expressed by a set of data representing 2d integers greater than or equal to 0 and less than or equal to p−1. The encryption parameter setting apparatus 100 can add or multiply the element of the extension field K by calculating addition or multiplication of a polynomial expressed by the set of data and calculating the remainder divided by the generator polynomial.

Moreover, the divisor of the Jacobian variety $Jac_c$ in the extension field K can be expressed, for example, by treating the element of the extension field K as a coefficient of a polynomial in the Mumford expression, in the case of using the Mumford expression.

The base divisor generation unit 123 calculates the base divisor $D^~_j$ being a divisor of the Jacobian variety $Jac_c$ in the extension field K by calculating the operation in the extension field K, by using the CPU 911. For example, if w=5 and a=2, the base divisor generation unit 123 computes base divisors $D^~_0$, $D^~_1$, $D^~_2$, and $D^~_3$ by calculating the expression shown in Expression 5, by using the CPU 911.

$$\tilde{D}_0 = D_0 + D_1 + D_2 + D_3$$

$$\tilde{D}_1 = D_0 + p \cdot D_1 + p^2 \cdot D_2 + p^3 \cdot D_3$$

$$\tilde{D}_2 = D_0 + p^2 \cdot D_1 + p^4 \cdot D_2 + p^6 \cdot D_3$$

$$\tilde{D}_3 = D_0 + p^3 \cdot D_1 + p^6 \cdot D_2 + p^9 \cdot D_3 \qquad \text{[Expression 5]}$$

where $D_0$, $D_1$, $D_2$, and $D_3$ are divisors of the Jacobian variety $Jac_c$ in the extension field K, and $D_0=ρ(D^*)$, $D_1=ρ^2(D^*)$, $D_2=ρ^4(D^*)$, and $D_3=ρ^8(D^*)$. Moreover, since $D^*=ρ^5(D^*)$ because of $ζ^5=1$, it becomes $D_3=ρ^3(D^*)$. Therefore, the divisors $D_0$, $D_1$, $D_2$, and $D_3$ can be calculated by the procedure shown in Expression 6.

$$D* \xrightarrow{\rho} D_0, D_0 \xrightarrow{\rho} D_1, D_1 \xrightarrow{\rho} D_3, D_3 \xrightarrow{\rho} D_2 \qquad \text{[Expression 6]}$$

As an algorithm for calculating addition of divisors of the Jacobian variety $Jac_c$ within a polynomial time, there is known a method using a Chinese remainder theorem, etc. Accordingly, the encryption parameter setting apparatus 100 can calculate addition of divisors of the Jacobian variety $Jac_c$ within the polynomial time.

The base divisor generation unit 123 stores the data representing a plurality of calculated base divisors $D^~_j$, by using the RAM 914.

The base divisor generation unit 123 calculates 2d base divisors. The base divisor $D^~_j$ calculated by the base divisor generation unit 123 has the following characteristics:

2d base divisors $D^~_j$ are divisors of the Jacobian variety $Jac_c$ in the extension field K whose order of extension is 2d, and are mutually linearly independent.

Moreover, since the Gauss Sum operator $G_j$ is homomorphic, the order of the base divisor $D^~_j$ is r being the same as that of the random divisor $D^*$.

Therefore, a group G (hereinafter called a "finitely generated divisor group") which is finitely generated from 2d base divisors $D^~_j$ is a direct product of 2d cyclic groups whose order is r.

The discrete log calculation unit 124 inputs the data representing the order p of the finite field $F_p$ stored by the order determination unit 121 and the data representing the order r of the divisor D of the Jacobian variety $Jac_c$ in the finite field $F_p$, by using the CPU 911. The discrete log calculation unit 124 calculates a plurality of discrete logs $l_K$ (where K is an integer greater than or equal to 1 and less than or equal to 2d−1, and the discrete log $l_K$ is an integer greater than or equal to 0 and less than or equal to 2d−1), based on the orders p and r represented by the input data. For example, if w=5, the discrete log calculation unit 124 calculates three discrete logs $l_1$, $l_2$, and $l_3$ by using the CPU 911.

In the following example, the discrete log calculation unit 124 shall compute a discrete log $l_K$ which satisfies Expression 7, by using the CPU 911.

$$a^K - 1 \equiv a^{l_K} \bmod w \qquad \text{[Expression 7]}$$

where a is the remainder of the order p of the finite field $F_p$ divided by the prime number w. Since, according to the condition of determining the order p of the finite field $F_p$ by the order determination unit 121, the remainder a is the generator of the multiplicative group $F_w^*$ of the finite field whose order is w, when $1 \leq K \leq 2d-1(=w-2)$, $a^K \neq 1 \pmod{w}$. Therefore, $l_k$ which satisfies Expression 7 certainly exists.

The discrete log calculation unit 124 calculates, for example, all 2d−1 $a^K$ (remainder of $a^K$ divided by the prime number w) by using the CPU 911, and stores the calculated 2d−1 $a^K$ by using the RAM 914. Next, the discrete log calculation unit 124 calculates $a^K−1$ (the remainder of $a^K−1$ divided by the prime number w) based on the calculated $a^K$, and then calculates a discrete log $l_K$ by comparing the calculated $a^K−1$ and the stored 2d−1 $a^K$ in order to find equivalents, by using the CPU 911. For example, if w=5 and a=2, the discrete log calculation unit 124 calculates $2^1=2$ (mod 4, similarly applied hereinafter), $2^2=4$, and $2^3=3$, judges that $2-1=1=2^0$, $4-1=3=2^3$, and $3-1=2=2^1$, and calculates $l_1=0$, $l_2=3$, and $l_3=1$.

In addition, it is also preferable to previously calculate a plurality of discrete logs $l_k$ (w,a) which are defined by the prime number w and the remainder a, and store the data representing the plurality of discrete logs $l_k$ by the discrete log calculation unit 124 by using the magnetic disk drive 920. Furthermore, it is also preferable that the discrete log calculation unit 124 calculates the remainder a based on the order p of the finite field $F_p$ represented by the input data, and the prime number w, and acquires a plurality of discrete logs $l_k$ corresponding to the prime number w and the remainder a from the discrete log $l_K$ w,a) previously stored, by using the CPU 911.

The discrete log calculation unit 124 stores the data representing a plurality of calculated discrete logs $l_k$, by using the RAM 914.

The pairing log calculation unit 125 inputs the data representing the plurality of discrete logs $l_k$ stored by the discrete log calculation unit 124, by using the CPU 911. The pairing log calculation unit 125 calculates a plurality of pairing log coefficients $\eta_i$ (where i is an integer greater than or equal to 0 and less than or equal to 2d−1, the pairing log coefficient $\eta_i$ is an integer greater than or equal to 0 and less than or equal to r−1, and r is the order of the divisor D of the Jacobian variety $Jac_c$), based on the plurality of discrete logs $l_k$ represented by the input data, by using the CPU 911. For example, if w=5, the pairing log calculation unit 125 calculates four pairing log coefficients $\eta_0$, $\eta_1$, $\eta_2$, and $\eta_3$ by using the CPU 911.

In the following example, the pairing log calculation unit 125 shall compute a plurality of pairing log coefficients $\eta_i$ by calculating the expression shown in Expression 8, by using the CPU 911.

$$\eta_i = \left(\sum_{K=1}^{2d-1} p^{l_K + i \cdot K}\right) \bmod r \quad \text{[Expression 8]}$$

where i is an integer greater than or equal to 0 and less than or equal to 2d−1, K is an integer greater than or equal to 1 and less than or equal to 2d−1, p is the order of the finite field $F_p$ determined by the order determination unit 121, and r is the order of the group composed of the divisor D of the Jacobian variety $Jac_c$ in the finite field $F_p$ calculated by the order determination unit 121. For example, if w=5, the pairing log calculation unit 125 calculates four pairing log coefficients $\eta_0$, $\eta_1$, $\eta_2$, and $\eta_3$ by calculating the expression shown in Expression 9, by using the CPU 911.

$\eta_0 = (p^{l_1} + p^{l_2} + p^{l_3}) \bmod r$ $\eta_1 = (p^{l_1+1} + p^{l_2+2} + p^{l_3+3}) \bmod r$ $\eta_2 = (p^{l_1+1} + p^{l_2+4} + p^{l_3+6}) \bmod r$ $\eta_3 = (p^{l_1+3} + p^{l_2+6} + p^{l_3+9}) \bmod r$ [Expression 9]

The pairing log calculation unit 125 stores the data representing a plurality of calculated pairing log coefficients by using the RAM 914.

The parameter setting unit 140 inputs the data representing the order p of the finite field $F_p$ stored by the order determination unit 121, the data representing the order r of the group composed of the divisor D of the Jacobian variety $Jac_c$ in the finite field $F_p$, the data representing the plurality of base divisors $D^\sim_j$ stored by the base divisor generation unit 123, and the data representing the plurality of pairing log coefficients $\eta_i$ stored by the pairing log calculation unit 125, by using the CPU 911. The parameter setting unit 140 sets the order p, the order r, the plurality of base divisors $D^\sim_j$ and the plurality of pairing log coefficients $\eta_i$ represented by the input data, as encryption parameters, by using the CPU 911.

FIG. 5 is a flowchart showing an example of the flow of encryption parameter calculation processing in which the encryption parameter setting apparatus 100 according to the present Embodiment calculates an encryption parameter.

In a security parameter input step S711, the security parameter input unit 110 inputs a security parameter by using the CPU 911.

In an order determination step S712, the order determination unit 121 determines the order p of the finite field $F_p$ based on the security parameter input by the security parameter input unit 110 in the security parameter input step S711, by using the CPU 911. The order determination unit 121 calculates the order r of the divisor D of the Jacobian variety $Jac_c$ in the finite field $F_p$, based on the determined order p of the finite field $F_p$, by using the CPU 911.

In a random divisor selection step S713, the random divisor selection unit 122 randomly selects a random divisor D* from the divisors of the order r in the divisors of the Jacobian variety $Jac_c$ in the finite field $F_p$, by using the CPU 911.

In a base divisor calculation step S714, the base divisor generation unit 123 calculates a plurality of base divisors $D^\sim_j$ of the Jacobian variety $Jac_c$ in the extension field K, based on the random divisor D* selected in the random divisor selection step S713, by using the CPU 911.

In a discrete log calculation step S715, the discrete log calculation unit 124 calculates a plurality of discrete logs $l_k$ by using the CPU 911.

In a pairing log coefficient calculation step S716, the pairing log calculation unit 125 calculates a plurality of pairing log coefficients $\eta_i$, based on the discrete log $l_K$ calculated by the discrete log calculation unit 124 in the discrete log calculation step S715, by using the CPU 911.

Now, a pairing operation e of the divisors of the Jacobian variety $Jac_c$ is defined as $e(D,D') = e_w(D, \phi(D'))$. $e_w$ is a Weil pairing. $\phi$ is an endomorphism mapping which is calculable within the polynomial time in the group composed of divisors of the Jacobian variety $Jac_c$ in the extension field K. For example, $\phi$ is a mapping on the Jacobian variety $Jac_c$ corresponding to the p-th power Frobenius map $\pi_p : (x,y) \to (x^p, y^p)$) on the hyperelliptic curve C.

Since the algorithm for calculating a value of Weil pairing within a polynomial time is already known, the encryption parameter setting apparatus 100 can calculate the pairing value, which is a calculation result of the pairing operation e, within the polynomial time.

The pairing operation e as defined above has the following characteristics:

The pairing value e(D,D), which is a calculation result of the pairing operation e of the same divisors, is $e(D,D) \neq 1$ unless the order of the divisor D is 1.

Since the Weil pairing $e_w$ is a bilinear pairing, the pairing operation e is also a bilinear pairing. That is, Expression 10 is satisfied with respect to all the divisors D and D' of the Jacobian variety $Jac_c$.

$$e(a \cdot D, b \cdot D') = (D, D')^{ab} \quad \text{[Expression 10]}$$

where a and b are arbitrary integers. a·D denotes a divisor obtained as a result of adding the divisor D of the Jacobian variety $Jac_c$ a times.

When a divisor included in the finitely generated divisor group G finitely generated from 2d base divisors $D^\sim_j$ whose order is r is used as an argument of the pairing operation e, the group composed of all the pairing values is a direct product of 2d cyclic groups whose order is r, as well as the finitely generated divisor group G.

Furthermore, when let $u = e(D^*, D_0)$ and $u^\sim_{i,j} = e(D^\sim_i, D^\sim_j)$ (where i and j are integers greater than or equal to 0 and less than or equal to 2d−1), Expression 11 is satisfied.

$$\begin{cases} \text{when } i+j \neq 2d-1, & \tilde{u}_{i,j} = 1 (= u^0) \\ \text{when } i+j = 2d-1, & \tilde{u}_{i,j} = u^{2d\eta_j} \end{cases} \quad \text{[Expression 11]}$$

where $\eta_v$ is a pairing log coefficient calculated by the pairing log calculation unit 125.

The key generation apparatus 500 sets a key to be used in the cryptographic system 800, by using this characteristic.

FIG. 6 is a block diagram showing an example of a functional block configuration of the key generation apparatus 500 according to the present Embodiment.

The key generation apparatus 500 includes a base divisor storage unit 511, a pairing log storage unit 512, a condition storage unit 130, a condition input unit 141, a random matrix selection unit 142, an output base calculation unit 143, and a key calculation unit 150.

The base divisor storage unit 511 has stored the data representing a plurality of base divisors $D^-_j$ in the encryption parameters set by the encryption parameter setting apparatus 100, by using the ROM 913.

The pairing log storage unit 512 has stored the data representing a plurality of pairing log coefficients $\eta_i$ in the encryption parameters set by the encryption parameter setting apparatus 100, by using the ROM 913.

In addition, the base divisor storage unit 511 and the pairing log storage unit 512 may store encryption parameters in the form incorporated in the program stored by the magnetic disk drive 920 etc., by using the magnetic disk drive 920 etc.

The condition storage units 130 has stored the data representing the condition that should be satisfied by a plurality of output bases $g_i$ (where i is an integer greater than or equal to 1 and less than or equal to b, and b is an integer greater than or equal to d and less than or equal to 2d) calculated by the output base calculation unit 143 mentioned later, by using the magnetic disk drive 920.

The condition indicated by the data stored in the condition storage unit 130 expresses whether a pairing value of two output bases in b output bases $g_i$ calculated by the output base calculation unit 143 should be 1, should be other than 1, or may be an arbitrary value.

The data stored in the condition storage unit 130 is composed of two data of consistent condition data and inconsistent condition data, for example. The consistent condition data is a set of data representing a pair ($\mu,\nu$) of two integers (where $\mu$ and $\nu$ are integers greater than or equal to 1 and less than or equal to b) which indicates an output base pair where a pairing value of the output base $g_\mu$ and the output base $g_\nu$ should be 1. The inconsistent condition data is also a set of data representing a pair ($\mu,\nu$) of two integers (where $\mu$ and $\nu$ are integers greater than or equal to 1 and less than or equal to b) as well as the consistent condition data, and however, the pair ($\mu,\nu$) of the integers represented by the inconsistent condition data indicates an output base pair in which a pairing value of the output base $g_\mu$ and the output base $g_\nu$ should be other than 1. When the data representing an integer pair ($\mu,\nu$) indicating a pair of the output base $g_\mu$ and the output base $g_\nu$ is included in neither the consistent condition data nor the inconsistent condition data, it means that the pairing value of the output base $g_\mu$ and the output base $g_\nu$ may be an arbitrary value.

The condition input unit 141 inputs the data representing the condition that should be satisfied by the output base which the condition storage unit 130 stored, by using the CPU 911. The condition input unit 141 (an example of the consistent condition input unit and the inconsistent condition input unit) inputs, for example, the consistent condition data and the inconsistent condition data stored by the condition storage unit 130. The condition input unit 141 stores the input data representing the condition that should be satisfied by the output base, by using the RAM 914.

The random matrix selection unit 142 inputs the data representing the condition that should be satisfied by the output base stored by the condition input unit 141, and the data representing a plurality of pairing log coefficients $\eta_i$ stored by the pairing log storage unit 512, by using the CPU 911. Based on the condition represented by the input data, the random matrix selection unit 142 randomly selects a matrix V* from the matrix V which satisfies the condition, and treats it as a random matrix V.

Here, the matrix V is a b row by 2d column matrix. For example, if w=5 and b=2, the matrix V is a 2 row by 4 column matrix. Supposing that the $\mu$-th row and $\nu$-th column element of the matrix V is $c_{\mu,\nu}$ (where $\mu$ is an integer greater than or equal to 1 and less than or equal to b, and $\nu$ is an integer greater than or equal to 1 and less than or equal to 2d), $c_{\mu,\nu}$ is a variable whose value is an integer greater than or equal to 0 and less than or equal to r−1. The random matrix selection unit 142 determines the value of the variable $c_{\mu,\nu}$, based on the condition represented by the input data, by using the CPU 911.

The random matrix selection unit 142 searches a matrix V which satisfies a relational expression: $W=V \cdot M \cdot V^T$, by using the CPU 911. In this case, the matrix $V^T$ is a 2d row by b column matrix which is transposed from the matrix V. The $\nu$-th row and $\mu$p-th column element (where $\mu$ is an integer greater than or equal to 1 and less than or equal to b, and $\nu$ is an integer greater than or equal to 1 and less than or equal to 2d) of the transposed-matrix $V^T$ is a variable $c_{\mu,\nu}$.

A matrix M is a 2d-dimensional square matrix. For example, if w=5, the matrix M is the four-dimensional square matrix. Supposing that the $\mu$-th row and $\nu$-th column element of the matrix M is $m_{\mu,\nu}$ (where $\mu$ and $\nu$ are integers greater than or equal to 1 and less than or equal to 2d), when $\mu+\nu=2d+1$, $m_{\mu,\nu}=\eta_\nu 1$, and when $\mu+\nu \neq 2d+1$, $m_{\mu,\nu}=0$.

A matrix M' is a b-dimensional square matrix. For example, if b=2, the matrix M' is a two-dimensional square matrix. Supposing that the $\mu$-th row and $\nu$-th column element of the matrix M' is $m'_{\mu,\nu}$ (where $\mu$ and $\nu$ are integers greater than or equal to 1 and less than or equal to b), Expression 12 is satisfied.

$$m'_{\mu,\nu} = \sum_{i=0}^{2d-1} \eta_i \cdot c_{\mu,2d-i} \cdot c_{\nu,i+1} \qquad \text{[Expression 12]}$$

where i is an integer greater than or equal to 0 and less than or equal to 2d−1. $\eta_i$ is a pairing log coefficient calculated by the pairing log calculation unit 125 of the encryption parameter setting apparatus 100.

The random matrix selection unit 142, for example, calculates $c_{\mu,\nu}$ so that $m'_{\mu,\nu}=0$ may be satisfied with respect to an integer pair ($\mu,\nu$) indicated by the input consistent condition data, by using the CPU 911. Further, the random matrix selection unit 142 calculates $c_{\mu,\nu}$ so that $m'_{\mu,\nu} \neq 0$ may be satisfied with respect to an integer pair ($\mu,\nu$) indicated by the input inconsistent condition data, by using the CPU 911.

For example, the random matrix selection unit 142 calculates a degree of freedom by subtracting the number of the integer pairs indicated by the input consistent condition data from the number(=2d·b) of the variables $c_{\mu,\nu}$, by using the CPU 911. The random matrix selection unit 142 randomly selects variables $c_{\mu,\nu}$ whose number is the same as the degree of freedom from the variables $c_{\mu,\nu}$, based on the calculated degree of freedom, by using the CPU 911. The random matrix selection unit 142 randomly determines the value of the selected variable $c_{\mu,\nu}$, by using the CPU 911. For example, if w=5 and b=2, the number of the variables $c_{\mu,\nu}$ is 4·2=8. If there are two integer pairs indicated by the consistent condition data, since the degree of freedom is 8−2=6, the random matrix selection unit 142 selects six variables $c_{\mu,v}$ from the eight ones, and randomly determines the values.

Next, the random matrix selection unit 142 solves an equation prescribed by the consistent condition data, and determines the value of the remaining variable $c_{\mu,v}$, by using the CPU 911. The random matrix selection unit 142 substitutes the value of the determined variable $c_{\mu,v}$ into an equation prescribed by the inconsistent condition data, and confirms whether $m'_{\mu,v} \neq 0$ is satisfied, by using the CPU 911. If there is one satisfying $m'_{\mu,v}=0$, the random matrix selection unit 142 redoes from the randomly selecting the variable $c_{\mu,v}$, by using the CPU 911. When all the equations prescribed by the inconsistent condition data are satisfied, the random matrix selection unit 142 stores data representing the value of the determined variable $c_{\mu,v}$, by using the RAM 914.

The random matrix selection unit 142 treats the matrix in which the value of the determined variable $c_{\mu,v}$ is the μ-th row and ν-th column element, as a random matrix V*, by using the CPU 911, and stores the data representing the random matrix V*, by using the RAM 914.

The output base calculation unit 143 inputs the data representing a plurality of base divisors $D^\sim_j$ stored by the base divisor storage unit 511 and the data representing the random matrix V* stored by the random matrix selection unit 142, by using the CPU 911.

The output base calculation unit 143 calculates a plurality of output bases $g_i$ (where i is an integer greater than or equal to 1 and less than or equal to b, and b is an integer greater than or equal to d and less than or equal to 2d), based on the plurality of base divisors $D^\sim_j$ and the random matrix V' represented by the input data, by using the CPU 911.

The output base calculation unit 143 calculates a plurality of output bases $g_i = v_i \cdot D^\sim$ (where i is an integer greater than or equal to 1 and less than or equal to b, $v_i$ is an i-th row vector of the random matrix V*, and $D^\sim$ is a 2d-dimensional column vector in which the base divisor $D^\sim_j$ calculated by the base divisor generation unit 123 is used as the $(j_+1)$th row element), by using the CPU 911. That is, the output base calculation unit 143 calculates b output bases $g_i$ by calculating the expression shown in Expression 13, by using the CPU 911.

$$g_j = \sum_{j=0}^{2d-1} c_{i,j+1} \cdot \tilde{D}_j \qquad \text{[Expression 13]}$$

where i is an integer greater than or equal to 1 and less than or equal to b, j is an integer greater than or equal to 0 and less than or equal to 2d−1, $c_{i,j+1}$ is the i-th row and (j+1)th column element of the random matrix V* selected by the random matrix selection unit 142, and $D^\sim_j$ is a base divisor calculated by the base divisor generation unit 123 of the encryption parameter setting apparatus 100.

The output base calculation unit 143 stores the data representing a plurality of calculated output bases $g_i$, by using the RAM 914.

A plurality of output bases $g_i$ which the output base calculation unit 143 calculates are included in the finitely generated divisor group G. In a plurality of base divisors $D^\sim_j$ calculated by the base divisor generation unit 123, there is a relation that a pairing value becomes the value described above (refer to Expression 11). For this reason, in a plurality of output bases calculated by the output base calculation unit 143, the relation is satisfied that when $m'_{i,j}=0$, the pairing value of the output base $g_i$ and the output base $g_j$ becomes 1.

The key calculation unit 150 inputs the data representing the output base $g_i$ stored by the output base calculation unit 143, by using the CPU 911. The key calculation unit 150 calculates keys, such as a public key PK, a private key SK, and a tracer's key TK, based on the output base $g_i$ represented by the input data, by using the CPU 911.

FIG. 7 is a flowchart showing an example of the flow of output base calculation processing in which the key generation apparatus 500 according to the present Embodiment calculates an output base $g_i$.

In a condition input step S721, the condition input unit 141 inputs the condition that should be satisfied by the output base $g_i$, by using the CPU 911.

In a random matrix selection step S722, the random matrix selection unit 142 randomly selects a random matrix V* from the matrices V satisfying the condition input by the condition input unit 141, based on a plurality of pairing log coefficients $\eta_i$ indicated by the data stored by the pairing log storage unit 512, by using the CPU 911.

In an output base calculation step S718, the output base calculation unit 143 calculates a plurality of output bases $g_i$, based on the plurality of base divisors $D^\sim_j$ indicated by the data which the base divisor storage unit 511 stored, and the random matrix V* selected in the random matrix selection step S717, by using the CPU 911.

Next, there will be described a key which is to be computed based on the output base $g_i$ as calculated above.

In the following example, it is premised that a hyperelliptic curve $C: Y^2=X^5+1$ of genus 2 (namely, d=2 and w=5) is used as a hyperelliptic curve, the output base calculation unit 143 calculates four output bases $g_1, g_2, g_3$, and $g_4$ (namely, b=4), and the condition storage unit 130 has stored data representing eight integer pairs (1,2), (1,4), (2,1), (2,3), (3,2), (3,4), (4,1), and (4,3) as the consistent condition data, and has stored data representing four integer pairs (1,1), (2,2), (3,3), and (4,4) as the inconsistent condition data. That is, with respect to pairing values of the four output bases $g_1, g_2, g_3$ and $g_4$ calculated by the output base calculation unit 143, the following relation is satisfied:

$$e(g_1,g_2)=e(g_1,g_4)=e(g_2,g_3)=e(g_2,g_3)e(g_3,g_2)=e(g_3,g_4)= e(g_4,g_1)=e(g_4,g_3)=1, e(g_1,g_1)\neq 1, e(g_2,g_2)\neq 1, e(g_3,g_3)\neq 1, \text{ and } e(g_4,g_4)\neq 1.$$

FIG. 8 is a detailed block diagram showing an example of the internal block configuration of the key calculation unit 150 according to the present Embodiment.

The key calculation unit 150 includes a number-of-users input unit 151, a random number generation unit 160, a public key calculation unit 170, a private key calculation unit 180, a public key setting unit 191, a private key setting unit 192, and a tracer's key setting unit 193.

The number-of-users input unit 151 inputs two integers $n_1$ and $n_2$ which indicate the maximum value of the number of users (the number of the proper ciphertext decryption apparatuses 300) of the cryptographic system 800, by using the CPU 911. Here, the maximum value n of the number of users of the cryptographic system 800 is $n=n_1 \cdot n_2$. The user of the cryptographic system 800 is uniquely identified by a pair (x,y) of an index x (where x is an integer greater than or equal to 1 and less than or equal to $n_1$) and an index y (where y is an integer greater than or equal to 1 and less than or equal to $n_2$). $n_1$ and $n_2$ may be equal, and in such case, the number-of-users input unit 151 may input one integer $n_1$ that shows the maximum value $n=n_1^2$ of the number of users of the cryptographic system 800, by using the CPU 911. Alternatively, the number-of-users input unit 151 may input one integer n that shows the maximum value n of the number of users of the cryptographic system 800, and compute a minimum integer $n_1$ that does not fall below the square root of the input integer n, by using the CPU 911. The number-of-users input unit 151 stores the data representing the two input integers $n_1$ and $n_2$, by using the RAM 914.

The random number generation unit 160 includes a row random number generation unit 161, a pairing random number generation unit 162, a column random number generation unit 163, and a common random number generation unit 164.

The row random number generation unit 161 inputs the data representing the order r of the divisor of the Jacobian variety $Jac_c$ which the order determination unit 121 stored, and the data representing the integer $n_1$ which the number-of-users input unit 151 stored, by using the CPU 911. The row random number generation unit 161 performs processing, based on the order r and the integer $n_1$ represented by the input data, to randomly select $n_1$ integers greater than or equal to 1 and less than or equal to r−1, and treat them as $n_1$ random numbers $r_x$ (where x is an integer greater than or equal to 1 and less than or equal to $n_1$), by using the CPU 911. The row random number generation unit 161 stores the data representing the selected $n_1$ random numbers $r_x$, by using the RAM 914.

The pairing random number generation unit 162 inputs the data representing the order r of the divisor of the Jacobian variety $Jac_c$ stored by the order determination unit 121, and the data representing the integer $n_1$ stored by the number-of-users input unit 151, by using the CPU 911. The pairing random number generation unit 162 performs processing, based on the order r and the integer $n_1$ represented by the input data, to randomly select $n_1$ integers greater than or equal to 1 and less than or equal to r−1, and treat them as $n_1$ random numbers $\alpha_x$ (where x is an integer greater than or equal to 1 and less than or equal to $n_1$), by using the CPU 911. The pairing random number generation unit 162 stores the data representing the selected $n_1$ random numbers $\alpha_x$, by using the RAM 914.

The column random number generation unit 163 inputs the data representing the order r of the divisor of the Jacobian variety $Jac_c$ stored by the order determination unit 121, and the data representing the integer $n_2$ stored by the number-of-users input unit 151, by using the CPU 911. The column random number generation unit 163 performs processing, based on the order r and the integer $n_2$ represented by the input data, to randomly select $n_2$ integers greater than or equal to 1 and less than or equal to r−1, and treat them as $n_2$ random numbers $c_y$ (where y is an integer greater than or equal to 1 and less than or equal to $n_2$), by using the CPU 911. The column random number generation unit 163 stores the data representing the selected $n_2$ random numbers $c_y$, by using the RAM 914.

The common random number generation unit 164 inputs the data representing the order r of the divisor of the Jacobian variety $Jac_c$ stored by the order determination unit 121, by using the CPU 911. Based on the order represented by the input data, the common random number generation unit 164 randomly selects an integer greater than or equal to 1 and less than or equal to r−1, and treats it as a random number β, by using the CPU 911. The common random number generation unit 164 stores the data representing the selected random number β, by using the RAM 914.

The public key calculation unit 170 includes a public row base calculation unit 171, a public column base calculation unit 172, a public common divisor calculation unit 173, a public row first divisor calculation unit 174, a public row second divisor calculation unit 175, a public pairing value calculation unit 176, and a public column divisor calculation unit 177.

The public row base calculation unit 171 inputs the data representing the output bases $g_1$ and $g_2$ stored by the output base calculation unit 143, by using the CPU 911. The public row base calculation unit 171 performs processing, based on the output bases $g_1$ and $g_2$ represented by the input data, to calculate a divisor $g=g_1+g_2$ of the Jacobian variety $Jac_c$ in the extension field K, by using the CPU 911. That is, the public row base calculation unit 171 calculates a divisor by adding the divisor $g_1$ and the divisor $g_2$, and treats it as the divisor g, by using the CPU 911. The public row base calculation unit 171 stores the data representing the calculated divisor g, by using the RAM 914. Since the output bases $g_1$ and $g_2$ are included in the finitely generated divisor group G, the divisor g calculated by the public row base calculation unit 171 is also included in the finitely generated divisor group G.

The public column base calculation unit 172 inputs the data representing the output bases $g_3$ and $g_4$ stored by the output base calculation unit 143, by using the CPU 911. The public column base calculation unit 172 performs processing, based on the output bases $g_3$ and $g_4$ represented by the input data, to calculate a divisor $h=g_3+g_4$ of the Jacobian variety $Jac_c$ in the extension field K, by using the CPU 911. That is, the public column base calculation unit 172 calculates a divisor by adding the divisor $g_3$ and the divisor $g_4$ and treats it as the divisor h, by using the CPU 911. The divisor h is included in the finitely generated divisor group G. The public column base calculation unit 172 stores the data representing the calculated divisor h, by using the RAM 914.

The public common divisor calculation unit 173 inputs the data representing the output base $g_2$ stored by the output base calculation unit 143, and the data representing the random number β, stored by the common random number generation unit 164, by using the CPU 911. The public common divisor calculation unit 173 performs processing, based on the output base $g_2$ and the random number β represented by the input data, to calculate a divisor $E=\beta \cdot g_2$ of the Jacobian variety $Jac_c$ in the extension field K, by using the CPU 911. That is, the public column base calculation unit 172 calculates a divisor by β times adding the divisor $g_2$, and treats it as the divisor E, by using the CPU 911. The divisor E is included in the finitely generated divisor group G. The public common divisor calculation unit 173 stores the data representing the calculated divisor E, by using the RAM 914.

The public row first divisor calculation unit 174 inputs the data representing the output base $g_2$ stored by the output base calculation unit 143, the data representing the $n_1$ random numbers $r_x$ stored by the row random number generation unit 161, and the data representing the random number β stored by the common random number generation unit 164, by using the CPU 911. The public row first divisor calculation unit 174 performs processing, based on the output base $g_2$, the $n_1$ random numbers $r_x$ and the random number β represented by the input data, to calculate $n_1$ divisors $E_x=\beta r_x \cdot g_2$ (where x is an integer greater than or equal to 1 and less than or equal to $n_1$) of the Jacobian variety $Jac_c$ in the extension field K, by using the CPU 911. That is, the public row first divisor calculation unit 174 calculates a divisor by $(\beta \times r_x)$ times adding the divisor $g_2$, and treats it as the divisor $E_x$, by using the CPU 911. The divisor $E_x$ is included in the finitely generated divisor group G. The public row first divisor calculation unit 174 stores the data representing the calculated $n_1$ divisors $E_x$, by using the RAM 914.

Moreover, since $E=\beta \cdot g_2$, the public row first divisor calculation unit 174 may input the data representing the divisor E stored by the public common divisor calculation unit 173 and the data representing the $n_1$ random numbers $r_x$ stored by the row random number generation unit 161, and calculate $n_1$ divisors $E_x = r_x \cdot E$ (where x is an integer greater than or equal to 1 and less than or equal to $n_1$), by using the CPU 911. That is, the public row first divisor calculation unit 174 may calculate a divisor by $r_x$ times adding the divisor E and treat it as the divisor $E_x$, by using the CPU 911.

The public row second divisor calculation unit 175 inputs the data representing the output base $g_4$ stored by the output base calculation unit 143, the representing the $n_1$ random numbers $r_x$ stored by the row random number generation unit 161, and the data representing the random number $\beta$ stored by the common random number generation unit 164, by using the CPU 911. The public row second divisor calculation unit 175 performs processing, based on the output base $g_4$, the $n_1$ random numbers $r_x$, and the random number $\beta$ represented by the input data, to calculate $n_1$ divisors $F_x = \beta r_x \cdot g_4$ (where x is an integer greater than or equal to 1 and less than or equal to $n_1$) of the Jacobian variety $Jac_c$ in the extension field K, by using the CPU 911. That is, the public row second divisor calculation unit 175 calculates a divisor by $(\beta \times r_x)$ times adding the divisor $g_4$, and treats it as the divisor $F_x$, by using the CPU 911. The divisor $F_x$ is included in the finitely generated divisor group G. The public row second divisor calculation unit 175 stores the data representing the calculated $n_1$ divisors $F_x$, by using the RAM 914.

The public pairing value calculation unit 176 inputs the data representing the output base $g_2$ stored by the output base calculation unit 143, the data representing the $n_1$ random numbers $\alpha_x$ stored by the pairing random number generation unit 162, and the data representing the random number $\beta$ stored by the common random number generation unit 164, by using the CPU 911. The public pairing value calculation unit 176 performs processing, based on the output base $g_2$, the $n_1$ random numbers $\alpha_x$ and the random number $\beta$ represented by the input data, to calculate pairing values $G_x = e(g_2, g_2)^{\beta\alpha}$ (where x is an integer greater than or equal to 1 and less than or equal to $n_1$), by using the CPU 911. That is, the public pairing value calculation unit 176 calculates a pairing value by $(\beta \times \alpha_x)$ times multiplying the pairing value of the divisor $g_2$ and the divisor $g_2$, and treats it as the pairing value $G_x$, by using the CPU 911. The public pairing value calculation unit 176 stores the data representing the calculated $n_1$ pairing values $G_x$, by using the RAM 914.

The public column divisor calculation unit 177 inputs the data representing the divisor g stored by the public row base calculation unit 171, and the data representing the $n_2$ random numbers $c_y$ stored by the common random number generation unit 164, by using the CPU 911. The public column divisor calculation unit 177 performs processing, based on the divisor g and the $n_2$ random numbers $c_y$ represented by the input data, to calculate $n_2$ divisors $H_y = c_y \cdot g$ (where y is an integer greater than or equal to 1 and less than or equal to $n_2$) of the Jacobian variety $Jac_c$ in the extension field K, by using the CPU 911. That is, the public column divisor calculation unit 177 calculates a divisor by $c_y$ times adding the divisor g and treats it as the divisor $H_y$, by using the CPU 911. The divisor $H_y$ is included in the finitely generated divisor group G. The public column divisor calculation unit 177 stores the data representing the calculated $n_2$ divisors $H_y$, by using the RAM 914.

The private key calculation unit 180 includes a private divisor calculation unit 181.

The private divisor calculation unit 181 inputs the data representing the $n_1$ random numbers $r_x$ stored by the row random number generation unit 161, the data representing the $n_1$ random numbers $\alpha_x$ stored by the pairing random number generation unit 162, the data representing the $n_2$ random numbers $c_y$ stored by the column random number generation unit 163, and the data representing the divisor g stored by the public row base calculation unit 171, by using the CPU 911. The private divisor calculation unit 181 performs processing, based on the $n_1$ random numbers $r_x$, the $n_1$ random numbers $\alpha_x$, the $n_2$ random numbers $c_y$, and the divisor g represented by the input data, to calculate n divisors $K_{x,y} = (\alpha_x + r_x c_y) \cdot g$ (where x is an integer greater than or equal to 1 and less than or equal to $n_1$ and y is an integer greater than or equal to 1 and less than or equal to $n_2$) of the Jacobian variety $Jac_c$ in the extension field, by using the CPU 911. That is, the private divisor calculation unit 181 calculates a divisor by adding a divisor which is obtained by $\alpha_x$ times adding the divisor g, and a divisor which is obtained by $(r_x \times c_y)$ times adding the divisor g, and treats it as the divisor $K_{x,y}$. The divisor $K_{x,y}$ is included in the finitely generated divisor group G. The private divisor calculation unit 181 stores the data representing the calculated n divisors $K_{x,y}$, by using the RAM 914.

The public key setting unit 191 inputs the data representing the divisor g stored by the public row base calculation unit 171, the data representing the divisor h stored by the public column base calculation unit 172, the data representing the divisor E stored by the public common divisor calculation unit 173, the data representing the $n_1$ divisors $E_x$ stored by the public row first divisor calculation unit 174, the data representing the $n_1$ divisors $F_x$ stored by the public row second divisor calculation unit 175, the data representing $n_1$ pairing values $G_x$ stored by the public pairing value calculation unit 176, and the data representing the $n_2$ divisors $H_y$ stored by the public column divisor calculation unit 177, by using the CPU 911. The public key setting unit 191 performs processing, based on the divisors g, h, and E, the $n_1$ divisors $E_x$, the $n_1$ divisors $F_x$, the $n_1$ pairing values $G_x$ and the $n_2$ divisors $H_y$ represented by the input data, to set a set $(g, h, E, E_1, E_2, \ldots, E_{n1}, F_1, F_2, \ldots, F_{n1}, G_1, G_2, \ldots, G_{n1}, H_1, H_2, \ldots, H_{n2})$ of $(2n_1+n_2+3)$ divisors and $n_1$ pairing values $G_x$, as a public key PK, by using the CPU 911.

The private key setting unit 192 inputs the data representing the n divisors $K_{x,y}$ stored by the private divisor calculation unit 181, by using the CPU 911. The private key setting unit 192 performs processing, based on the n divisors $K_{x,y}$ represented by the input data, to set one divisor $K_{x,y}$ as a private key SK for each of the users who are respectively identified according to the pair (x,y) of the index x and the index y, by using the CPU 911.

The tracer's key setting unit 193 inputs the data representing the output bases $g_1, g_2, g_3$, and $g_4$ stored by the output base calculation unit 143, the data representing the $n_1$ random numbers $r_x$ stored by the row random number generation unit 161, the data representing the $n_1$ random numbers $\alpha_x$ stored by the pairing random number generation unit 162, the data representing the $n_2$ random numbers $c_y$ stored by the column random number generation unit 163, and the data representing the random number $\beta$ stored by the common random number generation unit 164, by using the CPU 911. The tracer's key setting unit 193 performs processing, based on the output bases $g_1, g_2, g_3$ and $g_4$, the $n_1$ random numbers $r_x$, the $n_1$ random numbers $\alpha_x$, the $n_2$ random numbers $c_y$ and the random number $\beta$ represented by the input data, to set a set $(g_1, g_2, g_3, g_4, r_1, r_2, \ldots, r_{n1}, \alpha_1, \alpha_2, \ldots, \alpha_{n1}, c_1, c_2, \ldots, c_{n2}, \beta)$ of four divisors and $(2n_1+n_2+1)$ integers, as a tracer's key TK, by the CPU 911.

Next, there will be described the ciphertext generation apparatus 200 and the ciphertext decryption apparatus 300 that perform encryption and decryption by using the key as generated above.

FIG. 9 is a block diagram showing an example of a functional block configuration of the ciphertext generation apparatus 200 according to the present Embodiment.

The ciphertext generation apparatus 200 encrypts a plaintext M to generate a ciphertext CT. The ciphertext CT includes $n_1$ row ciphertexts $CT_x$ (where x is an integer greater than or equal to 1 and less than or equal to $n_1$) and $n_2$ column ciphertexts $CT_y$ (where y is an integer greater than or equal to 1 and less than or equal to $n_2$). The row ciphertext $CT_x$ is a ciphertext common to the users, whose maximum number is $n_2$, identified by the same index x in the users, whose maximum number is n, identified by the pair (x,y) of two indexes. The column ciphertext $CT_y$ is a ciphertext common to the users, whose maximum number is $n_1$, identified by the same index y in the users, whose maximum number is n, identified by the pair (x,y) of two indexes. Therefore, a pair $(CT_x, CT_y)$ of the row ciphertext $CT_x$ and the column ciphertext $CT_y$ which is different for each user serves as a ciphertext for each of all the users.

When sending no ciphertext to all the users that are identified by a certain index x, the ciphertext generation apparatus 200 does not need to generate a row ciphertext $CT_x$ corresponding to the index x. Moreover, when sending no ciphertext to all the users that are identified by a certain index y, the ciphertext generation apparatus 200 does not need to generate a column ciphertext $CT_y$ corresponding to the index y. That is, the number of row ciphertexts $CT_x$ which the ciphertext generation apparatus 200 generates may be $n_1$ or less, and the number of column ciphertexts $CT_y$ which the ciphertext generation apparatus 200 generates may be $n_2$ or less. In the following explanation, the row ciphertext $CT_x$ and the column ciphertext $CT_y$ corresponding to all the indexes shall be generated.

The ciphertext generation apparatus 200 includes a public key input unit 211, a plaintext input unit 221, an encryption random number generation unit 230, a row ciphertext generation unit 240, a column ciphertext generation unit 250, a row ciphertext setting unit 261, and a column ciphertext setting unit 262.

The public key input unit 211 inputs a public key PK set by the key generation apparatus 500, by using the CPU 911. The public key input unit 211 stores the data representing the divisors g, h, and E, the $n_1$ divisors $E_x$ and $F_x$, the $n_1$ pairing values $G_x$, and the $n_2$ divisors $H_y$ which are included in the input public key PK, by using the magnetic disk drive 920.

The plaintext input unit 221 inputs a plaintext M to be encrypted, by using the CPU 911. The plaintext input unit 221 stores the data representing the input plaintext M, by using the RAM 914.

The encryption random number generation unit 230 includes an encryption common random number generation unit 231, an encryption row random number generation unit 232, and an encryption column random number generation unit 233.

The encryption common random number generation unit 231 randomly selects an integer greater than or equal to 1 and less than or equal to r−1, based on the order r of the divisor of the Jacobian variety $Jac_c$, and treats it as a random number t, by using the CPU 911. The common random number generation unit 164 stores the data representing the selected random number t, by using the RAM 914.

The encryption row random number generation unit 232 performs processing, based on the order r of the divisor of the Jacobian variety $Jac_c$ and the integer $n_1$ in the integers $n_1$ and $n_2$ showing the maximum value n of the number of users of the cryptographic system 800, to randomly select $n_1$ integers greater than or equal to 1 and less than or equal to r−1, and treat them as $n_1$ random numbers $s_x$ (where x is an integer greater than or equal to 1 and less than or equal to $n_1$), by using the CPU 911. The encryption row random number generation unit 232 stores the data representing the selected $n_1$ random numbers $s_x$, by using the RAM 914.

The encryption column random number generation unit 233 performs processing, based on the order r of the divisor of the Jacobian variety $Jac_c$ and the integer $n_2$ in the integers $n_1$ and $n_2$ showing the maximum value n of the number of users of the cryptographic system 800, to randomly select $n_2$ integers greater than or equal to 1 and less than or equal to r−1, and treat them as $n_2$ random numbers $w_y$ (where y is an integer greater than or equal to 1 and less than or equal to $n_2$), by using the CPU 911. The encryption row random number generation unit 232 stores the data representing the selected $n_1$ random numbers $s_x$, by using the RAM 914.

The row ciphertext generation unit 240 includes an encryption row first divisor calculation unit 241, an encryption row second divisor calculation unit 242, an encryption row third divisor calculation unit 243, an encryption key calculation unit 244, and a plaintext encryption unit 245.

The encryption row first divisor calculation unit 241 inputs the data representing the $n_1$ divisors $E_x$ stored by the public key input unit 211, and the data representing the $n_1$ random number $s_x$ stored by the encryption row random number generation unit 232, by using the CPU 911. The encryption row first divisor calculation unit 241 performs processing, based on the $n_1$ divisors $E_x$ and the $n_1$ random numbers $s_x$ represented by the input data, to calculate $n_1$ divisors $R_x = s_x \cdot E_x$ (where x is an integer greater than or equal to 1 and less than or equal to $n_1$) of the Jacobian variety $Jac_c$ in the extension field K, by using the CPU 911. That is, the encryption row first divisor calculation unit 241 calculates a divisor by $s_x$ times adding the divisor $E_x$ and treats it as the divisor $R_x$, by using the CPU 911. The divisor $R_x$ is included in the finitely generated divisor group G. The encryption row first divisor calculation unit 241 stores the data representing the calculated $n_1$ divisors $R_x$, by using the RAM 914.

The encryption row second divisor calculation unit 242 inputs the data representing the $n_1$ divisors $F_x$ stored by the public key input unit 211, and the data representing the $n_1$ random numbers $s_x$ stored by the encryption row random number generation unit 232, by using the CPU 911. The encryption row second divisor calculation unit 242 performs processing, based on the $n_1$ divisors $F_x$ and the $n_1$ random numbers $s_x$ represented by the input data, to calculate $n_1$ divisors $R^\sim_x = s_x \cdot F_x$ (where x is an integer greater than or equal to 1 and less than or equal to $n_1$) of the Jacobian variety $Jac_c$ in the extension field K, by using the CPU 911. That is, the encryption row second divisor calculation unit 242 calculates a divisor by $s_x$ times adding the divisor $F_x$ and treats it as the divisor $R^\sim_x$, by using the CPU 911. The divisor $R^\sim_x$ is included in the finitely generated divisor group G. The encryption row second divisor calculation unit 242 stores the data representing the calculated $n_1$ divisors $R^\sim_x$, by using the RAM 914.

The encryption row third divisor calculation unit 243 inputs the data representing the divisor E stored by the public key input unit 211, the data representing the random number t stored by the encryption common random number generation unit 231, and the data representing the $n_1$ random numbers $s_x$ stored by the encryption row random number generation unit 232, by using the CPU 911. The encryption row third divisor calculation unit 243 performs processing, based on the divisor E, the random number t and the $n_1$ random numbers $s_x$ represented by the input data, to calculate $n_1$ divisors $A_x = s_x \cdot t \cdot E$ (where x is an integer greater than or equal to 1 and less than or equal to $n_1$) of the Jacobian variety $Jac_c$ in the extension field K, by using the CPU 911. That is, the encryption row third divisor calculation unit 243 calculates a divisor by $(s_x \times t)$ times adding the divisor E, and treats it as the divisor $A_x$, by using the CPU 911. The divisor $A_x$ is included in the finitely generated divisor group G. The encryption row third divisor calculation unit 243 stores the data representing the calculated $n_1$ divisors $A_x$, by using the RAM 914.

The encryption key calculation unit 244 inputs the data representing the $n_1$ pairing values $G_x$ stored by the public key input unit 211, the data representing the random number t stored by the encryption common random number generation unit 231, and the data representing the $n_1$ random numbers $s_x$ stored by the encryption row random number generation unit 232, by using the CPU 911. The encryption key calculation unit 244 performs processing, based on the $n_1$ pairing values $G_x$, the random number t, and the $n_1$ random numbers $s_x$ represented by the input data, to calculate $n_1$ pairing values $CK_x = G_x^{s_x \cdot t}$ (where x is an integer greater than or equal to 1 and less than or equal to $n_1$), by using the CPU 911. That is, the encryption key calculation unit 244 calculates a pairing value by $(s_x \times t)$ times multiplying the pairing value $G_x$, and treats it as the pairing value $CK_x$. The encryption key calculation unit 244 stores the data representing the calculated $n_1$ pairing values $CK_x$, by using the RAM 914.

The plaintext encryption unit 245 inputs the data representing the plaintext M stored by the plaintext input unit 221, and the data representing the $n_1$ pairing values $CK_x$ stored by the encryption key calculation unit 244, by using the CPU 911. The plaintext encryption unit 245 performs processing, based on the plaintext M and the $n_1$ pairing values $CK_x$ represented by the input data, to generate $n_1$ ciphertexts $B_x$ (where x is an integer greater than or equal to 1 and less than or equal to $n_1$) by encrypting the plaintext M by using each of the $n_1$ pairing values $CK_x$ as an encryption key, by using the CPU 911. For example, the plaintext encryption unit 245 regards the plaintext M as a pairing value, calculates a pairing value $M \cdot CK_x$ by multiplying the pairing value M by the pairing value $CK_x$, and treats it as a ciphertext $B_x$, by using the CPU 911. The plaintext encryption unit 245 stores the generated $n_1$ ciphertexts $B_x$, by using the RAM 914.

The column ciphertext generation unit 250 includes an encryption column first divisor calculation unit 251, and an encryption column second divisor calculation unit 252.

The encryption column first divisor calculation unit 251 inputs the data representing the divisor h and the $n_2$ divisors $H_y$ stored by the public key input unit 211, the data representing the random number t stored by the encryption common random number generation unit 231, and the data representing the $n_2$ random numbers $w_y$ stored by the encryption column random number generation unit 233, by using the CPU 911. The encryption column first divisor calculation unit 251 performs processing, based on the divisor h, the $n_2$ divisors $H_y$, the random number t, and the $n_2$ random numbers $w_y$ represented by the input data, to calculate $n_2$ divisors $C_y = t \cdot H_y + w_y \cdot h$ (where y is an integer greater than or equal to 1 and less than or equal to $n_2$) of the Jacobian variety $Jac_c$ in the extension field K, by using the CPU 911. That is, the encryption column first divisor calculation unit 251 calculates a divisor by adding a divisor obtained by t times adding the divisor $H_y$ and a divisor obtained by $w_y$ times adding the divisor h, and treats it as the divisor $C_y$, by using the CPU 911. The divisor $C_y$ is included in the finitely generated divisor group G. The encryption column first divisor calculation unit 251 stores the data representing the calculated $n_2$ divisors $C_y$, by using the RAM 914.

The encryption column second divisor calculation unit 252 inputs the data representing the divisor g stored by the public key input unit 211, and the data representing the $n_2$ random numbers $w_y$ stored by the encryption column random number generation unit 233, by using the CPU 911. The encryption column second divisor calculation unit 252 performs processing, based on the divisor g and the $n_2$ random numbers $w_y$ represented by the input data, to calculate $n_2$ divisors $C^\sim_y = w_y \cdot g$ (where y is an integer greater than or equal to 1 and less than or equal to $n_2$) of the Jacobian variety $Jac_c$ in the extension field K, by using the CPU 911. That is, the encryption column second divisor calculation unit 252 calculates a divisor by $w_y$ times adding the divisor g and treats it as the divisor $C^\sim_y$, by using the CPU 911. The divisor $C^\sim_y$ is included in the finitely generated divisor group G. The encryption column second divisor calculation unit 252 stores the data representing the calculated $n_2$ divisors $C^\sim_y$, by using the RAM 914.

The row ciphertext setting unit 261 inputs the data representing the $n_1$ divisors $R_x$ stored by the encryption row first divisor calculation unit 241, the data representing the $n_1$ divisors $R^\sim_x$ stored by the encryption row second divisor calculation unit 242, the data representing the $n_1$ divisors $A_x$ stored by the encryption row third divisor calculation unit 243, and the data representing the $n_1$ ciphertexts $B_x$ stored by the plaintext encryption unit 245, by using the CPU 911. The row ciphertext setting unit 261 performs processing, based on the $n_1$ divisors $R_x$, the $n_1$ divisors $R^\sim_x$, the $n_1$ divisors $A_x$ and the $n_1$ ciphertexts $B_x$ represented by the input data, to generate $n_1$ sets $(R_x, R^\sim_x, A_x, B_x)$ (where x is an integer greater than or equal to 1 and less than or equal to $n_1$) of three divisors and one ciphertext, and treat them as $n_1$ row ciphertexts $CT_x$, by using the CPU 911.

The column ciphertext setting unit 262 inputs the data representing the $n_2$ divisors $C_y$ stored by the encryption column first divisor calculation unit 251 and the data representing the $n_2$ divisors $C^\sim_y$ stored by the encryption column second divisor calculation unit 252, by using the CPU 911. The column ciphertext setting unit 262 performs processing, based on the $n_2$ divisors $C_y$ and the $n_2$ divisors $C^\sim_y$ represented by the input data, to generate $n_2$ sets $(C_y, C^\sim_y)$ (where y is an integer greater than or equal to 1 and less than or equal to $n_2$) of two divisors, and treat them as $n_2$ column ciphertexts $CT_y$, by using the CPU 911.

FIG. 10 is a block diagram showing an example of a functional block configuration of the (proper) ciphertext decryption apparatus 300 according to the present Embodiment.

The proper ciphertext decryption apparatus 300 inputs a ciphertext CT generated by the ciphertext generation apparatus 200, takes out a row ciphertext $CT_x$ and a column ciphertext $CT_y$ corresponding to its own user from the input ciphertext CT, and decrypts them.

The proper ciphertext decryption apparatus 300 includes a ciphertext input unit 311, an index storage unit 321, a row ciphertext input unit 322, a column ciphertext input unit 323, a private key storage unit 331, and a decrypted text generation unit 340.

The ciphertext input unit 311 inputs the ciphertext CT generated by the ciphertext generation apparatus 200, by using the CPU 911. The ciphertext input unit 311 stores the data representing the input ciphertext CT, by using the RAM 914.

The index storage unit 321 has previously stored data representing two indexes X and Y corresponding to its own user, by using the ROM 913.

The row ciphertext input unit 322 inputs the data representing the ciphertext CT stored by the ciphertext input unit 311, and the data representing the index X stored by the index storage unit 321, by using the CPU 911. The row ciphertext input unit 322 acquires one row ciphertext $CT_x$ corresponding to the user having the index X from the ciphertext CT, based on the ciphertext CT and the index X represented by the input data, by using the CPU 911. The row ciphertext input unit 322 stores data representing divisors $R_x$, $\tilde{R}_x$ and $A_x$ and a ciphertext $B_x$ included in the acquired row ciphertext $CT_x$, by using the RAM 914.

The column ciphertext input unit 323 inputs the data representing the ciphertext CT stored by the ciphertext input unit 311, and the data representing the index Y stored by the index storage unit 321, by using the CPU 911. The column ciphertext input unit 323 acquires one column ciphertext $CT_y$ corresponding to the user having the index Y from the ciphertext CT, based on the ciphertext CT and the index Y represented by the input data, by using the CPU 911. The column ciphertext input unit 323 stores data representing divisors $C_y$ and $\tilde{C}_y$ included in the acquired column ciphertext $CT_y$, by using the RAM 914.

The private key storage unit 331 has previously stored data representing a private key $K_{X,Y}$ set by the key generation apparatus 500, by using a storage device having the tamper resistance.

The decrypted text generation unit 340 includes a decryption key calculation unit 341 and a ciphertext decryption unit 342.

The decryption key calculation unit 341 inputs the data representing the divisors $R_X$, $\tilde{R}_X$, and $A_X$ stored by row ciphertext input unit 322, the data representing the divisors $C_Y$ and $\tilde{C}_Y$ stored by the column ciphertext input unit 323, and the data representing the private key $K_{X,Y}$ stored by the private key storage unit 331, by using the CPU 911. The decryption key calculation unit 341 performs processing, based on the divisors $R_X$, $\tilde{R}_X$, $A_X$, $C_Y$, and $\tilde{C}_Y$ and the private key $K_{X,Y}$ represented by the input data, to calculate a pairing value $CK'=e(K_{X,Y},A_X)\cdot e(\tilde{R}_X,\tilde{C}_Y)/e(C_Y,R_X)$, by using the CPU 911. That is, the decryption key calculation unit 341 computes a pairing value by dividing the pairing value which is obtained by multiplying the pairing value of the divisor $K_{X,Y}$ and the divisor $A_X$ by the pairing value of the divisor $\tilde{R}_X$ and the divisor $\tilde{C}_Y$, by the pairing value of the divisor $C_Y$ and the divisor $R_X$, and treats it as the pairing value CK', by using the CPU 911. The decryption key calculation unit 341 stores the data representing the calculated pairing value CK', by using the RAM 914.

The ciphertext decryption unit 342 inputs the data representing the ciphertext $B_x$ stored by the row ciphertext input unit 322, and the data representing the pairing value CK' stored by the decryption key calculation unit 341, by using the CPU 911. The ciphertext decryption unit 342 performs processing, based on the ciphertext $B_x$ and the pairing value CK' represented by the input data, to decrypt the ciphertext $B_x$ by using the pairing value CK' as a decryption key, so as to generate a decrypted text M', by using the CPU 911. For example, regarding the ciphertext $B_x$ as a pairing value, the ciphertext decryption unit 342 calculates a pairing value $B_x$/CK' which is a product of the pairing value $B_x$ and the inverse number of the pairing value CK', and treats it as the decrypted text M', by using the CPU 911. The ciphertext decryption unit 342 stores the generated decrypted text M', by using the RAM 914.

Now, expressing the pairing value $CK_X$ which the encryption key calculation unit 244 of the ciphertext generation apparatus 200 generates, by using parameters that have not been published, it is given by Expression 14.

$$CK_X = G_X^{s_X t} = e(g_2, g_2)^{\beta \alpha_X s_X t} \qquad \text{[Expression 14]}$$

Moreover, expressing the pairing value CK' which the decryption key calculation unit 341 of the ciphertext decryption apparatus 300 generates, by using parameters that have not been published, it is given by Expression 15.

$$
\begin{aligned}
CK' &= \frac{e(K_{X,Y}, A_X)e(\tilde{R}_X, \tilde{C}_Y)}{e(C_Y, R_X)} \\
&= \frac{e((\alpha_X + r_X c_Y)\cdot(g_1+g_2), s_X t\beta \cdot g_2)e(s_X\beta r_X \cdot g_4, w_Y\cdot(g_1+g_2))}{e(tc_Y\cdot(g_1+g_2)+w_Y\cdot(g_3+g_4), s_X\beta r_X\cdot g_2)} \\
&= \frac{e(g_1+g_2, g_2)^{\alpha_X s_X t\beta}e(g_4, g_1+g_2)^{s_X\beta r_X w_Y}}{e(g_3+g_4, g_2)^{s_X\beta r_X w_Y}}
\end{aligned}
$$
[Expression 15]

Based on the relation among the output bases $g_1$, $g_2$, $g_3$, and $g_4$ calculated by the output base calculation unit 143, $e=e(g_1,g_2)=e(g_1,g_4)=e(g_2,g_1)=e(g_2,g_3)=e(g_3,g_2)=e(g_3,g_4)=e(g_4,g_1)=e(g_4,g_3)=1$, $e(g_1,g_1)\ne 1$, $e(g_2,g_2)\ne 1$, $e(g_3,g_3)\ne 1$, and $e(g_4,g_4)\ne 1$. Therefore, the pairing value CK' can be expressed as shown in Expression 16.

$$
\begin{aligned}
CK' &= \frac{e(g_2, g_2)^{\alpha_X s_X t\beta}e(g_4, g_2)^{s_X\beta r_X w_Y}}{e(g_4, g_2)^{s_X\beta r_X w_Y}} \\
&= e(g_2, g_2)^{\alpha_X s_X t\beta}
\end{aligned}
$$
[Expression 16]

That is, the pairing value $CK_x$ which the encryption key calculation unit 244 of the ciphertext generation apparatus 200 calculates, and the pairing value CK' which the decryption key calculation unit 341 of the ciphertext decryption apparatus 300 calculates are equal. Thereby, the ciphertext generation apparatus 200 and the ciphertext decryption apparatus 300 can use the encryption key and the decryption key in common.

Next, there will be explained the wrongdoer tracing apparatus 400 which analyzes a fraudulent ciphertext decryption apparatus 300z and identifies a leak source of a private key in the cryptographic systems 800 described above.

FIG. 11 is a block diagram showing an example of a functional block configuration of the wrongdoer tracing apparatus 400 according to the present Embodiment.

The wrongdoer tracing apparatus 400 generates a ciphertext CT for tracing, and feeds it to a fraudulent ciphertext decryption apparatus 300z. By inputting and analyzing a decrypted text M' which the fraudulent ciphertext decryption apparatus 300z had generated by decrypting the ciphertext CT, the wrongdoer tracing apparatus 400 identifies a private key $K_{X,Y}$ which the ciphertext decryption apparatus 300z is using.

The wrongdoer tracing apparatus 400 includes a tracer's key storage unit 411, a target determination unit 421, a tracing plaintext generation unit 422, a tracing random number generation unit 430, a tracing row ciphertext generation unit 440, a tracing column ciphertext generation unit 450, a row ciphertext setting unit 461, a column ciphertext setting unit 462, a ciphertext output unit 463, a decrypted text input unit 471, and a leak source identification unit 472.

The tracer's key storage unit 411 has previously stored data representing a tracer's key TK set by the key generation apparatus 500, by using a storage device having the tamper resistance.

The target determination unit 421 classifies n users of the cryptographic system 800 into a plurality of groups, based on the index x and the index y, by using the CPU 911. The target determination unit 421 stores the data representing the classified groups, by using the RAM 914.

The tracing plaintext generation unit 422 randomly generates a plaintext M to be encrypted in the ciphertext CT for tracing, by using the CPU 911. The tracing plaintext generation unit 422 stores the data representing the generated plaintext M, by using the RAM 914.

The tracing random number generation unit 430 generates a plurality of random numbers to be used in order to generate a ciphertext CT for tracing, by using the CPU 911. The tracing random number generation unit 430 stores the data representing the plurality of generated random numbers, by using the RAM 914.

The tracing row ciphertext generation unit 440 inputs the data representing the tracer's key TK stored by the tracer's key storage unit 411, the data representing the groups stored by the target determination unit 421, the data representing the plurality of random numbers stored by the tracing random number generation unit 430, and the data representing the plaintext M stored by the tracing plaintext generation unit 422, by using the CPU 911. The tracing row ciphertext generation unit 440 performs processing, based on the tracer's key TK, the groups, the plurality of random numbers, and the plaintext M represented by the input data, to generate a plurality of divisors, etc. which are necessary in order to generate $n_1$ row ciphertexts $CT_x$ for tracing, by using the CPU 911. The tracing row ciphertext generation unit 440 stores the data representing the plurality of generated divisors, etc., by using the RAM 914.

The tracing column ciphertext generation unit 450 inputs the data representing the tracer's key TK stored by the tracer's key storage unit 411, the data representing the groups stored by the target determination unit 421, and the data representing the plurality of random numbers stored by the tracing random number generation unit 430, by using the CPU 911. The tracing column ciphertext generation unit 450 performs processing, based on the tracer's key TK, the groups, and the plurality of random numbers represented by the input data, to generate a plurality of divisors, etc. which are necessary in order to generate $n_2$ column ciphertexts $CT_y$ for tracing, by using the CPU 911. The tracing column ciphertext generation unit 450 stores the data representing the plurality of generated divisors, etc., by using the RAM 914.

The row ciphertext setting unit 461 (tracing row ciphertext setting unit) inputs the data representing the plurality of divisors, etc. stored by the tracing row ciphertext generation unit 440, by using the CPU 911. The row ciphertext setting unit 461 performs processing, based on the plurality of divisors, etc. represented by the input data, to set $n_1$ row ciphertexts $CT_x$ for tracing, by using the CPU 911. The row ciphertext setting unit 461 stores the data representing the set $n_1$ row ciphertexts $CT_x$ for tracing, by using the RAM 914.

The column ciphertext setting unit 462 (tracing column ciphertext setting unit) inputs the data representing the plurality of divisors, etc. stored by the tracing column ciphertext generation unit 450, by using the CPU 911. The column ciphertext setting unit 462 performs processing, based on the plurality of divisors, etc. represented by the input data, to set $n_2$ column ciphertexts $CT_y$ for tracing, by using the CPU 911. The column ciphertext setting unit 462 stores the data representing the set $n_2$ column ciphertexts $CT_y$ for tracing, by using the RAM 914.

The ciphertext output unit 463 inputs the data representing the $n_1$ row ciphertexts $CT_x$ for tracing stored by the row ciphertext setting unit 461, and the data representing the $n_2$ column ciphertexts $CT_y$ for tracing stored by the column ciphertext setting unit 462, by using the CPU 911. The ciphertext output unit 463 performs processing, based on the $n_1$ row ciphertexts $CT_x$ for tracing and the $n_2$ column ciphertexts $CT_y$ for tracing represented by the input data, to generate a ciphertext CT for tracing, by using the CPU 911. The ciphertext output unit 463 outputs the generated ciphertext CT for tracing to the fraudulent ciphertext decryption apparatus 300z, by using the CPU 911.

The decrypted text input unit 471 inputs the decrypted text M' which the ciphertext decryption apparatus 300z generated by decrypting the ciphertext CT for tracing output by the ciphertext output unit 463, by using the CPU 911. The decrypted text input unit 471 stores the data representing the input decrypted text M'.

The leak source identification unit 472 inputs the data representing the groups stored by the target determination unit 421, the data representing the plaintext M stored by the tracing plaintext generation unit 422, and the data representing the decrypted text M' stored by the decrypted text input unit 471, by using the CPU 911.

Based on the plaintext M and the decrypted text M' represented by the input data, the leak source identification unit 472 judges whether the ciphertext decryption apparatus 300z has correctly decrypted the ciphertext CT for tracing or not, by using the CPU 911.

The ciphertext CT for tracing which the wrongdoer tracing apparatus 400 generates has the structure that can be correctly decrypted when the private key $K_{x,y}$ of the user belonging to a predetermined group in a plurality of groups classified by the target determination unit 421 is used, and that cannot be correctly decrypted when a private key $K_{x,y}$ of a user belonging to the other group is used.

Therefore, by making the ciphertext decryption apparatus 300z decrypt the ciphertext CT for tracing while changing the classification of the group and by judging whether it can perform decryption correctly or not, it is possible to identify the indexes x and y of the private key $K_{x,y}$ which the fraudulent ciphertext decryption apparatus 300z is using.

When the indexes x and y of the private key $K_{x,y}$ which the fraudulent ciphertext decryption apparatus 300z is using have been identified, the leak source identification unit 472 outputs the identified indexes x and y, by using the CPU 911.

When the indexes x and y of the private key $K_{x,y}$ which the fraudulent ciphertext decryption apparatus 300z is using have not been identified yet, the leak source identification unit 472 stores data representing the judgment result, by using the RAM 914.

The target determination unit 421 inputs the data representing the judgment result stored by the leak source identification unit 472, and, based on the judgment result represented by the input data, changes the group classification, by using the CPU 911.

The wrongdoer tracing apparatus 400 again feeds the ciphertext CT for tracing which has been newly generated based on the changed group classification to the ciphertext decryption apparatus 300z, and analyzes the decrypted text M'. By repeating this, the wrongdoer tracing apparatus 400 identifies the indexes x and y of the private key $K_{x,y}$ which the fraudulent ciphertext decryption apparatus 300z is using.

FIG. 12 is a detailed block diagram showing an example of an internal block of the tracing random number generation unit 430, the tracing row ciphertext generation unit 440, and the tracing column ciphertext generation unit 450, in the wrongdoer tracing apparatus 400 according to the present Embodiment.

In this example, the target determination unit 421 shall classify the users of the cryptographic system 800 into three groups based on the index x, and two groups based on the index y, namely into six groups totally, by using the CPU 911. The target determination unit 421 determines two integers i and j (where i is an integer greater than or equal to 1 and less than or equal to $n_1$, and j is an integer greater than or equal to 1 and less than or equal to $n_2$) by using the CPU 911, and stores the data representing the determined integers i and j, by using the RAM 914. The integer i classifies the users of the cryptographic system 800 into a first group in which the index x is greater than i, a second group in which the index x is equal to i, and a third group in which the index x is less than i. Moreover, the integer j classifies the users of the cryptographic system 800 into a first group in which the index y is greater than or equal to j, and a second group in which the index y is less than j. Based on the combination of these two classifications, the users of the cryptographic system 800 are classified into six groups.

The tracing random number generation unit 430 includes a tracing common random number generation unit 431, a tracing row random number generation unit 432, a tracing column random number generation unit 433, a disturbance row random number generation unit 434, and a disturbance column random number generation unit 435.

Since the tracing common random number generation unit 431, the tracing row random number generation unit 432, and the tracing column random number generation unit 433 are respectively the same as the encryption common random number generation unit 231, the encryption row random number generation unit 232, and the encryption column random number generation unit 233 of the ciphertext generation apparatus 200, description thereof is herein omitted.

The disturbance row random number generation unit 434 performs processing, based on the integer i determined by the target determination unit 421 and the order r of the divisor of the Jacobian variety $Jac_c$, to randomly select 3(i−1) integers each being greater than or equal to 1 and less than or equal to r−1, and treat them as random numbers $v_{x,1}$, $v_{x,2}$, and $v_{x,3}$ (where x is an integer greater than or equal to 1 and less than i), by using the CPU 911. The disturbance row random number generation unit 434 stores the data representing the selected random numbers $v_{x,1}$, $v_{x,2}$ and $v_{x,3}$, by using the RAM 914.

The disturbance column random number generation unit 435 performs processing, based on the integer j determined by the target determination unit 421 and the order r of the divisor of the Jacobian variety $Jac_c$, to randomly select j−1 integers each being greater than or equal to 1 and less than or equal to r−1, and treat them as random numbers $z_{p,y}$, (where y is an integer greater than or equal to 1 and less than j), by using the CPU 911. The disturbance column random number generation unit 435 stores the data representing the selected random numbers $z_{p,y}$, by using the RAM 914.

The tracing row ciphertext generation unit 440 includes a tracing row first divisor calculation unit 441, a tracing row second divisor calculation unit 442, a tracing row third divisor calculation unit 443, a tracing encryption key calculation unit 444, and a tracing plaintext encryption unit 445.

The tracing row first divisor calculation unit 441 is corresponding to the encryption row first divisor calculation unit 241 of the ciphertext generation apparatus 200. The tracing row first divisor calculation unit 441 performs processing, based on the integer i determined by the target determination unit 421, the divisor $g_2$ and the $n_1$ random numbers $r_x$ included in the tracer's key TK, the divisor g (may be computed from the divisors $g_1$ and $g_2$ included in the tracer's key TK, or may be acquired from the public key PK), the $n_1$ random numbers $s_x$ generated by the tracing row random number generation unit 432, and the i−1 random numbers $v_{x,1}$ generated by the disturbance row random number generation unit 434, to calculate $n_1$ divisors $R_x$ of the Jacobian variety $Jac_c$ in the extension field K, by using the CPU 911.

When the index x is greater than the integer i, the tracing row first divisor calculation unit 441 calculates a divisor $R_x = s_x r_x \cdot g_2$ (where x is an integer greater than or equal to i+1 and less than or equal to $n_1$), by using the CPU 911. That is, the tracing row first divisor calculation unit 441 calculates a divisor by ($s_x \times r_x$) times adding the divisor $g_2$ and treats it as the divisor $R_x$, by using the CPU 911.

When the index x is equal to the integer i, the tracing row first divisor calculation unit 441 calculates a divisor $R_x = s_x r_x \cdot g$ (where x=i), by using the CPU 911. That is, the tracing row first divisor calculation unit 441 calculates a divisor by ($s_x \times r_x$) times adding the divisor g, and treats it as the divisor $R_x$, by using the CPU 911.

When the index x is less than the integer i, the tracing row first divisor calculation unit 441 calculates a divisor $R_x = v_{x,1} \cdot g$ (where x is an integer greater than or equal to 1 and less than or equal to i−1), by using the CPU 911. That is, the tracing row first divisor calculation unit 441 calculates a divisor by $v_{x,1}$ times adding the divisor g, and treats it as the divisor $R_x$, by using the CPU 911.

In any of the cases, the divisor $R_x$ is included in the finitely generated divisor group G.

The tracing row first divisor calculation unit 441 stores the data representing the calculated $n_1$ divisors $R_x$, by using the RAM 914.

The tracing row second divisor calculation unit 442 is corresponding to the encryption row second divisor calculation unit 242 of the ciphertext generation apparatus 200. The tracing row second divisor calculation unit 442 performs processing, based on the integer i determined by the target determination unit 421, the divisor $g_4$ and the $n_1$ random numbers $r_x$ included in the tracer's key TK, the divisor h (may be computed from the divisors $g_3$ and $g_4$ included in the tracer's key TK, or may be acquired from the public key PK), the $n_1$ random numbers $s_x$ generated by the tracing row random number generation unit 432, and the i−1 random numbers $v_{x,1}$ generated by the disturbance row random number generation unit 434, to calculate $n_1$ divisors $R^{\sim}_x$ of the Jacobian variety $Jac_c$ in the extension field K, by using the CPU 911.

When the index x is greater than the integer i, the tracing row second divisor calculation unit 442 calculates a divisor $R^{\sim}_x = s_x r_x \cdot g_4$ (where x is an integer greater than or equal to i+1 and less than or equal to $n_1$), by using the CPU 911. That is, the tracing row second divisor calculation unit 442 calculates a divisor by ($s_x \times r_x$) times adding the divisor $g_4$, and treats it as the divisor $R^{\sim}_x$, by using the CPU 911.

When the index x is equal to the integer i, the tracing row second divisor calculation unit 442 calculates a divisor $R^\sim_x = s_x r_x \cdot h$ (where x=i), by using the CPU 911. That is, the tracing row second divisor calculation unit 442 calculates a divisor by $(s_x \times r_x)$ times adding the divisor h and treats it as the divisor $R^\sim_x$, by using the CPU 911.

When the index x is less than the integer i, the tracing row second divisor calculation unit 442 calculates a divisor $R^\sim_x = v_{x,1} \cdot h$ (where x is an integer greater than or equal to 1 and less than or equal to i−1), by using the CPU 911. That is, the tracing row second divisor calculation unit 442 calculates a divisor by $v_{x,1}$ times adding the divisor h, and treats it as the divisor $R^\sim_x$, by using the CPU 911.

In any of the cases, the divisor $R^\sim_x$ is included in the finitely generated divisor group G.

The tracing row second divisor calculation unit 442 stores the data representing the calculated $n_1$ divisors $R^\sim_x$, by using the RAM 914.

The tracing row third divisor calculation unit 443 is corresponding to the encryption row third divisor calculation unit 243 of the ciphertext generation apparatus 200.

The tracing row third divisor calculation unit 443 performs processing, based on the integer i determined by the target determination unit 421, the divisor $g_2$ included in the tracer's key TK, the random number t generated by the tracing common random number generation unit 431, the $n_1$ random numbers $s_x$ generated by the tracing row random number generation unit 432, and the i−1 random numbers $v_{x,2}$ generated by the disturbance row random number generation unit 434, to calculate $n_1$ divisors $A_x$ of the Jacobian variety $Jac_c$ in the extension field K, by using the CPU 911.

When the index x is greater than the integer i, the tracing row third divisor calculation unit 443 calculates a divisor $A_x = s_x t \cdot g_2$ (where x integer greater than or equal to i+1 and less than or equal to $n_1$) by using the CPU 911. That is, the tracing row third divisor calculation unit 443 calculates a divisor by $(s_x \times t)$ times adding the divisor $g_2$ and treats it as the divisor $A_x$, by using the CPU 911.

When the index x is equal to the integer i, the tracing row third divisor calculation unit 443 calculates a divisor $A_x = s_x t \cdot g$ (where x=i) by using the CPU 911. That is, the tracing row third divisor calculation unit 443 calculates a divisor by $(s_x \times t)$ times adding the divisor g and treats it as the divisor $A_x$, by using the CPU 911.

When the index x is less than the integer i, the tracing row third divisor calculation unit 443 calculates a divisor $A_x = v_{x,2} \cdot g$ (where x is an integer greater than or equal to 1 and less than or equal to i−1) by using the CPU 911. That is, the tracing row third divisor calculation unit 443 calculates a divisor by $v_{x,2}$ times adding the divisor g, and treats it as the divisor $A_x$, by using the CPU 911.

In any of the cases, the divisor $A_x$ is included in the finitely generated divisor group G.

The tracing row third divisor calculation unit 443 stores the data representing the calculated $n_1$ divisors $R^\sim_x$, by using the RAM 914.

The tracing encryption key calculation unit 444 is corresponding to the encryption key calculation unit 244 of the ciphertext generation apparatus 200.

The tracing encryption key calculation unit 444 performs processing, based on the integer i determined by the target determination unit 421, the divisor $g_2$ and the $n_1$ random numbers $\alpha_x$ included in the tracer's key TK, the divisor g, the random number t generated by the tracing common random number generation unit 431, the $n_1$ random numbers $s_x$ generated by the tracing row random number generation unit 432, and the i−1 random numbers $v_{x,3}$ generated by the disturbance row random number generation unit 434, to calculate $n_1$ pairing values $CK_x$, by using the CPU 911.

When the index x is greater than the integer i, the tracing encryption key calculation unit 444 calculates a pairing value $CK_x = e(g_2, g)^{\alpha_x s_x t}$ (where x is an integer greater than or equal to i+1 and less than or equal to $n_1$) by using the CPU 911. That is, the tracing encryption key calculation unit 444 calculates a pairing value by $(\alpha_x \times s_x \times t)$ times multiplying the pairing value of the divisor $g_2$ and the divisor g and treats it as the pairing value $CK_x$, by using the CPU 911.

When the index x is equal to the integer i, the tracing encryption key calculation unit 444 calculates a pairing value $CK_x = e(g,g)^{\alpha_x s_x t}$ (where x=i) by using the CPU 911. That is, the tracing encryption key calculation unit 444 calculates a pairing value by $(\alpha_x \times s_x \times t)$ times multiplying the pairing value of the divisor g and the divisor g, and treats it as the pairing value $CK_x$, by using the CPU 911.

When the index x is less than the integer i, the tracing encryption key calculation unit 444 calculates a pairing value $CK_x = e(g,g)^{v_{x,3}}$ (where x is an integer greater than or equal to 1 and less than or equal to i−1) by using the CPU 911. That is, the tracing encryption key calculation unit 444 calculates a pairing value by $v_{x,3}$ times multiplying the pairing value of the divisor g and the divisor g and treats it as the pairing value $CK_x$, by using the CPU 911.

The tracing encryption key calculation unit 444 stores the data representing the calculated $n_1$ pairing values $CK_x$, by using the RAM 914.

The tracing plaintext encryption unit 445 is corresponding to the plaintext encryption unit 245 of the ciphertext generation apparatus 200. The tracing plaintext encryption unit 445 inputs the data representing the plaintext M stored by the tracing plaintext generation unit 422 and the data representing the $n_1$ pairing values $CK_x$ stored by the tracing encryption key calculation unit 444, by using the CPU 911. Based on the plaintext M and the $n_1$ pairing values $CK$, represented by the input data, the tracing plaintext encryption unit 445 generates $n_1$ ciphertexts $B_x$ (where x is an integer greater than or equal to 1 and less than or equal to $n_1$) by encrypting the plaintext M by using each of the $n_1$ pairing values $CK_x$ as an encryption key, by using the CPU 911. For example, the plaintext encryption unit 245 regards the plaintext M as a pairing value, calculates a pairing value $M \cdot CK_x$ by multiplying the pairing value M by the pairing value $CK_x$, and treats it as a ciphertext $B_x$, by using the CPU 911. The plaintext encryption unit 245 stores the generated $n_1$ ciphertexts $B_x$, by using the RAM 914.

The tracing column ciphertext generation unit 450 includes a tracing column first divisor calculation unit 451, and a tracing column second divisor calculation unit 452.

The tracing column first divisor calculation unit 451 is corresponding to the encryption column first divisor calculation unit 251 of the ciphertext generation apparatus 200. The tracing column first divisor calculation unit 451 performs processing, based on the integer j determined by the target determination unit 421, the divisor $g_1$ and the $n_2$ random numbers $c_y$ included in the tracer's key TK, the divisor g, the divisor h, the random number t generated by the tracing common random number generation unit 431, the $n_2$ random numbers $w_y$ generated by the tracing column random number generation unit 433, and the j−1 random numbers $z_{p,y}$ generated by the disturbance column random number generation unit 435, to calculate $n_2$ divisors $C_y$ of the Jacobian variety $Jac_c$ in the extension field K, by using the CPU 911.

When the index y is greater than or equal to the integer j, the tracing column first divisor calculation unit 451 calculates a divisor $C_y = t c_y \cdot g + w_y \cdot h$ (where y is an integer greater than or equal to j and less than or equal to n2) by using the CPU 911.

That is, the tracing column first divisor calculation unit 451 calculates a divisor by adding the divisor which is obtained by ($t \times c_y$) times adding the divisor g and the divisor which is obtained by $w_y$ times adding the divisor h, and treats it as the divisor $C_y$, by using the CPU 911.

When the index y is less than the integer j, the tracing column first divisor calculation unit 451 calculates a divisor $C_y = tc_y \cdot g + z_{p,y} \cdot g1 + w_y \cdot h$ (where y is an integer greater than or equal to 1 and less than or equal to j−1) by using the CPU 911. That is, the tracing column first divisor calculation unit 451 calculates a divisor by adding the divisor which is obtained by ($t \times c_y$) times adding the divisor g, the divisor which is obtained by $z_{p,y}$ times adding the divisor $g_1$, and the divisor which is obtained by $w_y$ times adding the divisor h, and treats it as the divisor $C_y$, by using the CPU 911.

In any of the cases, the divisor $C_y$ is included in the finitely generated divisor group G.

The tracing column first divisor calculation unit 451 stores the data representing the calculated $n_2$ divisors $C_y$, by using the RAM 914.

The tracing column second divisor calculation unit 452 is corresponding to the encryption column second divisor calculation unit 252 of the ciphertext generation apparatus 200. The tracing column second divisor calculation unit 452 performs processing, based on the $n_2$ random numbers $w_y$, calculated by the tracing column random number generation unit 433 and the divisor g, to calculate $n_2$ divisors $\tilde{C}_y = w_y \cdot g$ of the Jacobian variety $Jac_c$ in the extension field K, by using the CPU 911. That is, the tracing column second divisor calculation unit 452 calculates a divisor by $w_y$ times adding the divisor g, and treats it as the divisor $\tilde{C}_y$, by using the CPU 911. The Divisor $\tilde{C}_y$ is included in the finitely generated divisor group G. The tracing column second divisor calculation unit 452 stores the data representing the calculated $n_2$ divisors $\tilde{C}_y$, by using the RAM 914.

Based on a plurality of divisors and ciphertexts calculated as described above, the row ciphertext setting unit 461 sets a row ciphertext $CT_x$, the column ciphertext setting unit 462 sets a column ciphertext $CT_y$, and the ciphertext output unit 463 outputs a ciphertext CT for tracing.

When the ciphertext CT for tracing output by the ciphertext output unit 463 is decrypted by using a private key $K_{x,y}$, in which the index x is greater than i, a decrypted text M' being the same as the plaintext M generated by the tracing plaintext generation unit 422 is obtained regardless of the value of the index y. When the decryption is performed by using a private key $K_{x,y}$ in which the index x is less than i, a decrypted text M' being unrelated to the plaintext M generated by the tracing plaintext generation unit 422 is obtained regardless of the value of the index y. When the decryption is performed by using a private key $K_{x,y}$ in which the index x is equal to i, if the index y is greater than or equal to j, a decrypted text M' being the same as the plaintext M generated by the tracing plaintext generation unit 422 is obtained, and if the index y is less than j, a decrypted text M' being unrelated to the plaintext M generated by the tracing plaintext generation unit 422 is obtained.

Therefore, if feeding the ciphertext CT for tracing output by the ciphertext output unit 463 to the fraudulent ciphertext decryption apparatus 300z and analyzing the decrypted text M' which is obtained after decryption, it is possible to identify the leak source of the private key $K_{x,y}$ being used by the fraudulent ciphertext decryption apparatus 300z.

In order for the wrongdoer tracing apparatus 400 described above to identify the leak source of a private key, it is necessary that the fraudulent ciphertext decryption apparatus 300z is unable to distinguish the ciphertext CT for tracing from the normal ciphertext CT. If, hypothetically, the fraudulent ciphertext decryption apparatus 300z is able to distinguish the ciphertext CT for tracing from the normal ciphertext CT, in the case configured not to output a decrypted text M' (or configured to output a random decrypted text M') when the fraudulent ciphertext decryption apparatus 300z identifies having input a ciphertext CT for tracing, it becomes impossible for the wrongdoer tracing apparatus 400 to acquire a clue to identify the leak source of a private key.

Here, the difference between the ciphertext CT and the ciphertext CT for tracing is whether the divisors $R_x$, $\tilde{R}_x$, $A_x$, etc. are integral multiples of the divisor $g_2$ or the divisor $g_4$, or alternatively, integral multiples of the divisor g or the divisor h. With respect to a divisor being an integral multiple of $g_2$ or $g_4$, the pairing value of the divisor and the divisor $g_1$ or $g_3$ (or its integral multiple divisor) is 1. Therefore, if it is possible to calculate a pairing value of a divisor and the divisor $g_1$ or $g_3$ (or its integral multiple divisor), the difference between the ciphertext CT and the ciphertext CT for tracing can be identified. However, neither the divisor $g_1$ nor the divisor $g_3$ (or its integral multiple divisor) is published, and it is practically impossible to compute it from the divisor included in the public key PK. Accordingly, the difference between the ciphertext CT and the ciphertext CT for tracing cannot be identified by computing a pairing value.

Moreover, the order of a divisor which is an integral multiple of the divisor $g_2$ or $g_4$, and the order of a divisor which is an integral multiple of the divisor g or h are equal to be r. That is, even if the order of a divisor can be obtained, it is impossible to identify the difference between the ciphertext CT and the ciphertext CT for tracing.

Therefore, the fraudulent ciphertext decryption apparatus 300z is not able to distinguish the ciphertext CT for tracing from the normal ciphertext CT, and thus, the wrongdoer tracing apparatus 400 can identify the leak source of a private key.

The encryption parameter setting apparatus 100 according to the present Embodiment includes the processing device (CPU 911) for processing data, the random divisor selection unit 122, the base divisor generation unit 123, the pairing log calculation unit 125, and the parameter setting unit 140.

The random divisor selection unit 122 selects an element from a plurality of elements of a cyclic group G' (subgroup of a group composed of a Jacobian variety $Jac_c$ of a hyperelliptic curve C in a finite field $F_p$), as a random divisor D*, by using the processing device (CPU 911).

Based on the random divisor D* selected by the random divisor selection unit 122, the base divisor generation unit 123 calculates a plurality of base divisors $\tilde{D}_j$ by mapping the random divisor D* by using a plurality of maps $G_j$ (Gauss sum operator $G_j$) (where the plurality of maps $G_j$ are homomorphism from the cyclic group G' to each of a plurality of cyclic groups $G'_j$), by using the processing device (CPU 911).

The pairing log calculation unit 125 calculates logarithms of pairing values of the plurality of base divisors $\tilde{D}_j$ in a group G (finitely generated divisor group G) (where the group G is a direct product of the plurality of cyclic group $G'_j$, and a pairing value by bilinear pairing operation of two elements included in the group G is computable), and treats the logarithms as a plurality of pairing log coefficients $\eta_i$, by using the processing device (CPU 911).

The parameter setting unit 140 treats the plurality of base divisors $\tilde{D}_j$ calculated by the base divisor generation unit 123 and the plurality of pairing log coefficients $\eta_i$ calculated by the pairing log calculation unit 125, as encryption parameters used in a cryptographic operation, by using the processing device (CPU 911).

The encryption parameter setting apparatus 100 according to the present Embodiment has the following effect:

A concrete encryption parameter required for configuring a group G which has a group structure to be utilized for realizing an advanced cryptographic system can be computed.

The random divisor selection unit 122 according to the present Embodiment selects an element from a plurality of elements of a cyclic group G' which is a subgroup of a group composed of divisors of a Jacobian variety $Jac_c$ of an algebraic curve C (hyperelliptic curve C) in a finite field $F_p$, as a random divisor D*, by using the processing device (CPU 911).

The base divisor generation unit 123 calculates the plurality of base divisors $D^\sim_j$ by treating a plurality of endomorphism maps (Gauss sum operator $G_j$) in a group composed of divisors of a Jacobian variety $Jac_c$ of an algebraic curve C (hyperelliptic curve C) in an extension field K given by a finite algebraic extension of the finite field $F_p$, as the plurality of maps $G_j$, by using the processing device (CPU 911).

The encryption parameter setting apparatus 100 according to the present Embodiment has the following effect:

A concrete encryption parameter required for configuring a group G which has a group structure to be utilized for realizing an advanced cryptographic system can be computed.

The encryption parameter setting apparatus 100 according to the present Embodiment includes the processing device (CPU 911) for processing data, the random divisor selection unit 122, the base divisor generation unit 123, the discrete log calculation unit 124, the pairing log calculation unit 125, and the parameter setting unit 140.

The random divisor selection unit 122 selects a random divisor D* from a plurality of divisors of a Jacobian variety $Jac_c$ of an algebraic curve C (hyperelliptic curve C) of genus d in a finite field $F_p$ (where an order p of the finite field $F_p$ is a prime number, and the genus d is an integer greater than or equal to 2), by using the processing device (CPU 911).

The base divisor generation unit 123 calculates a plurality of base divisors $D^\sim_j$, based on the random divisor D* selected by the random divisor selection unit 122, by using the processing device (CPU 911).

The discrete log calculation unit 124 calculates a plurality of discrete logs $l_k$, by using the processing device (CPU 911).

The pairing log calculation unit 125 calculates a plurality of pairing log coefficients $\eta_i$, based on the plurality of discrete logs $l_k$ calculated by the discrete log calculation unit 124, by using the processing device (CPU 911).

The parameter setting unit 140 sets an encryption parameter to be used in a cryptographic operation, based on the plurality of base divisors $D^\sim_j$ calculated by the base divisor generation unit 123 and the plurality of pairing log coefficients $\eta_i$ calculated by the pairing log calculation unit 125, by using the processing device (CPU 911).

Here, the group structure of the finitely generated divisor group G is a direct product of 2d cyclic groups whose order is r. That is, the finitely generated divisor group G is a 2d-dimensional vector space whose component is a residual group with the order r.

By utilizing the group structure of the finitely generated divisor group G described above, an advanced cryptographic system becomes realizable. Then, in order to realize such an advanced cryptographic system, it is necessary to be able to compute the concrete encryption parameter or the value of the key within a polynomial time.

The encryption parameter setting apparatus 100 according to the present Embodiment has the following effect:

A concrete encryption parameter required for configuring the finitely generated divisor group G having a group structure to be used for realizing the advanced cryptographic system as described above can be computed within a polynomial time.

The random divisor selection unit 122 according to the present Embodiment selects a random divisor D* from a plurality of divisors of a Jacobian variety $Jac_c$ of a hyperelliptic curve $C: Y^2 = X^w + 1$ (where w is a prime number of w=2d+1, and the remainder a of the order p divided by the prime number w is a generator of a multiplicative group $F_w^*$ of a finite field $F_w$ whose order is w) in the finite field $F_p$, by using the processing device (CPU 911).

Based on the random divisor D* selected by the random divisor selection unit 122, the base divisor generation unit 123 calculates a plurality of base divisors $D^\sim_j = G_j(D^*)$ by applying Gauss sum operators $G_j$ to the random divisor D* (where j is an integer greater than or equal to 0 and less than or equal to 2d−1, the Gauss sum operator $G_j$ is an operation on a Jacobian variety $Jac_c$ in an extension field K shown in Expression 17, the extension field K is an algebraic extension field given by a 2d-th order extension of the finite field $F_p$, and ζ is a w-th root of 1), by using the processing device (CPU 911).

Based on the remainder a, the discrete log calculation unit 124 calculates a plurality of discrete logs $l_k$ satisfying Expression 18 (where κ is an integer greater than or equal to 1 and equal to 2d−1, and the plurality of discrete logs $l_k$ are integers greater than or equal to 0 and less than or equal to 2d−1), by using the processing device (CPU 911).

Based on the plurality of discrete logs $l_k$ calculated by the discrete log calculation unit 124, the pairing log calculation unit 125 calculates a plurality of pairing log coefficients $\eta_i$ (where i is an integer greater than or equal to 0 and less than or equal to 2d−1, the plurality of pairing log coefficients $\eta_i$ are integers greater than or equal to 0 and less than or equal to r−1, and r is an order of the random divisor D*) by calculating the expression shown in Expression 19, by using the processing device (CPU 911).

$$G_j = \sum_{i=0}^{2d-1} \{ p^{i \cdot j} \cdot \rho^{\sigma^i} \} \quad \text{[Expression 17]}$$

where ρ is an operation on the Jacobian variety $Jac_c$ corresponding to an operation $(x,y) \to (\zeta x, y)$ on the hyperelliptic curve C in the extension field K, and ζ is the w-th root of 1.

$$a^\kappa - 1 \equiv a^{l_\kappa} \bmod w \quad \text{[Expression 18]}$$

$$\eta_i = \left( \sum_{\kappa=1}^{2d-1} p^{l_\kappa + i \cdot \kappa} \right) \bmod r \quad \text{[Expression 19]}$$

The encryption parameter setting apparatus 100 according to the present Embodiment has the following effect:

By concretely computing the expressions as described above, a concrete encryption parameter required for configuring the finitely generated divisor group G having a group structure to be used for realizing the advanced cryptographic system can be computed within a polynomial time.

The key generation apparatus 500 according to the present Embodiment includes the processing device (CPU 911) for processing data, the storage device (the ROM 913, the magnetic disk drive 920, etc.) for storing data, the base divisor storage unit 511, the pairing log storage unit 512, the output base calculation unit 143, and the key calculation unit 150.

The base divisor storage unit 511 stores, as a plurality of base divisors $D^\sim_j$, a plurality of elements of a group G (finitely generated divisor group G) (where the group G is a direct product of a plurality of cyclic groups of the same order, a pairing value by a bilinear pairing operation of two elements included in the group G is computable, and the plurality of base divisors $D'_j$ are mutually linearly independent), by using the storage device (ROM 913).

The pairing log storage unit 512 stores logarithms of pairing values of the plurality of base divisors $D^\sim_j$, as a plurality of pairing log coefficients $\eta_i$, by using the storage device (ROM 913).

Based on the plurality of base divisors $D^\sim_j$ stored by the base divisor storage unit 511 and the plurality of pairing log coefficients stored by the pairing log storage unit 512, the output base calculation unit 143 calculates a plurality of output bases $g_k$ being elements of the group G (finitely generated divisor group G) (where a pairing value of at least any two output bases $g_k$ in the plurality of output bases $g_k$ is 1), by using the processing device (CPU 911).

Based on the plurality of output bases $g_k$ calculated by the output base calculation unit 143, the key calculation unit 150 calculates a key to be used in a cryptographic operation, by using the processing device (CPU 911).

The key generation apparatus 500 according to the present Embodiment has the following effect:

Since the key used in a cryptographic operation is computed based on a plurality of output bases $g_k$ in which a pairing value of at least any two output bases $g_k$ is 1, a pairing operation with respect to one output base $g_{k1}$ in the two output bases of $e(g_{k1},g_{k2})=1$ can be used as a projection operator which eliminates the component concerning the other output base $g_{k2}$, thereby realizing an advanced cryptographic system using this projection operator.

The key generation apparatus 500 according to the present Embodiment further includes the random matrix selection unit 142.

Based on the plurality of pairing log coefficients $\eta_i$ stored by the pairing log storage unit 512, the random matrix selection unit 142 randomly selects a random matrix V* from a plurality of matrices V satisfying $m'_{uv}=0$ (where u and v are predetermined integers greater than or equal to 1 and less than or equal to b) in a relational expression $M'=V \cdot M \cdot V^T$ (where M' is a b-dimensional square matrix in which $m'_{\mu\nu}$ is the $\mu$-th row and $\nu$-th column element, b is the number of a plurality of output bases $g_k$ which the output base calculation unit 143 calculates, V is a b row by f column matrix in which a variable $c_{\mu\nu}$, whose value is an integer greater than or equal to 0 and less than or equal to r−1, is the $\mu$-th row and $\nu$-th column element, r is the order of the plurality of cyclic groups, f is the number of the plurality of base divisors $D^\sim_j$ stored by the base divisor storage unit 511, M is an f-dimensional square matrix in which a pairing log coefficient $\eta_i$ of a base divisor $D^\sim_\mu$ and a base divisor $D^\sim_\nu$ in the pairing log coefficients $\eta_i$ stored by the pairing log storage unit 512 is the $\mu$-th row and $\nu$-th column element, and $V^T$ is an f row by b column matrix transposed from the matrix V), by using the processing device (CPU 911).

Based on the plurality of base divisors $D^\sim_j$ stored by the base divisor storage unit 511 and the random matrix V* selected by the random matrix selection unit 142, the output base calculation unit 143 calculates the plurality of output bases $g_k = v_k \cdot D^\sim$ (where k is an integer greater than or equal to 1 and less than or equal to b, $v_k$ is the k-th row vector of the random matrix V*, and $D^\sim$ is the f-dimensional column vector which uses the plurality of base divisors $D^\sim_j$ as the (j+1)th row element), by using the processing device (CPU 911).

The key generation apparatus 500 according to the present Embodiment has the following effects:

Since the random matrix V* satisfying $m'_{uv}=0$ in the relational expression $M'=V \cdot M \cdot V^T$ is randomly selected and a plurality of output bases $g_k = v_k \cdot D^\sim$ are calculated based on the selected random matrix V*, a plurality of output bases $g_k$ in which a pairing value $e(g_u, g_v)$ of the output bases $g_u$ and $g_v$ is 1 can be computed. Moreover, since the random matrix V* being a random element intervenes in the relation between a plurality of base divisors $D^\sim_j$ and a plurality of output bases $g_k$, a user of the cryptographic system 800 who does not know the random matrix V* is not able to guess a plurality of output bases $g_k$, thereby capable of using a plurality of output bases $g_k$ as a secret key.

The base divisor storage unit 511 according to the present Embodiment stores a plurality of elements of a group G (finitely generated divisor group G) which is a subgroup of a group composed of a plurality of divisors of a Jacobian variety $Jac_c$ of an algebraic curve C in an extension field K given by a finite algebraic extension of a finite field $F_p$, as the plurality of base divisors $D^\sim_j$, by using the storage device (ROM 913).

The key generation apparatus 500 according to the present Embodiment has the following effect:

Since a plurality of elements of a finitely generated divisor group G which is a subgroup of a group composed of a plurality of divisors of a Jacobian variety $Jac_c$ of an algebraic curve C in an extension field K given by an finite algebraic extension of a finite field $F_p$ are used as the plurality of base divisors $D^\sim_j$, so that the computer can perform operations such as an addition of divisors, a pairing operation.

The key generation apparatus 500 according to the present Embodiment includes the processing device (CPU 911) for processing data, the storage device (the ROM 913, the magnetic disk drive 920, etc.) for storing data, the base divisor storage unit 511, the pairing log storage unit 512, the random matrix selection unit 142, the output base calculation unit 143, and the key calculation unit 150.

The base divisor storage unit 511 stores a plurality of base divisors $D^\sim_j$ calculated by the encryption parameter setting apparatus 100, by using the storage device (ROM 913). The pairing log storage unit 512 stores a plurality of pairing log coefficients $\eta_i$ calculated by the encryption parameter setting apparatus 100, by using the storage device (ROM 913).

Based on a predetermined condition that should be satisfied by a plurality of integers $m'_{\mu\nu}$ (where $\mu$ and $\nu$ are integers greater than or equal to 1 and less than or equal to b, and b is an integer greater than or equal to 2 and less than or equal to 2d), the random matrix selection unit 142 randomly selects a random matrix V* from a plurality of matrices V satisfying a relational expression $M'=V \cdot M \cdot V^T$ (where M' is a b-dimensional square matrix in which an integer $m'_{\mu\nu}$ is the $\mu$-th row and $\nu$-th column element, V is a b row by 2d column matrix in which a variable $c_{\mu\nu}$, whose value is an integer greater than or equal to 0 and less than or equal to r−1, is the $\mu$-th row and $\nu$-th column element, $V^T$ is a 2d row by b column square matrix transposed from the matrix V, M is a 2d-dimensional square matrix in which an integer $m_{\mu\nu}$ is the $\mu$-th row and $\nu$-th column element, and the integer $m_{\mu\nu}$ is $\eta_{\nu+1}$ when $\mu+\nu=2d+1$ and 0 when $\mu+\nu \neq 2d+1$), by using the processing device (CPU 911).

Based on the plurality of base divisors $D^\sim_j$ stored by the encryption parameter storage unit 510 and the random matrix V* selected by the random matrix selection unit 142, the output base calculation unit 143 calculates a plurality of output bases $g_k = v_k \cdot D^\sim$ (where k is an integer greater than or equal to 1 and less than or equal to b, $g_k$ is a divisor of a Jacobian variety $Jac_c$ in the extension field K, $v_k$ is the k-th row vector of the random matrix V*, and $D^\sim$ is the 2d-dimensional column vector which uses the plurality of base divisors $D^\sim_j$ as the (j+1)th row element), by using the processing device (CPU 911).

The key generation apparatus 500 according to the present Embodiment has the following effect:

Since the output base calculation unit 143 calculates an output base $g_k$, based on the random matrix V* selected by the random matrix selection unit 142 from the matrices V satisfying the condition, an output base $g_k$ whose pairing value of output bases $g_k$ is a desired value can be computed. Thus, it is possible to configure a finitely generated divisor group G having a group structure to be used for realizing the advanced cryptographic system as described above, and to compute the concrete value of the key utilizing the configured finitely generated divisor group G within a polynomial time.

The key generation apparatus 500 according to the present Embodiment further includes a consistent condition input unit (condition input unit 141).

The consistent condition input unit (condition input unit 141) inputs an integer pair (μ,ν) indicating an output base pair whose pairing value $e(g_\mu, g_\nu)$ of an output base $g_\mu$ and an output base $g_\nu$ in the plurality of output bases $g_k$ should be 1, by using the processing device (CPU 911).

Based on the integer pair (μ,ν) input by the consistent condition input unit (condition input unit 141), the random matrix selection unit 142 selects a random matrix V* satisfying a condition $m'_{\mu\nu} = 0$, by using the processing device (CPU 911).

The key generation apparatus 500 according to the present Embodiment has the following effect:

Since the output base calculation unit 143 calculates an output base $g_k$, based on the random matrix V* selected by the random matrix selection unit 142 from the matrices V satisfying the condition, an output base $g_k$ whose pairing value of two output bases $g_k$ is 1 can be computed. Thus, it is possible to configure a finitely generated divisor group G having a group structure to be used for realizing the advanced cryptographic system as described above, and to compute the concrete value of the key utilizing the configured finitely generated divisor group G within a polynomial time.

The key generation apparatus 500 according to the present Embodiment further includes an inconsistent condition input unit (condition input unit 141).

The inconsistent condition input unit (condition input unit 141) inputs an integer pair (μ,ν) indicating an output base pair whose pairing value $e(g_\mu, g_\nu)$ of an output base $g_\mu$ and an output base $g_\nu$ in the plurality of output bases $g_k$ should not be 1, by using the processing device (CPU 911).

Based on the integer pair (μ,ν) input by the inconsistent condition input unit (condition input unit 141), the random matrix selection unit 142 selects a random matrix V* satisfying a condition $m'_{\mu\nu} \neq 0$, by using the processing device (CPU 911).

The key generation apparatus 500 according to the present Embodiment has the following effects:

Since the output base calculation unit 143 calculates an output base $g_k$, based on the random matrix V* selected by the random matrix selection unit 142 from the matrices V satisfying the condition, the output base $g_k$ whose pairing value of two output bases $g_k$ is other than 1 can be computed. Thus, it is possible to configure a finitely generated divisor group G having a group structure to be used for realizing the advanced cryptographic system as described above, and to compute the concrete value of the key utilizing the configured finitely generated divisor group G within a polynomial time.

The cryptographic system 800 according to the present Embodiment includes the encryption parameter setting apparatus 100 and the key generation apparatus 500.

The base divisor storage unit 511 stores a plurality of base divisors $D^\sim_j$ calculated by the encryption parameter setting apparatus 100, by using the storage device (ROM 913).

The pairing log storage unit 512 stores a plurality of pairing log coefficients $\eta_i$ calculated by the encryption parameter setting apparatus 100, by using the storage device (ROM 913).

The cryptographic system 800 according to the present Embodiment has the following effect:

Since the key generation apparatus 500 generates a key by using a plurality of concrete base divisors $D^\sim_j$ and a plurality of values of pairing log coefficients $\eta_i$ calculated by the encryption parameter setting apparatus 100, the concrete value of the key required for realizing an advanced cryptographic system can be computed.

The cryptographic system 800 according to the present Embodiment further includes the ciphertext generation apparatus 200 and the ciphertext decryption apparatus 300.

The ciphertext generation apparatus 200 generates a ciphertext, based on an encryption parameter set by the encryption parameter setting apparatus 100 and a key generated by the key generation apparatus 500.

The ciphertext decryption apparatus 300 decrypts the ciphertext generated by the ciphertext generation apparatus 200, based on the encryption parameter set by the encryption parameter setting apparatus 100 and the key generated by the key generation apparatus 500.

The cryptographic system 800 according to the present Embodiment has the following effect:

Based on the encryption parameters set by the encryption parameter setting apparatus 100, the key generation apparatus 500 configures a finitely generated divisor group G having a group structure to be used for realizing the advanced cryptographic system as described above, and computes the concrete value of the key utilizing the configured finitely generated divisor group G, the ciphertext generation apparatus 200 generates a ciphertext by using the key generated by the key generation apparatus 500, and the ciphertext decryption apparatus 300 decrypts the ciphertext generated by the ciphertext generation apparatus 200, thereby realizing the advanced cryptographic system utilizing the group structure of the finitely generated divisor group G.

The cryptographic system 800 according to the present Embodiment including a plurality of ciphertext decryption apparatuses 300a to 300c, further comprises a wrongdoer tracing apparatus 400.

The key generation apparatus 500 further includes the public key setting unit 191, the private key setting unit 192, and the tracer's key setting unit 193.

The public key setting unit 191 sets a public key PK to be used for generating a ciphertext by the ciphertext generation apparatus 200.

The private key setting unit 192 sets a plurality of private keys $SK_{x,y}$ to be used for decrypting the ciphertext CT, generated by the ciphertext generation apparatus 200, by each of the plurality of ciphertext decryption apparatuses 300a to 300c.

The tracer's key setting unit 193 sets a tracer's key TK to be used for identifying a leak source of a private key $SK_{x,y}$ by the wrongdoer tracing apparatus 400.

The ciphertext generation apparatus 200 generates a ciphertext CT, based on the public key PK set by the key generation apparatus 500.

Based on the private key $SK_{x,y}$ corresponding to the user of the ciphertext decryption apparatuses 300a to 300c in the plurality of private keys $SK_{x,y}$ set by the key generation apparatus 500, each of the plurality of ciphertext decryption apparatuses 300a to 300c decrypts the ciphertext CT generated by the ciphertext generation apparatus 200.

Based on the tracer's key TK set by the key generation apparatus 500, the wrongdoer tracing apparatus 400 generates a ciphertext CT, analyzes a decryption result (decrypted text M') of the generated ciphertext CT decrypted by a pirate decryption device (fraudulent ciphertext decryption apparatus 300z) which decrypts a ciphertext CT generated by the ciphertext generation apparatus 200, and identifies the private key $SK_{x,y}$ having been used for decrypting the ciphertext by the pirate decryption device.

The cryptographic system 800 according to the present Embodiment has the effect of realizing the advanced cryptographic system which identifies a leak source of a private key by utilizing a group structure of the finitely generated divisor group G.

The random divisor selection unit 122 according to the present Embodiment selects a random divisor D* from a plurality of divisors of a Jacobian variety $Jac_c$ of a hyperelliptic curve $C:Y^2=X^5+1$ (where the remainder a of a prime number p divided by 5 is 2 or 3) in a finite field $F_p$, by using the processing device (CPU 911).

The random matrix selection unit 142 selects a random matrix V* of 4 row by 4 column satisfying a condition: $m'_{12}=m'_{21}=m'_{34}=m'_{43}=m'_{14}=m'_{41}=m'_{23}=m'_{32}$ 0, $m'_{11}\neq 0$, $m'_{22}\neq 0$, $m'_{33}\neq 0$, and $m'_{44}\neq 0$, by using the processing device (CPU 911).

The output base calculation unit 143 performs processing, based on the plurality of base divisors $D\tilde{\ }_j$ stored by the base divisor storage unit 511 and the random matrix V* calculated by the random matrix selection unit 142, to calculate four output bases $g_k=v_k \cdot D\tilde{\ }$ (where k is an integer greater than or equal to 1 and less than or equal to 4), by using the processing device (CPU 911).

The key calculation unit 150 includes the number-of-users input unit 151, the public row base calculation unit 171, the public column base calculation unit 172, the row random number generation unit 161, the column random number generation unit 163, the pairing random number generation unit 162, the common random number generation unit 164, the public common divisor calculation unit 173, the public row first divisor calculation unit 174, the public row second divisor calculation unit 175, the public pairing value calculation unit 176, the public column divisor calculation unit 177, the public key setting unit 191, the private divisor calculation unit 181, and the private key setting unit 192.

The number-of-users input unit 151 inputs an integer $n_1$ and an integer $n_2$ (where $n=n_1 n_2$) indicating n being the number of users, by using the processing device (CPU 911).

The public row base calculation unit 171 performs processing, based on an output base $g_1$ and an output base $g_2$ calculated by the output base calculation unit 143, to calculate a divisor $g=g_1+g_2$ of the Jacobian variety $Jac_c$, by using the processing device (CPU 911).

The public column base calculation unit 172 performs processing, based on an output base $g_3$ and an output base $g_4$ calculated by the output base calculation unit 143, to calculate a divisor $h=g_3+g_4$ of the Jacobian variety $Jac_c$, by using the processing device (CPU 911).

The row random number generation unit 161 performs processing, based on the integer $n_1$ input by the number-of-users input unit 151, to randomly generate $n_1$ random numbers $r_x$ (where x is an integer greater than or equal to 1 and less than or equal to $n_1$, and the random number r, is an integer greater than or equal to 1 and less than or equal to r−1), by using the processing device (CPU 911).

The column random number generation unit 163 performs processing, based on the integer $n_2$ input by the number-of-users input unit 151, to randomly generate $n_2$ random numbers $c_y$ (where y is an integer greater than or equal to 1 and less than or equal to $n_2$, and the random number $c_y$ is an integer greater than or equal to 1 and less than or equal to r−1), by using the processing device (CPU 911).

The pairing random number generation unit 162 performs processing, based on the integer $n_1$ input by the number-of-users input unit 151, to randomly generate $n_1$ random numbers $\alpha_x$ (where x is an integer greater than or equal to 1 and less than or equal to $n_1$, and the random number $\alpha_x$ is an integer greater than or equal to 1 and less than or equal to r−1), by using the processing device (CPU 911).

The common random number generation unit 164 randomly generates a random number β (where β is an integer greater than or equal to 1 and less than or equal to r−1), by using the processing device (CPU 911).

The public common divisor calculation unit 173 performs processing, based on the output base $g_2$ calculated by the output base calculation unit 143 and the random number β generated by the common random number generation unit 164, to calculate a divisor $E=\beta \cdot g_2$ of the Jacobian variety $Jac_c$, by using the processing device (CPU 911).

The public row first divisor calculation unit 174 performs processing, based on the output base $g_2$ calculated by the output base calculation unit 143, the $n_1$ random numbers $r_x$ generated by the row random number generation unit 161, and the random number β generated by the common random number generation unit 164, to calculate $n_1$ divisors $E_x=\beta \cdot r_x \cdot g_2$ (where x is an integer greater than or equal to 1 and less than or equal to $n_1$) of the Jacobian variety $Jac_c$, by using the processing device (CPU 911).

The public row second divisor calculation unit 175 performs processing, based on the output base $g_4$ calculated by the output base calculation unit 143, the $n_1$ random numbers $r_x$ generated by the row random number generation unit 161, and the random number β generated by the common random number generation unit 164, to calculate $n_1$ divisors $F_x=\beta \cdot r_x \cdot g_4$ (where x is an integer greater than or equal to 1 and less than or equal to m) of the Jacobian variety $Jac_c$, by using the processing device (CPU 911).

The public pairing value calculation unit 176 performs processing, based on the output base $g_2$ calculated by the output base calculation unit 143, the $n_1$ random numbers $\alpha_x$ generated by the pairing random number generation unit 162, and the random number β generated by the common random number generation unit 164, to calculate $n_1$ pairing values $G_x=e(g_4,g_4)^{\beta \cdot \alpha_x}$ (where the pairing e is $e(D,D')=e_w(D,\phi(D'))$, $e_w$ is a Weil pairing, and φ is a calculable homomorphism mapping on the Jacobian variety $Jac_c$), by using the processing device (CPU 911).

The public column divisor calculation unit 177 performs processing, based on the divisor g calculated by the public row base calculation unit 171 and the random number $c_y$ generated by the column random number generation unit 163, to calculate $n_2$ divisors $H_y=c_y \cdot g$ (where y is an integer greater than or equal to 1 and less than or equal to $n_2$) of the Jacobian variety $Jac_c$, by using the processing device (CPU 911).

The public key setting unit 191 sets a public key $PK=(g,h,E,E_x,F_x,G_x,H_y)$ (where x is an integer greater than or equal to 1 and less than or equal to $n_1$, and y is an integer greater than or equal to 1 and less than or equal to $n_2$), based on the divisor g calculated by the public row base calculation unit 171, the divisor h calculated by the public column base calculation unit 172, the divisor E calculated by the public common divisor calculation unit 173, the $n_1$ divisors $E_x$ calculated by the public row first divisor calculation unit 174, the $n_1$ divisors $F_x$ calculated by the public row second divisor calculation unit 175, the $n_1$ pairing values $G_x$ calculated by the public pairing value calculation unit 176, and the $n_2$ divisors $H_y$ calculated by the public column divisor calculation unit 177, by using the processing device (CPU 911).

The private divisor calculation unit 181 performs processing, based on the divisor g calculated by the public row base calculation unit 171, the $n_1$ random numbers $r_x$ generated by the row random number generation unit 161, the $n_2$ random numbers $c_y$ generated by the column random number generation unit 163, and the $n_1$ random numbers $\alpha_x$ generated by the pairing random number generation unit 162, to calculate n divisors $K_{x,y}=\alpha_x \cdot g + r_x c_y \cdot g$ (where x is an integer greater than or equal to 1 and less than or equal to $n_1$, and y is an integer greater than or equal to 1 and less than or equal to $n_2$), by using the processing device (CPU 911).

The private key setting unit 192 performs processing, based on the n divisors $K_{x,y}$ calculated by the private divisor calculation unit 181, to set n private keys $SK_{x,y}=(K_{x,y})$ respectively corresponding to n users, by using the processing device (CPU 911).

The ciphertext generation apparatus 200 includes the processing device (CPU 911) for processing data, the public key input unit 211, the plaintext input unit 221, the encryption common random number generation unit 231, the encryption column random number generation unit 233, the encryption row random number generation unit 232, the encryption row first divisor calculation unit 241, the encryption row second divisor calculation unit 242, the encryption row third divisor calculation unit 243, the encryption key calculation unit 244, the plaintext encryption unit 245, the row ciphertext setting unit 261, the encryption column first divisor calculation unit 251, the encryption column second divisor calculation unit 252, and the column ciphertext setting unit 262.

The public key input unit 211 inputs the public key $PK=(g,h,E,E_x,F_x,G_x,H_y)$ set by the key generation apparatus 500, by using the processing device (CPU 911).

The plaintext input unit 221 inputs a plaintext M to be encrypted, by using the processing device (CPU 911).

The encryption common random number generation unit 231 randomly generates a random number t (where the random number t is an integer greater than or equal to 1 and less than or equal to r), by using the processing device (CPU 911).

The encryption column random number generation unit 233 generates $n_2$ or less random numbers $w_y$ (where y is an integer greater than or equal to 1 and less than or equal to $n_2$, and the random number $w_y$ is an integer greater than or equal to 1 and less than or equal to r−1), by using the processing device (CPU 911).

The encryption row random number generation unit 232 generates $n_1$ or less random numbers $s_x$ (where x is an integer greater than or equal to 1 and less than or equal to and the random number $s_x$ is an integer greater than or equal to 1 and less than or equal to r−1), by using the processing device (CPU 911).

The encryption row first divisor calculation unit 241 performs processing, based on the $n_1$ divisors $E_x$ included in the public key PK input by the public key input unit 211 and the $n_1$ or less random numbers $s_x$ generated by the encryption row random number generation unit 232, to calculate $n_1$ or less divisors $R_x=s_x \cdot E_x$ (where x is an integer greater than or equal to 1 and less than or equal to $n_1$) of a Jacobian variety $Jac_c$, by using the processing device (CPU 911).

The encryption row second divisor calculation unit 242 performs processing, based on the $n_1$ divisors $F_x$ included in the public key PK input by the public key input unit 211, and the $n_1$ or less random numbers $s_x$ generated by the encryption row random number generation unit 232, to calculate $n_1$ or less divisors $R^\sim_x=s_x \cdot F_x$ (where x is an integer greater than or equal to 1 and less than or equal to $n_1$) of the Jacobian variety $Jac_c$, by using the processing device (CPU 911).

The encryption row third divisor calculation unit 243 performs processing, based on the divisor E included in the public key PK input by the public key input unit 211, the random number t generated by the encryption common random number generation unit 231, and the $n_1$ or less random number $s_x$ generated by encryption row random number generation unit 232, to calculate $n_1$ or less divisors $A_x=s_x t \cdot E$ (where x is an integer greater than or equal to 1 and less than or equal to $n_1$) of the Jacobian variety $Jac_c$, by using the processing device (CPU 911).

The encryption key calculation unit 244 performs processing, based on the $n_1$ pairing values $G_x$ included in the public key PK input by the public key input unit 211, the random number t generated by the encryption common random number generation unit 231, and the $n_1$ or less random numbers $s_x$ generated by the encryption column random number generation unit 232, to calculate $n_1$ or less pairing values $CK_x=G_x^{s_x t}$ (where x is an integer greater than or equal to 1 and less than or equal to $n_1$), by using the processing device (CPU 911).

The plaintext encryption unit 245 performs processing, based on the plaintext M input by the plaintext input unit 221 and the $n_1$ or less pairing values $CK_x$ calculated by the encryption key calculation unit 244, to generate $n_1$ or less ciphertexts $B_x$ (where x is an integer greater than or equal to 1 and less than or equal to $n_1$) by encrypting the plaintext M by respectively using the $n_1$ or less pairing values $CK_x$ as encryption keys, by using the processing device (CPU 911).

The row ciphertext setting unit 261 performs processing, based on the $n_1$ or less divisors $R_x$ calculated by the encryption row first divisor calculation unit 241, the $n_1$ or less divisors $R^\sim_x$ calculated by the encryption row second divisor calculation unit 242, the $n_1$ or less divisors $A_x$ calculated by the encryption row third divisor calculation unit 243, and the $n_1$ or less ciphertexts $B_x$ generated by the plaintext encryption unit 245, to set $n_1$ or less row ciphertexts $CT_x=(R_x,R^\sim_x,A_x,B_x)$ (where x is an integer greater than or equal to 1 and less than or equal to $n_1$), by using the processing device (CPU 911).

The encryption column first divisor calculation unit 251 performs processing, based on the divisors h and $H_y$ included in the public key PK input by the public key input unit 211, the random number t generated by the encryption common random number generation unit 231, and the random number $w_y$ generated by the encryption column random number generation unit 233, to calculate $n_2$ or less divisors $C_y=t \cdot H_y + w_y \cdot h$ (where y is an integer greater than or equal to 1 and less than or equal to $n_2$) of the Jacobian variety $Jac_c$, by using the processing device (CPU 911).

The encryption column second divisor calculation unit 252 performs processing, based on the divisor g included in the public key PK input by the public key input unit 211, and the random number $w_y$ generated by the encryption column random number generation unit 233, to calculate $n_2$ or less divisors $\tilde{C}_y = w_y \cdot g$ (where y is an integer greater than or equal to 1 and less than or equal to $n_2$) of the Jacobian variety $Jac_c$, by using the processing device (CPU 911).

The column ciphertext setting unit 262 performs processing, based on the $n_2$ or less divisors $C_y$ calculated by the encryption column first divisor calculation unit 251 and the $n_2$ or less divisors $\tilde{C}_y$ calculated by the encryption column second divisor calculation unit 252, to set $n_2$ or less column ciphertexts $CT_y = (C_y, \tilde{C}_y)$ (where y is an integer greater than or equal to 1 and less than or equal to $n_2$), by using the processing device (CPU 911).

The ciphertext decryption apparatus 300 according to the present Embodiment includes a storage device for storing data, the processing device (CPU 911) for processing data, the private key storage unit 331, the row ciphertext input unit 322, the column ciphertext input unit 323, the decryption key calculation unit 341, and the ciphertext decryption unit 342.

The private key storage unit 331 stores a private key $SK_{X,Y} = (K_{X,Y})$ corresponding to predetermined indexes X and Y (where X is an integer greater than or equal to 1 and less than or equal to $n_1$ and Y is an integer greater than or equal to 1 and less than or equal to $n_2$) corresponding to a user of the ciphertext decryption apparatus 300, in the n private keys $SK_{x,y}$ set by the key generation apparatus 500, by using the storage device.

The row ciphertext input unit 322 inputs a row ciphertext $CT_x = (R_x, \tilde{R}_x, A_x, B_x)$ corresponding to the index X, in the $n_1$ or less row ciphertexts $CT_x$ set by the ciphertext generation apparatus 200, by using the processing device (CPU 911).

The column ciphertext input unit 323 inputs a column ciphertext $CT_y = (C_y, \tilde{C}_y)$ corresponding to the index Y, in the $n_2$ or less column ciphertexts $CT_y$ set by the ciphertext generation apparatus 200, by using the processing device (CPU 911).

The decryption key calculation unit 341 performs processing, based on the private key $SK_{X,Y}$ stored by the private key storage unit 331, the divisors $R_X$, $\tilde{R}_X$ and $A_X$ included in the row ciphertext $CT_X$ input by the row ciphertext input unit 322, the divisors $C_Y$ and $\tilde{C}_Y$ included in the column ciphertext $CT_Y$ input by the column ciphertext input unit 323, to calculate a pairing value $CK' = e(K_{X,Y}, A_X) \cdot e(\tilde{R}_X, \tilde{C}_Y) / e(C_Y, R_X)$, by using the processing device (CPU 911).

The ciphertext decryption unit 342 performs processing, based on a ciphertext $B_X$ included in the row ciphertext $CT_X$ input by the row ciphertext input unit 322 and the pairing value CK' calculated by the decryption key calculation unit 341, to generate a decrypted text M' by decrypting the ciphertext $B_X$ by using the pairing value CK' as a decryption key, by using the processing device (CPU 911).

The cryptographic system 800 according to the present Embodiment has the effect of realizing a cryptographic system, in which a ciphertext CT encrypted from one plaintext M to be sent to n users is made up of $(3n_1 + 2n_2)$ divisors of the Jacobian variety $Jac_c$ and $4n_1$ ciphertexts $B_x$, by utilizing a group structure of the finitely generated divisor group G.

The cryptographic system 800 according to the present Embodiment, including a plurality of ciphertext decryption apparatuses 300a to 300c, further comprises the wrongdoer tracing apparatus 400.

The key calculation unit 150 further includes the tracer's key setting unit 193.

The tracer's key setting unit 193 performs processing, based on the four output bases $g_k$ calculated by the output base calculation unit 143, the $n_1$ random numbers $r_x$ generated by the row random number generation unit 161, the $n_1$ random numbers $\alpha_x$ generated by the pairing random number generation unit 162, and the $n_2$ random numbers $c_y$ generated by the column random number generation unit 163, to set a tracer's key $TK = (g_k, r_x, \alpha_x, c_y)$ (where k is an integer greater than or equal to 1 and less than or equal to 4, x is an integer greater than or equal to 1 and less than or equal to $n_1$, and y is an integer greater than or equal to 1 and less than or equal to $n_2$), by using the processing device (CPU 911).

The wrongdoer tracing apparatus 400 includes the storage device for storing data, the processing device (CPU 911) for processing data, the tracer's key storage unit 411, the target determination unit 421, the tracing plaintext generation unit 422, the tracing common random number generation unit 431, the tracing column random number generation unit 433, the tracing row random number generation unit 432, the disturbance row random number generation unit 434, the disturbance column random number generation unit 435, the tracing row first divisor calculation unit 441, the tracing row second divisor calculation unit 442, the tracing row third divisor calculation unit 443, the tracing encryption key calculation unit 444, the tracing plaintext encryption unit 445, the tracing row ciphertext setting unit (row ciphertext setting unit 461), the tracing column first divisor calculation unit 451, the tracing column second divisor calculation unit 452, the tracing column ciphertext setting unit (column ciphertext setting unit 462), the decrypted text input unit 471, and the leak source identification unit 472.

The tracer's key storage unit 411 stores the tracer's key $TK = (g_k, r_x, \alpha_x, c_y)$ set by the key generation apparatus 500, by using the storage device.

The target determination unit 421 classifies the index x into three groups and the index y into two groups, by using the processing device (CPU 911).

The tracing plaintext generation unit 422 generates a plaintext M by using the processing device (CPU 911).

The tracing common random number generation unit 431 randomly generates a random number t (where the random number t is an integer greater than or equal to 1 and less than or equal to r) by using the processing device (CPU 911).

The tracing column random number generation unit 433 randomly generates $n_2$ or less random numbers $w_y$ (where y is an integer greater than or equal to 1 and less than or equal to $n_2$, and the random number $w_y$ is an integer greater than or equal to 1 and less than or equal to r−1) by using the processing device (CPU 911).

The tracing row random number generation unit 432 randomly generates $n_1$ or less random numbers $s_x$ (where x is an integer greater than or equal to 1 and less than or equal to $n_1$, and the random number $s_x$ is an integer greater than or equal to 1 and less than or equal to r−1) by using the processing device (CPU 911).

The disturbance row random number generation unit 434 randomly generates $n_1$ or less random numbers $v_{x,1}$ (where x is an integer greater than or equal to 1 and less than or equal to $n_1$, and the random number $v_{x,1}$ is an integer greater than or equal to 1 and less than or equal to r−1), $n_1$ or less random numbers $v_{x,2}$ (where x is an integer greater than or equal to 1 and less than or equal to $n_1$, and the random number $v_{x,2}$ is an integer greater than or equal to 1 and less than or equal to r−1), and $n_1$ or less random numbers $v_{x,3}$ (where x is an integer greater than or equal to 1 and less than or equal to $n_1$, and the random number $v_{x,3}$ is an integer greater than or equal to 1 and less than or equal to r−1) by using the processing device (CPU 911).

The disturbance column random number generation unit 435 randomly generates $n_2$ or less random numbers $z_{p,y}$ (where y is an integer greater than or equal to 1 and less than or equal to $n_2$, and the random number $z_{p,y}$ is an integer greater than or equal to 1 and less than or equal to r−1) by using the processing device (CPU 911).

The tracing row first divisor calculation unit 441 performs processing, based on divisors $g_1$ and $g_2$ and the $n_1$ random numbers $r_x$ included in the tracer's key TK stored by the tracer's key storage unit 411, the three groups into which the target determination unit 421 classified the index x, the $n_1$ or less random numbers $s_x$ generated by the tracing row random number generation unit 432, and the $n_1$ or less random numbers $v_{x,1}$ generated by the disturbance row random number generation unit 434, to calculate a divisor $R_x=s_x r_x \cdot g_2$ (where x is an integer greater than or equal to 1 and less than or equal to $n_1$) with respect to the index x belonging to the first group in the three groups, a divisor $R_x=s_x r_x \cdot (g_1+g_2)$ (where x is an integer greater than or equal to 1 and less than or equal to $n_1$) with respect to the index x belonging to the second group in the three groups, and a divisor $R_x=v_{x,1} \cdot (g_1+g_2)$ (where x is an integer greater than or equal to 1 and less than or equal to $n_1$) with respect to the index x belonging to the third group in the three groups, by using the processing device (CPU 911).

The tracing row second divisor calculation unit 442 performs processing, based on divisors $g_3$ and $g_4$ and the $n_1$ random numbers $r_x$ included in the tracer's key TK stored by the tracer's key storage unit 411, the three groups into which the target determination unit 421 classified the index x, the $n_1$ or less random numbers $s_x$ generated by the tracing row random number generation unit 432, and the $n_1$ or less random numbers $v_{x,1}$ generated by the disturbance row random number generation unit 434, to calculate a divisor $R^\sim_x=s_x r_x \cdot g_4$ (where x is an integer greater than or equal to 1 and less than or equal to $n_1$) with respect to the index x belonging to the first group in the three groups, a divisor $R^\sim_x=s_x r_x \cdot (g_3+g_4)$ (where x is an integer greater than or equal to 1 and less than or equal to $n_1$) with respect to the index x belonging to the second group in the three groups, and a divisor $R^\sim_x=v_{x,1} \cdot (g_3+g_4)$ (where x is an integer greater than or equal to 1 and less than or equal to $n_1$) with respect to the index x belonging to the third group in the three groups, by using the processing device (CPU 911).

The tracing row third divisor calculation unit 443 performs processing, based on the divisors $g_1$ and $g_2$ included in the tracer's key TK stored by the tracer's key storage unit 411, the three groups into which the target determination unit 421 classified the index x, the random number t generated by the tracing common random number generation unit 431, the $n_1$ or less random numbers $s_x$ generated by the tracing row random number generation unit 432, and the $n_1$ or less random numbers $V_{x,2}$ generated by the disturbance row random number generation unit 434, to calculate a divisor $A_x=s_x t \cdot g_2$ (where x is an integer greater than or equal to 1 and less than or equal to $n_1$) with respect to the index x belonging to the first group in the three groups, a divisor $A_x=s_x t \cdot (g_1+g_2)$ (where x is an integer greater than or equal to 1 and less than or equal to $n_1$) with respect to the index x belonging to the second group in the three groups, and a divisor $A_x=v_{x,2} \cdot (g_1+g_2)$ (where x is an integer greater than or equal to 1 and less than or equal to $n_1$) with respect to the index x belonging to the third group in the three groups, by using the processing device (CPU 911).

The tracing encryption key calculation unit 444 performs processing, based on the divisors $g_1$ and $g_2$ and the $n_1$ random numbers $\alpha_x$ included in the tracer's key TK stored by the tracer's key storage unit 411, the three groups into which the target determination unit 421 classified the index x, the $n_1$ or less random numbers $s_x$ generated by the tracing row random number generation unit 432, and the $n_1$ or less random numbers $v_{x,3}$ generated by the disturbance row random number generation unit 434, to calculate a pairing value $CK_x=e(g_2, g_2)^{\alpha_x s_x t}$ (where x is an integer greater than or equal to 1 and less than or equal to $n_1$) with respect to the index x belonging to the first group in the three groups, a pairing value $CK_x=e(g_1+g_2, g_1+g_2)^{\alpha_x s_x t}$ (where x is an integer greater than or equal to 1 and less than or equal to $n_1$) with respect to the index x belonging to the second group in the three groups, and a pairing value $CK_x=e(g_1+g_2, g_1+g_2)^{v_{x,2}}$ (where x is an integer greater than or equal to 1 and less than or equal to $n_1$) with respect to the index x belonging to the third group in the three groups, by using the processing device (CPU 911).

The tracing plaintext encryption unit 445 performs processing, based on the $n_1$ or less pairing values $CK_x$ calculated by the tracing encryption key calculation unit 444 and the plaintext M generated by the tracing plaintext generation unit 422, to generate $n_1$ or less ciphertexts $B_x$ (where x is an integer greater than or equal to 1 and less than or equal to $n_1$) by encrypting the plaintext M by respectively using the $n_1$ or less pairing values $CK_x$ as encryption keys, by using the processing device (CPU 911).

The tracing row ciphertext setting unit (row ciphertext setting unit 461) performs processing, based on $n_1$ or less divisors $R_x$ calculated by the tracing row first divisor calculation unit 441, $n_1$ or less divisors $R^\sim_x$ calculated by the tracing row second divisor calculation unit 442, $n_1$ or less divisors $A_x$ calculated by the tracing row third divisor calculation unit 443, and the $n_1$ or less ciphertexts $B_x$ generated by the tracing plaintext encryption unit 445, to set $n_1$ or less row ciphertexts $CT_x=(R_x, R^\sim_x, A_x, B_x)$ (where x is an integer greater than or equal to 1 and less than or equal to $n_1$) by using the processing device (CPU 911).

The tracing column first divisor calculation unit 451 performs processing, based on the divisors $g_1$, $g_2$, $g_3$, and $g_4$, and the $n_2$ random numbers $c_y$ included in the tracer's key TK stored by the tracer's key storage unit 411, the two groups into which the target determination unit 421 classified the index y, the random number t generated by the tracing common random number generation unit 431, the $n_2$ or less random numbers $w_y$ generated by the tracing column random number generation unit 433, and the n2 or less random numbers $z_{p,y}$ generated by the disturbance column random number generation unit 435, to calculate a divisor $C_y=tc_y \cdot (g_1+g_2)+w_y \cdot (g_3+g_4)$ (where y is an integer greater than or equal to 1 and less than or equal to $n_2$) with respect to the index y belonging to the first group in the two groups, and a divisor $c_y=tc_y \cdot (g_3+g_4)+z_{p,y} \cdot g_1+w_y \cdot (g_3+g_4)$ (where y is an integer greater than or equal to 1 and less than or equal to $n_2$) with respect to the index y belonging to the second group in the two groups, by using the processing device (CPU 911).

The tracing column second divisor calculation unit 452 performs processing, based on the divisors $g_1$ and $g_2$ included in the tracer's key TK stored by the tracer's key storage unit 411 and the $n_2$ or less random numbers $w_y$ generated by the tracing column random number generation unit 433, to calculate $n_2$ or less $C^\sim_y=w_y \cdot (g_1+g_2)$ (where y is an integer greater than or equal to 1 and less than or equal to $n_2$) by using the processing device (CPU 911).

The tracing column ciphertext setting unit (column ciphertext setting unit 462) performs processing, based on the $n_2$ or less divisors $C_y$ calculated by the tracing column first divisor calculation unit 451 and the $n_2$ or less divisors $C^\sim_y$ calculated by the tracing column second divisor calculation unit 452, to set $n_2$ or less column ciphertexts $CT_y=(C_y,C^\sim_y)$ (where y is an integer greater than or equal to 1 and less than or equal to $n_2$) by using the processing device (CPU 911).

The decrypted text input unit 471 inputs a decrypted text M' generated by decrypting a ciphertext, including the $n_1$ or less row ciphertexts $CT_x$ set by the tracing row ciphertext setting unit (row ciphertext setting unit 461) and the $n_2$ or less column ciphertexts $CT_y$ set by the tracing column ciphertext setting unit (column ciphertext setting unit 462), by the pirate decryption device (fraudulent ciphertext decryption apparatus 300z) which decrypts a ciphertext generated by the ciphertext generation apparatus 200, by using the processing device (CPU 911).

The leak source identification unit 472 identifies a private key $K_{x,y}$ having been used for decryption by the pirate decryption device (fraudulent ciphertext decryption apparatus 300z), by comparing the plaintext M generated by the tracing plaintext generation unit 422 and the decrypted text M' input by the decrypted text input unit 471, by using the processing device (CPU 911).

The cryptographic system 800 according to the present Embodiment has the effect of realizing, by utilizing a group structure of the finitely generated divisor group G, an advanced cryptographic system capable of identifying a leak source of a private key by analyzing a pirate decryption device which fraudulently uses a leaked private key $K_{x,y}$.

The encryption parameter setting apparatus 100 or the key generation apparatus 500 according to the present Embodiment can be realized when a computer executes a program that causes a computer with a processor for processing data to function as the encryption parameter setting apparatus 100 or the key generation apparatus 500.

The program according to the present Embodiment has the effect of realizing an encryption parameter setting apparatus which can compute, within a polynomial time, concrete encryption parameters necessary for configuring the finitely generated divisor group G having a group structure to be utilized for realizing the advanced cryptographic system as described above.

The program according to the present Embodiment has the effect of realizing a key generation apparatus which can configure the finitely generated divisor group G having a group structure to be utilized for realizing the advanced cryptographic system as described above, and can compute the concrete value of the key using the configured finitely generated divisor group G within a polynomial time.

An encryption parameter setting method according to which the encryption parameter setting apparatus 100 of the present Embodiment sets encryption parameters used for a cryptographic operation has the following steps:

The processing device (CPU 911) selects an element from a plurality of elements of a cyclic group G' (subgroup of a group composed of divisors of a Jacobian variety $Jac_c$ of an algebraic curve C in a finite field $F_p$), as a random divisor D*.

The processing device (CPU 911) calculates a plurality of base divisors $D^\sim_j$ by mapping the random divisor D* by using a plurality of maps $G_j$ (Gauss sum operator $G_j$) (where the plurality of maps $G_j$ are homomorphism from the cyclic group G' to each of a plurality of cyclic groups $G'_j$), based on the selected random divisor D*.

The processing device (CPU 911) calculates logarithms of pairing values of the plurality of base divisors $D^\sim_j$ in a group G (finitely generated divisor group G) (where the group G is a direct product of the plurality of cyclic groups $G'_j$, and a pairing value by a bilinear pairing operation of two elements included in the group G is computable), and treats the logarithms as a plurality of pairing log coefficients $\eta_i$.

The processing device (CPU 911) treats the plurality of calculated base divisors $D^\sim_j$ and the plurality of calculated pairing log coefficients $\eta_i$, as the encryption parameters.

The encryption parameter setting apparatus 100 according to the present Embodiment has the following effect:

A concrete encryption parameter required for configuring a group G having a group structure to be used for realizing an advanced cryptographic system can be computed.

An encryption parameter setting method according to which the encryption parameter setting apparatus 100 of the present Embodiment sets encryption parameters used for a cryptographic operation has the following steps:

The processing device (CPU 911) randomly selects a random divisor D* from a plurality of divisors of a Jacobian variety $Jac_c$ of a hyperelliptic curve C of genus d in a finite field $F_p$ (where an order p of the finite field $F_p$ is a prime number, and the genus d is an integer greater than or equal to 2).

The processing device (CPU 911) calculates a plurality of base divisors $D^\sim_j$, based on the selected random divisor D'.

The processing device (CPU 911) calculates a plurality of discrete logs $l_k$ (where k is an integer greater than or equal to 1 and less than or equal to 2d−1, and the discrete log $l_K$ is an integer greater than or equal to 0 and less than or equal to 2d−1).

The processing device (CPU 911) calculates a plurality of pairing log coefficients $\eta_i$ (where i is an integer greater than or equal to 0 and less than or equal to 2d−1, the pairing log coefficient $\eta_i$ is an integer greater than or equal to 0 and less than or equal to r−1, and r is an order of the plurality of divisors of the Jacobian variety $Jac_c$), based on the plurality of calculated discrete logs $l_K$.

The processing device (CPU 911) sets the encryption parameters, based on the plurality of calculated base divisors $D^\sim_j$ and the plurality of calculated pairing log coefficients $\eta_i$.

The encryption parameter setting method according to the present Embodiment has the following effect:

A concrete encryption parameter required for configuring a finitely generated divisor group G having a group structure to be used for realizing an advanced cryptographic system can be computed within a polynomial time.

The key generation method according to which the key generation apparatus 500 of the present Embodiment generates a key used for a cryptographic operation has the following steps:

The storage device (ROM 913) stores, as a plurality of base divisors $D^\sim_j$, a plurality of elements of a group G (finitely generated divisor group G) (where the group G is a direct product of a plurality of cyclic groups of a same order, a pairing value by a bilinear pairing operation of two elements included in the group G is computable, and the plurality of base divisors $D^\sim_j$ are mutually linearly independent).

The storage device (ROM 913) stores logarithms of pairing values of the plurality of base divisors $D^\sim_j$, as a plurality of pairing log coefficients $\eta_i$.

The processing device (CPU 911) calculates a plurality of output bases $g_k$ being elements of the group G (where a pairing value of at least any two output bases $g_k$ in the plurality of output bases $g_k$ is 1), based on the plurality of base divisors $D^\sim_j$ stored by the storage device (ROM 913) and the plurality of pairing log coefficients $\eta_i$ stored by the storage device (ROM 913).

The processing device (CPU 911) calculates the key, based on the plurality of calculated output bases.

The key generation method according to the present Embodiment has the following effect:

The group G having a group structure to be used for realizing an advanced cryptographic system can be concretely configured, and the concrete value of the key utilizing the configured group G can be computed.

The key generation method according to which the key generation apparatus 500 of the present Embodiment generates a key used for a cryptographic operation has the following steps:

The storage device (ROM 913) stores a plurality of base divisors $D^-_j$ of a Jacobian variety $Jac_c$ of an algebraic curve C of genus d in an extension field K given by a finite algebraic extension of a finite field $F_p$ (where an order p of the finite field $F_p$ is a prime number, the genus d is an integer greater than or equal to 2, and w is a prime number of w=2d+1) and a plurality of pairing log coefficients $\eta_i$ indicating a relation of a pairing value of the plurality of base divisors.

The processing device (CPU 911) randomly selects a random matrix V* satisfying a predetermined condition, based on the plurality of pairing log coefficients $\eta_i$ stored by the storage device.

The processing device (CPU 911) calculates a plurality of output bases $g_K$, based on the plurality of base divisors $D^-_j$ stored by the storage device and the selected random matrix V.

The processing device (CPU 911) calculates the key, based on the plurality of calculated output bases $g_K$.

The key generation method according to the present Embodiment has the following effect:

A finitely generated divisor group G having a group structure to be used for realizing the advanced cryptographic system as described above can be configured, and the concrete value of the key utilizing the configured finitely generated divisor group G can be computed within a polynomial time.

Embodiment 2

Referring to FIGS. 13 to 19, Embodiment 2 will now be described. In this Embodiment, another example of the advanced cryptographic system utilizing a group structure of a group composed of divisors of a Jacobian variety $Jac_c$ is described.

FIG. 13 shows an example of an overall system configuration of a cryptographic system 800E according to the present Embodiment.

The cryptographic system 800B includes the encryption parameter setting apparatus 100 and a group signature system 820.

The encryption parameter setting apparatus 100 sets an encryption parameter (system parameter) to be used in the group signature system 820.

Since details of the encryption parameter setting apparatus 100 are the same as those described in Embodiment 1, description thereof is omitted herein.

The group signature system 820 includes a key generation apparatus 500B, a signing key issuing apparatus 600, a plurality of signing apparatuses 200B, a signature verification apparatus 300B, and a signer tracing apparatus 400B.

In the group signature system 820, one of the plurality of signing apparatuses 200B signs a message M, and the signature verification apparatus 300B verifies a signature σ. The group signature system 820 has anonymity, so that the signature verification apparatus 300B does not know which signing apparatus 200B signed. However, since the signer tracing apparatus 400B can trace which signing apparatus 200B signed, the person in charge of the group can identify the signer.

The key generation apparatus 500B generates a key to be used in the group signature system 820. As the keys generated by the key generation apparatus 500B, there are a public key PK, a tracer's key TK, a master key MK, etc.

The public key PK is published to the public. The master key MK is held by the signing key issuing apparatus 600 in secrecy. The tracer's key TK is held by the signer tracing apparatus 400B in secrecy.

The signing key issuing apparatus 600 generates a signing key SK by using the master key MK. The signing key issuing apparatus 600 is managed by a person in charge of the group, and issues the generated signing key SK to the signing apparatus 200B which is allowed to sign as a member of the group. The signing key SK issued by the signing key issuing apparatus 600 is held by the signing apparatus 200B in secrecy.

Moreover, the signing key issuing apparatus 600 generates an identifier $s_{ID}$. The identifier $s_{ID}$ generated by the signing key issuing apparatus 600 is for identifying a signing key SK, and is held by the signer tracing apparatus 400B in secrecy.

The signing apparatus 200B inputs a message M, and generates a signature σ by using the signing key SK.

The signature verification apparatus 300B inputs the message M and the signature σ, and verifies the signature σ by using the public key PK.

The signer tracing apparatus 400B inputs the signature σ, and identifies the signer by using the tracer's key TK and the identifier $s_{ID}$.

FIG. 14 is a block diagram showing an example of a functional block configuration of the key generation apparatus 500B according to the present Embodiment. Parts similar to those of the key generation apparatus 500 described in Embodiment 1 are denoted by the same signs, and description thereof is omitted herein.

The output base calculation unit 143 calculates two output bases $g_1$ and $g_2$ by using the CPU 911. The condition storage unit 130 has stored the data representing pairs (1,2) and (2,1) of two integers as consistent condition data, and the data representing pairs (1,1) and (2,2) of two integers as inconsistent condition data. That is, the output base calculation unit 143 calculates two output bases $g_1$ and $g_2$ whose pairing value is $e(g_1,g_2)=e(g_2,g_1)=1$, $e(g_1,g_1)\neq 1$, and $e(g_2,g_2)\neq 1$.

FIG. 15 is a detailed block diagram showing an example of an internal block configuration of the key calculation unit 150B according to the present Embodiment.

The key calculation unit 150B includes a bit length input unit 151B, a random number generation unit 160B, a public key calculation unit 170B, a master key calculation unit 180B, a public key setting unit 191B, a master key setting unit 192B, and a tracer's key setting unit 193B.

The bit length input unit 151B inputs a bit length m by using the CPU 911. The bit length m indicates a bit length of a predetermined message M to be signed. The bit length input unit 151B stores the data representing the input bit length, by using the RAM 914.

The random number generation unit 160B includes a base random number generation unit 163B, a pairing random number generation unit 161B, and a master random number generation unit 162B.

The base random number generation unit 163B randomly selects an integer greater than or equal to 1 and less than or equal to r−1, and treats it as a random number β, by using the CPU 911. The base random number generation unit 163B stores the data representing the selected random number β, by using the RAM 914.

The pairing random number generation unit 161B randomly selects an integer greater than or equal to 1 and less than or equal to r−1, and treats it as a random number α, by using the CPU 911. The pairing random number generation unit 161B stores the data representing the selected random number α, by using the RAM 914.

The master random number generation unit 162B randomly selects an integer greater than or equal to 1 and less than or equal to r−1, and treats it as a random number ω, by using the CPU 911. The master random number generation unit 162B stores the data representing the selected random number ω, by using the RAM 914.

The public key calculation unit 170B includes a public base calculation unit 171B, a public first divisor calculation unit 172B, a public pairing value calculation unit 173B, a public second divisor generation unit 174B, a public third divisor generation unit 175B, and a public bit divisor generation unit 176B.

The public base calculation unit 171B inputs the data representing the output bases $g_1$ and $g_2$ stored by the output base calculation unit 143, and the data representing the random number β stored by the base random number generation unit 163B, by using the CPU 911. The public base calculation unit 171B calculates a divisor $g=g_2+\beta \cdot g_1$ of a Jacobian variety $Jac_c$ in an extension field K, based on the output bases $g_1$ and $g_2$ and the random number β represented by the input data, by using the CPU 911. That is, the public base calculation unit 171B calculates a divisor by β times adding the divisor $g_1$, and then calculates another divisor by adding the calculated divisor to the divisor $g_2$, and treats it as the divisor g, by using the CPU 911. The divisor g is included in the finitely generated divisor group G. The public base calculation unit 171B stores the data representing the calculated divisor g, by using the CPU 911.

The public first divisor calculation unit 172B inputs the data representing the random number ω stored by the master random number generation unit 162B, and the data representing the divisor g stored by the public base calculation unit 171B, by using the CPU 911. The public first divisor calculation unit 172B calculates a divisor $\Omega=\omega \cdot g$ of the Jacobian variety $Jac_c$ in the extension field K, based on the random number ω and the divisor g represented by the input data, by using the CPU 911. That is, the public first divisor calculation unit 172B calculates a divisor by ω times adding the divisor g and treats it as the divisor Ω, by using the CPU 911. The divisor Ω is included in the finitely generated divisor group G. The public first divisor calculation unit 172B stores the data representing the calculated divisor Ω, by using the RAM 914.

The public pairing value calculation unit 173B inputs the data representing the random number α stored by the pairing random number generation unit 161B and the data representing the divisor g stored by the public base calculation unit 171B, by using the CPU 911. The public pairing value calculation unit 173B calculates a pairing value $A=e(g,g)^\alpha$, based on the random number α and the divisor g represented by the input data, by using the CPU 911. That is, the public pairing value calculation unit 173B calculates a pairing value by α times multiplying the pairing value of the divisor g and the divisor g, and treats it as the pairing value A, by using the CPU 911. The public pairing value calculation unit 173B stores the data representing the calculated pairing value A, by using the RAM 914.

The public second divisor generation unit 174B randomly selects a divisor from the divisors included in the finitely generated divisor group G, and treats it as a divisor u, by using the CPU 911. For example, by using the CPU 911, the public second divisor generation unit 174E randomly selects 2d integers each being greater than or equal to 1 and less than or equal to r−1, treats them as 2d random numbers $u_j$ (where j is an integer greater than or equal to 0 and less than or equal to 2d−1), and calculates the divisor $u=\Sigma(u_j \cdot D^-_j)$ (where j is an integer greater than or equal to 0 and less than or equal to 2d−1) included in the finitely generated divisor group G, based on 2d base divisors $D^-_j$ included in the encryption parameter set by the encryption parameter setting apparatus 100 and the generated 2d random numbers. That is, by using the CPU 911, the public second divisor generation unit 174B calculates 2d divisors by $u_j$ times adding each of the 2d base divisors $D^-_j$, calculates a divisor by adding all the calculated 2d divisors, and treats it as the divisor u. The public second divisor generation unit 174B stores the data representing the selected divisor u, by using the RAM 914.

The public third divisor generation unit 175B randomly selects a divisor from the divisors included in the finitely generated divisor group G, and treats it as a divisor v', by using the CPU 911. The public third divisor generation unit 175B stores the data representing the selected divisor v' by using the RAM 914.

The public bit divisor generation unit 176B inputs the data representing the bit length m stored by the bit length input unit 151B, by using the CPU 911. The public bit divisor generation unit 176B randomly selects m divisors from the divisors included in the finitely generated divisor group G, based on the bit length m represented by the input data, and treats them as m divisors $v_i$ (where i is an integer greater than or equal to 1 and less than or equal to m), by using the CPU 911. The public bit divisor generation unit 176B stores the data representing the selected m divisors $v_i$, by using the RAM 914.

The master key calculation unit 180B includes a master divisor calculation unit 181B.

The master divisor calculation unit 181B inputs the data representing the random number α stored by the pairing random number generation unit 161B and the data representing the divisor g stored by the public base calculation unit 171B, by using the CPU 911. The master divisor calculation unit 181B calculates a divisor $g'=\alpha \cdot g$ of the Jacobian variety $Jac_c$ in the extension field K, based on the random number α and the divisor g represented by the input data, by using the CPU 911. That is, the master divisor calculation unit 181B calculates a divisor by α times adding the divisor g and treats it as the divisor g', by using the CPU 911. The divisor g' is included in the finitely generated divisor group G. The master divisor calculation unit 181B stores the data representing the calculated divisor g', by using the CPU 911.

The public key setting unit 191B inputs the data representing the output base $g_1$ stored by the output base calculation unit 143, the data representing the divisor g stored by the public base calculation unit 171B, the data representing the divisor Ω stored by the public first divisor calculation unit 172B, the data representing the pairing value A stored by the public pairing value calculation unit 173B, the data representing the divisor u stored by the public second divisor generation unit 174B, the data representing the divisor v' stored by the public third divisor generation unit 175B, and the data representing the m divisors $v_i$ stored by the public bit divisor generation unit 176B. The public key setting unit 191E sets a set $(g_1,g,\Omega,A,u,v',v_1,v_2,\ldots,v_m)$ of m+5 divisors and a pairing value, as the public key PK, based on the output base $g_1$, the divisors g and Ω, the pairing value A, the divisors u and v', and the m divisors $v_i$ represented by the input data, by using the CPU 911.

The master key setting unit 192B inputs the data representing the random number ω stored by the master random number generation unit 162B and the data representing the divisor g' stored by the master divisor calculation unit 181B, by using the CPU 911. The master key setting unit 192B sets a set (ω,g') of the integer and the divisor, as the master key MK, based on the random number ω and the divisor g' represented by the input data, by using the CPU 911.

The tracer's key setting unit 193B inputs the data representing the output base $g_2$ stored by the output base calculation unit 143, by using the CPU 911. The tracer's key setting unit 193B sets the divisor $g_2$ as the tracer's key TK, based on the output base $g_2$ represented by the input data, by using the CPU 911.

FIG. 16 is a block diagram showing an example of a functional block configuration of the signing key issuing apparatus 600 according to the present Embodiment.

The signing key issuing apparatus 600 includes an issue request input unit 154C, an issued identifier storage unit 155C, a master key storage unit 156C, a public key input unit 157C, an identifier generation unit 160C, a signing key calculation unit 180C, an identifier setting unit 194C, and a signing key setting unit 195C.

The master key storage unit 156C has previously stored the data representing the master key MK=(ω,g') set by the key generation apparatus 500B, by using a storage device having the tamper resistance.

The issued identifier storage unit 155C has stored the data representing the identifier $s_{ID}$ of the issued signing key SK, by using a storage device having the tamper resistance.

The public key input unit 157C (issuer public key input unit) has stored the data representing the public key PK set by the signing key issuing apparatus 600, by using the magnetic disk drive 920.

The issue request input unit 154C inputs a signing key issue request which requests to issue a signing key SK, by using the CPU 911.

When the issue request input unit 154C inputs the signing key issue request, the identifier generation unit 160C inputs the data representing the random number ω included in the master key MK stored by the master key storage unit 156C and the data representing the identifier $s_{ID}$ of the issued signing key SK stored by the issued identifier storage unit 155C, by using the CPU 911.

The identifier generation unit 160C randomly selects an integer greater than or equal to 1 and less than or equal to r−1, and treats it as the identifier $s_{ID}$ of a new signing key SK, by using the CPU 911.

The identifier generation unit 160C judges whether ω+$s_{ID}$ has a multiplicative inverse element in a residue ring Z/rZ of the order r, based on the random number ω represented by the input data and the selected identifier $S_{ID}$ of the new signing key SK, by using the CPU 911. When judging that ω+$s_{ID}$ has no inverse element, the identifier generation unit 160C reselects an identifier $s_{ID}$ by using the CPU 911.

Since the order r is a prime number, when ω+$s_{ID}$ is not divisible by r, ω+$s_{ID}$ has a multiplicative inverse element. Since both ω and $s_{ID}$ are integers each being greater than or equal to 1 and less than or equal to r−1, when ω+$s_{ID}$≠r, ω+$s_{ID}$ has a multiplicative inverse element. The identifier generation unit 160C calculates a sum ω+$s_{ID}$ of the random number ω and the identifier $s_{ID}$, and when the calculated sum ω+$s_{ID}$ is equal to the order r, reselects an identifier $s_{ID}$, by using the CPU 911.

The identifier generation unit 160C judges whether there is any identifier $s_{ID}$ of the issued signing key SK being in accordance with the selected identifier $s_{ID}$ of the new signing key SK, based on the selected identifier $s_{ID}$ of the new signing key SK and identifiers $s_{ID}$ of the issued signing keys SK represented by the input data, by using the CPU 911. When judging that there is an identical one, the identifier generation unit 160C reselects an identifier $s_{ID}$, by using the CPU 911.

When the selected identifier $s_{ID}$ of the new signing key SK has an inverse element with respect to the sum ω+$s_{ID}$ and is different from the identifier $s_{ID}$ of the issued signing key SK, the identifier generation unit 160C stores the selected identifier $s_{ID}$ of the new signing key SK, by using the RAM 914.

Using a storage device having the tamper resistance, the issued identifier storage unit 155C stores the data representing the identifier $s_{ID}$ of the new signing key SK stored by the identifier generation unit 160C in addition to the data representing the identifiers $s_{ID}$ of the issued signing keys SK having been stored.

The signing key calculation unit 180C includes a signing first key calculation unit 184C, a signing second key calculation unit 185C, and a signing third key calculation unit 186C.

The signing first key calculation unit 184C inputs the data representing the random number ω and the divisor g' included in the master key MK stored by the master key storage unit 156C and the data representing the identifier $s_{ID}$ of the new signing key SK stored by the identifier generation unit 160C, by using the CPU 911. The signing first key calculation unit 184C calculates a divisor $K_1$={1/(ω+$s_{ID}$)}·g' of the Jacobian variety $Jac_c$ in the extension field K, based on the random number ω, the divisor g' and the identifier $s_{ID}$ represented by the input data. That is, the signing first key calculation unit 184C calculates 1/(ω+$s_{ID}$) being an inverse number of the sum of the integer ω and the integer $s_{ID}$ in the residue ring Z/rZ of the order r, calculates a divisor by the calculated inverse number times, namely 1/(ω+$s_{ID}$) times, adding the divisor g', and treats it as the divisor $K_1$, by using the CPU 911. The divisor $K_1$ is included in the finitely generated divisor group G. The signing first key calculation unit 184C stores the data representing the calculated divisor $K_1$, by using the RAM 914.

The signing second key calculation unit 185C inputs the data representing the divisor g included in the public key PK stored by the public key input unit 157C and the data representing the identifier $s_{ID}$ of the new signing key SK stored by the identifier generation unit 160C, by using the CPU 911. The signing second key calculation unit 185C calculates a divisor $K_2$=$s_{ID}$·g of the Jacobian variety $Jac_c$ in the extension field K, based on the divisor g and the identifier $s_{ID}$ represented by the input data, by using the CPU 911. That is, the signing second key calculation unit 185C calculates a divisor by $s_{ID}$ times adding the divisor g and treats it as the divisor $K_2$, by using the CPU 911. The divisor $K_2$ is included in the finitely generated divisor group G. The signing second key calculation unit 185C stores the data representing the calculated divisor $K_2$, by using the RAM 914.

The signing third key calculation unit 186C inputs the data representing the divisor u included in the public key PK stored by the public key input unit 157C and the data representing the identifier $s_{ID}$ of the new signing key SK stored by the identifier generation unit 160C, by using the CPU 911. The signing third key calculation unit 186C calculates a divisor $K_3$=$s_{ID}$·u of the Jacobian variety $Jac_c$ in the extension field K, based on the divisor u and the identifier $S_{ID}$ represented by the input data, by using the CPU 911. That is, the signing third key calculation unit 186C calculates a divisor by $s_{ID}$ times adding the divisor u, and treats it as the divisor $K_3$, by using the CPU 911. The divisor $K_3$ is included in the finitely generated divisor group G. The signing third key calculation unit 186C stores the data representing the calculated divisor $K_3$, by using the RAM 914.

The identifier setting unit 194C inputs the data representing the identifier $s_{ID}$ of the new signing key SK stored by the identifier generation unit 160C, by using the CPU 911. The identifier setting unit 194C sets an identifier $s_{ID}$, based on the identifier $s_{ID}$ represented by the input data, by using the CPU 911.

The signing key setting unit 195C inputs the data representing the divisor $K_1$ stored by the signing first key calculation unit 184C, the data representing the divisor $K_2$ stored by the signing second key calculation unit 185C, and the data representing the divisor $K_3$ stored by the signing third key calculation unit 186C, by using the CPU 911. The signing key setting unit 195C sets a set $(K_1, K_2, K_3)$ of three divisors as a signing key SK, based on the divisors $K_1$, $K_2$, and $K_3$ represented by the input data, by using the CPU 911.

FIG. 17 is a block diagram showing an example of a functional block configuration of the signing apparatus 200B according to the present Embodiment.

The signing apparatus 200B includes a public key input unit 211B, a signing key input unit 212B, a signing key verification unit 220B, a signing key storage unit 225B, a message input unit 213B, a signature random number generation unit 230B, a message divisor calculation unit 240B, a signature calculation unit 250B, and a signature output unit 261B.

The public key input unit 211B (signer public key input unit) inputs a public key PK set by the key generation apparatus 500B, by using the CPU 911. The signing key first verification value calculation unit 221B stores the data representing the input public key PK, by using the magnetic disk drive 920.

The signing key input unit 212B inputs a signing key SK issued by the signing key issuing apparatus 600, by using the CPU 911. The signing key input unit 212B stores the data representing the input signing key SK, by using the RAM 914.

The signing key verification unit 220B verifies the consistency of the signing key SK input by the signing key input unit 212B.

The signing key verification unit 220B includes a signing key first verification value calculation unit 221B, a signing key second verification value calculation unit 222B, a signing key third verification value calculation unit 223B, and a signing key verification judgment unit 224B.

The signing key first verification value calculation unit 221B inputs the data representing the divisor $\Omega$ included in the public key PK stored by the public key input unit 211B and the data representing the divisors $K_1$ and $K_2$ included in the signing key SK stored by the signing key input unit 212B, by using the CPU 911. The signing key first verification value calculation unit 221B calculates a pairing value $A'=e(K_1, K_2+\Omega)$, based on the divisors $\Omega$, $K_1$ and $K_2$ represented by the input data, by using the CPU 911. That is, the signing key first verification value calculation unit 221B calculates a pairing value of the divisor $K_1$ and a divisor obtained by adding the divisor $K_2$ to the divisor $\Omega$, and treats it as the pairing value $A'$, by using the CPU 911. The signing key first verification value calculation unit 221B stores the data representing the calculated pairing value $A'$, by using the RAM 914.

The signing key second verification value calculation unit 222B inputs the data representing the divisor u included in the public key PK stored by the public key input unit 211B and the data representing the divisor $K_2$ included in the signing key SK stored by the signing key input unit 212B, by using the CPU 911. The signing key second verification value calculation unit 222B calculates a pairing value $B=e(K_2, u)$, based on the divisors u and $K_2$ represented by the input data, by using the CPU 911. That is, the signing key second verification value calculation unit 222B calculates a pairing value of the divisor $K_2$ and the divisor u, and treats it as the pairing value B, by using the CPU 911. The signing key second verification value calculation unit 222B stores the data representing the calculated pairing value B, by using the RAM 914.

The signing key third verification value calculation unit 223E inputs the data representing the divisor g included in the public key PK stored by the public key input unit 211B and the data representing the divisor $K_3$ included in the signing key SK stored by the signing key input unit 212B, by using the CPU 911. The signing key third verification value calculation unit 223B calculates a pairing value $B'=e(g, K_3)$, based on the divisors g and $K_3$ represented by the input data, by using the CPU 911. That is, the signing key third verification value calculation unit 223B calculates a pairing value of the divisor g and the divisor $K_3$, and treats it as the pairing value $B'$, by using the CPU 911. The signing key third verification value calculation unit 223B stores the data representing the calculated pairing value $B'$, by using the RAM 914.

The signing key verification judgment unit 224B inputs, by using the CPU 911, the data representing the pairing value A included in the public key PK stored by the public key input unit 211B, the data representing the pairing value $A'$ stored by the signing key first verification value calculation unit 221B, the data representing the pairing value B stored by the signing key second verification value calculation unit 222B, and the data representing the pairing value $B'$ stored by the signing key third verification value calculation unit 223B. Based on the pairing values A, $A'$, B, and $B'$ represented by the input data, the signing key verification judgment unit 224B judges whether the pairing value A is in accordance with the pairing value $A'$ or not, and whether the pairing value B is in accordance with the pairing value $B'$ or not, by using the CPU 911. When the pairing value A is in accordance with the pairing value $A'$ and the pairing value B is in accordance with the pairing value $B'$, the signing key verification judgment unit 224B judges that the signing key SK input by the signing key input unit 212B has the consistency, by using the CPU 911.

When the signing key verification judgment unit 224B judges that the signing key SK has the consistency, the signing key storage unit 225B inputs the data representing the signing key SK stored by the signing key input unit 212B, by using the CPU 911. The signing key storage unit 225B stores the data representing the input signing key SK, by using a storage device having the tamper resistance.

The message input unit 213B (signer message input unit) inputs a message M to be signed, by using the CPU 911. Here, the bit length of the message M is m, and the i-th bit of the message M is represented by $\mu_i$ (where i is an integer greater than or equal to 1 and less than or equal to m, and $\mu_i$ is 0 or 1). The message input unit 213B stores the data representing the input message M, by using the RAM 914.

The message divisor calculation unit 240B (signer message divisor calculation unit) converts the message M input by the message input unit 213B into a divisor included in the finitely generated divisor group G.

The message divisor calculation unit 240B inputs the data representing the divisor $v'$ and m divisors $v_i$ included in the public key PK stored by the public key input unit 211B and the data representing the message M stored by the message input unit 213B, by using the CPU 911. The message divisor calculation unit 240B calculates a divisor $v=v'+\Sigma(\mu_i \cdot v_i)$ (where is an integer greater than or equal to 1 and less than or equal to m) of the Jacobian variety $Jac_c$ in the extension field K, based on the divisor $v'$, the m divisors $v_i$ and the message M represented by the input data, by using the CPU 911. That is, the message divisor calculation unit 240B calculates a divisor by adding the divisor $v'$ to a divisor obtained by summing the divisors $v_i$ corresponding to bits in which the bit $\mu_i$ of the message M is 1, in the m divisors $v_j$, and treats it as the divisor v, by using the CPU 911. The divisor v is included in the finitely generated divisor group G. The message divisor calculation unit 240E stores the data representing the calculated divisor v, by using the RAM 914.

The signature random number generation unit 230B generates a random number to be used for computing a signature σ.

The signature random number generation unit 230B includes a signature first random number generation unit 231B and a signature second random number generation unit 232B.

The signature first random number generation unit 231B randomly selects an integer greater than or equal to 1 and less than or equal to r−1, and treats it as a random number s, by using the CPU 911. The signature first random number generation unit 231B stores the data representing the selected random number s, by using the RAM 914.

The signature second random number generation unit 232B randomly selects four integers each being greater than or equal to 1 and less than or equal to r−1, and treats them as random numbers $t_j$ (where j is an integer greater than or equal to 1 and less than or equal to 4), by using the CPU 911. The signature second random number generation unit 232B stores the data representing the selected four random numbers $t_j$, by using the RAM 914.

The signature calculation unit 250B calculates divisors constituting the signature σ.

The signature calculation unit 250B includes a signature first divisor calculation unit 251B, a signature second divisor calculation unit 252B, a signature third divisor calculation unit 253B, a signature fourth divisor calculation unit 2543, a signature fifth divisor calculation unit 255B, and a signature sixth divisor calculation unit 2563.

The signature first divisor calculation unit 251B inputs the data representing the divisor $g_1$ included in the public key PK stored by the public key input unit 211B, the data representing the divisor $K_1$ included in the signing key SK stored by the signing key storage unit 225B and the data representing the random number $t_1$ stored by the signature second random number generation unit 232B, by using the CPU 911. The signature first divisor calculation unit 251B calculates a divisor $\sigma_1 = K_1 + t_1 \cdot g_1$ of the Jacobian variety $Jac_c$ in the extension field K, based on the divisors $g_1$ and $K_1$ and the random number $t_1$ represented by the input data, by using the CPU 911. That is, the signature first divisor calculation unit 251B calculates a divisor by adding the divisor $K_1$ to a divisor obtained by $t_1$ times adding the divisor $g_1$, and treats it as the divisor $\sigma_1$, by using the CPU 911. The divisor $\sigma_1$ is included in the finitely generated divisor group G. The signature first divisor calculation unit 251B stores the data representing the calculated divisor $\sigma_1$, by using the RAM 914.

The signature second divisor calculation unit 252B inputs the data representing divisor $g_1$ included in the public key PK stored by the public key input unit 211B, the data representing the divisor $K_2$ included in the signing key SK stored by the signing key storage unit 225B and the data representing the random number $t_2$ stored by the signature second random number generation unit 232B, by using the CPU 911. The signature second divisor calculation unit 252B calculates a divisor $\sigma_2 = K_2 + t_2 \cdot g_1$ of the Jacobian variety $Jac_c$ in the extension field K, based on the divisors $g_1$ and $K_2$ and the random number $t_2$ represented by the input data, by using the CPU 911. That is, the signature second divisor calculation unit 252B calculates a divisor by adding the divisor $K_2$ to a divisor obtained by $t_2$ times adding the divisor $g_1$, and treats it as the divisor $\sigma_2$, by using the CPU 911. The divisor $\sigma_2$ is included in the finitely generated divisor group G. The signature second divisor calculation unit 252B stores the data representing the calculated divisor $\sigma_2$, by using the RAM 914.

The signature third divisor calculation unit 253B inputs the data representing the divisor $g_1$ included in the public key PK stored by the public key input unit 211B, the data representing the divisor $K_3$ included in the signing key SK stored by the signing key storage unit 225B, the data representing the divisor v stored by the message, divisor calculation unit 240B, the data representing the random number stored by the signature first random number generation unit 231B, and the data representing the random number $t_3$ stored by the signature second random number generation unit 232B, by using the CPU 911. The signature third divisor calculation unit 253B calculates a divisor $\sigma_3 = K_3 + s \cdot v + t_3 \cdot g_1$ of the Jacobian variety $Jac_c$ in the extension field K, based on the divisors $g_1$, $K_3$ and v and the random numbers s and $t_3$ represented by the input data, by using the CPU 911. That is, the signature first divisor calculation unit 251B calculates a divisor by adding the divisor $K_3$, a divisor obtained by s times adding the divisor v and a divisor obtained by $t_3$ times adding the divisor $g_1$, and treats it as the divisor $\sigma_3$, by using the CPU 911. The divisor $\sigma_3$ is included in the finitely generated divisor group G. The signature third divisor calculation unit 253B stores the data representing the calculated divisor $\sigma_3$, by using the RAM 914.

The signature fourth divisor calculation unit 254B inputs the data representing divisors $g_1$ and g included in the public key PK stored by the public key input unit 211B, the data representing the random number s stored by the signature first random number generation unit 231B, and the data representing the random number $t_4$ stored by the signature second random number generation unit 232B, by using the CPU 911. The signature fourth divisor calculation unit 254B calculates a divisor $\sigma_4 = s \cdot g + t_4 \cdot g_1$ of the Jacobian variety $Jac_c$ in the extension field K, based on the divisors $g_1$ and g, and the random numbers s and $t_4$ represented by the input data, by using the CPU 911. That is, the signature fourth divisor calculation unit 254B calculates a divisor by adding a divisor obtained by (r−s) times adding the divisor g, to a divisor obtained by $t_4$ times adding the divisor $g_1$, and treats it as the divisor $\sigma_4$, by using the CPU 911. The divisor $\sigma_4$ is included in the finitely generated divisor group G. The signature fourth divisor calculation unit 254B stores the data representing the calculated divisor $\sigma_4$, by using the RAM 914.

The signature fifth divisor calculation unit 255B inputs the data representing divisors $g_1$ and Ω included in the public key PK stored by the public key input unit 211B, the data representing divisors $K_1$ and $K_2$ included in the signing key SK stored by the signing key storage unit 225B, and the data representing the random numbers $t_1$ and $t_2$ stored by the signature second random number generation unit 232B, by using the CPU 911. The signature fifth divisor calculation unit 255B calculates a divisor $\pi_1 = t_1 t_2 \cdot g_1 + t_2 \cdot K_1 + t_1 \cdot (K_2 + \Omega)$ of the Jacobian variety $Jac_c$ in the extension field K, based on the divisors $g_1$, Ω, $K_1$ and $K_2$, and the random numbers $t_1$ and $t_2$ represented by the input data, by using the CPU 911. That is, the signature fifth divisor calculation unit 255B calculates a divisor by adding a divisor obtained by ($t_1 \times t_2$) times adding the divisor $g_1$, a divisor obtained by $t_2$ times adding the divisor $K_1$, and a divisor obtained by $t_1$ times adding the divisor which is the sum of the divisor $K_2$ and the divisor Ω, and treats it as the divisor $\pi_i$, by using the CPU 911. The divisor $\pi_1$ is included in the finitely generated divisor group G. The signature fifth divisor calculation unit 255B stores the data representing the calculated divisor $\pi_1$, by using the RAM 914.

The signature sixth divisor calculation unit 256B inputs the data representing the divisors g and u included in the public key PK stored by the public key input unit 211B, the data representing the divisor v stored by the message divisor calculation unit 240B, and the data representing the random numbers $t_2$, $t_3$, and $t_4$ stored by the signature second random number generation unit 232B, by using the CPU 911. The signature sixth divisor calculation unit 2563 calculates a divisor $\pi_2 = t_2 \cdot u - t_3 \cdot g - t_4 \cdot v$ of the Jacobian variety $Jac_c$ in the extension field K, based on the divisors g, u, and v, and the random numbers $t_2$, $t_3$, and $t_4$ represented by the input data, by using the CPU 911. That is, the signature sixth divisor calculation unit 256B calculates a divisor by adding a divisor obtained by $t_2$ times adding the divisor u, a divisor obtained by $(r-t_3)$ times adding the divisor g, and a divisor obtained by $(r-t_4)$ times adding the divisor v, and treats it as the divisor $\pi_2$, by using the CPU 911. The divisor $\pi_2$ is included in the finitely generated divisor group G. The signature sixth divisor calculation unit 256B stores the data representing the calculated divisor $\pi_2$, by using the RAM 914.

The signature output unit 261B inputs the data representing the divisor $\sigma_1$ stored by the signature first divisor calculation unit 251B, the data representing the divisor $\sigma_2$ stored by the signature second divisor calculation unit 252B, the data representing divisor $\sigma_3$ stored by the signature third divisor calculation unit 253B, the data representing the divisor $\sigma_4$ stored by the signature fourth divisor calculation unit 254B, the data representing the divisor $\pi_1$ stored by the signature fifth divisor calculation unit 255B, and the data representing the divisor $\pi_2$ stored by the signature sixth divisor calculation unit 256B, by using the CPU 911. The signature output unit 261B outputs a set $(\sigma_1, \sigma_2, \sigma_3, \sigma_4, \pi_1, \pi_2)$ of six divisors, as the signature $\sigma$, based on the divisors $\sigma_1, \sigma_2, \sigma_3, \sigma_4, \pi_1$ and $\pi_2$ represented by the input data, by using the CPU 911.

FIG. 18 is a block diagram showing an example of a functional block configuration of the signature verification apparatus 300B according to the present Embodiment.

The signature verification apparatus 300B includes a public key input unit 3113, a message input unit 313B, a signature input unit 312B, a message divisor calculation unit 340B, and a signature verification unit 350B.

The public key input unit 311B (verifier public key input unit) inputs the public key PK set by the key generation apparatus 500B, by using the CPU 911. The public key input unit 311B stores the data representing the input public key PK, by using the magnetic disk drive 920.

The message input unit 313B (verifier message input unit) inputs a signed message M, by using the CPU 911. The message input unit 313B stores the data representing the input message M, by using the RAM 914.

The signature input unit 312B (verifier signature input unit) inputs the signature $\sigma$ for the message M input by the message input unit 313B, by using the CPU 911. The signature input unit 312B stores the data representing the input signature $\sigma$, by using the RAM 914.

The message divisor calculation unit 340B (verifier message divisor calculation unit) converts the message M input by the message input unit 313B into the divisor v included in the finitely generated divisor group G, as well as the message divisor calculation unit 240B of the signing apparatus 200B.

The signature verification unit 350B includes a signature first verification value calculation unit 351B, a signature second verification value calculation unit 352B, a signature third verification value calculation unit 353B, a signature fourth verification value calculation unit 354B, and a signature verification judgment unit 355B.

The signature first verification value calculation unit 351B inputs the data representing the divisor $g_1$ included in the public key PK stored by the public key input unit 311B and the data representing the divisor $\pi_1$ included in the signature $\sigma$ stored by the signature input unit 312B, by using the CPU 911. The signature first verification value calculation unit 351B calculates a pairing value $C = e(g_1, \pi_1)$, based on the divisors $g_1$ and $\pi_1$ represented by the input data, by using the CPU 911. That is, the signature first verification value calculation unit 351B calculates a pairing value of the divisor $g_1$ and the divisor $\pi_1$, and treats it as the pairing value C, by using the CPU 911. The signature first verification value calculation unit 351B stores the data representing the calculated pairing value C, by using the RAM 914.

The signature second verification value calculation unit 352B inputs the data representing the divisor Q and the pairing value A included in the public key PK stored by the public key input unit 311B and the data representing divisors $\sigma_1$ and $\sigma_2$ included in the signature $\sigma$ stored by the signature input unit 312B, by using the CPU 911. The signature second verification value calculation unit 352B calculates a pairing value $C' = e(\sigma_1, \sigma_2 + \Omega)/A$, based on the divisor $\Omega$, the pairing value A, and the divisors $\sigma_1$ and $\sigma_2$ represented by the input data, by using the CPU 911. That is, the signature second verification value calculation unit 352B calculates a pairing value by multiplying a pairing value of the divisor $\sigma_1$ and a divisor obtained by adding the divisor $\sigma_2$ to the divisor $\Omega$, by an inverse number of the pairing value A, and treats it as the pairing value C', by using the CPU 911. The signature second verification value calculation unit 352B stores the data representing the calculated pairing value C', by using the RAM 914.

The signature third verification value calculation unit 353B inputs the data representing the divisor $g_1$ included in the public key PK stored by the public key input unit 311B and the data representing the divisor $\pi_2$ included in the signature $\sigma$ stored by the signature input unit 312B, by using the CPU 911. The signature third verification value calculation unit 353B calculates a pairing value $D = e(g_1, \pi_2)$, based on the divisors $g_1$ and $\pi_2$ represented by the input data, by using the CPU 911. That is, the signature third verification value calculation unit 353B calculates a pairing value of the divisor $g_1$ and the divisor $\pi_2$, and treats it as the pairing value D, by using the CPU 911. The signature third verification value calculation unit 353B stores the data representing the calculated pairing value D, by using the RAM 914.

The signature fourth verification value calculation unit 354B inputs the data representing the divisors u and g included in the public key PK stored by the public key input unit 311B, the data representing the divisors $\sigma_2$, $\sigma_3$, and $\sigma_4$ included in the signature $\sigma$ stored by the signature input unit 312B, and the data representing the divisor v stored by the message divisor calculation unit 340B, by using the CPU 911. The signature fourth verification value calculation unit 354B calculates a pairing value $D' = e(\sigma_2, u)/\{e(g, \sigma_3) \cdot e(\sigma_4, v)\}$, based on the divisors u, g, $\sigma_2$, $\sigma_3$, $\sigma_4$ and v represented by the input data, by using the CPU 911. That is, the signature fourth verification value calculation unit 354B calculates a pairing value by multiplying the pairing value of the divisor $\sigma_2$ and the divisor u, the inverse number of the pairing value of the divisor g and the divisor $\sigma_3$, and the inverse number of the pairing value of the divisor $\sigma_4$ and the divisor v together, and treats it as the pairing value D', by using the CPU 911. The signature fourth verification value calculation unit 354B stores the data representing the calculated pairing value D', by using the RAM 914.

The signature verification judgment unit 355B inputs the data representing the pairing value C stored by the signature first verification value calculation unit 351B, the data representing the pairing value C' stored by the signature second verification value calculation unit 352B, the data representing the pairing value D stored the signature third verification value calculation unit 353B, and the data representing the pairing value D' stored by the signature fourth verification value calculation unit 354B, by using the CPU 911. Based on the pairing values C, C', D, and D' represented by the input data, the signature verification judgment unit 355B judges whether the pairing value C is in accordance with the pairing value C' or not, and whether the pairing value D is in accordance with the pairing value D' or not, by using the CPU 911. When the pairing value C is in accordance with the pairing value C' and the pairing value D is in accordance with the pairing value D', the signature verification judgment unit 355B judges that the signature σ for the message M is valid, by using the CPU 911.

FIG. 19 is a block diagram showing an example of a functional block configuration of the signer tracing apparatus 400B according to the present Embodiment.

The signer tracing apparatus 400B includes a signature input unit 412B, a tracer's key storage unit 414B, an identifier storage unit 415B, a signature pairing value calculation unit 451B, an identifier pairing value calculation unit 452B, and a signer identification unit 453B.

The tracer's key storage unit 414B has previously stored the data representing a tracer's key TK set by the key generation apparatus 500B, by using a storage device having the tamper resistance.

The identifier storage unit 415B has previously stored the data representing the identifier $s_{ID}$ of each of a plurality of signing keys SK issued by the signing key issuing apparatus 600, by using a storage device having the tamper resistance.

The signature input unit 412B (tracer signature input unit) inputs a signature σ whose signer is needed to be identified, by using the CPU 911. The signature input unit 412B stores the data representing the input signature σ, by using the RAM 914.

The signature pairing value calculation unit 451B inputs the data representing the divisor $g_2$ included in the tracer's key TK stored by the tracer's key storage unit 414B and the data representing the divisor $\sigma_2$ included in the signature σ stored by the signature input unit 412B, by using the CPU 911. The signature pairing value calculation unit 451B calculates a pairing value $E=e(g_2,\sigma_2)$, based on the divisors $g_2$ and $\sigma_2$ represented by the input data, by using the CPU 911. That is, the signature pairing value calculation unit 451B calculates a pairing value of the divisor $g_2$ and the divisor $\sigma_2$, and treats it as the pairing value E, by using the CPU 911. The signature pairing value calculation unit 451B stores the data representing the calculated pairing value E, by using the RAM 914.

The identifier pairing value calculation unit 452B inputs the data representing the divisor $g_2$ included in the tracer's key TK stored by the tracer's key storage unit 414B and the data representing a plurality of identifiers $s_{ID}$ stored by the identifier storage unit 415B, by using the CPU 911. The identifier pairing value calculation unit 452B calculates each of a plurality of pairing values $E_{ID}=e(g_2,g_2)^{s_{ID}}$, based on the divisor $g_2$ and the plurality of identifiers $s_{ID}$ represented by the input data, by using the CPU 911. That is, the identifier pairing value calculation unit 452B calculates pairing values by $s_{ID}$ times multiplying the pairing value of the divisor $g_2$ and the divisor $g_2$, and treats them as pairing values $E_{ID}$, by using the CPU 911. The identifier pairing value calculation unit 452B stores the data representing a plurality of calculated pairing values $E_{ID}$, by using the RAM 914.

The signer identification unit 453B inputs the data representing the pairing value E stored by the signature pairing value calculation unit 451B and the data representing the plurality of pairing values $E_{ID}$ stored by the identifier pairing value calculation unit 452B, by using the CPU 911. The signer identification unit 453B searches a pairing value in accordance with the pairing value E from the plurality of pairing values $E_{ID}$, based on the pairing value E and the plurality of pairing values $E_{ID}$ represented by the input data, by using the CPU 911. When detecting a pairing value $E_{ID}$ in accordance with the pairing value E, the signer identification unit 453B judges the identifier $s_n$, which was used as a basis for calculating the pairing value $E_{ID}$ is the identifier of the signing key SK used in generating the signature σ, by using the CPU 911.

Now, expressing the pairing value E which the signature pairing value calculation unit 451B calculates, by using parameters that have not been published, it is given by Expression 20.

$$E=e(g_2,s_{ID}\cdot(g_2+\beta\cdot g_1)+t_2\cdot g_1) \qquad \text{[Expression 20]}$$

Based on the relation among the output bases $g_1$, $g_2$, and $g_3$ calculated by the output base calculation unit 143, $e(g_1,g_2)=e(g_2,g_1)=e(g_2,g_2)=e(g_3,g_2)\neq 1$, $e(g_1,g_1)\neq 1$, $e(g_2,g_2)\neq 1$, and $e(g_3,g_3)\neq 1$. Therefore, the pairing value E can be expressed as shown in Expression 21.

$$E=e(g_2,s_{ID}\cdot g_2)=e(g_2,g_2)^{s_{ID}}$$

Thus, the signer can be identified by detecting a pairing value $E_{ID}$ in accordance with the pairing value E.

The cryptographic system 800B according to the present Embodiment further includes the signing key issuing apparatus 600, a plurality of signing apparatuses 200B, the signature verification apparatus 300B, and the signer tracing apparatus 400B.

The signing key issuing apparatus 600 generates a plurality of signing keys SK respectively corresponding to the plurality of signing apparatuses 200B, based on an encryption parameter set by the encryption parameter setting apparatus 100B and a key (master key MK) generated by the key generation apparatus 500B.

At least any signing apparatus 200B of the plurality of signing apparatuses 200B generates a signature σ by using a signing key SK corresponding to the signing apparatus 200B in the plurality of signing keys SK generated by the signing key issuing apparatus 600.

The signature verification apparatus 300B verifies the signature generated by the signing apparatus 200B, by using the encryption parameter set by the encryption parameter setting apparatus 100B and the key (public key PK) generated by the key generation apparatus 500.

The signer tracing apparatus 400B analyzes the signature σ generated by the signing apparatus 200B, and identifies the signing apparatus 200B which generated the signature σ, by using the encryption parameter set by the encryption parameter setting apparatus 100B and the key (tracer's key TK) generated by the key generation apparatus 500.

The cryptographic system 800 according to the present Embodiment has the following effect:

Since the encryption parameter setting apparatus 100B sets a concrete encryption parameter necessary for configuring a finitely generated divisor group G having a group structure to be used for realizing the advanced cryptographic system as described above, the key generation apparatus 500 configures the finitely generated divisor group G and calculates a concrete value of the key utilizing the configured finitely generated divisor group G, based on the encryption parameter set by the encryption parameter setting apparatus 100B, the signing key issuing apparatus 600 generates a signing key SK by using the key calculated by the key generation apparatus 500, the signing apparatus 200B generates a signature σ, the signature verification apparatus 300B verifies the signature σ, and the signer tracing apparatus 400B identifies the signing apparatus 200B which generated the signature σ, an advanced cryptographic system utilizing the group structure of the finitely generated divisor group G can be realized.

The random divisor selection unit 122 according to the present Embodiment selects a random divisor D* from a plurality of divisors of a Jacobian variety $Jac_c$ of a hyperelliptic curve $C:Y^2=X^5+1$ (where the remainder a of a prime number p divided by 5 is 2 or 3) in a finite field $F_p$, by using the processing device (CPU 911).

The random matrix selection unit 142 selects a random matrix V* of 3 row by 3 column satisfying a condition: $m'_{12}=m'_{21}=0$, $m'_{11}\neq 0$, and $m'_{22}\neq 0$, by using the processing device (CPU 911).

The output base calculation unit 143 performs processing, based on a plurality of base divisors $D^\sim_j$ calculated by the base divisor storage unit 511 and the random matrix V* calculated by the random matrix selection unit 142, to calculate two output bases $g_k=v_k\cdot D^\sim$ (where k is an integer greater than or equal to 1 and less than or equal to 2), by using the processing device (CPU 911).

The key calculation unit 150B includes the bit length input unit 151B, the base random number generation unit 163B, the pairing random number generation unit 161B, the master random number generation unit 162B, the public base calculation unit 171B, the public first divisor calculation unit 172B, the public pairing value calculation unit 173B, the public second divisor generation unit 174B, the public third divisor generation unit 175B, the public bit divisor generation unit 176B, the master divisor calculation unit 181B, the public key setting unit 191B, the master key setting unit 192B, and the tracer's key setting unit 193B.

The bit length input unit 151B inputs a bit length m of a message M to be signed, by using the processing device (CPU 911).

The base random number generation unit 163B randomly generates a random number β (where the random number β is an integer greater than or equal to 1 and less than or equal to r−1), by using the processing device (CPU 911).

The pairing random number generation unit 161B randomly generates a random number α (where the random number α is an integer greater than or equal to 1 and less than or equal to r−1), by using the processing device (CPU 911).

The master random number generation unit 162B randomly generates a random number ω (where the random number ω is an integer greater than or equal to 1 and less than or equal to r−1), by using the processing device (CPU 911).

The public base calculation unit 171B performs processing, based on output bases $g_1$ and $g_2$ calculated by the output base calculation unit 143 and the random number β generated by the base random number generation unit 163B, to calculate a divisor $g=g_2+\beta\cdot g_1$ of the Jacobian variety $Jac_c$, by using the processing device (CPU 911).

The public first divisor calculation unit 172B performs processing, based on the random number ω generated by the master random number generation unit 162B and the divisor g calculated by the public base calculation unit 171B, to calculate a divisor $\Omega=\omega\cdot g$ of the Jacobian variety $Jac_c$, by using the processing device (CPU 911).

The public pairing value calculation unit 173B performs processing, based on the random number α generated by the pairing random number generation unit 161B and the divisor g calculated by the public base calculation unit 171B, to calculate a pairing value $A=e(g,g)^\alpha$, by using the processing device (CPU 911).

The public second divisor generation unit 174B randomly generates a divisor u of the Jacobian variety $Jac_c$, by using the processing device (CPU 911).

The public third divisor generation unit 175B randomly generates a divisor v' of the Jacobian variety $Jac_c$, by using the processing device (CPU 911).

The public bit divisor generation unit 176B performs processing, based on the bit length m input by the bit length input unit 151B, to randomly generate m divisors $v_i$ (where i is an integer greater than or equal to 1 and less than or equal to m) of the Jacobian variety $Jac_c$, by using the processing device (CPU 911).

The master divisor calculation unit 181B performs processing, based on the random number α generated by the pairing random number generation unit 161B and the divisor g calculated by the public base calculation unit 171B, to calculate a divisor $g'=\alpha\cdot g$ of the Jacobian variety $Jac_c$, by using the processing device (CPU 911).

The public key setting unit 191E performs processing, based on the divisor $g_1$ calculated by the output base calculation unit 143, the divisor g calculated by the public base calculation unit 171B, the divisor Ω calculated by the public first divisor calculation unit 172B, the pairing value A calculated by the public pairing value calculation unit 173B, the divisor u generated by the public second divisor generation unit 174B, the divisor v' generated by the public third divisor generation unit 175B, and the m divisors $v_i$ generated by the public bit divisor generation unit 176B, to set a public key $PK=(g_1,g,\Omega,A,u,v',v_i)$ (where i is an integer greater than or equal to 1 and less than or equal to m), by using the processing device (CPU 911).

The master key setting unit 192B performs processing, based on the random number ω generated by the master random number generation unit 162B and the divisor g' calculated by the master divisor calculation unit 181B, to set a master key $MK=(\omega,g')$, by using the processing device (CPU 911).

The tracer's key setting unit 193B performs processing, based on the output base $g_2$ calculated by the output base calculation unit 143, to set a tracer's key $TK=(g_2)$, by using the processing device (CPU 911).

The signing key issuing apparatus 600 according to the present Embodiment includes a storage device for storing data, a processing device (CPU 911) for processing data, the master key storage unit 156C, the issuer public key input unit (public key input unit 157C), the identifier generation unit 160C, the signing first key calculation unit 184C, the signing second key calculation unit 185C, the signing third key calculation unit 186C, the signing key setting unit 195C, and the identifier setting unit 194C.

The master key storage unit 156C stores the master key $MK=(\omega,g')$ set by the key generation apparatus 500B, by using the storage device.

The issuer public key input unit (public key input unit 157C) inputs the public key $PK=(g_1,g,\Omega,A,u,v',v_i)$ set by the key generation apparatus 500B, by using the processing device (CPU 911).

The identifier generation unit 160C randomly generates an identifier $s_{ID}$ (where the identifier $s_{ID}$ is an integer greater than or equal to 1 and less than or equal to r−1), by using the processing device (CPU 911).

The signing first key calculation unit 184C performs processing, based on the random number ω and the divisor g' included in the master key MK stored by the master key storage unit 156C and the identifier $s_{ID}$ generated by the identifier generation unit 160C, to calculate a divisor $K_1=\{1/(\omega+s_{ID})\}\cdot g'$ of the Jacobian variety $Jac_c$, by using the processing device (CPU 911).

The signing second key calculation unit 185C performs processing, based on the divisor g included in the public key PK stored by the issuer public key input unit (public key input unit 157C) and the identifier $s_{ID}$ generated by the identifier generation unit 160C, to calculate a divisor $K_2=s_{ID}\cdot g$ of the Jacobian variety $Jac_c$, by using the processing device (CPU 911).

The signing third key calculation unit 186C performs processing, based on the divisor u included in the public key PK stored by the issuer public key input unit (public key input unit 1570) and the identifier $s_{ID}$ generated by the identifier generation unit 160C, to calculate a divisor $K_3=s_{ID}\cdot u$ of the Jacobian variety $Jac_c$, by using the processing device (CPU 911).

The signing key setting unit 195C performs processing, based on the divisor $K_1$ calculated by the signing first key calculation unit 184C, the divisor $K_2$ calculated by the signing second key calculation unit 185C, and the divisor $K_3$ calculated by the signing third key calculation unit 186C, to set a signing key $SK=(K_1,K_2,K_3)$, by using the processing device (CPU 911).

The identifier setting unit 194C sets the identifier $s_{ID}$ generated by the identifier generation unit 160C as an identifier for identifying the signing key SK set by the signing key setting unit 195C, by using the processing device (CPU 911).

The signing apparatus 200B according to the present Embodiment includes a storage device for storing data, a processing device (CPU 911) for processing data, the signing key storage unit 225B, the signer public key input unit (public key input unit 211B), the signer message input unit (message input unit 213B), the signer message divisor calculation unit (message divisor calculation unit 240B), the signature first random number generation unit 231B, the signature second random number generation unit 232B, the signature first divisor calculation unit 251B, the signature second divisor calculation unit 252B, the signature third divisor calculation unit 253B, the signature fourth divisor calculation unit 254B, the signature fifth divisor calculation unit 255B, the signature sixth divisor calculation unit 256B, and the signature output unit 261B.

The signing key storage unit 225B stores the signing key $SK=(K_1,K_2,K_3)$ set by the key generation apparatus 500B, by using the storage device.

The signer public key input unit (public key input unit 211B) inputs the public key $PK=(g_1,g,\Omega,A,u,v',v_i)$ set by the key generation apparatus 500B, by using the processing device (CPU 911).

The signer message input unit (message input unit 213B) inputs a message M to be signed, by using the processing device (CPU 911).

The signer message divisor calculation unit (message divisor calculation unit 240B) performs processing, based on the divisor v' and the m divisors $v_i$ included in the public key PK input by the signer public key input unit (public key input unit 211B) and the message M input by the signer message input unit (message input unit 213B), to calculate a divisor $v=v'+\Sigma(\mu_i\cdot v_i)$ (where i is an integer greater than or equal to 1 and less than or equal to m, and $\mu_i$ is an integer being 0 or 1 indicating the i-th bit of the message M) of the Jacobian variety $Jac_c$, by using the processing device (CPU 911).

The signature first random number generation unit 231B generates a random number s (where the random number s is an integer greater than or equal to and less than or equal to r−1), by using the processing device (CPU 911).

The signature second random number generation unit 232B randomly generates four random numbers $t_j$ (where j is an integer greater than or equal to 1 and less than or equal to 4 and the random number $t_j$ is an integer greater than or equal to 1 and less than or equal to r−1), by using the processing device (CPU 911).

The signature first divisor calculation unit 251B performs processing, based on the divisor $g_1$ included in the public key PK input by the signer public key input unit (public key input unit 211B), the divisor $K_1$ included in the signing key SK stored by the signing key storage unit 225B, and a random number $t_1$ generated by the signature second random number generation unit 232B, to calculate a divisor $\sigma_1=K_1+t_1\cdot g_1$ of the Jacobian variety $Jac_c$, by using the processing device (CPU 911).

The signature second divisor calculation unit 252B performs processing, based on the divisor $g_1$ included in the public key PK input by the signer public key input unit (public key input unit 211B), the divisor $K_2$ included in the signing key SK stored by the signing key storage unit 225B, and a random number $t_2$ generated by the signature second random number generation unit 232B, to calculate a divisor $\sigma_2=K_2+t_2\cdot g_1$ of the Jacobian variety $Jac_c$, by using the processing device (CPU 911).

The signature third divisor calculation unit 253B performs processing, based on the divisor $g_1$ included in the public key PK input by the signer public key input unit (public key input unit 211B), the divisor $K_3$ included in the signing key SK stored by the signing key storage unit 225B, the divisor v calculated by the signer message divisor calculation unit (message divisor calculation unit 240B), the random number s generated by the signature first random number generation unit 231B, and a random number $t_3$ generated by the signature second random number generation unit 232B, to calculate a divisor $\sigma_3=K_3+s\cdot v+t_3\cdot g_1$ of the Jacobian variety $Jac_c$, by using the processing device (CPU 911).

The signature fourth divisor calculation unit 254B performs processing, based on the divisors g and $g_1$ included in the public key PK input by the signer public key input unit (public key input unit 211B), the random number s generated by the signature first random number generation unit 231B, and a random number $t_4$ generated by the signature second random number generation unit 232B, to calculate a divisor $\sigma_4=-s\cdot g+t_4\cdot g_1$ of the Jacobian variety $Jac_c$, by using the processing device (CPU 911).

The signature fifth divisor calculation unit 255B performs processing, based on the divisors $g_1$ and $\Omega$ included in the public key PK input by the signer public key input unit (public key input unit 211B), the divisors $K_1$ and $K_2$ included in the signing key SK stored by the signing key storage unit 225B, and the random numbers $t_1$ and $t_2$ generated by the signature second random number generation unit 232B, to calculate a divisor $\pi_1=t_1t_2\cdot g_1+t_2\cdot K_1+t_1\cdot(K_2+\Omega)$ of the Jacobian variety $Jac_c$, by using the processing device (CPU 911).

The signature sixth divisor calculation unit 256B performs processing, based on the divisors g and u included in the public key PK input by the signer public key input unit (public key input unit 211B), the divisor v calculated by the signer message divisor calculation unit (message divisor calculation unit 240B), and the random numbers $t_2$, $t_3$, and $t_4$ generated by the signature second random number generation unit 232B, to calculate a divisor $\pi_2 = t_2 \cdot u - t_3 \cdot g - t_4 \cdot v$ of the Jacobian variety $Jac_C$, by using the processing device (CPU 911).

The signature output unit 261B performs processing, based on the divisor $\sigma_1$ calculated by the signature first divisor calculation unit 251B, the divisor $\sigma_2$ calculated by the signature second divisor calculation unit 252B, the divisor $\sigma_3$ calculated by the signature third divisor calculation unit 253B, the divisor $\sigma_4$ calculated by the signature fourth divisor calculation unit 254B, the divisor $\pi_1$ calculated by the signature fifth divisor calculation unit 255B, and the divisor $\pi_2$ calculated by the signature sixth divisor calculation unit 256B, to output a signature $\sigma = (\sigma_1, \sigma_2, \sigma_3, \sigma_4, \pi_1, \pi_2)$, by using the processing device (CPU 911).

The signature verification apparatus 300B according to the present Embodiment includes a processing device (CPU 911) for processing data, the verifier public key input unit (public key input unit 311B), the verifier signature input unit (signature input unit 312B), the verifier message input unit (message input unit 313B), the verifier message divisor calculation unit (message divisor calculation unit 340B), the signature first verification value calculation unit 351B, the signature second verification value calculation unit 352B, the signature third verification value calculation unit 353B, the signature fourth verification value calculation unit 354B, and the signature verification judgment unit 355B.

The verifier public key input unit (public key input unit 311B) inputs the public key $PK = (g_1, g, \Omega, A, u, v', v_i)$ set by the key generation apparatus 500B, by using the processing device (CPU 911).

The verifier signature input unit (signature input unit 312B) inputs the signature $\sigma = (\sigma_1, \sigma_2, \sigma_3, \sigma_4, \pi_1, \pi_2)$ output by the signing apparatus 200B, by using the processing device (CPU 911).

The verifier message input unit (message input unit 313B) inputs the message M signed with the signature $\sigma$, by using the processing device (CPU 911).

The verifier message divisor calculation unit (message divisor calculation unit 340B) performs processing, based on the divisor v' and the m divisors $v_i$ included in the public key PK input by the verifier public key input unit (public key input unit 311B) and the message M input by the verifier message input unit (message input unit 313B), to calculate the divisor $v = v' + \Sigma(\mu_i \cdot v_i)$ (where i is an integer greater than or equal to 1 and less than or equal to m, and $\mu_i$ is an integer being 0 or 1 indicating the i-th bit of the message M) of the Jacobian variety $Jac_C$, by using the processing device (CPU 911).

The signature first verification value calculation unit 351B performs processing, based on the divisor $g_1$ included in the public key PK input by the verifier public key input unit (public key input unit 311B) and the divisor $\pi_i$ included in the signature $\sigma$ input by the verifier signature input unit (signature input unit 312B), to calculate a pairing value $C = e(g_1, \pi_1)$, by using the processing device (CPU 911).

The signature second verification value calculation unit 352B performs processing, based on the divisor $\Omega$ and the pairing value A included in the public key PK input by the verifier public key input unit (public key input unit 311B) and the divisors $\sigma_1$ and $\sigma_2$ included in the signature $\sigma$ input by the verifier signature input unit (signature input unit 312B), to calculate a pairing value $C' = e(\sigma_1, \sigma_2 + \Omega)/A$, by using the processing device (CPU 911).

The signature third verification value calculation unit 353B performs processing, based on the divisor $g_1$ included in the public key PK input by the verifier public key input unit (public key input unit 311B) and the divisor $\pi_2$ included in the signature $\sigma$ input by the verifier signature input unit (signature input unit 312B), to calculate a pairing value $D = e(g_1, \pi_2)$, by using the processing device (CPU 911).

The signature fourth verification value calculation unit 354B performs processing, based on the divisors u and g included in the public key PK input by the verifier public key input unit (public key input unit 311B), the divisors $\sigma_2$, $\sigma_3$, and $\sigma_4$ included in the signature $\sigma$ input by the verifier signature input unit (signature input unit 312B), and the divisor v calculated by the verifier message divisor calculation unit (message divisor calculation unit 340B), to calculate a pairing value $D' = e(\sigma_2, u) / \{e(g, \sigma_3) \cdot e(\sigma_4, v)\}$, by using the processing device (CPU 911).

The signature verification judgment unit 355B performs processing, based on the pairing value C calculated by the signature first verification value calculation unit 351B, the pairing value C' calculated by the signature second verification value calculation unit 352B, the pairing value D calculated by the signature third verification value calculation unit 353B, and the pairing value D' calculated by the signature fourth verification value calculation unit 354B, to judge whether the pairing value C and the pairing value C' are equal or not and whether the pairing value D and the pairing value D' are equal or not, and when judging that the pairing value C and the pairing value C' are equal and the pairing value D and the pairing value D' are equal, judge the signature $\sigma$ input by the verifier signature input unit (signature input unit 312B) to be valid, by using the processing device (CPU 911).

The signer tracing apparatus 400B according to the present Embodiment includes a storage device for storing data, a processing device (CPU 911) for processing data, the tracer's key storage unit 414B, the identifier storage unit 415B, the tracer signature input unit (signature input unit 412B), the signature pairing value calculation unit 451B, the identifier pairing value calculation unit 452B, and the signer identification unit 453B.

The tracer's key storage unit 414B stores a tracer's key $TK = (g_2)$ set by the key generation apparatus 500B, by using the storage device.

The identifier storage unit 415B stores the identifier $s_{ID}$ for identifying the signing key SK issued by the signing key issuing apparatus 600, by using the storage device.

The tracer signature input unit (signature input unit 412B) inputs the signature $\sigma$ output by the signing apparatus 200B, by using the processing device (CPU 911).

The signature pairing value calculation unit 451B performs processing, based on the divisor $g_2$ included in the tracer's key TK stored by the tracer's key storage unit 414B and the divisor $\sigma_2$ included in the signature $\sigma$ input by the tracer signature input unit (signature input unit 412B), to calculate a pairing value $E = e(g_2, \sigma_2)$, by using the processing device (CPU 911).

The identifier pairing value calculation unit 452B performs processing, based on the divisor $g_2$ included in the tracer's key TK stored by the tracer's key storage unit 414B and the identifier $s_{ID}$ stored by the identifier storage unit 415B, to calculate a pairing value $E_{ID} = e(g_2, g_2)^{s_{ID}}$, by using the processing device (CPU 911).

The signer identification unit 453B identifies the identifier of the signing key SK which had generated the signature $\sigma$ input by the tracer signature input unit (signature input unit 412B), by detecting a pairing value in accordance with the pairing value E calculated by the signature pairing value calculation unit 451B in the pairing value $E_{ID}$ calculated by the identifier pairing value calculation unit 452B, by using the processing device (CPU 911).

The cryptographic system 800B according to the present Embodiment has the effect of realizing a group signature having anonymity and capable of tracing a signer, by utilizing a group structure of the finitely generated divisor group G.

Figure 1:
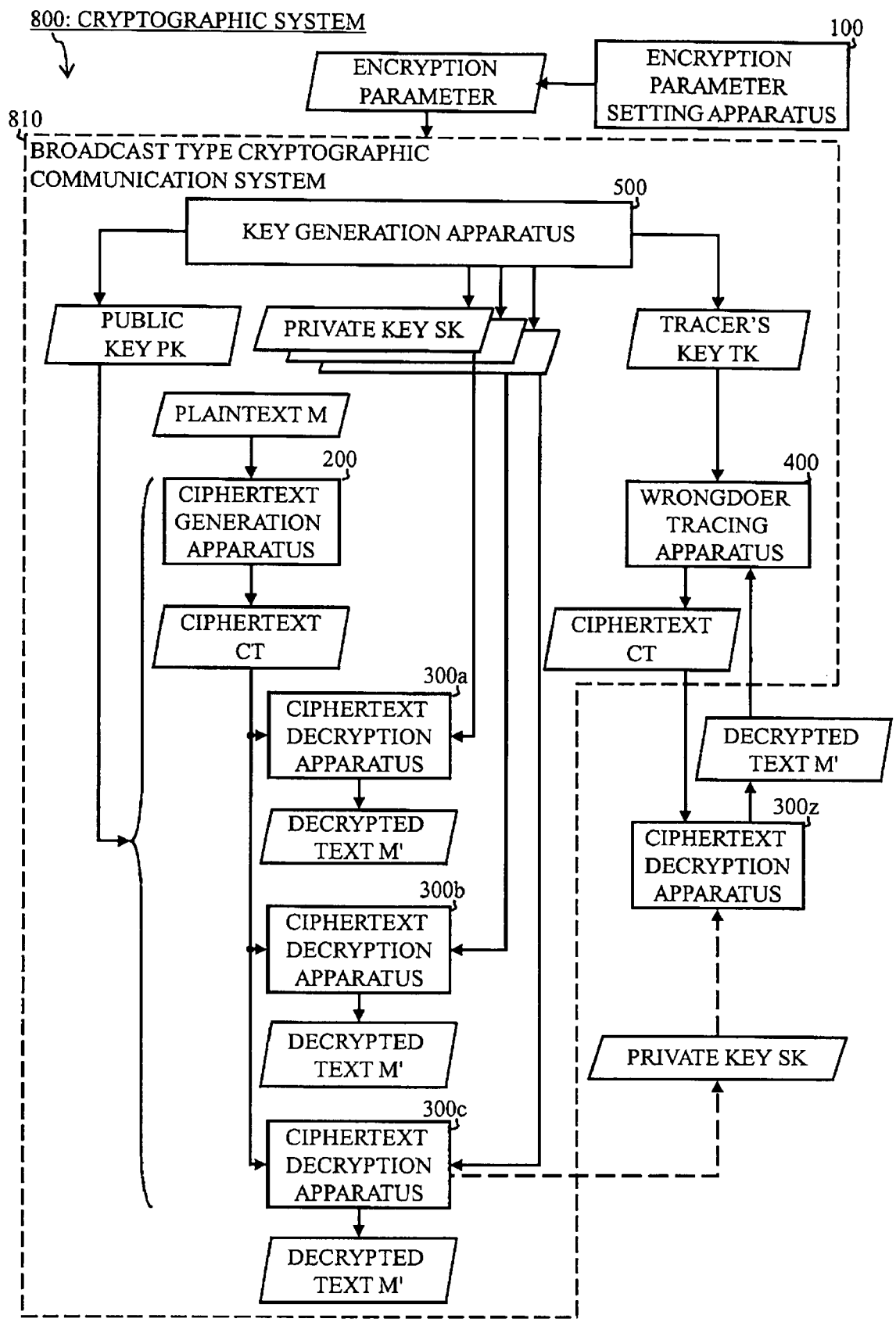
FIG. 1 shows an example of an overall system configuration of a cryptographic system 800 according to Embodiment 1.
Figure 2:
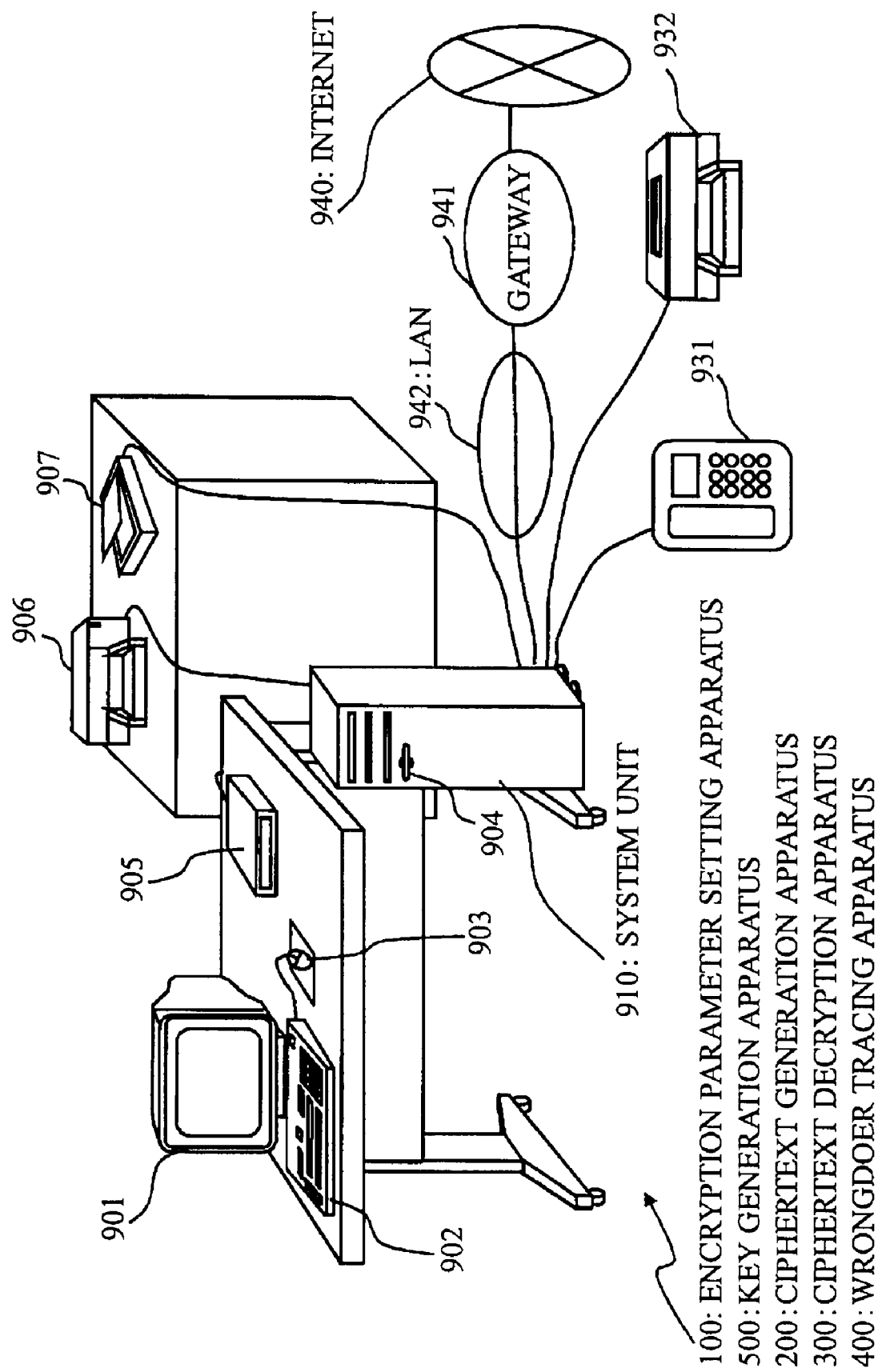
FIG. 2 shows an example of the appearance of an encryption parameter setting apparatus 100, a key generation apparatus 500, a ciphertext generation apparatus 200, a ciphertext decryption apparatus 300, and a wrongdoer tracing apparatus 400 according to Embodiment 1.
Figure 3:
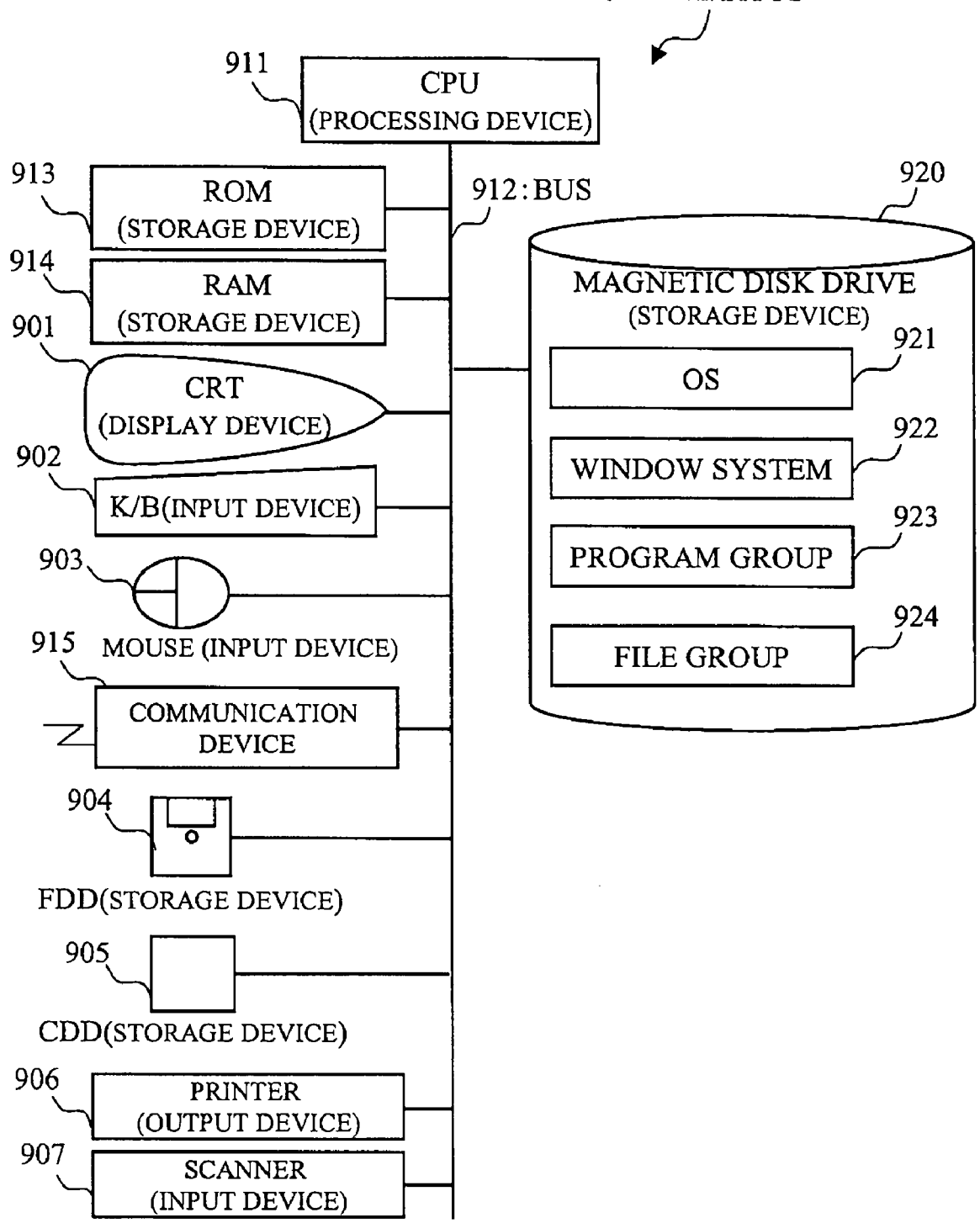
FIG. 3 shows an example of hardware resources of the encryption parameter setting apparatus 100, the key generation apparatus 500, the ciphertext generation apparatus 200, the ciphertext decryption apparatus 300, and the wrongdoer tracing apparatus 400 according to Embodiment 1.
Figure 4:
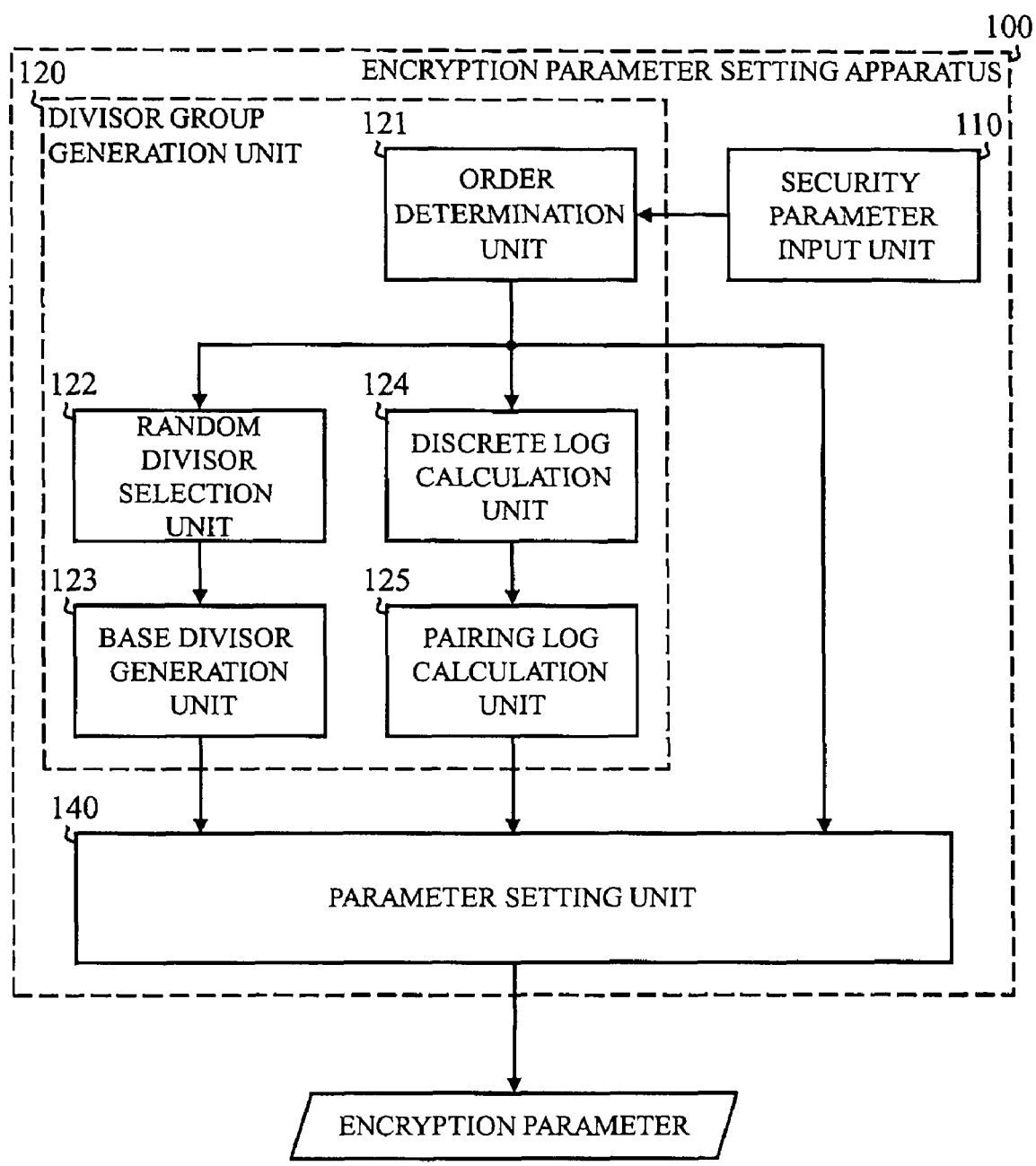
FIG. 4 is a block diagram showing an example of a functional block configuration of the encryption parameter setting apparatus 100 according to Embodiment 1.
Figure 5:
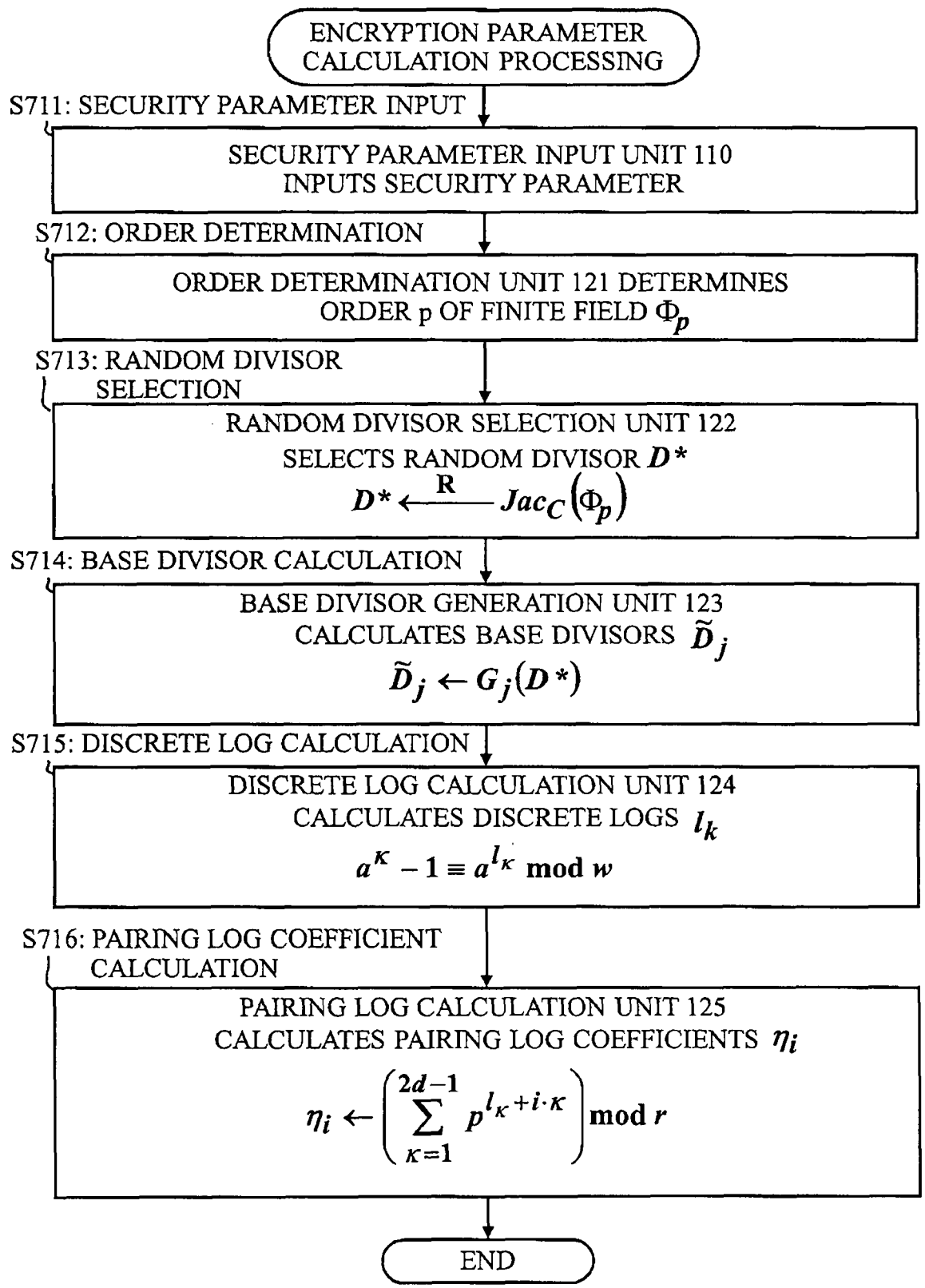
FIG. 5 is a flowchart showing an example of the flow of encryption parameter calculation processing in which the encryption parameter setting apparatus 100 according to Embodiment 1 calculates an encryption parameter.
Figure 6:
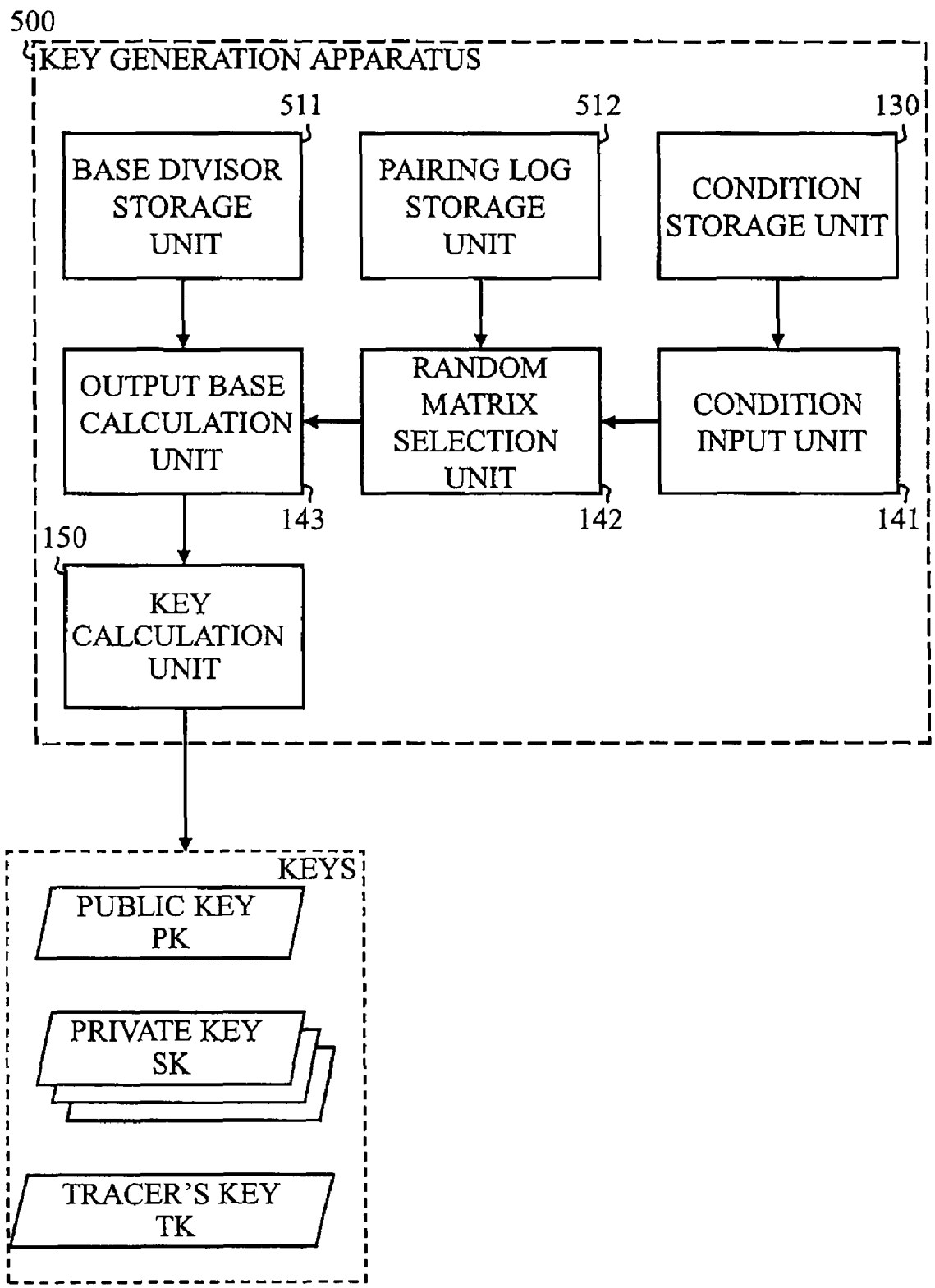
FIG. 6 is a block diagram showing an example of a functional block configuration of the key generation apparatus 500 according to Embodiment 1.
Figure 7:
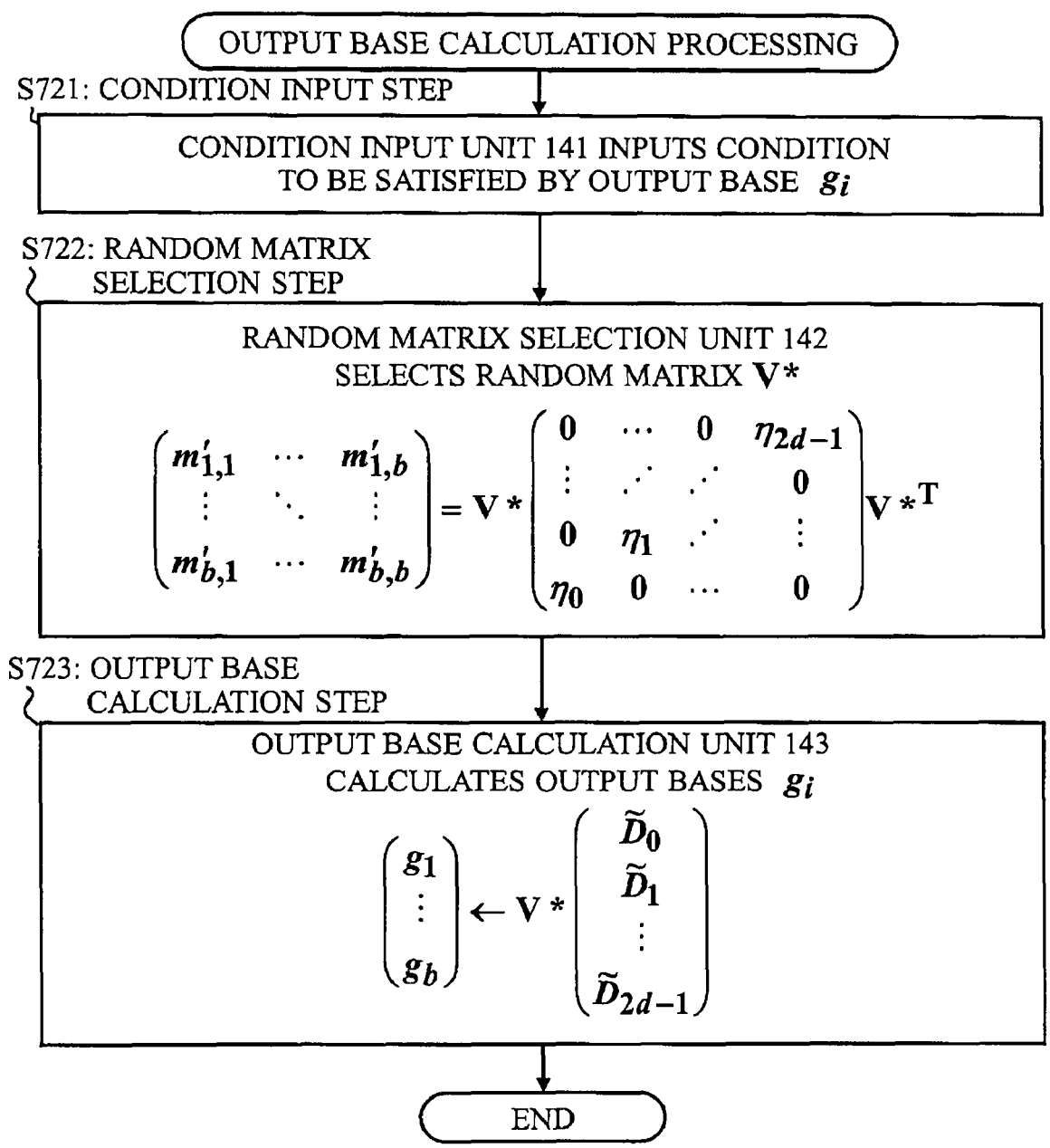
FIG. 7 is a flowchart showing an example of the flow of output base calculation processing in which the key generation apparatus 500 according to Embodiment 1 calculates an output base $g_i$.
Figure 8:
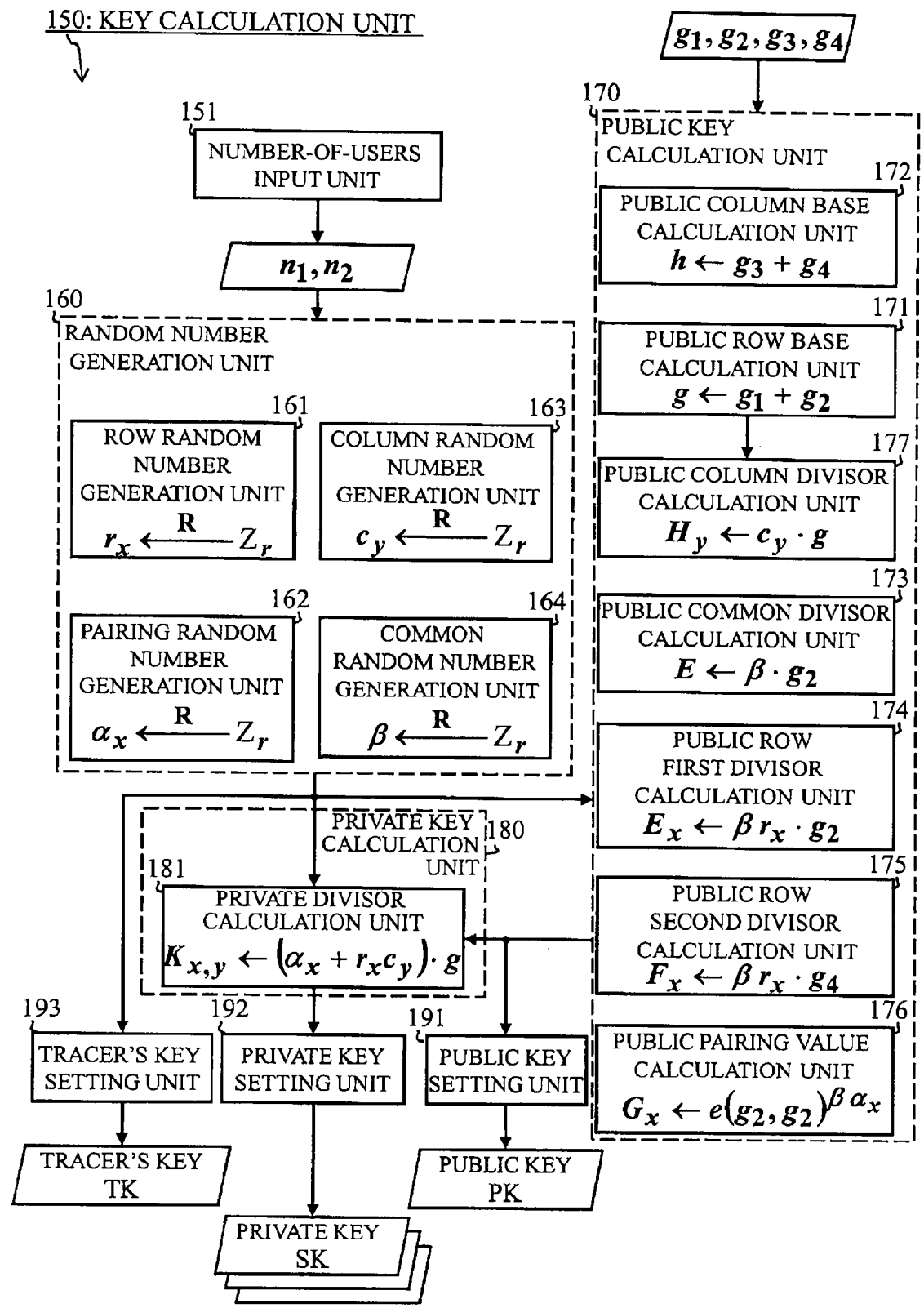
FIG. 8 is a detailed block diagram showing an example of the internal block configuration of a key calculation unit 150 according to Embodiment 1.
Figure 9:
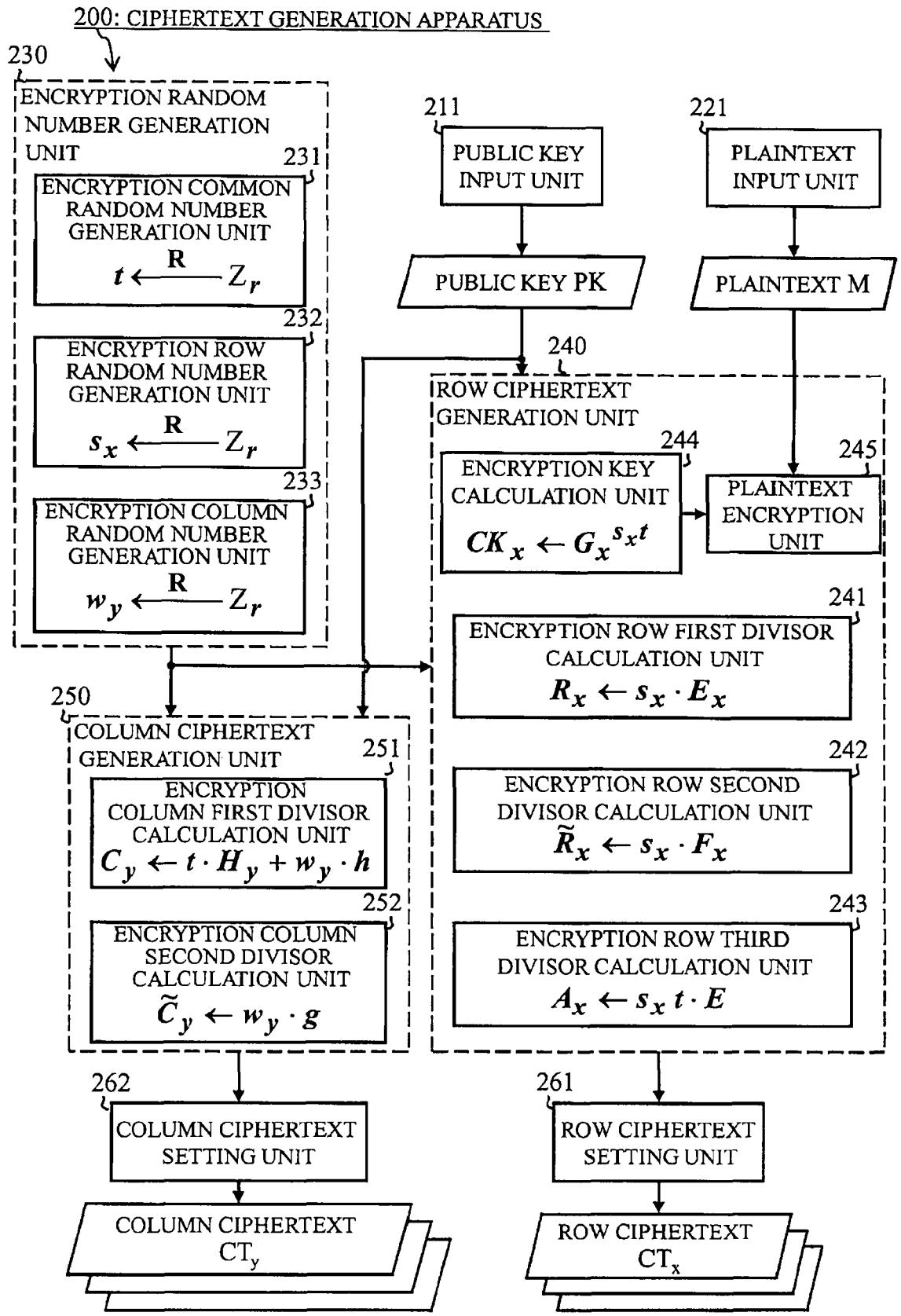
FIG. 9 is a block diagram showing an example of a functional block configuration of the ciphertext generation apparatus 200 according to Embodiment 1.
Figure 10:
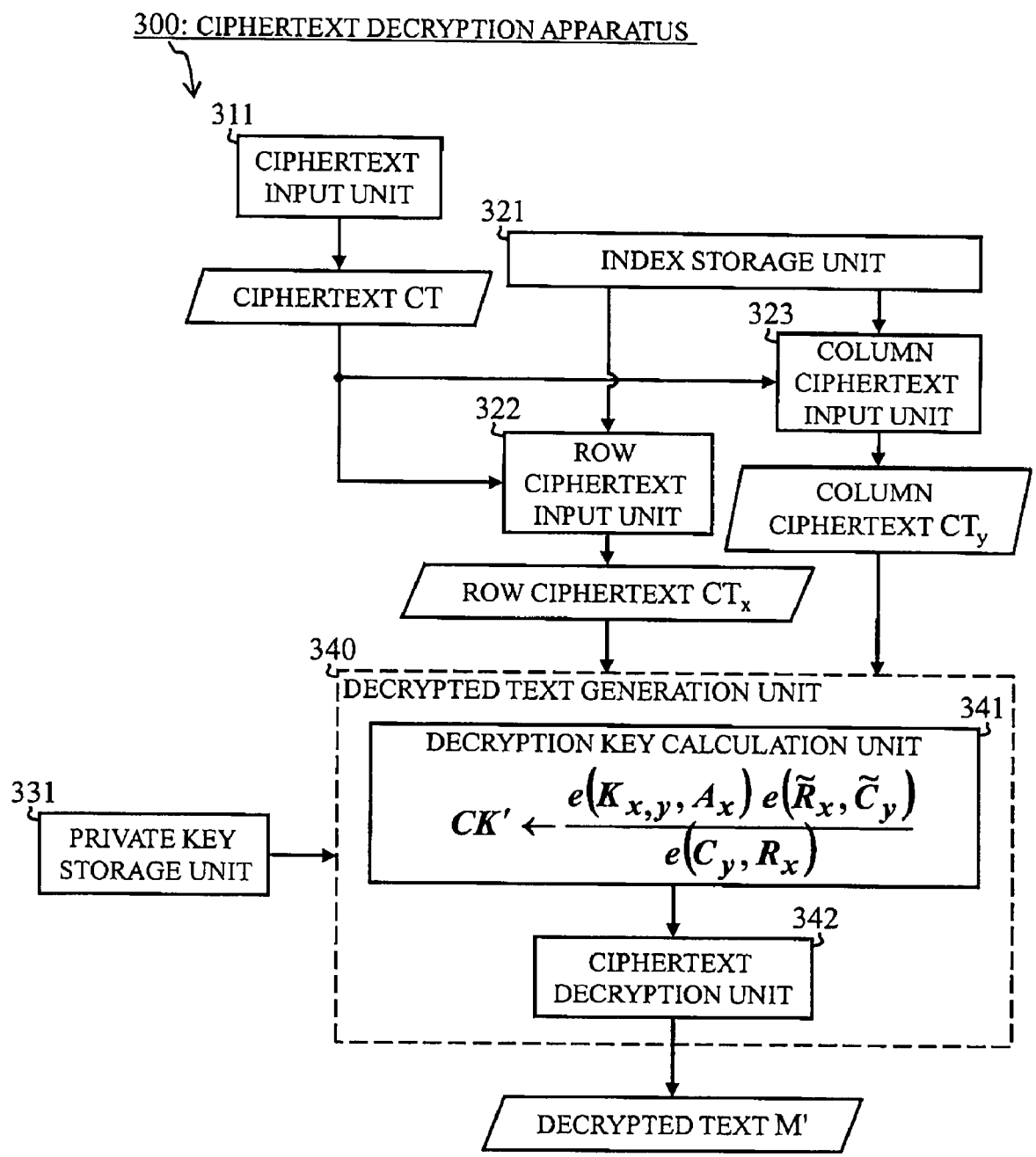
FIG. 10 is a block diagram showing an example of a functional block configuration of the (proper) ciphertext decryption apparatus 300 according to Embodiment 1.
Figure 11:
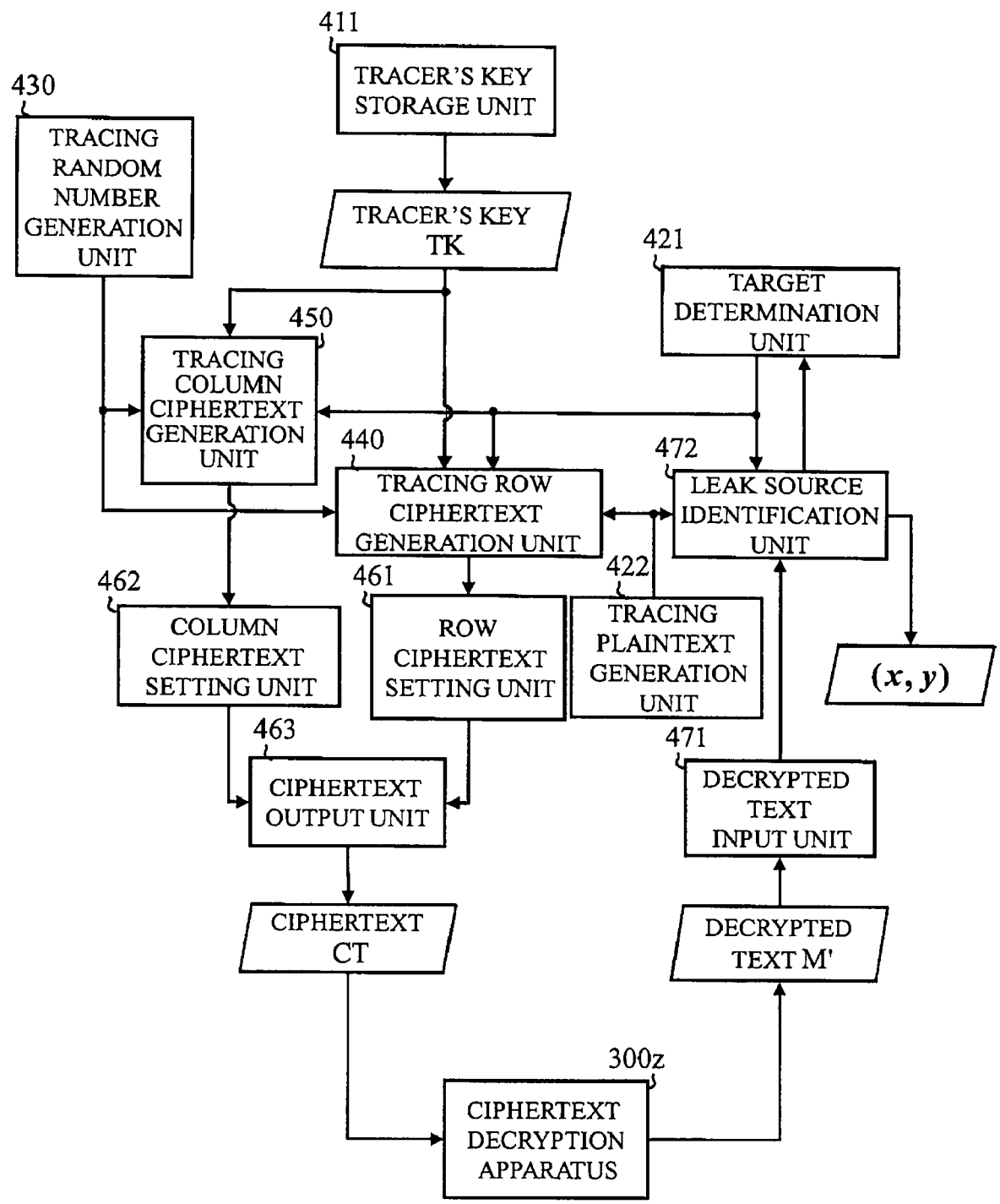
FIG. 11 is a block diagram showing an example of a functional block configuration of the wrongdoer tracing apparatus 400 according to Embodiment 1.
Figure 12:
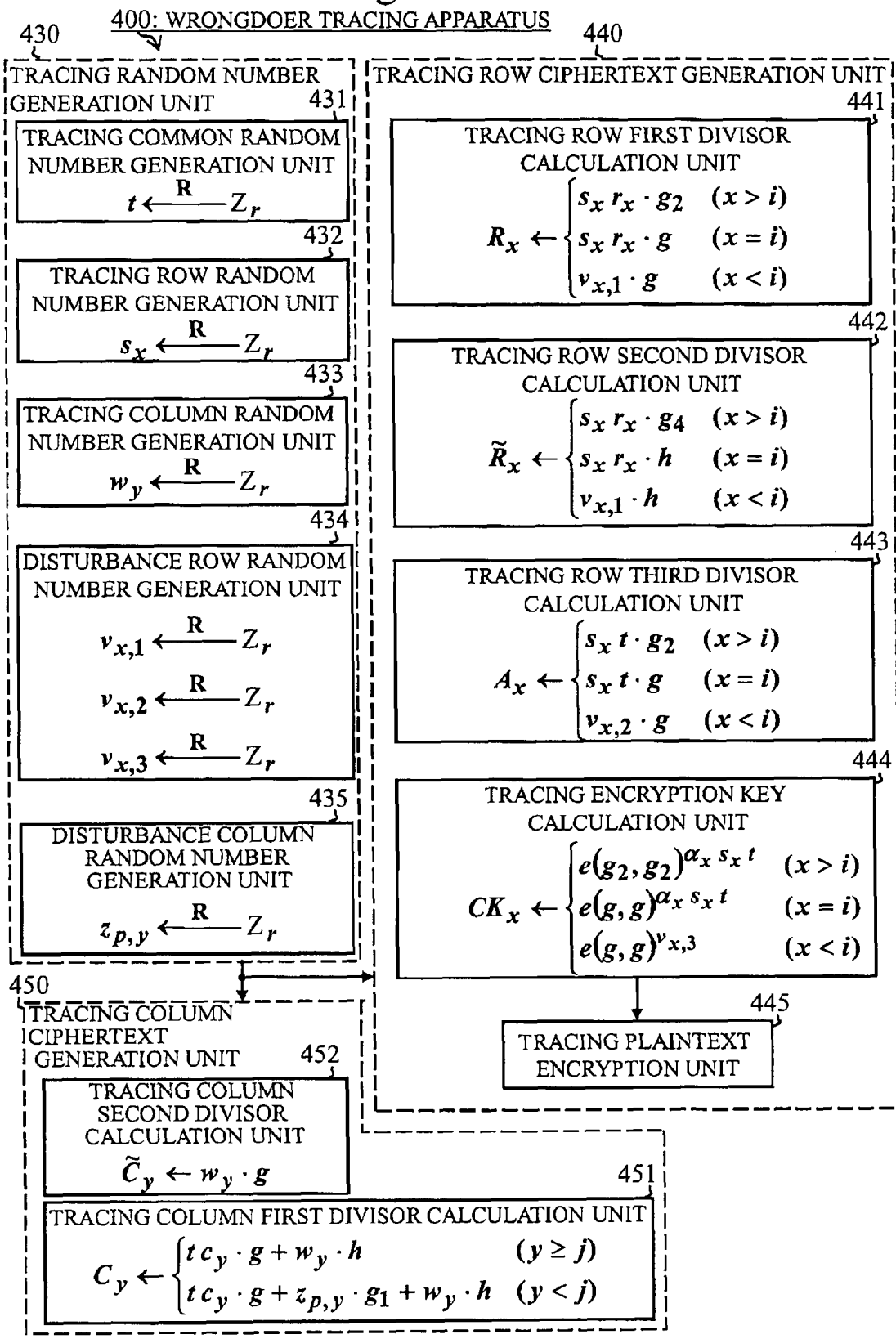
FIG. 12 is a detailed block diagram showing an example of an internal block of a tracing random number generation unit 430, a tracing row ciphertext generation unit 440, and a tracing column ciphertext generation unit 450, in the wrongdoer tracing apparatus 400 according to Embodiment 1.
Figure 13:
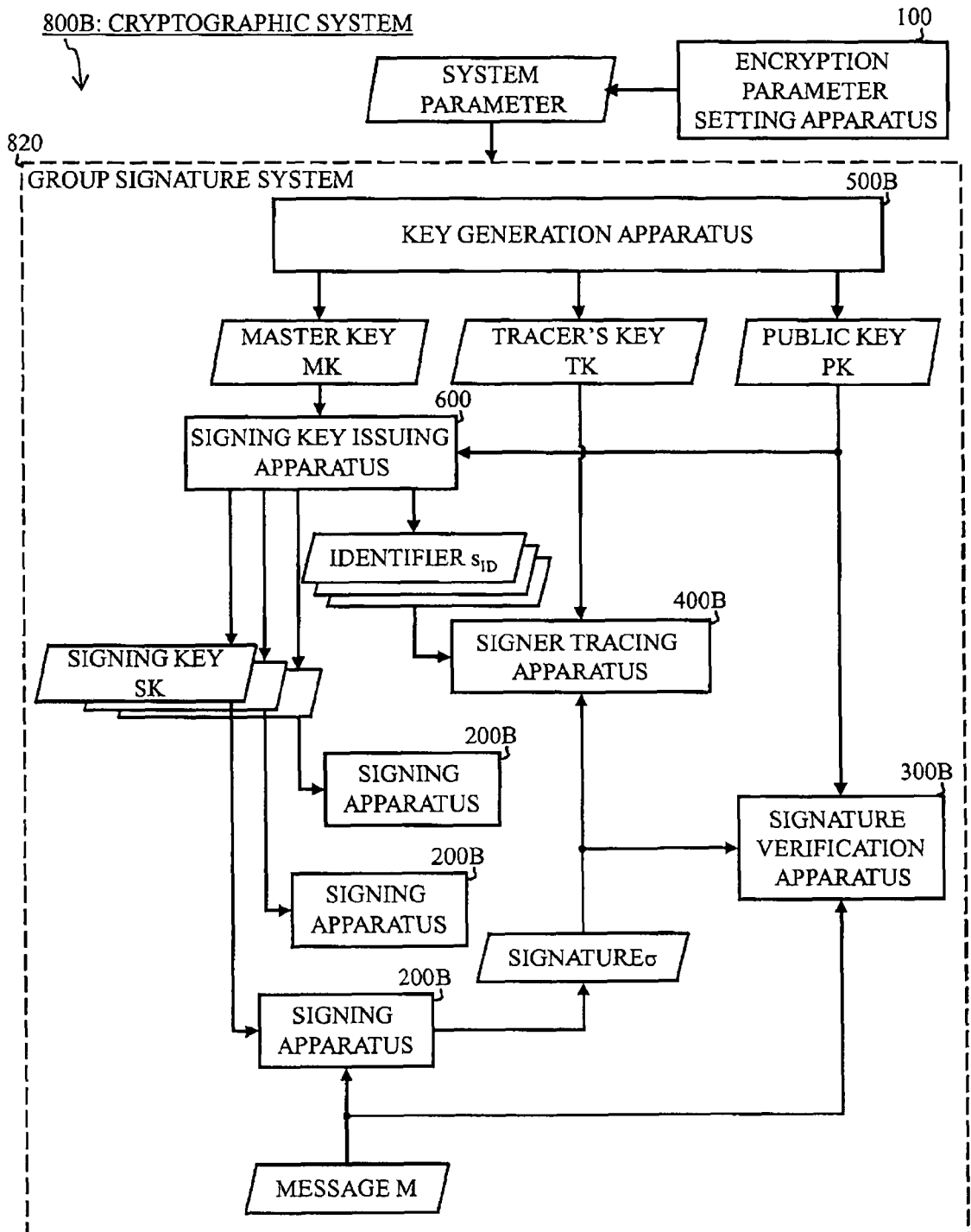
FIG. 13 shows an example of an overall system configuration of a cryptographic system 800B according to Embodiment 2.
Figure 14:
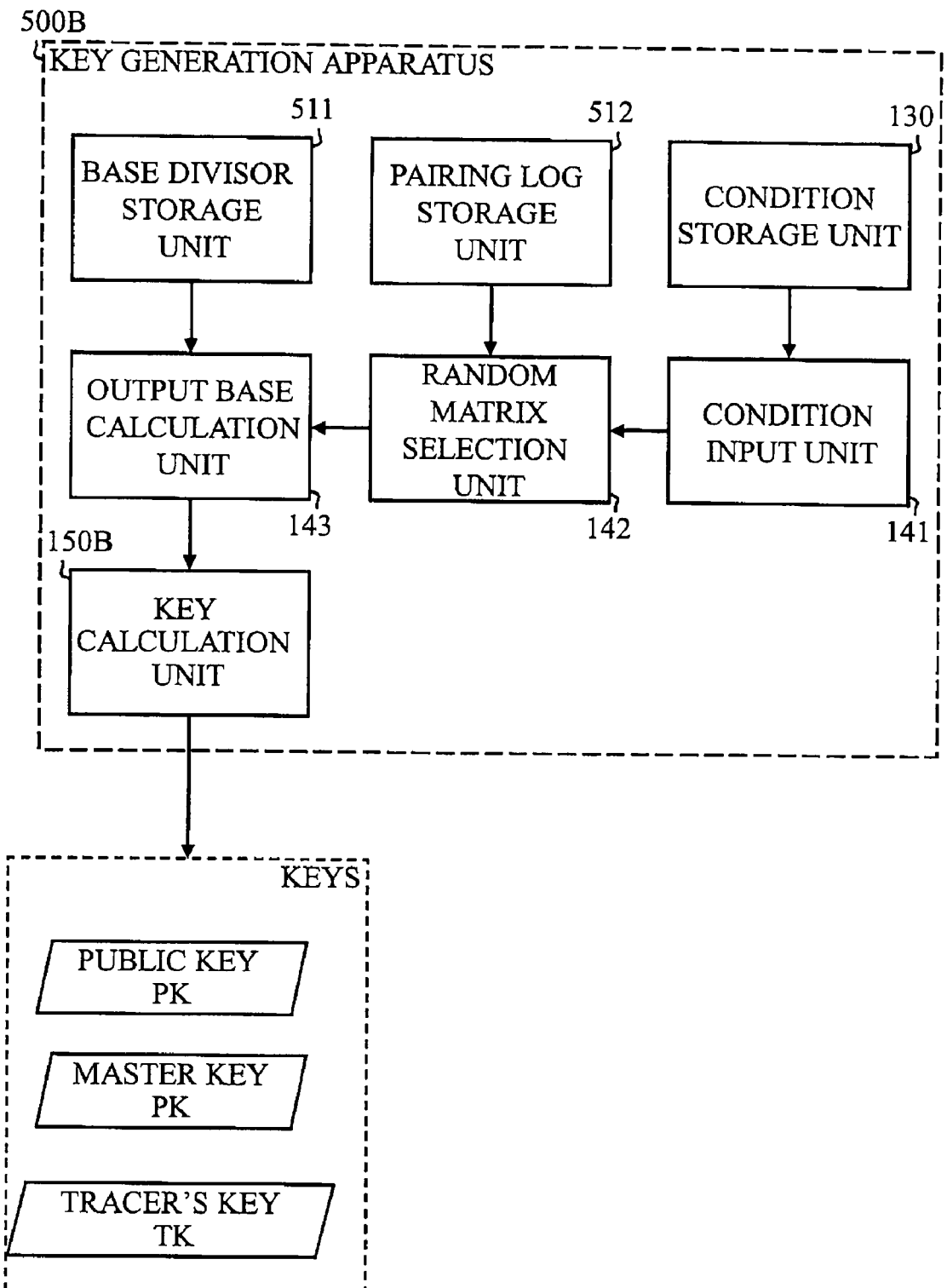
FIG. 14 is a block diagram showing an example of a functional block configuration of a key generation apparatus 500B according to Embodiment 2.
Figure 15:
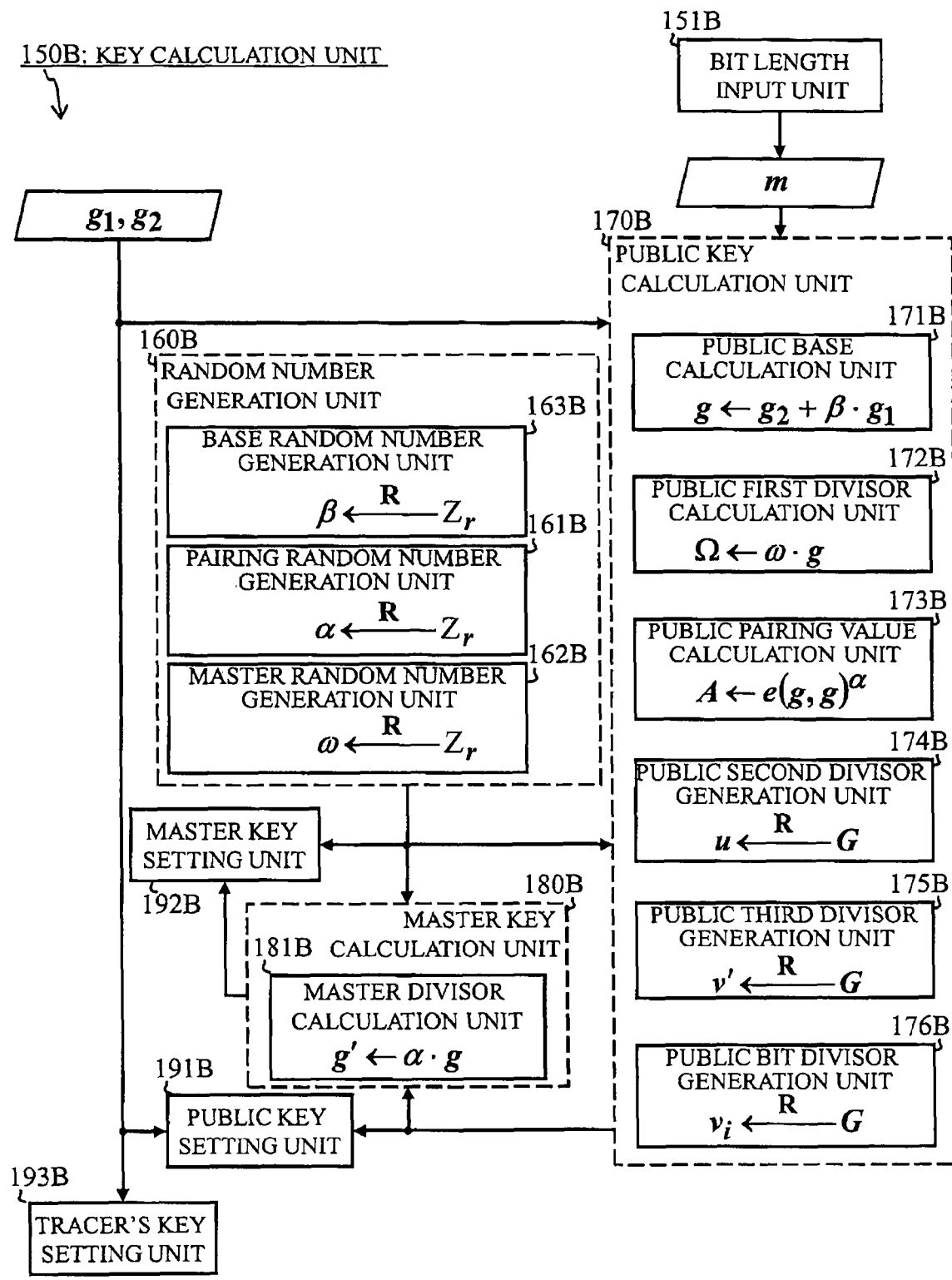
FIG. 15 is a detailed block diagram showing an example of an internal block configuration of a key calculation unit 150B according to Embodiment 2.
Figure 16:
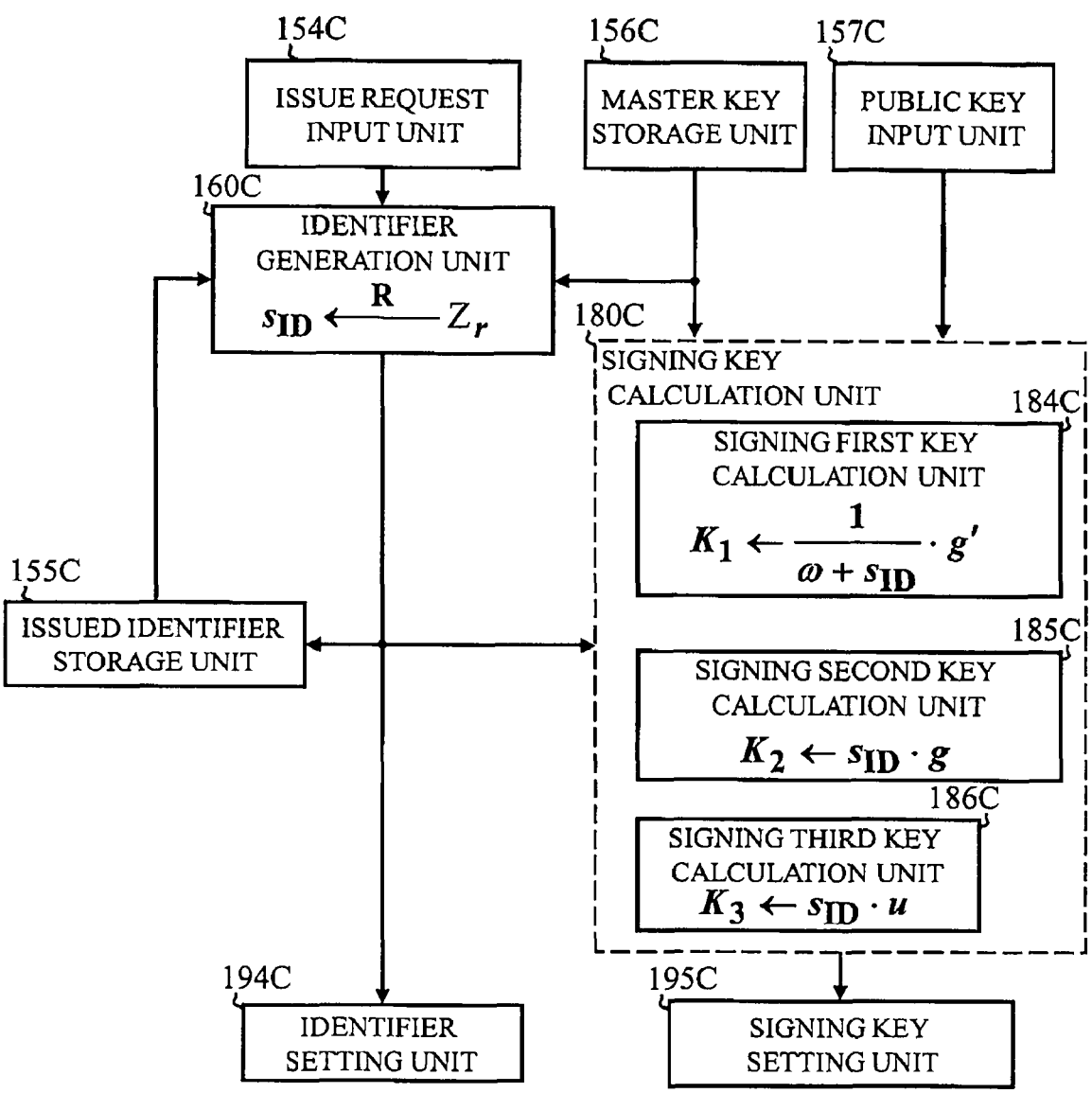
FIG. 16 is a block diagram showing an example of a functional block configuration of a signing key issuing apparatus 600 according to Embodiment 2.
Figure 17:
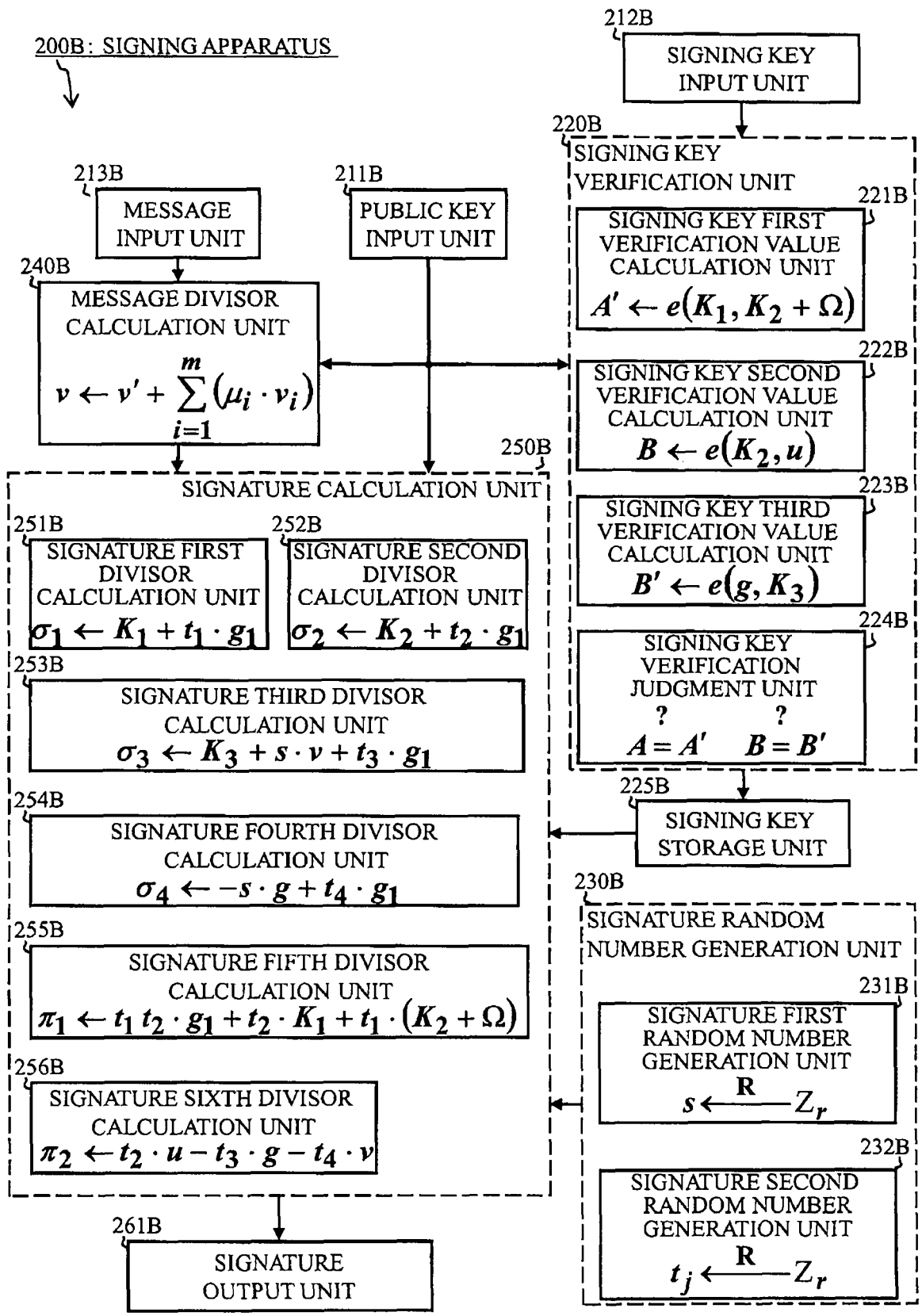
FIG. 17 is a block diagram showing an example of a functional block configuration of a signing apparatus 200B according to Embodiment 2.
Figure 18:
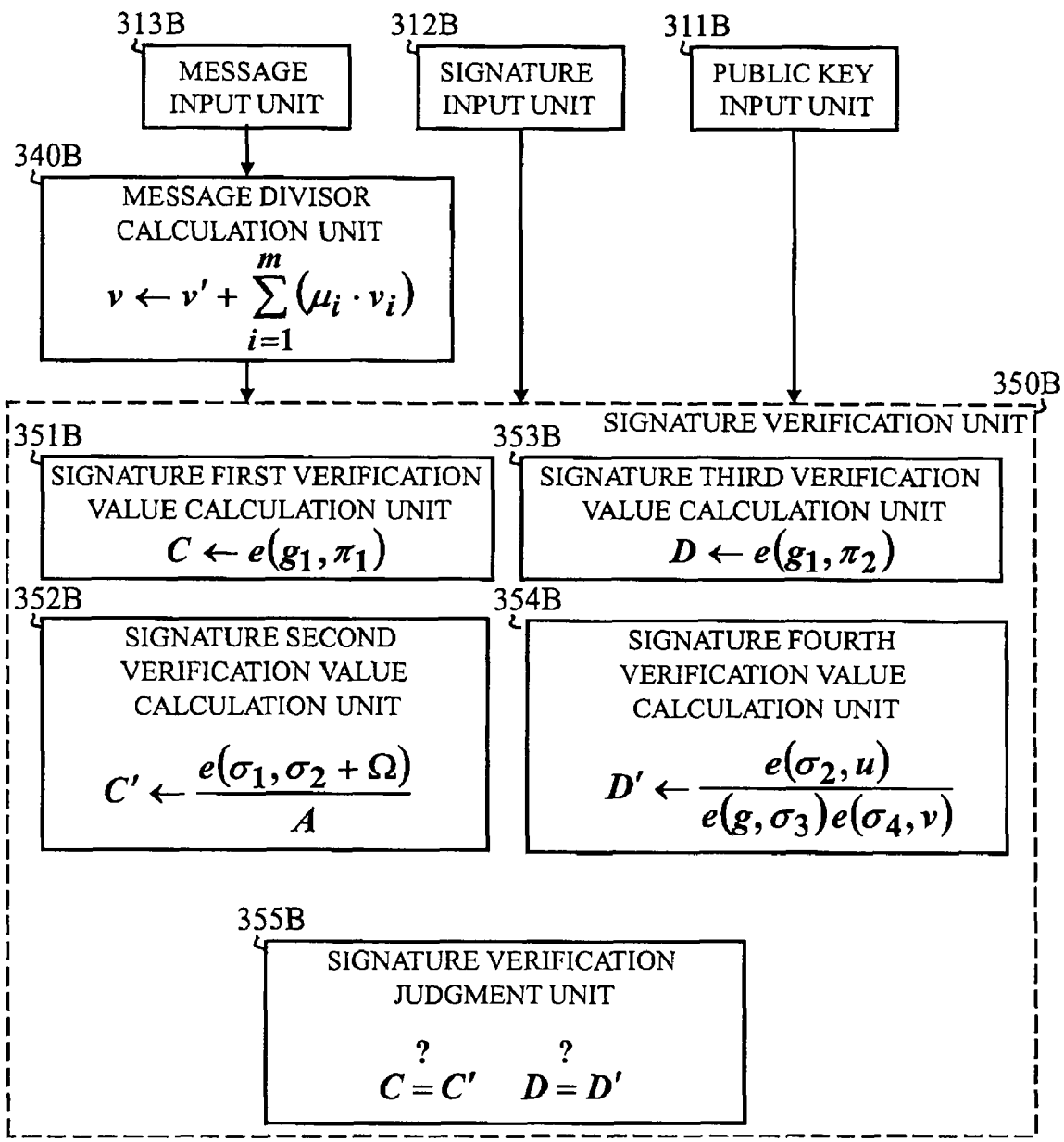
FIG. 18 is a block diagram showing an example of a functional block configuration of a signature verification apparatus 300E according to Embodiment 2.
Figure 19:
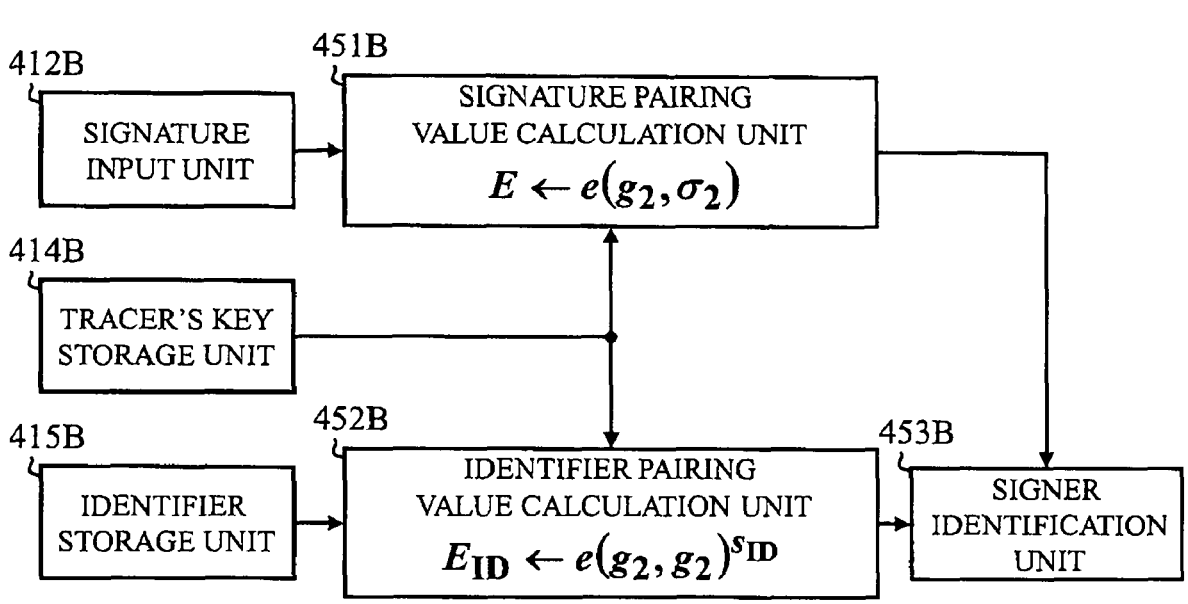
FIG. 19 is a block diagram showing an example of a functional block configuration of a signer tracing apparatus 400B according to Embodiment 2.

REFERENCE SIGNS LIST 100,100B Encryption parameter setting apparatus, 110 Security parameter input unit, 120 Divisor group generation unit, 121 Order determination unit, 122 Random divisor selection unit, 123 Base divisor generation unit, 124 Discrete log calculation unit, 125 Pairing log calculation unit, 130 Condition storage unit, 140 Parameter setting unit, 141 Condition input unit, 142 Random matrix selection unit, 143 Output base calculation unit, 150 Key calculation unit, 151 Number-of-users input unit, 160 Random number generation unit, 161 Row random number generation unit, 162 Pairing random number generation unit, 163 Column random number generation unit, 164 Common random number generation unit, 170 Public key calculation unit, 171 Public row base calculation unit, 172 Public column base calculation unit, 173 Public common divisor calculation unit, 174 Public row first divisor calculation unit, 175 Public row second divisor calculation unit, 176 Public pairing value calculation unit, 177 Public column divisor calculation unit, 180 Private key calculation unit, 181 Private divisor calculation unit, 191 Public key setting unit, 192 Private key setting unit, 193 Tracer's key setting unit, 200 Ciphertext generation apparatus, 211 Public key input unit, 221 Plaintext input unit, 230 Encryption random number generation unit, 231 Encryption common random number generation unit, 232 Encryption row random number generation unit, 233 Encryption column random number generation unit, 240 Row ciphertext generation unit, 241 Encryption row first divisor calculation unit, 242 Encryption row second divisor calculation unit, 243 Encryption row third divisor calculation unit, 244 Encryption key calculation unit, 245 Plaintext encryption unit, 250 Column ciphertext generation unit, 251 Encryption column first divisor calculation unit, 252 Encryption column second divisor calculation unit, 261 Row ciphertext setting unit, 262 Column ciphertext setting unit, 300 Ciphertext decryption apparatus, 311 Ciphertext input unit, 321 Index storage unit, 322 Row ciphertext input unit, 323 Column ciphertext input unit, 331 Private key storage unit, 340 Decrypted text generation unit, 341 Decryption key calculation unit, 342 Ciphertext decryption unit, 400 Wrongdoer tracing apparatus, 411 Tracer's key storage unit, 421 Target determination unit, 422 Tracing plaintext generation unit, 430 Tracing random number generation unit, 431 Tracing common random number generation unit, 432 Tracing row random number generation unit, 433 Tracing column random number generation unit, 434 disturbance row random number generation unit, 435 disturbance column random number generation unit, 440 Tracing row ciphertext generation unit, 441 Tracing row first divisor calculation unit, 442 Tracing row second divisor calculation unit, 443 Tracing row third divisor calculation unit, 444 Tracing encryption key calculation unit, 445 Tracing plaintext encryption unit, 450 Tracing column ciphertext generation unit, 451 Tracing column first divisor calculation unit, 452 Tracing column second divisor calculation unit, 461 Row ciphertext Setting unit, 462 Column ciphertext setting unit, 463 Ciphertext output unit, 471 Decrypted text input unit, 472 Leak source identification unit, 500 Key generation apparatus, 511 Base divisor storage unit, 512 Pairing log storage unit, 150B Key calculation unit, 151B Bit length input unit, 160B Random number generation unit, 161B Pairing random number generation unit, 162B Master random number generation unit, 163B Base random number generation unit, 170B Public key calculation unit, 171B Public base calculation unit, 172B Public first divisor calculation unit, 173B Public pairing value calculation unit, 174B Public second divisor generation unit, 175B Public third divisor generation unit, 176B Public bit divisor generation unit, 180B Master key calculation unit, 181E Master divisor calculation unit, 191B Public key setting unit, 192B Master key setting unit, 193B Tracer's key setting unit, 600 Signing key issuing apparatus, 154C Issue request input unit, 155C Issued identifier storage unit, 156C Master key storage unit, 157C Public key input unit, 160C Identifier generation unit, 180C Signing key calculation unit, 184C Signing first key calculation unit, 185C Signing second key calculation unit, 186C Signing third key calculation unit, 194C Identifier setting unit, 195C Signing key setting unit, 200B Signing apparatus, 211B Public key input unit, 212B Signing key input unit, 213B Message input unit, 220B Signing key verification unit, 221B Signing key first verification value calculation unit, 222B Signing key second verification value calculation unit, 223B Signing key third verification value calculation unit, 224B Signing key verification judgment unit, 225B Signing key storage unit, 230B Signature random number generation unit, 231B Signature first random number generation unit, 232B Signature second random number generation unit, 240B Message divisor calculation unit, 250B Signature calculation unit, 251B Signature first divisor calculation unit, 252B Signature second divisor calculation unit, 253B Signature third divisor calculation unit, 254B Signature fourth divisor calculation unit, 255B Signature fifth divisor calculation unit, 256B Signature sixth divisor calculation unit, 261B Signature output unit, 300B Signature verification apparatus, 311B Public key input unit, 312B Signature input unit, 313B Message input unit, 340B Message divisor calculation unit, 350B Signature verification unit, 351B Signature first verification value calculation unit, 352B Signature second verification value calculation unit, 353B Signature third verification value calculation unit, 354B Signature fourth verification value calculation unit, 355B Signature verification judgment unit, 400B Signer tracing apparatus, 412B Signature input unit, 414B Tracer's key storage unit, 415B Identifier storage unit, 451B Signature pairing value calculation unit, 452B Identifier pairing value calculation unit, 453B Signer identification unit, 800,800B Cryptographic system, 901 Display device, 902 Keyboard, 903 Mouse, 904 FDD, 905 CDD, 906 Printer device, 907 Scanner device, 910 System unit, 911 CPU, 912 Bus, 913 ROM, 914 RAM, 915 Communication device, 920 Magnetic disk drive, 921 OS, 922 Window system, 923 Program group, 924 File group, 931 Telephone, 932 Facsimile, 940 Internet, 941 Gateway, 942 LAN

The invention claimed is:

1. An encryption parameter setting apparatus comprising:
a processing device for processing data; a random divisor selection unit; a base divisor generation unit; a pairing log calculation unit; and a parameter setting unit,
wherein the random divisor selection unit selects an element from a plurality of elements of a cyclic group G', as a random divisor $D^*$, by using the processing device;
the base divisor generation unit calculates a plurality of base divisors $D^-_j$ by mapping the random divisor $D^*$ by using a plurality of maps $G_j$, where the plurality of maps $G_j$ are homomorphism from the cyclic group G' to each of a plurality of cyclic groups $G'_j$, based on the random divisor $D^*$ selected by the random divisor selection unit, by using the processing device;
the pairing log calculation unit calculates logarithms of pairing values of the plurality of base divisors $D^-_j$ in a group G, where the group G is a direct product of the plurality of cyclic groups $G'_j$, and a pairing value by a bilinear pairing operation of two elements included in the group G is computable, and treats the logarithms as a plurality of pairing log coefficients $\eta_i$, by using the processing device; and
the parameter setting unit treats the plurality of base divisors $D^-_j$ calculated by the base divisor generation unit and the plurality of pairing log coefficients $\eta_i$ calculated by the pairing log calculation unit, as encryption parameters used in a cryptographic operation, by using the processing device.

2. The encryption parameter setting apparatus according to claim 1,
wherein the random divisor selection unit selects an element from a plurality of elements of a cyclic group G' which is a subgroup of a group composed of divisors of a Jacobian variety $Jac_c$ of an algebraic curve C in a finite field $F_p$, as a random divisor $D^*$, by using the processing device; and
the base divisor generation unit calculates the plurality of base divisors $D^-_j$ by treating a plurality of endomorphism maps in a group composed of divisors of a Jacobian variety $Jac_C$ of an algebraic curve C in an extension field K given by a finite algebraic extension of the finite field $F_p$, as the plurality of maps $G_j$, by using the processing device.

3. A cryptographic system comprising:
an encryption parameter setting apparatus according to claim 1; and a key generation apparatus,
wherein the key generation apparatus includes a second processing device for processing data, a storage device for storing data, a base divisor storage unit, a pairing log storage unit, an output base calculation unit, and a key calculation unit;
the base divisor storage unit stores a plurality of base divisors $D^{-hd\ j}$ calculated by the encryption parameter setting apparatus, by using the storage device;
the pairing log storage unit stores a plurality of pairing log coefficients $\eta$ calculated by the encryption parameter setting apparatus, by using the storage device;
the output base calculation unit calculates a plurality of output bases $g_k$ being elements of the group G, where a pairing value of at least any two output bases $g_k$ in the plurality of output bases $g_k$ is 1, based on the plurality of base divisors $D^-_j$ stored by the base divisor storage unit and the plurality of pairing log coefficients $n_i$ stored by the pairing log storage unit, by using the second processing device; and
the key calculation unit calculates a key to be used in a cryptographic operation, based on the plurality of output bases $g_k$ calculated by the output base calculation unit, by using the second processing device.

4. The cryptographic system according to claim 3, further comprising a ciphertext generation apparatus; and a ciphertext decryption apparatus,
wherein the ciphertext generation apparatus generates a ciphertext, based on an encryption parameter set by the encryption parameter setting apparatus and a key generated by the key generation apparatus; and
the ciphertext decryption apparatus decrypts the ciphertext generated by the ciphertext generation apparatus, based on the encryption parameter set by the encryption parameter setting apparatus and the key generated by the key generation apparatus.

5. The cryptographic system according to claim 4, including a plurality of ciphertext decryption apparatuses, further comprising a wrongdoer tracing apparatus,
wherein the key generation apparatus further includes a public key setting unit, a private key setting unit, and a tracer's key setting unit;
the public key setting unit sets a public key to be used for generating a ciphertext by the ciphertext generation apparatus;
the private key setting unit sets a plurality of private keys to be used for decrypting the ciphertext, generated by the ciphertext generation apparatus, by each of the plurality of ciphertext decryption apparatuses;
the tracer's key setting unit sets a tracer's key to be used for identifying a leak source of a private key by the wrongdoer tracing apparatus;
the ciphertext generation apparatus generates a ciphertext, based on the public key set by the key generation apparatus;
each of the plurality of ciphertext decryption apparatuses decrypts the ciphertext generated by the ciphertext generation apparatus, based on the private key corresponding to a user of the ciphertext decryption apparatus in the plurality of private keys set by the key generation apparatus; and
the wrongdoer tracing apparatus, based on the tracer's key set by the key generation apparatus, generates a ciphertext, analyzes a decryption result of a generated ciphertext decrypted by a pirate decryption device which decrypts a ciphertext generated by the ciphertext generation apparatus, and identifies a private key having been used for decrypting the ciphertext by the pirate decryption device.

6. The cryptographic system according to claim 3, further comprising a signing key issuing apparatus; a plurality of signing apparatuses; a signature verification apparatus; and a signer tracing apparatus,
wherein the signing key issuing apparatus generates a plurality of signing keys respectively corresponding to the plurality of signing apparatuses, based on an encryption parameter set by the encryption parameter setting apparatus and a key generated by the key generation apparatus;
at least any signing apparatus of the plurality of signing apparatuses generates a signature by using a signing key corresponding to the signing apparatus in the plurality of signing keys generated by the signing key issuing apparatus;
the signature verification apparatus verifies the signature generated by the signing apparatus, by using the encryption parameter set by the encryption parameter setting apparatus and the key generated by the key generation apparatus; and
the signer tracing apparatus analyzes the signature generated by the signing apparatus, and identifies the signing apparatus used for generating the signature, by using the encryption parameter set by the encryption parameter setting apparatus and the key generated by the key generation apparatus.

7. A non-transitory computer readable storage medium having stored therein computer executable instructions that cause a computer, having a processing device for processing data, to operate as the encryption parameter setting apparatus according to claim 1.

8. An encryption parameter setting apparatus comprising:
a processing device for processing data; a random divisor selection unit; a base divisor generation unit; a discrete log calculation unit; a pairing log calculation unit; and a parameter setting unit,
wherein the random divisor selection unit selects a random divisor $D^*$ from a plurality of divisors of a Jacobian variety $Jac_C$ of an algebraic curve C of genus d in a finite field $F_p$, where an order p of the finite field $F_p$ is a prime number, and the genus d is an integer greater than or equal to 2, by using the processing device;
the base divisor generation unit calculates a plurality of base divisors $D^-_j$, based on the random divisor $D^*$ selected by the random divisor selection unit, by using the processing device;
the discrete log calculation unit calculates a plurality of discrete logs $l_K$, by using the processing device;
the pairing log calculation unit calculates a plurality of pairing log coefficients $\eta_i$, based on the plurality of discrete logs $l_k$ calculated by the discrete log calculation unit, by using the processing device; and
the parameter setting unit sets an encryption parameter to be used in a cryptographic operation, based on the plurality of base divisors $D^-_j$ calculated by the base divisor generation unit and the plurality of pairing log coefficients $\eta_i$ calculated by the pairing log calculation unit, by using the processing device.

9. The encryption parameter setting apparatus according to claim 8,
wherein the random divisor selection unit selects a random divisor $D^*$ from a plurality of divisors of a Jacobian variety $Jac_C$ of a hyperelliptic curve $C:Y^2=X^w+1$, where w is a prime number of $w=2d+1$, and a remainder a of the order p divided by the prime number w is a generator of a multiplicative group $F_W^*$ of a finite field $F_W$ whose order is W, in the finite field $F_p$, by using the processing device;
the base divisor generation unit calculates, by applying Gauss sum operators $G_j$ to the random divisor $D^*$, where j is an integer greater than or equal to 0 and less than or equal to 2d-1, the Gauss sum operators $G_j$ is an operation on a Jacobian variety $Jac_C$ in an extension field K shown in Expression 1, and the extension field K is an algebraic extension field given by a 2d-th order extension of the finite field $F_p$, a plurality of base divisors $D^-_j=G_j(D^*)$ of the Jacobian variety $Jac_C$ in the extension field K, based on the random divisor $D^*$ selected by the random divisor selection unit, by using the processing device;
the discrete log calculation unit calculates a plurality of discrete logs $l_K$ satisfying Expression 2, where K is an integer greater than or equal to 1 and less than or equal to 2d-1, and the plurality of discrete logs $l_K$ are integers greater than or equal to 0 and less than or equal to 2d-1, based on the remainder a, by using the processing device; and
the pairing log calculation unit calculates a plurality of pairing log coefficients $\eta_i$, where i is an integer greater than or equal to 0 and less than or equal to 2d-1, the plurality of pairing log coefficients $\eta_i$ are integers greater than or equal to 0 and less than or equal to r-1, and r is an order of the random divisor $D^*$, by calculating an expression shown in Expression 3, based on the plurality of discrete logs $l_K$ calculated by the discrete log calculation unit, by using the processing device.

$$G_j = \sum_{i=0}^{2d-1} \{p^{i \cdot j} \cdot \rho^{a^i}\} \quad \text{[Expression 1]}$$

where ρ is an operation on the Jacobian variety $Jac_C$ corresponding to an operation $(x,y) \rightarrow (\xi x, y)$ on the hyperelliptic curve C in the extension field K, and ξ is a w-th root of 1

$$a^\kappa - 1 \equiv a^{l_k} \bmod w \quad \text{[Expression 2]}$$

$$\eta_i = \left(\sum_{k=1}^{2d-1} p^{l_k + i \cdot \kappa}\right) \bmod r. \quad \text{[Expression 3]}$$

10. A key generation apparatus comprising:
a processing device for processing data; a storage device for storing data; a base divisor storage unit; a pairing log storage unit; a random matrix selection unit; an output base calculation unit; and a key calculation unit,
wherein the base divisor storage unit stores a plurality of base divisors $D^\sim_j$ calculated by an encryption parameter setting apparatus according to claim 9, by using the storage device;
the pairing log storage unit stores a plurality of pairing log coefficients $\eta_i$ calculated by the encryption parameter setting apparatus, by using the storage device;
the random matrix selection unit randomly selects a random matrix V* from a plurality of matrices V satisfying a relational expression $M'=V \cdot M \cdot V^T$, where M' is a b-dimensional square matrix in which an integer $m'_{\mu\nu}$ is a μ-th row and ν-th column element, V is a b row by 2d column matrix in which a variable $c_{\mu\nu}$ whose value is an integer greater than or equal to 0 and less than or equal to r−1 is a μ-th row and ν-th column element, $V^T$ is a 2d row by b column matrix transposed from the matrix V, M is a 2d-dimensional square matrix in which an integer $m_{\mu\nu}$ is a μ-th row and ν-th column element, and the integer $m_{\mu\nu}$ is $\eta_{\nu+1}$ when μ+ν=2d+1 and 0 when μ+ν≠2d+1, based on a predetermined condition that should be satisfied by a plurality of integers $m'_{\mu\nu}$ where μ and ν are integers greater than or equal to 1 and less than or equal to b, and b is an integer greater than or equal to 2 and less than or equal to 2d, by using the processing device;
the output base calculation unit calculates a plurality of output bases $g_k=v_k \cdot D^\sim$, where k is an integer greater than or equal to 1 and less than or equal to b, $g_k$ is a divisor of a Jacobian variety $Jac_C$ in the extension field K, $v_k$ is a k-th row vector of the random matrix V*, and $D^\sim$ is a 2d-dimensional column vector which uses the plurality of base divisors $D^\sim_j$ as a (j+1)th row element, based on the plurality of base divisors $D^\sim_j$ stored by the base divisor storage unit and the random matrix V* selected by the random matrix selection unit, by using the processing device; and
the key calculation unit calculates a key to be used in a cryptographic operation, based on the plurality of output bases $g_k$ calculated by the output base calculation unit and the random matrix V* selected by the random matrix selection unit, by using the processing device.

11. The key generation apparatus according to claim 10, further comprising a consistent condition input unit,
wherein the consistent condition input unit inputs an integer pair (μ,ν) indicating an output base pair whose pairing value $e(g_\mu,g_\nu)$ of an output base $g_\mu$ and an output base $g_\nu$ in the plurality of output bases $g_k$ should be 1, by using the processing device; and
the random matrix selection unit selects a random matrix V* satisfying a condition $m'_{\mu\nu}=0$, based on the integer pair (μ,ν) input by the consistent condition input unit, by using the processing device.

12. The key generation apparatus according to claim 10, further comprising an inconsistent condition input unit,
wherein the inconsistent condition input unit inputs an integer pair (μ,ν) indicating an output base pair whose pairing value $e(g_\mu,g_\nu)$ of an output base $g_\mu$ and an output base $g_\nu$ in the plurality of output bases $g_k$ should not be 1, by using the processing device; and
the random matrix selection unit selects a random matrix V* satisfying a condition $m'_{\mu\nu} \neq 0$, based on the integer pair (μ,ν) input by the inconsistent condition input unit, by using the processing device.

13. A cryptographic system comprising:
an encryption parameter setting apparatus according to claim 9; a key generation apparatus; a ciphertext generation apparatus; and a ciphertext decryption apparatus;
wherein the key generation apparatus includes a second processing device for processing data, a storage device for storing data, a base divisor storage unit, a pairing log storage unit, a random matrix selection unit, an output base calculation unit, and a key calculation unit;
the base divisor storage unit stores a plurality of base divisors $D^\sim_j$ calculated by the encryption parameter setting apparatus, by using the storage device;
the pairing log storage unit stores a plurality of pairing log coefficients $n_j$ calculated by the encryption parameter setting apparatus, by using the storage device;
the random matrix selection unit randomly selects a random matrix V* from a plurality of matrices V satisfying a relational expression $M'=V \cdot M \cdot V^T$, where M' is a b-dimensional square matrix in which an integer $m'_{\mu\nu}$ is a μ-th row and ν-th column element, V is a b row by 2d column matrix in which a variable $c_{\mu\nu}$, whose value is an integer greater than or equal to 0 and less than or equal to r−1 is a μ-th row and ν-th column element, $V^T$ is a 2d row by b column matrix transposed from the matrix V, M is a 2d-dimensional square matrix in which an integer $m_{\mu\nu}$ is a μ-th row and ν-th column element, and the integer $m_{\mu\nu}$ is $\eta_{\nu+1}$ when μ+ν=2d+and 0 when μ+ν≠2d+1, based on a predetermined condition that should be satisfied by a plurality of integers $m'_{\mu\nu}$, where μ and ν are integers greater than or equal to 1 and less than or equal to b, and b is an integer greater than or equal to 2 and less than or equal to 2d, by using the second processing device;
the output base calculation unit calculates a plurality of output bases $g_k=v_k \cdot D^\sim$, where k is an integer greater than or equal to 1 and less than or equal to b, $g_k$ is a divisor of a Jacobian variety $Jac_C$ in the extension field K, $v_k$ is a k-th row vector of the random matrix V*, and $D^\sim$ is a 2d-dimensional column vector which uses the plurality of base divisors $D^\sim_j$ as a (j+1)th row element, based on the plurality of base divisors $D^\sim_j$ stored by the base divisor storage unit and the random matrix V* selected by the random matrix selection unit, by using the second processing device;
the key calculation unit calculates a key to be used in a cryptographic operation, based on the plurality of output bases $g_k$ calculated by the output base calculation unit and the random matrix V* selected by the random matrix selection unit, by using the second processing device;

the random divisor selection unit selects a random divisor D* from a plurality of divisors of a Jacobian variety $Jac_C$ of a hyperelliptic curve $C:Y^2=X^5+1$, where a remainder a of a prime number p divided by 5 is 2 or 3, in a finite field $F_p$, by using the processing device;

the random matrix selection unit selects a random matrix V* of 4 row by 4 column satisfying a condition: $m'_{12}=m'_{21}=m'_{34}=m'_{43}=m'_{14}=m'_{41}=m'_{23}=m'_{32}=0$, $m'_{11}\neq 0$, $m'_{22}\neq 0$, and $m'_{33}\neq 0$, and $m'_{44}\neq 0$, by using the second processing device;

the output base calculation unit calculates four output bases $g_k=v_k \cdot D^\sim$, where k is an integer greater than or equal to 1 and less than or equal to 4, based on the plurality of base divisors $D^\sim_j$ stored by the base divisor storage unit and the random matrix V* calculated by the random matrix selection unit, by using the second processing device;

the key calculation unit includes a number-of-users input unit, a public row base calculation unit, a public column base calculation unit, a row random number generation unit, a column random number generation unit, a pairing random number generation unit, a common random number generation unit, a public common divisor calculation unit, a public row first divisor calculation unit, a public row second divisor calculation unit, a public pairing value calculation unit, a public column divisor calculation unit, a public key setting unit, a private divisor calculation unit, and a private key setting unit;

the number-of-users input unit inputs an integer $n_1$ and an integer $n_2$, where $n=n_1 n_2$, indicating n being a number of users, by using the second processing device;

the public row base calculation unit calculates a divisor $g=g_1+g_2$ of the Jacobian variety $Jac_C$, based on an output base $g_1$ and an output base $g_2$ calculated by the output base calculation unit, by using the second processing device;

the public column base calculation unit calculates a divisor $h=g_3+g_4$ of the Jacobian variety $Jac_C$, based on an output base $g_3$ and an output base $g_4$ calculated by the output base calculation unit, by using the second processing device;

the row random number generation unit randomly generates $n_1$ random numbers $r_x$, where x is an integer greater than or equal to 1 and less than or equal to $n_1$, and the random number $r_x$ is an integer greater than or equal to 1 and less than or equal to r−1, based on the integer $n_1$ input by the number-of-users input unit, by using the second processing device;

the column random number generation unit randomly generates $n_2$ random numbers $c_y$, where y is an integer greater than or equal to 1 and less than or equal to $n_2$, and the random number $c_y$ is an integer greater than or equal to 1 and less than or equal to r−1, based on the integer $n_2$ input by the number-of-users input unit, by using the second processing device;

the pairing random number generation unit randomly generates $n_1$ random numbers $\alpha_x$, where x is an integer greater than or equal to 1 and less than or equal to $n_1$, and the random number $\alpha_x$ is an integer greater than or equal to 1 and less than or equal to r−1, based on the integer $n_1$ input by the number-of-users input unit, by using the second processing device;

the common random number generation unit randomly generates a random number $\beta$, where the random number $\beta$ is an integer greater than or equal to 1 and less than or equal to r−1, by using the second processing device;

the public common divisor calculation unit calculates a divisor $E=\beta \cdot g_2$ of the Jacobian variety $Jac_C$, based on the output base $g_2$ calculated by the output base calculation unit and the random number $\beta$ generated by the common random number generation unit, by using the second processing device;

the public row first divisor calculation unit calculates $n_1$ divisors $E_x=\beta \cdot r_x \cdot g_2$, where x is an integer greater than or equal to 1 and less than or equal to $n_1$, of the Jacobian variety $Jac_C$, based on the output base $g_2$ calculated by the output base calculation unit, the $n_1$ random numbers $r_x$ generated by the row random number generation unit, and the random number $\beta$ generated by the common random number generation unit, by using the second processing device;

the public row second divisor calculation unit calculates $n_1$ divisors $F_x=\beta \cdot r_x \cdot g_4$, where x is an integer greater than or equal to 1 and less than or equal to $n_1$, of the Jacobian variety $Jac_C$, based on the output base $g_4$ calculated by the output base calculation unit, the $n_1$ random numbers $r_x$ generated by the row random number generation unit, and the random number $\beta$ generated by the common random number generation unit, by using the second processing device;

the public pairing value calculation unit calculates $n_1$ pairing values $G_x=e(g_4,g_4)^{\beta \cdot \alpha_x}$, where the pairing e is $e(D, D')=e_W(D,\phi(D'))$, $e_W$ is a Weil pairing, and $\phi$ is a calculable homomorphism mapping on the Jacobian variety $Jac_C$), based on the output base $g_2$ calculated by the output base calculation unit, the $n_1$ random numbers $\alpha_x$ generated by the pairing random number generation unit, and the random number $\beta$ generated by the common random number generation unit, by using the second processing device;

the public column divisor calculation unit calculates $n_2$ divisors $H_y=c_y \cdot g$, where y is an integer greater than or equal to 1 and less than or equal to $n_2$, of the Jacobian variety $Jac_C$, based on the divisor g calculated by the public row base calculation unit and the $n_2$ random numbers $c_y$ generated by the column random number generation unit, by using the second processing device;

the public key setting unit sets a public key $PK=(g,h,E,E_x,F_x,G_x,H_y)$, where x is an integer greater than or equal to 1 and less than or equal to $n_1$, and y is an integer greater than or equal to 1 and less than or equal to $n_2$, based on the divisor g calculated by the public row base calculation unit, the divisor h calculated by the public column base calculation unit, the divisor E calculated by the public common divisor calculation unit, the $n_1$ divisors $E_x$ calculated by the public row first divisor calculation unit, the $n_1$ divisors $F_x$ calculated by the public row second divisor calculation unit, the $n_1$ pairing values $G_x$ calculated by the public pairing value calculation unit, and the $n_2$ divisors $H_y$ calculated by the public column divisor calculation unit, by using the second processing device;

the private divisor calculation unit calculates n divisors $K_{x,y}=\alpha_x \cdot g+r_x c_y \cdot g$, where x is an integer greater than or equal to 1 and less than or equal to $n_1$, and y is an integer greater than or equal to 1 and less than or equal to $n_2$, based on the divisor g calculated by the public row base calculation unit, the $n_1$ random numbers $r_x$ generated by the row random number generation unit, the $n_2$ random numbers $c_y$ generated by the column random number generation unit, and the $n_1$ random numbers $\alpha_x$ generated by the pairing random number generation unit, by using the second processing device;

the private key setting unit sets n private keys $SK_{x,y}=(K_{x,y})$ respectively corresponding to n users, based on the n divisors $K_{x,y}$ calculated by the private divisor calculation unit, by using the second processing device;

the ciphertext generation apparatus includes a third processing device for processing data, a public key input unit, a plaintext input unit, an encryption common random number generation unit, an encryption column random number generation unit, an encryption row random number generation unit, an encryption row first divisor calculation unit, an encryption row second divisor calculation unit, an encryption row third divisor calculation unit, an encryption key calculation unit, a plaintext encryption unit, a row ciphertext setting unit, an encryption column first divisor calculation unit, an encryption column second divisor calculation unit, and a column ciphertext setting unit;

the public key input unit inputs the public key $PK=(g,h,E,E_x,F_x,G_x,H_y)$ set by the key generation apparatus, by using the third processing device;

the plaintext input unit inputs a plaintext M to be encrypted, by using the third processing device;

the encryption common random number generation unit randomly generates a random number t, where the random number t is an integer greater than or equal to 1 and less than or equal to r−1, by using the third processing device;

the encryption column random number generation unit generates $n_2$ or less random numbers $w_y$, where y is an integer greater than or equal to 1 and less than or equal to $n_2$, and the random number $w_y$ is an integer greater than or equal to 1 and less than or equal to r−1, by using the third processing device;

the encryption row random number generation unit generates $n_1$ or less random numbers $s_x$, where x is an integer greater than or equal to 1 and less than or equal to $n_1$, and the random number $s_x$ is an integer greater than or equal to 1 and less than or equal to r−1, by using the third processing device;

the encryption row first divisor calculation unit calculates $n_1$ or less divisors $R_x=s_x \cdot E_x$, where x is an integer greater than or equal to 1 and less than or equal to $n_1$, of a Jacobian variety $Jac_C$, based on the $n_1$ divisors $E_x$ included in the public key PK input by the public key input unit and the $n_1$ or less random numbers $s_x$ generated by the encryption row random number generation unit, by using the third processing device;

the encryption row second divisor calculation unit calculates $n_1$ or less divisors $R^\sim_x=s_x \cdot F_x$, where x is an integer greater than or equal to 1 and less than or equal to $n_1$, of the Jacobian variety $Jac_C$, based on the $n_1$ divisors $F_x$ included in the public key PK input by the public key input unit, and the $n_1$ or less random numbers $s_x$ generated by the encryption row random number generation unit, by using the third processing device;

the encryption row third divisor calculation unit calculates $n_1$ or less divisors $A_x=s_x t \cdot E$, where x is an integer greater than or equal to 1 and less than or equal to $n_1$, of the Jacobian variety $Jac_C$, based on the divisor E included in the public key PK input by the public key input unit, the random number t generated by the encryption common random number generation unit, and the $n_1$ or less random numbers $s_x$ generated by encryption row random number generation unit, by using the third processing device;

the encryption key calculation unit calculates $n_1$ or less pairing values $CK_x=G_x^{s_x t}$, where x is an integer greater than or equal to 1 and less than or equal to $n_1$, based on the $n_1$ pairing values $G_x$ included in the public key PK input by the public key input unit, the random number t generated by the encryption common random number generation unit, and the $n_1$ or less random numbers $s_x$ generated by the encryption column random number generation unit, by using the third processing device;

the plaintext encryption unit generates, based on the plaintext M input by the plaintext input unit and the $n_1$ or less pairing values $CK_x$ calculated by the encryption key calculation unit, $n_1$ or less ciphertexts $B_x$, where x is an integer greater than or equal to 1 and less than or equal to $n_1$, by encrypting the plaintext M by respectively using the $n_1$ or less pairing values $CK_x$ as encryption keys, by using the third processing device;

the row ciphertext setting unit sets $n_1$ or less row ciphertexts $CT_x=(R_x,R^\sim_x,A_x,B_x)$, where x is an integer greater than or equal to 1 and less than or equal to $n_1$, based on the $n_1$ or less divisors $R_x$ calculated by the encryption row first divisor calculation unit, the $n_1$ or less divisors $R^\sim_x$ calculated by the encryption row second divisor calculation unit, the $n_1$ or less divisors $A_x$ calculated by the encryption row third divisor calculation unit, and the $n_1$ or less ciphertexts $B_x$ generated by the plaintext encryption unit, by using the third processing device;

the encryption column first divisor calculation unit calculates $n_2$ or less divisors $C_y=t \cdot H_y+w_y \cdot h$, where y is an integer greater than or equal to 1 and less than or equal to $n_2$, of the Jacobian variety $Jac_C$, based on the divisors h and $H_y$ included in the public key PK input by the public key input unit, the random number t generated by the encryption common random number generation unit, and the random number $w_y$ generated by the encryption column random number generation unit, by using the third processing device;

the encryption column second divisor calculation unit calculates $n_2$ or less divisors $C^\sim_y=w_y \cdot g$, where y is an integer greater than or equal to 1 and less than or equal to $n_2$, of the Jacobian variety $Jac_C$, based on the divisor g included in the public key PK input by the public key input unit and the random number $w_y$ generated by the encryption column random number generation unit, by using the third processing device;

the column ciphertext setting unit sets $n_2$ or less column ciphertexts $CT_y=(C_y,C^\sim_y)$, where y is an integer greater than or equal to 1 and less than or equal to $n_2$, based on the $n_2$ or less divisors $C_y$ calculated by the encryption column first divisor calculation unit and the $n_2$ or less divisors $C^\sim_y$ calculated by the encryption column second divisor calculation unit, by using the third processing device;

the ciphertext decryption apparatus includes a second storage device for storing data, a fourth processing device for processing data, a private key storage unit, a row ciphertext input unit, a column ciphertext input unit, a decryption key calculation unit, and a ciphertext decryption unit;

the private key storage unit stores a private key $SK_{X,Y}=(K_{X,Y})$ corresponding to predetermined indexes X and Y, where X is an integer greater than or equal to 1 and less than or equal to $n_1$ and Y is an integer greater than or equal to 1 and less than or equal to $n_2$, corresponding to a user of the ciphertext decryption apparatus, in the n private keys $SK_{x,y}$ set by the key generation apparatus, by using the second storage device;

the row ciphertext input unit inputs a row ciphertext $CT_X = (R_X, R^\sim_X, A_X, B_X)$ corresponding to the index X, in the $n_1$ or less row ciphertexts $CT_x$ set by the ciphertext generation apparatus, by using the fourth processing device;

the column ciphertext input unit inputs a column ciphertext $CT_Y = (C_Y, C^\sim_Y)$ corresponding to the index Y, in the $n_2$ or less column ciphertexts $CT_y$ set by the ciphertext generation apparatus, by using the fourth processing device;

the decryption key calculation unit calculates a pairing value $CK' = e(K_{X,Y}, A_X) \cdot e(R^\sim_X, C^\sim_Y)/e(C_Y, R_X)$, based on the private key $SK_{X,Y}$ stored by the private key storage unit, the divisors $R_x$, $R^\sim_x$ and $A_x$ included in the row ciphertext $CT_X$ input by the row ciphertext input unit, the divisors $C_y$ and $C^\sim_y$ included in the column ciphertext $CT_y$ input by the column ciphertext input unit, by using the fourth processing device; and the ciphertext decryption unit generates, based on a ciphertext $B_X$ included in the row ciphertext $CT_x$ input by the row ciphertext input unit and the pairing value CK' calculated by the decryption key calculation unit, a decrypted text M' by decrypting the ciphertext $B_x$ by using the pairing value CK' as a decryption key, by using the fourth processing device.

14. The cryptographic system according to claim 13, including a plurality of ciphertext decryption apparatuses, further comprising a wrongdoer tracing apparatus, wherein the key calculation unit further includes a tracer's key setting unit;

the tracer's key setting unit sets a tracer's key $TK = (g_k, r_x, \alpha_x, c_y)$, where k is an integer greater than or equal to 1 and less than or equal to 4, x is an integer greater than or equal to 1 and less than or equal to $n_1$, and y is an integer greater than or equal to 1 and less than or equal to $n_2$, based on the four output bases $g_k$ calculated by the output base calculation unit, the $n_1$ random numbers $r_x$ generated by the row random number generation unit, the $n_1$ random numbers $\alpha_x$ generated by the pairing random number generation unit, and the $n_2$ random numbers $c_y$ generated by the column random number generation unit, by using the second processing device;

the wrongdoer tracing apparatus includes a third storage device for storing data, a fifth processing device for processing data, a tracer's key storage unit, a target determination unit, a tracing plaintext generation unit, a tracing common random number generation unit, a tracing column random number generation unit, a tracing row random number generation unit, a disturbance row random number generation unit, a disturbance column random number generation unit, a tracing row first divisor calculation unit, a tracing row second divisor calculation unit, a tracing row third divisor calculation unit, a tracing encryption key calculation unit, a tracing plaintext encryption unit, a tracing row ciphertext setting unit, a tracing column first divisor calculation unit, a tracing column second divisor calculation unit, a tracing column ciphertext setting unit, a decrypted text input unit, and a leak source identification unit;

the tracer's key storage unit stores the tracer's key $TK = (g_k, r_x, \alpha_x, c_y)$ set by the key generation apparatus, by using the third storage device;

the target determination unit classifies the index x into three groups and the index y into two groups, by using the fifth processing device;

the tracing plaintext generation unit generates a plaintext M by using the fifth processing device;

the tracing common random number generation unit randomly generates a random number t, where the random number t is an integer greater than or equal to 1 and less than or equal to r, by using the fifth processing device;

the tracing column random number generation unit randomly generates $n_2$ or less random numbers $w_y$, where y is an integer greater than or equal to 1 and less than or equal to $n_2$, and the random number $w_y$ is an integer greater than or equal to 1 and less than or equal to r−1, by using the fifth processing device;

the tracing row random number generation unit randomly generates $n_1$ or less random numbers $s_x$, where x is an integer greater than or equal to 1 and less than or equal to $n_1$, and the random number $s_x$ is an integer greater than or equal to 1 and less than or equal to r−1 by using the fifth processing device;

the disturbance row random number generation unit randomly generates $n_1$ or less random numbers $v_{x,1}$, where x is an integer greater than or equal to 1 and less than or equal to $n_1$, and the random number $v_{x,1}$ is an integer greater than or equal to 1 and less than or equal to r−1, $n_1$ or less random numbers $v_{x,2}$, where x is an integer greater than or equal to 1 and less than or equal to $n_1$, and the random number $v_{x,2}$ is an integer greater than or equal to 1 and less than or equal to r−1, and $n_1$ or less random numbers $v_{x,3}$, where x is an integer greater than or equal to 1 and less than or equal to $n_1$, and the random number $v_{x,3}$ is an integer greater than or equal to 1 and less than or equal to r−1, by using the fifth processing device;

the disturbance column random number generation unit randomly generates $n_2$ or less random numbers $z_{p,y}$, where y is an integer greater than or equal to 1 and less than or equal to $n_2$, and the random number $z_{p,y}$ is an integer greater than or equal to 1 and less than or equal to r−1, by using the fifth processing device;

the tracing row first divisor calculation unit calculates a divisor $R_x = s_x r_x \cdot g_2$, where x is an integer greater than or equal to 1 and less than or equal to $n_f$, with respect to the index x belonging to a first group in the three groups, a divisor $R_x = s_x r_x \cdot (g_1 + g_2)$, where x is an integer greater than or equal to 1 and less than or equal to $n_1$, with respect to the index x belonging to a second group in the three groups, and a divisor $R_x = v_{x,1} \cdot (g_1 + g_2)$, where x is an integer greater than or equal to 1 and less than or equal to $n_1$, with respect to the index x belonging to a third group in the three groups, based on divisors $g_1$ and $g_2$ and the $n_1$ random numbers $r_x$ included in the tracer's key TK stored by the tracer's key storage unit, the three groups of the index x classified by the target determination unit, the $n_1$ or less random numbers $s_x$ generated by the tracing row random number generation unit, and the $n_1$ or less random numbers $v_{x,1}$ generated by the disturbance row random number generation unit, by using the fifth processing device;

the tracing row second divisor calculation unit calculates a divisor $R^\sim_x = s_x r_x \cdot g_4$, where x is an integer greater than or equal to 1 and less than or equal to $n_f$, with respect to the index x belonging to the first group in the three groups, a divisor $R^\sim_x s_x r_x \cdot (g_3 + g_4)$, where x is an integer greater than or equal to 1 and less than or equal to $n_1$, with respect to the index x belonging to the second group in the three groups, and a divisor $R^\sim_x = v_{x,1} \cdot (g_3 + g_4)$, where x is an integer greater than or equal to 1 and less than or equal to $n_1$, with respect to the index x belonging to the third group in the three groups, based on divisors $g_3$ and $g_4$ and the $n_1$ random numbers $r_x$ included in the tracer's key TK stored by the tracer's key storage unit, the three groups of the index x classified by the target determination unit, the $n_1$ or less random numbers $s_x$ generated by the tracing row random number generation unit, and the $n_1$ or less random numbers $v_{x,1}$ generated by the disturbance row random number generation unit, by using the fifth processing device;

the tracing row third divisor calculation unit calculates a divisor $A_x = s_x \cdot t \cdot g_2$, where x is an integer greater than or equal to 1 and less than or equal to $n_1$, with respect to the index x belonging to the first group in the three groups, a divisor $A_x = s_x t \cdot (g_1 + g_2)$, where x is an integer greater than or equal to 1 and less than or equal to $n_1$, with respect to the index x belonging to the second group in the three groups, and a divisor $A_x = v_{x,2} \cdot (g_1 + g_2)$, where x is an integer greater than or equal to 1 and less than or equal to $n_1$, with respect to the index x belonging to the third group in the three groups, based on the divisors $g_1$ and $g_2$ included in the tracer's key TK stored by the tracer's key storage unit, the three groups of the index x classified by the target determination unit, the random number t generated by the tracing common random number generation unit, the $n_1$ or less random numbers $s_x$ generated by the tracing row random number generation unit, and the $n_1$ or less random numbers $v_{x,2}$ generated by the disturbance row random number generation unit, by using the fifth processing device;

the tracing encryption key calculation unit calculates a pairing value $CK_x = e(g_2, g_2)^{\alpha_x s_x t}$, where x is an integer greater than or equal to 1 and less than or equal to $n_1$, with respect to the index x belonging to the first group in the three groups, a pairing value $CK_x = e(g_1+g_2, g_1+g_2)^{\alpha_x s_x t}$, where x is an integer greater than or equal to 1 and less than or equal to $n_1$, with respect to the index x belonging to the second group in the three groups, and a pairing value $CK_x + e(g_1+g_2, g_1+g_2)^{v_{x,2}}$, where x is an integer greater than or equal to 1 and less than or equal to $n_1$, with respect to the index x belonging to the third group in the three groups, based on the divisors $g_1$ and $g_2$ and the $n_1$ random numbers $\alpha_x$ included in the tracer's key TK stored by the tracer's key storage unit, the three groups of the index x classified by the target determination unit, the $n_1$ or less random numbers $s_x$ generated by the tracing row random number generation unit, and the $n_1$ or less random numbers $v_{x,3}$ generated by the disturbance row random number generation unit, by using the fifth processing device;

the tracing plaintext encryption unit generates $n_1$ or less ciphertexts $B_x$, where x is an integer greater than or equal to 1 and less than or equal to $n_1$, by encrypting the plaintext M by respectively using the $n_1$ or less pairing values $CK_x$ as encryption keys, based on the $n_1$ or less pairing values $CK_x$ calculated by the tracing encryption key calculation unit and the plaintext M generated by the tracing plaintext generation unit, by using the fifth processing device;

the tracing row ciphertext setting unit sets $n_1$ or less row ciphertexts $CT_x = (R_x, R\tilde{}_x, A_x, B_x)$, where x is an integer greater than or equal to 1 and less than or equal to $n_1$, based on $n_1$ or less divisors $R_x$ calculated by the tracing row first divisor calculation unit, n1 or less divisors $R\tilde{}_x$ calculated by the tracing row second divisor calculation unit, $n_1$ or less divisors $A_x$ calculated by the tracing row third divisor calculation unit, and the $n_1$ or less ciphertexts $B_x$ generated by the tracing plaintext encryption unit, by using the fifth processing device;

the tracing column first divisor calculation unit calculates a divisor $C_y = tc_y \cdot (g_1+g_2) + w_y \cdot (g_3+g_4)$, where y is an integer greater than or equal to 1 and less than or equal to $n_2$, with respect to the index y belonging to a first group in the two groups, and a divisor $C_y = tc_y \cdot (g_3+g_4) + z_{p,y} \cdot g_1 + w_y \cdot (g_3+g_4)$, where y is an integer greater than or equal to 1 and less than or equal to $n_2$, with respect to the index y belonging to a second group in the two groups, based on the divisors $g_1$, $g_2$, $g_3$, and $g_4$, and the $n_2$ random numbers $c_y$ included in the tracer's key TK stored by the tracer's key storage unit, the two groups of the index y classified by the target determination unit, the random number t generated by the tracing common random number generation unit, the $n_2$ or less random numbers $w_y$ generated by the tracing column random number generation unit, and the n2 or less random numbers $z_{p,y}$ generated by the disturbance column random number generation unit, by using the fifth processing device;

the tracing column second divisor calculation unit calculates $n_2$ or less $C\tilde{}_y = w_y \cdot (g_1+g_2)$, where y is an integer greater than or equal to 1 and less than or equal to $n_2$, based on the divisors $g_1$ and $g_2$ included in the tracer's key TK stored by the tracer's key storage unit, and the $n_2$ or less random numbers $w_y$ generated by the tracing column random number generation unit, by using the fifth processing device;

the tracing column ciphertext setting unit sets $n_2$ or less column ciphertexts $CT_y = (C_y, C\tilde{}_y)$, where y is an integer greater than or equal to 1 and less than or equal to $n_2$, based on the $n_2$ or less divisors $C_y$ calculated by the tracing column first divisor calculation unit, and the $n_2$ or less divisors $C\tilde{}_y$ calculated by the tracing column second divisor calculation unit, by using the fifth processing device;

the decrypted text input unit inputs a decrypted text M' generated by decrypting a ciphertext, including the $n_1$ or less row ciphertexts $CT_x$ set by the tracing row ciphertext setting unit and the $n_2$ or less column ciphertexts $CT_y$ set by the tracing column ciphertext setting unit, by the pirate decryption device which decrypts a ciphertext generated by the ciphertext generation apparatus, by using the fifth processing device; and the leak source identification unit identifies a private key $K_{x,y}$ having been used for decryption by the pirate decryption device, by comparing the plaintext M generated by the tracing plaintext generation unit and the decrypted text M' input by the decrypted text input unit, by using the fifth processing device.

15. A cryptographic system comprising:

an encryption parameter setting apparatus according to claim 9; a key generation apparatus; a signing key issuing apparatus; a plurality of signing apparatuses; a signature verification apparatus; and a signer tracing apparatus;

wherein the key generation apparatus includes a second processing device for processing data, a storage device for storing data, a base divisor storage unit, a pairing log storage unit, a random matrix selection unit, an output base calculation unit, and a key calculation unit;

the base divisor storage unit stores a plurality of base divisors $D\tilde{}_j$ calculated by the encryption parameter setting apparatus, by using the storage device;

the pairing log storage unit stores a plurality of pairing log coefficients $n_j$ calculated by the encryption parameter setting apparatus, by using the storage device;

the random matrix selection unit randomly selects a random matrix V* from a plurality of matrices V satisfying a relational expression $M' = V \cdot M \cdot V^T$, where M' is a b-dimensional square matrix in which an integer $m'_{\mu\nu}$ is a μ-th row and v-th column element, V is a b row by 2d column matrix in which a variable $c_{\mu\nu}$ whose value is an integer greater than or equal to 0 and less than or equal to r−1 is a μ-th row and ν-th column element, $V^T$ is a 2d row by b column matrix transposed from the matrix V, M is a 2d-dimensional square matrix in which an integer $m_{\mu\nu}$ is a μ-th row and ν-th column element, and the integer $m_{\mu\nu}$ is $\eta_{\nu+1}$ when μ+ν=2d+1 and 0 when μ+ν≠2d+1, based on a predetermined condition that should be satisfied by a plurality of integers $m'_{\mu\nu}$, where μ and ν are integers greater than or equal to 1 and less than or equal to b, and b is an integer greater than or equal to 2 and less than or equal to 2d, by using the second processing device;

the output base calculation unit calculates a plurality of output bases $g_k = v_k \cdot D^-$, where k is an integer greater than or equal to 1 and less than or equal to b, $g_k$ is a divisor of a Jacobian variety $Jac_C$ in the extension field K, $v_k$ is a k-th row vector of the random matrix V*, and $D^-$ is a 2d-dimensional column vector which uses the plurality of base divisors $D^-_j$ as a (j+1)th row element, based on the plurality of base divisors $D^-_j$ stored by the base divisor storage unit and the random matrix V* selected by the random matrix selection unit, by using the second processing device;

the key calculation unit calculates a key to be used in a cryptographic operation, based on the plurality of output bases $g_k$ calculated by the output base calculation unit and the random matrix V* selected by the random matrix selection unit, by using the second processing device;

the random divisor selection unit selects a random divisor D* from a plurality of divisors of a Jacobian variety $Jac_C$ of a hyperelliptic curve $C: Y^2 = X^5 + 1$, where a remainder a of a prime number p divided by 5 is 2 or 3, in a finite field $F_p$, by using the processing device;

the random matrix selection unit selects a random matrix V* of 2 row by 2 column satisfying a condition: $m'_{12} = m'_{21} = 0, m'_{11} \neq 0$, and $m'_{22} \neq 0$, by using the second processing device;

the output base calculation unit calculates two output bases $g_k = v_k \cdot D^-$, where k is an integer greater than or equal to 1 and less than or equal to 2, based on a plurality of base divisors $D^-_j$ stored by the base divisor storage unit and the random matrix V* calculated by the random matrix selection unit, by using the second processing device;

the key calculation unit includes a bit length input unit, a base random number generation unit, a pairing random number generation unit, a master random number generation unit, a public base calculation unit, a public first divisor calculation unit, a public pairing value calculation unit, a public second divisor generation unit, a public third divisor generation unit, a public bit divisor generation unit, a master divisor calculation unit, a public key setting unit, a master key setting unit, and a tracer's key setting unit;

the bit length input unit inputs a bit length m of a message to be signed, by using the second processing device;

the base random number generation unit randomly generates a random number β, where the random number β is an integer greater than or equal to 1 and less than or equal to r−1, by using the second processing device;

the pairing random number generation unit randomly generates a random number α, where the random number α is an integer greater than or equal to 1 and less than or equal to r−1, by using the second processing device;

the master random number generation unit randomly generates a random number ω, where the random number ω is an integer greater than or equal to 1 and less than or equal to r−1, by using the second processing device;

the public base calculation unit calculates a divisor $g = g_2 + \beta \cdot g_1$ of the Jacobian variety $Jac_C$, based on an output base $g_1$ and an output base $g_2$ calculated by the output base calculation unit and the random number β generated by the base random number generation unit, by using the second processing device;

the public first divisor calculation unit calculates a divisor $\Omega = \omega \cdot g$ of the Jacobian variety $Jac_C$, based on the random number ω generated by the master random number generation unit and the divisor g calculated by the public base calculation unit, by using the second processing device;

the public pairing value calculation unit calculates a pairing value $A = e(g,g)^\alpha$, based on the random number α generated by the pairing random number generation unit and the divisor g calculated by the public base calculation unit, by using the second processing device;

the public second divisor generation unit randomly generates a divisor u of the Jacobian variety $Jac_C$, by using the second processing device;

the public third divisor generation unit randomly generates a divisor v' of the Jacobian variety $Jac_C$, by using the second processing device;

the public bit divisor generation unit randomly generates m divisors $v_i$, where i is an integer greater than or equal to 1 and less than or equal to m, of the Jacobian variety $Jac_C$, based on the bit length m input by the bit length input unit, by using the second processing device;

the master divisor calculation unit calculates a divisor $g' = \alpha \cdot g$ of the Jacobian variety $Jac_C$, based on the random number α generated by the pairing random number generation unit and the divisor g calculated by the public base calculation unit, by using the second processing device;

the public key setting unit sets a public key $PK = (g_1, g, \Omega, A, u, v', v_i)$, where i is an integer greater than or equal to 1 and less than or equal to m, based on the output base $g_1$ calculated by the output base calculation unit, the divisor g calculated by the public base calculation unit, the divisor Ω calculated by the public first divisor calculation unit, the pairing value A calculated by the public pairing value calculation unit, the divisor u generated by the public second divisor generation unit, the divisor v' generated by the public third divisor generation unit, and the m divisors $v_i$ generated by the public bit divisor generation unit, by using the second processing device;

the master key setting unit sets a master key $MK = (\omega, g')$, based on the random number ω generated by the master random number generation unit and the divisor g' calculated by the master divisor calculation unit, by using the second processing device;

the tracer's key setting unit sets a tracer's key $TK = (g_2)$, based on the output base $g_2$ calculated by the output base calculation unit, by using the second processing device;

the signing key issuing apparatus includes a second storage device for storing data, a third processing device for processing data, a master key storage unit, an issuer public key input unit, an identifier generation unit, a signing first key calculation unit, a signing second key calculation unit, a signing third key calculation unit, a signing key setting unit, and an identifier setting unit;

the master key storage unit stores the master key $MK = (\omega, g')$ set by the key generation apparatus, by using the second storage device;

the issuer public key input unit inputs the public key PK= $(g_1,g,\Omega,A,u,v',v_i)$ set by the key generation apparatus, by using the third processing device;

the identifier generation unit randomly generates an identifier $s_{ID}$ where the identifier $S_{ID}$ is an integer greater than or equal to 1 and less than or equal to r−1, by using the third processing device;

the signing first key calculation unit calculates a divisor $K_1=\{1/(\omega+s_{ID})\}\cdot g'$ of the Jacobian variety $Jac_C$, based on the random number ω and the divisor g' included in the master key MK stored by the master key storage unit and the identifier $s_{ID}$ generated by the identifier generation unit, by using the third processing device;

the signing second key calculation unit calculates a divisor $K_2=s_{ID}\cdot g$ of the Jacobian variety $Jac_C$, based on the divisor g included in the public key PK stored by the issuer public key input unit and the identifier $S_{ID}$ generated by the identifier generation unit, by using the third processing device;

the signing third key calculation unit calculates a divisor $K_3=s_{ID}\cdot u$ of the Jacobian variety $Jac_C$, based on the divisor u included in the public key PK stored by the issuer public key input unit and the identifier $s_{ID}$ generated by the identifier generation unit, by using the third processing device;

the signing key setting unit sets a signing key $SK=(K_1,K_2,K_3)$, based on the divisor $K_1$ calculated by the signing first key calculation unit, the divisor $K_2$ calculated by the signing second key calculation unit, and the divisor $K_3$ calculated by the signing third key calculation unit, by using the third processing device;

the identifier setting unit sets the identifier $s_{ID}$ generated by the identifier generation unit as an identifier for identifying the signing key SK set by the signing key setting unit, by using the third processing device;

each of the signing apparatus includes a third storage device for storing data, a fourth processing device for processing data, a signing key storage unit, a signer public key input unit, a signer message input unit, a signer message divisor calculation unit, a signature first random number generation unit, a signature second random number generation unit, a signature first divisor calculation unit, a signature second divisor calculation unit, a signature third divisor calculation unit, a signature fourth divisor calculation unit, a signature fifth divisor calculation unit, a signature sixth divisor calculation unit, and a signature output unit;

the signing key storage unit stores the signing key $SK=(K_1,K_2,K_3)$ set by the key generation apparatus, by using the third storage device;

the signer public key input unit inputs the public key PK= $(g_1,g,\Omega,A,u,v',v_i)$ set by the key generation apparatus, by using the fourth processing device;

the signer message input unit inputs a message M to be signed, by using the fourth processing device;

the signer message divisor calculation unit calculates a divisor $v = v'+\Sigma(\mu_i\cdot v_i)$, where i is an integer greater than or equal to 1 and less than or equal to m, and μi is an integer being 0 or 1 indicating an i-th bit of the message M, of the Jacobian variety $Jac_C$, based on the divisor v' and the m divisors $v_i$ included in the public key PK input by the signer public key input unit and the message M input by the signer message input unit, by using the fourth processing device;

the signature first random number generation unit generates a random number s, where the random number s is an integer greater than or equal to 1 and less than or equal to r−1, by using the fourth processing device;

the signature second random number generation unit randomly generates four random numbers $t_j$, where j is an integer greater than or equal to 1 and less than or equal to 4 and the random number $t_j$ is an integer greater than or equal to 1 and less than or equal to r−1, by using the fourth processing device;

the signature first divisor calculation unit calculates a divisor $\sigma_1=K_1+t_1\cdot g_1$ of the Jacobian variety $Jac_C$, based on the divisor $g_1$ included in the public key PK input by the signer public key input unit, the divisor $K_1$ included in the signing key SK stored by the signing key storage unit, and a random number $t_1$ generated by the signature second random number generation unit, by using the fourth processing device;

the signature second divisor calculation unit calculates a divisor $\sigma_2=K_2+t_2\cdot g_1$ of the Jacobian variety $Jac_C$, based on the divisor $g_1$ included in the public key PK input by the signer public key input unit, the divisor $K_2$ included in the signing key SK stored by the signing key storage unit, and a random number $t_2$ generated by the signature second random number generation unit, by using the fourth processing device;

the signature third divisor calculation unit calculates a divisor σhd 3=$K_3+s\cdot v+t_3\cdot g_1$ of the Jacobian variety $Jac_C$, based on the divisor $g_1$ included in the public key PK input by the signer public key input unit, the divisor $K_3$ included in the signing key SK stored by the signing key storage unit, the divisor v calculated by the signer message divisor calculation unit, the random number s generated by the signature first random number generation unit, and a random number $t_3$ generated by the signature second random number generation unit, by using the fourth processing device;

the signature fourth divisor calculation unit calculates a divisor $\sigma_4=s\cdot g+t_4\cdot g_1$ of the Jacobian variety $Jac_C$, based on the divisors g and $g_1$ included in the public key PK input by the signer public key input unit, the random number s generated by the signature first random number generation unit, and a random number $t_4$ generated by the signature second random number generation unit, by using the fourth processing device;

the signature fifth divisor calculation unit calculates a divisor $\pi_1=t_1 t_2\cdot g_1+t_2\cdot K_1+t_1\cdot(K_2+\Omega)$ of the Jacobian variety $Jac_C$, based on the divisors $g_i$ and Ω included in the public key PK input by the signer public key input unit, the divisors $K_1$ and $K_2$ included in the signing key SK stored by the signing key storage unit, and the random numbers $t_1$ and $t_2$ generated by the signature second random number generation unit, by using the fourth processing device;

the signature sixth divisor calculation unit calculates a divisor $\pi_2=t_2\cdot u-t_3\cdot g-t_4\cdot v$ of the Jacobian variety $Jac_C$, based on the divisors g and u included in the public key PK input by the signer public key input unit, the divisor v calculated by the signer message divisor calculation unit, and the random numbers $t_2$, $t_3$, and $t_4$ generated by the signature second random number generation unit, by using the fourth processing device;

the signature output unit outputs a signature $\sigma=(\sigma_1,\sigma_2,\sigma_3,\sigma_4,\pi_1,\pi_2)$, based on the divisor $\sigma_1$ calculated by the signature first divisor calculation unit, the divisor $\sigma_2$ calculated by the signature second divisor calculation unit, the divisor $\sigma_3$ calculated by the signature third divisor calculation unit, the divisor $\sigma_4$ calculated by the signature fourth divisor calculation unit, the divisor $\pi_1$ calculated by the signature fifth divisor calculation unit, and the divisor $\pi_2$ calculated by the signature sixth divisor calculation unit, by using the fourth processing device;

the signature verification apparatus includes a fifth processing device for processing data, a verifier public key input unit, a verifier signature input unit, a verifier message input unit, a verifier message divisor calculation unit, a signature first verification value calculation unit, a signature second verification value calculation unit, a signature third verification value calculation unit, a signature fourth verification value calculation unit, and a signature verification judgment unit;

the verifier public key input unit inputs the public key $PK=(g_1,g,\Omega,A,u,v',v_i)$ set by the key generation apparatus, by using the fifth processing device;

the verifier signature input unit inputs the signature $\sigma=(\sigma_1,\sigma_2,\sigma_3,\sigma_4,\pi_1,\pi_2)$ output by the signing apparatus, by using the fifth processing device;

the verifier message input unit inputs the message M signed with the signature $\sigma$, by using the fifth processing device;

the verifier message divisor calculation unit calculates the divisor $v=v'+\Sigma(\mu_i \cdot v_i)$, where i is an integer greater than or equal to 1 and less than or equal to m, and $\mu_i$ is an integer being 0 or 1 indicating an i-th bit of the message M, of the Jacobian variety $Jac_C$, based on the divisor v' and the m divisors $v_i$ included in the public key PK input by the verifier public key input unit and the message M input by the verifier message input unit, by using the fifth processing device;

the signature first verification value calculation unit calculates a pairing value $C=e(g_1,\pi_1)$, based on the divisor $g_1$ included in the public key PK input by the verifier public key input unit and the divisor $\pi_1$ included in the signature $\sigma$ input by the verifier signature input unit, by using the fifth processing device;

the signature second verification value calculation unit calculates a pairing value $C'=e(\sigma_1,\sigma_2+\Omega)/A$, based on the divisor $\Omega$ and the pairing value A included in the public key PK input by the verifier public key input unit and the divisors $\sigma_1$ and $\sigma_2$ included in the signature $\sigma$ input by the verifier signature input unit, by using the fifth processing device;

the signature third verification value calculation unit calculates a pairing value $D=e(g_1,\pi_2)$, based on the divisor $g_1$ included in the public key PK input by the verifier public key input unit and the divisor $\pi_2$ included in the signature a input by the verifier signature input unit, by using the fifth processing device;

the signature fourth verification value calculation unit calculates a pairing value $D'=e(\sigma_2,u)/\{e(g,\sigma_3)\cdot e(\sigma_4,v)\}$, based on the divisors u and g included in the public key PK input by the verifier public key input unit, the divisors $\sigma_2$, $\sigma_3$, and $\sigma_4$ included in the signature $\sigma$ input by the verifier signature input unit, and the divisor v calculated by the verifier message divisor calculation unit, by using the fifth processing device;

the signature verification judgment unit judges whether the pairing value C and the pairing value C' are equal or not and whether the pairing value D and the pairing value D' are equal or not, based on the pairing value C calculated by the signature first verification value calculation unit, the pairing value C' calculated by the signature second verification value calculation unit, the pairing value D calculated by the signature third verification value calculation unit, and the pairing value D' calculated by the signature fourth verification value calculation unit, and when judging that the pairing value C and the pairing value C' are equal and the pairing value D and the pairing value D' are equal, judges the signature $\sigma$ input by the verifier signature input unit to be valid, by using the fifth processing device;

the signer tracing apparatus includes a fourth storage device for storing data, a sixth processing device for processing data, a tracer's key storage unit, an identifier storage unit, a tracer signature input unit, a signature pairing value calculation unit, an identifier pairing value calculation unit, and a signer identification unit;

the tracer's key storage unit stores a tracer's key $TK=(g_2)$ set by the key generation apparatus, by using the fourth storage device;

the identifier storage unit stores the identifier $s_{ID}$ for identifying the signing key SK issued by the signing key issuing apparatus, by using the fourth storage device;

the tracer signature input unit inputs the signature $\sigma$ output by the signing apparatus, by using the sixth processing device;

the signature pairing value calculation unit calculates a pairing value $E=e(g_2,\sigma_2)$, based on the divisor $g_2$ included in the tracer's key TK stored by the tracer's key storage unit and the divisor $\sigma_2$ included in the signature $\sigma$ input by the tracer signature input unit, by using the sixth processing device;

the identifier pairing value calculation unit calculates a pairing value $E_{ID}=e(g_2,g_2)^{s_{ID}}$, based on the divisor $g_2$ included in the tracer's key TK stored by the tracer's key storage unit and the identifier $s_{ID}$ stored by the identifier storage unit, by using the sixth processing device; and the signer identification unit identifies an identifier of the signing key SK which had generated the signature $\sigma$ input by the tracer signature input unit, by detecting a pairing value in accordance with the pairing value E calculated by the signature pairing value calculation unit in the pairing value $E_{ID}$ calculated by the identifier pairing value calculation unit, by using the sixth processing device.

16. A key generation apparatus comprising:

a processing device for processing data; a storage device for storing data; a base divisor storage unit; a pairing log storage unit; an output base calculation unit; and a key calculation unit, wherein the base divisor storage unit stores, as a plurality of base divisors $D\widetilde{\ }_j$, a plurality of elements of a group G, where the group G is a direct product of a plurality of cyclic groups of a same order, a pairing value by a bilinear pairing operation of two elements included in the group G is computable, and the plurality of base divisors $D\widetilde{\ }_j$ are mutually linearly independent, by using the storage device;

the pairing log storage unit stores logarithms of pairing values of the plurality of base divisors $D\widetilde{\ }_j$, as a plurality of pairing log coefficients $\eta_i$, by using the storage device;

the output base calculation unit calculates a plurality of output bases $g_k$ being elements of the group G, where a pairing value of at least any two output bases $g_k$ in the plurality of output bases $g_k$ is 1, based on the plurality of base divisors $D\widetilde{\ }_j$, stored by the base divisor storage unit and the plurality of pairing log coefficients $\eta_i$ stored by the pairing log storage unit, by using the processing device; and the key calculation unit calculates a key to be used in a cryptographic operation, based on the plurality of output bases $g_k$ calculated by the output base calculation unit, by using the processing device.

17. The key generation apparatus according to claim 16, further comprising a random matrix selection unit, wherein the random matrix selection unit randomly selects a random matrix V* from a plurality of matrices V satisfying $m'_{uv}=0$, where u and v are predetermined integers greater than or equal to 1 and less than or equal to b, in a relational expression $M'=V \cdot M \cdot V^T$, where M' is a b-dimensional square matrix in which $m'_{uv}$ is a μ-th row and v-th column element, b is a number of a plurality of output bases $g_k$ which the output base calculation unit calculates, V is a b row by f column matrix in which a variable $c_{\mu v}$ whose value is an integer greater than or equal to 0 and less than or equal to r−1 is a μ-th row and v-th column element, r is an order of the plurality of cyclic groups, f is a number of the plurality of base divisors $D^\sim_j$, stored by the base divisor storage unit, M is an f-dimensional square matrix in which a pairing log coefficient $\eta_i$ of a base divisor $D^\sim_\mu$ and a base divisor $D^\sim_v$ in the pairing log coefficients $\mu_i$ stored by the pairing log storage unit is a μ-th row and v-th column element, and $V^T$ is an f row by b column matrix transposed from the matrix V, based on the plurality of pairing log coefficients η stored by the pairing log storage unit, by using the processing device; and the output base calculation unit calculates the plurality of output bases $g_k=v_k \cdot D^\sim$, where k is an integer greater than or equal to 1 and less than or equal to b, $v_k$ is a k-th row vector of the random matrix V*, and $D^\sim$ is an f-dimensional column vector which uses the plurality of base divisors $D^\sim_j$ as a (j+1)th row element, based on the plurality of base divisors $D^\sim_j$ stored by the base divisor storage unit and the random matrix V* selected by the random matrix selection unit, by the processing device.

18. The key generation apparatus according to claim 16, wherein the base divisor storage unit stores a plurality of elements of a group G which is a subgroup of a group composed of a plurality of divisors of a Jacobian variety $Jac_C$ of an algebraic curve C in an extension field K given by a finite algebraic extension of a finite field $F_p$, as the plurality of base divisors $D^\sim_j$, by using the storage device.

19. A non-transitory computer readable storage medium having stored therein computer executable instructions that cause a computer, having a processing device for processing data, to operate as the key generation apparatus according to claim 16.

20. An encryption parameter setting method according to which an encryption parameter setting apparatus, having a processing device for processing data, sets encryption parameters used for a cryptographic operation, the encryption parameter setting method comprising:
   selecting, by the processing device, an element from a plurality of elements of a cyclic group G', as a random divisor D*;
   calculating, by the processing device, a plurality of base divisors $D^\sim_j$ by mapping the random divisor D* by using a plurality of maps $G_j$, where the plurality of maps $G_j$ are homomorphism from the cyclic group G' to each of a plurality of cyclic groups $G'_j$, based on the random divisor D* selected;
   calculating, by the processing device, logarithms of pairing values of the plurality of base divisors $D^\sim_j$ in a group G, where the group G is a direct product of the plurality of cyclic groups $G'_j$, and a pairing value by a bilinear pairing operation of two elements included in the group G is computable, and treating the logarithms as a plurality of pairing log coefficients $\eta_i$; and
   treating, by the processing device, the plurality of base divisors $D^\sim_j$ calculated and the plurality of pairing log coefficients $\eta_i$; calculated, as the encryption parameters.

21. An encryption parameter setting method according to which an encryption parameter setting apparatus, having a processing device for processing data, sets encryption parameters used for a cryptographic operation, the encryption parameter setting method comprising:
   selecting, by the processing device, a random divisor D* randomly from a plurality of divisors of a Jacobian variety $Jac_C$ of a hyperelliptic curve C of genus d in a finite field $F_p$ (where an order p of the finite field $F_p$ is a prime number, and the genus d is an integer greater than or equal to 2);
   calculating, by the processing device, a plurality of base divisors $D^\sim_j$, based on the random divisor D* selected;
   calculating, by the processing device, a plurality of discrete logs $1_K$, where K is an integer greater than or equal to 1 and less than or equal to 2d-1, and the discrete log $1_K$ is an integer greater than or equal to 0 and less than or equal to 2d-1;
   calculating, by the processing device, a plurality of pairing log coefficients $\eta_i$, where i is an integer greater than or equal to 0 and less than or equal to 2d-1, the pairing log coefficient $\eta_i$ is an integer greater than or equal to 0 and less than or equal to r−1, and r is an order of the plurality of divisors of the Jacobian variety $Jac_C$, based on the plurality of discrete logs $1_K$ calculated; and
   setting, by the processing device, the encryption parameters, based on the plurality of base divisors $D^\sim_j$ calculated and the plurality of pairing log coefficients $\eta_i$ calculated.

22. A key generation method according to which a key generation apparatus, having a processing device for processing data and a storage device for storing data, generates a key used for a cryptographic operation, the key generation method comprising:
   storing, by the storage device, as a plurality of base divisors $D^\sim_j$, a plurality of elements of a group G, where the group G is a direct product of a plurality of cyclic groups of a same order, a pairing value by a bilinear pairing operation of two elements included in the group G is computable, and the plurality of base divisors $D^\sim_j$ are mutually linearly independent;
   storing, by the storage device, logarithms of pairing values of the plurality of base divisors $D^\sim_j$, as a plurality of pairing log coefficients $\eta_i$;
   calculating, by the processing device, a plurality of output bases $g_k$ being elements of the group G, where a pairing value of at least any two output bases $g_k$ in the plurality of output bases $g_k$ is 1, based on the plurality of base divisors $D^\sim_j$ stored by the storage device and the plurality of pairing log coefficients $\eta_i$ stored by the storage device; and
   calculating, by the processing device, the key, based on the plurality of output bases calculated.

23. A key generation method according to which a key generation apparatus, having a processing device for processing data and a storage device for storing data, generates a key used for a cryptographic operation, the key generation method comprising:
   storing, by the storing device, a plurality of base divisors $D^\sim_j$ of a Jacobian variety $Jac_C$ of an algebraic curve C of genus d in an extension field K given by a finite algebraic extension of a finite field $F_p$, where an order p of the finite field $F_p$ is a prime number, the genus d is an integer greater than or equal to 2, and w is a prime number of w=2d+1, and a plurality of pairing log coefficients $\eta_i$ indicating a relation of a pairing value of the plurality of base divisors;
   randomly, by the processing device, selecting a random matrix V* satisfying a predetermined condition, based on the plurality of pairing log coefficients $\eta_i$ stored by the storage device;

calculating, by the processing device, a plurality of output bases $g_k$, based on the plurality of base divisors $D^-_j$ stored by the storage device and the random matrix $V^*$ selected; and calculating, by the processing device, the key, based on the plurality of output bases $g_k$ calculated.

\* \* \* \* \*